(12) United States Patent
Mochinaga et al.

(10) Patent No.: US 9,218,109 B2
(45) Date of Patent: Dec. 22, 2015

(54) RECORDING MEDIUM, PLAYBACK DEVICE, RECORDING DEVICE, PLAYBACK METHOD AND RECORDING METHOD FOR EDITING RECORDED CONTENT WHILE MAINTAINING COMPATIBILITY WITH OLD FORMAT

(71) Applicant: Panasonic Corporation, Osaka (JP)

(72) Inventors: Kazuhiro Mochinaga, Hyogo (JP); Tomoki Ogawa, Osaka (JP); Hiroshi Yahata, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 284 days.

(21) Appl. No.: 13/882,328

(22) PCT Filed: Oct. 5, 2012

(86) PCT No.: PCT/JP2012/006444
§ 371 (c)(1),
(2) Date: Apr. 29, 2013

(87) PCT Pub. No.: WO2013/061523
PCT Pub. Date: May 2, 2013

(65) Prior Publication Data
US 2014/0115472 A1    Apr. 24, 2014

Related U.S. Application Data

(60) Provisional application No. 61/552,929, filed on Oct. 28, 2011.

(51) Int. Cl.
*H04N 5/84* (2006.01)
*H04N 5/89* (2006.01)
(Continued)

(52) U.S. Cl.
CPC ............ *G06F 3/0484* (2013.01); *G11B 27/034* (2013.01); *G11B 27/322* (2013.01);
(Continued)

(58) Field of Classification Search
USPC .................................. 386/223–224, 334–336
See application file for complete search history.

(56) References Cited

U.S. PATENT DOCUMENTS

| 6,574,423 B1 | 6/2003 | Oshima et al. |
| 2008/0158384 A1* | 7/2008 | Okamoto et al. .......... 348/231.2 |

(Continued)

FOREIGN PATENT DOCUMENTS

| CN | 102172033 | 8/2011 |
| EP | 1 998 557 | 12/2008 |

(Continued)

OTHER PUBLICATIONS

International Search Report issued Nov. 13, 2012 in International (PCT) Application No. PCT/JP2012/006444.
(Continued)

*Primary Examiner* — Nigar Chowdhury
(74) *Attorney, Agent, or Firm* — Wenderoth, Lind & Ponack, L.L.P.

(57) ABSTRACT

A rewritable recording medium on which Index.bdmv is recorded in the BDMV directory. The Index.bdmv includes editability_flag and extended_editability_flag. When the editability_flag is set ON, it indicates that the recording medium is treated as an editable medium by a legacy device which does not support recording and editing of stereoscopic video. When the editability_flag is set OFF, it indicates that the recording medium is treated as a non-editable medium by the legacy device. When the extended_editability_flag is set ON, it indicates that the recording medium is treated as an editable medium by a non-legacy device even when the editability flag is set OFF, where the non-legacy device supports recording and editing of stereoscopic video.

29 Claims, 62 Drawing Sheets

(51) Int. Cl.
*G06F 3/0484* (2013.01)
*G11B 27/034* (2006.01)
*G11B 27/32* (2006.01)
*H04N 5/85* (2006.01)
*H04N 9/804* (2006.01)
*H04N 9/82* (2006.01)
*H04N 13/00* (2006.01)

(52) U.S. Cl.
CPC ............... *G11B27/329* (2013.01); *H04N 5/85* (2013.01); *H04N 9/8042* (2013.01); *H04N 9/8205* (2013.01); *H04N 9/8233* (2013.01); *H04N 13/0048* (2013.01); *H04N 13/0055* (2013.01); *H04N 13/0066* (2013.01); *G11B 2220/216* (2013.01); *G11B 2220/2541* (2013.01); *H04N 13/007* (2013.01)

(56) References Cited

U.S. PATENT DOCUMENTS

| | | | |
|---|---|---|---|
| 2008/0316300 A1* | 12/2008 | Okamoto | 348/47 |
| 2011/0150421 A1 | 6/2011 | Sasaki et al. | |
| 2012/0099408 A1 | 4/2012 | Hamada et al. | |
| 2013/0011117 A1 | 1/2013 | Hamada | |

FOREIGN PATENT DOCUMENTS

| | | |
|---|---|---|
| EP | 2 445 224 | 4/2012 |
| JP | 3935507 | 6/2007 |
| JP | 2008-289065 | 11/2008 |
| JP | 2010-109404 A | 5/2010 |
| JP | 2011-23070 A | 2/2011 |
| JP | 2011-71970 A | 4/2011 |
| WO | 02/052556 | 7/2002 |
| WO | 2010/146847 | 12/2010 |
| WO | 2011/125572 | 10/2011 |

OTHER PUBLICATIONS

Office Action issued May 13, 2014 to corresponding Japanese Application No. 2013-148999.
Office Action issued Aug. 5, 2015, in corresponding Chinese Application No. 201280003781.9.
Partial Supplementary Search Report issued Sep. 3, 2015, in corresponding European Application No. 12843430.5.
Bolio, D. D. R. J.: "Integration of 3D Video into the Blu-ray format", Master Thesis Technische Universiteit Eindhoven Department of Mathematics and Computer Science, Technische Universiteit Eindhoven, NL, Oct. 1, 2007, pp. I-IX, 1, XP008148221, Retrieved from the Internet: URL:http://alexandria.tue.nl/extra/afstvers/wsk-i/bolio2007.pdf *last paragraph; p. 54*.

* cited by examiner

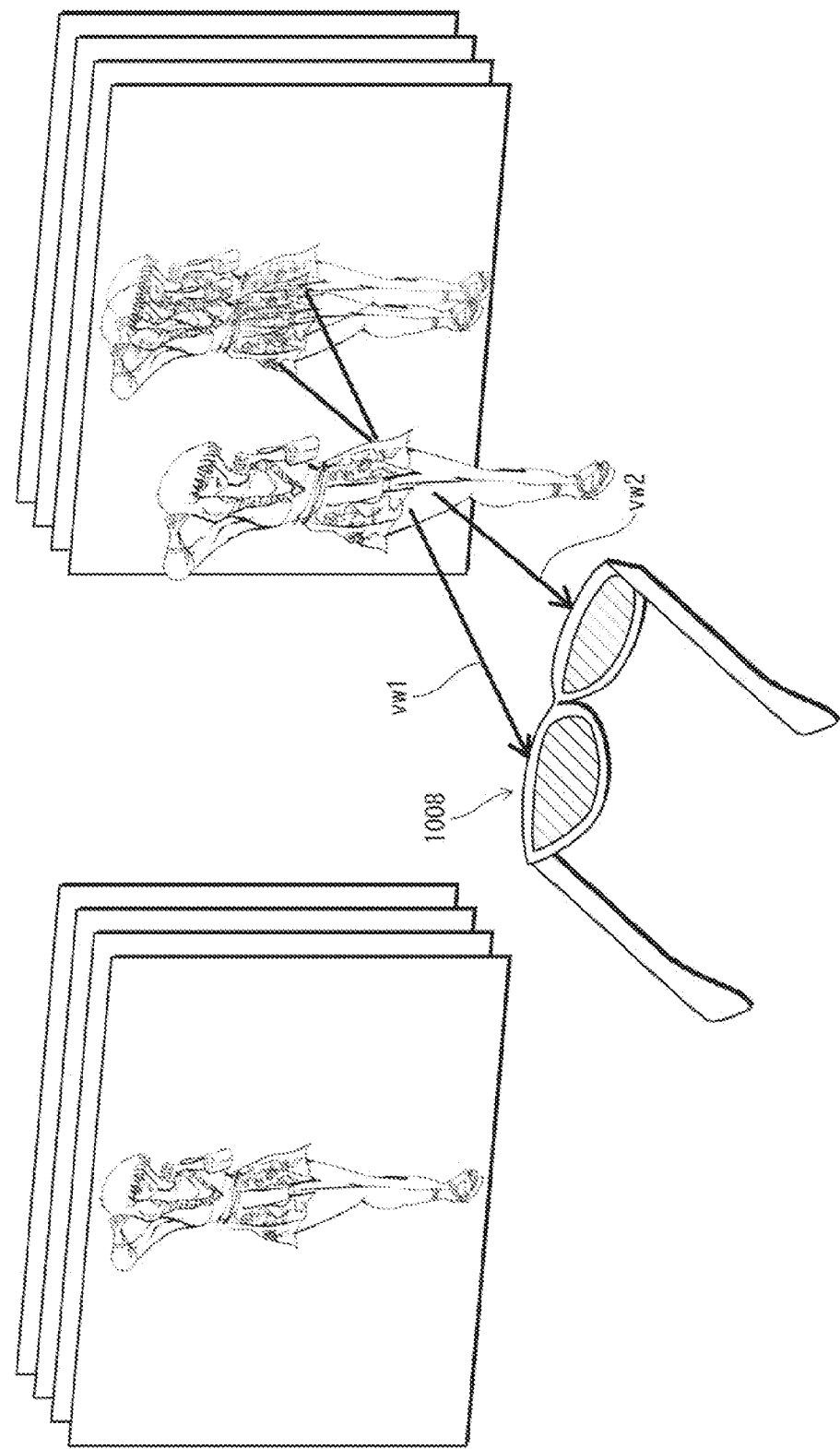

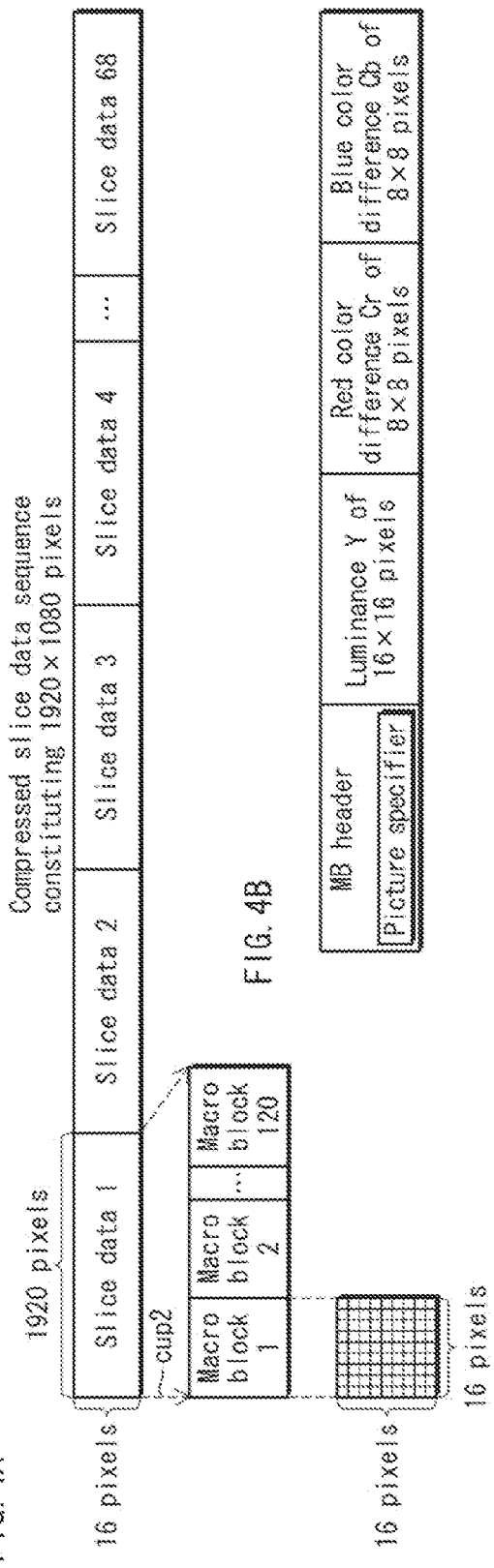
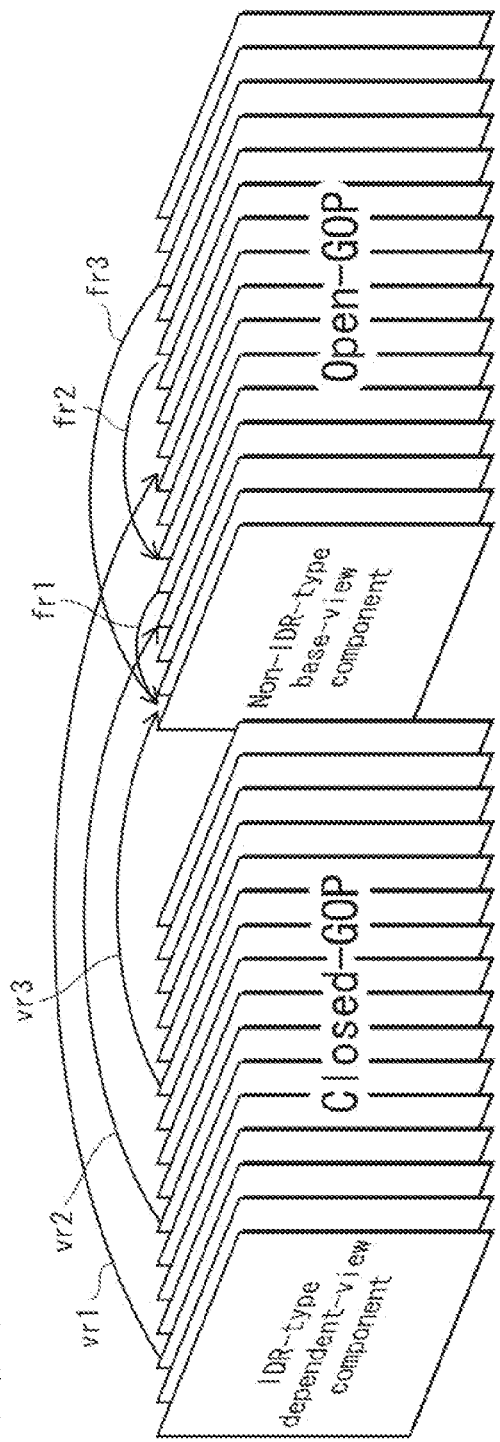
FIG. 4A
FIG. 4B
FIG. 4C

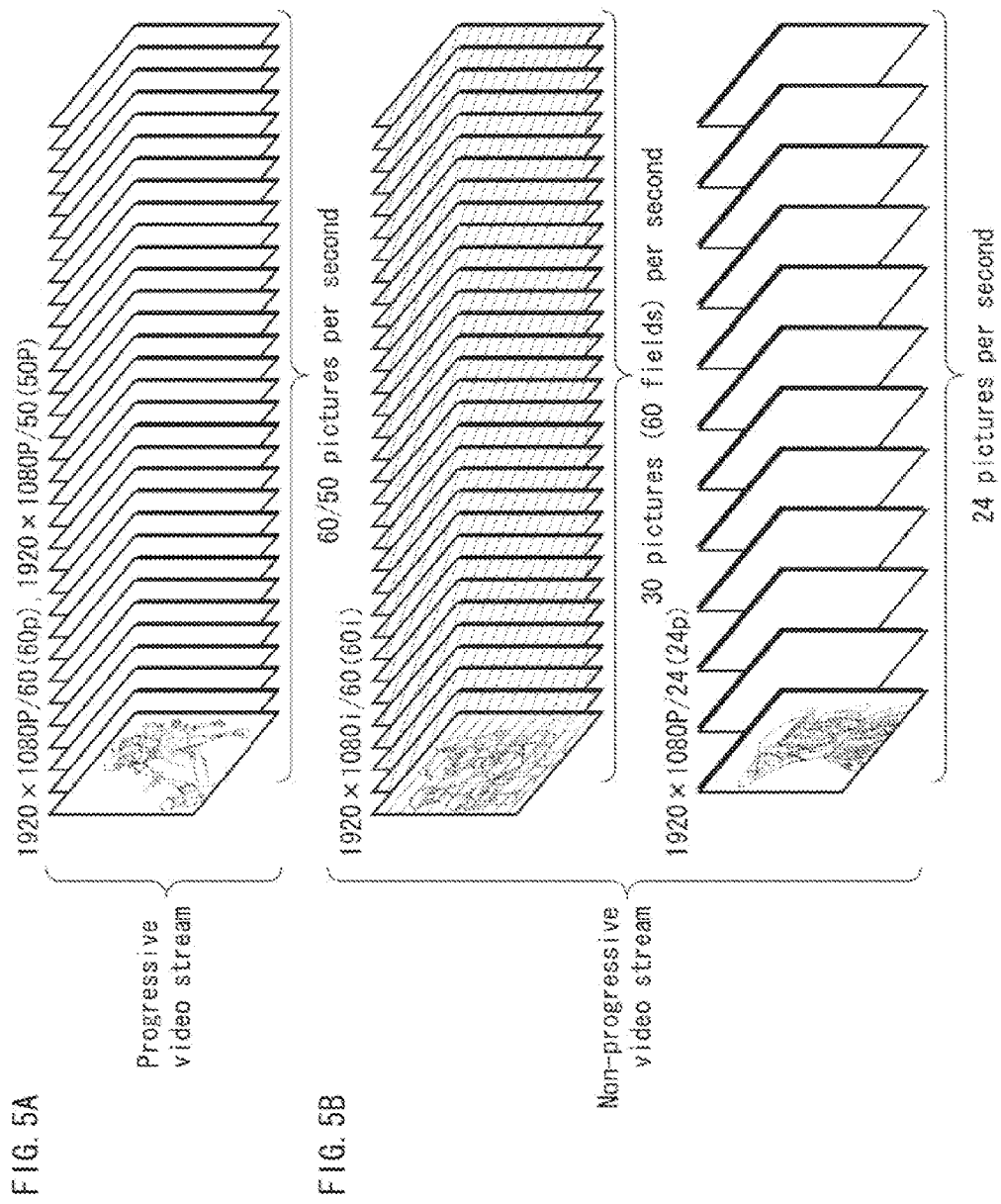

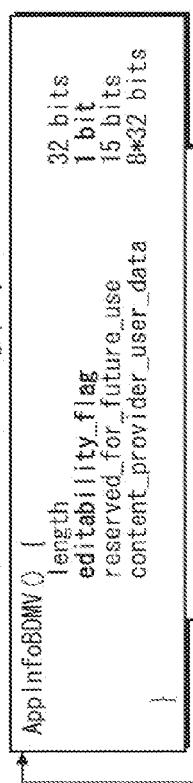
FIG. 6A
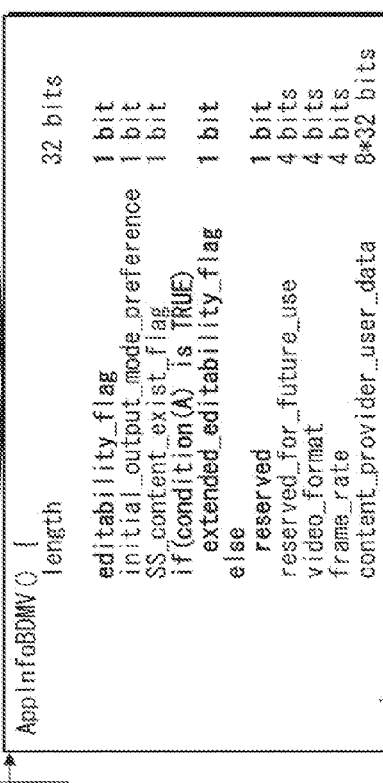
FIG. 6B Conventional recording/playback format
FIG. 6C Extended recording/playback format
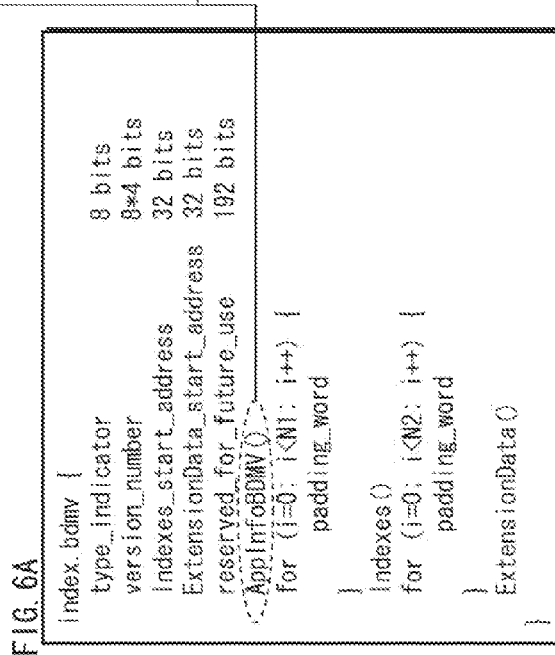
FIG. 6D

FIG. 8

- Condition to set editability_flag to "0"
  - Playlist including 3D is present
    → SS_content_exist_flag=1b
  - Playlist including progressive video stream is present
    → Playlist including primary video entry having following attribute is present in stream_attributes() in STN_table
        stream_coding_type=0x1B (MPEG-4 AVC)
        video_format=0x06 (1080P)
        frame_rate=6 or 7 (50Hz or 59.94Hz)

⇒Namely, above condition is same as condition to satisfy Condition (A).
  Conversely, when editability_flag = 1, any device can edit.
  Condition (A) is FALSE, and extended_editability_flag field is not present.

- When extended_editability_flag = 1 (editable disc):
  - Editability_flag needs to be set to "0" (because Condition (A) is TRUE);
  - Even when editability_flag = 0, recorder judges disc as editable; and
    BDMV Recording spec + PREF must be observed.

FIG. 14

PSR31 Player Profile and Player Version

| b31 | b30 | b29 | b82 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | Profile 5 indicator | Player Profile | | | |
| b15 | b14 | b13 | b12 | b11 | b10 | b9 | b8 |
| Player Version (b15–b8) | | | | | | | |
| b7 | b6 | b5 | b4 | b3 | b2 | b1 | b0 |
| Player Version (b7–b0) | | | | | | | |

Profile 5 indicator <<Profile5 → supports 3D playback>>
0b: BD-RE/BD-R Player which complies with BD-RE Profile 1, Profile 2, Profile 3 or Profile 4
1b: BD-RE/BD-R Player which complies with BD-RE Profile 5. When the Profile 5 indicator value is set to 1b, the Player Profile value shall be set to 0011b.

Player Version
0000 0010 0100 0000b (0x0240) : BD-RE/BD-R Player which complies with "System Description Blu-ray Disc Rewritable Format, Part 3: Audio Visual Basic Specifications Version 3.1"

FIG. 15

PSR29 Player Status Register for Player Capability for Video

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | Progressive Video Capability | Scaling value type of x1 for 720x480 16:9 on 1920x1080 or 1280x720 | | 50&25Hz Video Capability | HD Secondary Video Capability |

Progressive Video Capability
0b: Progressive Video incapable
1b: Progressive Video capable

FIG. 16

PSR23 Display Capability

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | Horizontal display size (b11-b8) | | | |

| b15 | b14 | b13 | b12 | b11 | b10 | b9 | b8 |
|---|---|---|---|---|---|---|---|
| | | | | Horizontal display size (b7-b0) | | | |

| b7 | b6 | b5 | b4 | b3 | b2 | b1 | b0 |
|---|---|---|---|---|---|---|---|
| reserved | | | | Stereoscopic 1920x1080 interlace video Display Capability | Stereoscopic No 3D glasses required for stereoscopic display | Stereoscopic 1280x720 50p video Display Capability | Stereoscopic Display Capability |

Stereoscopic 1920x1080 interlace video Display Capability
《《Whether TV connected with playback device can display interlace 3D》》
0b: Incapable of displaying Stereoscopic 1920x1080 interlace video
1b: Capable of displaying Stereoscopic 1920x1080 interlace video

FIG. 17

PSR24 3D Capability

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | Stereoscopic 1920x1080 interlace video output conversion Capability | Stereoscopic 1920x1080 interlace video Capability |
| b7 | b6 | b5 | b4 | b3 | b2 | b1 | b0 |
| Limited Stereoscopic BD-J | Secondary audio Capability | Stereoscopic BD-J Capability | dialog_ region_ offset | Stereoscopic IG Capability | | Stereoscopic 1280x720 P6 | Stereoscopic 1280x720 |

Stereoscopic 1920x1080 interlace video Capability
《Whether interlace 3D can be decoded》
0b: Incapable of decoding Stereoscopic 1920x1080 interlace video.
1b: Capable of decoding Stereoscopic 1920x1080 interlace video.
This field shall not be set to 1b, If Profile 5 indicator in PSR31 is set to 0b.

Stereoscopic 1920x1080 interlace video output conversion Capability
《Whether interlace 3D can be converted into HDMI v1.4a compliant 3D video》
0b: Incapable of output conversion
1b: Capable of output conversion. If PSR24 8b is set to 1b, this field shall be set to 1b.

When Profile5 is not supported, this field is not set to 1 (∵Because 3D other than Profile5 is not supported, decoding of interlace 3D is not supported).

Players capable of decoding interlace 3D need to have 3D output conversion function
⇒Currently presumed combination of capabilities is
[b9,b8]=[0,0] or [1,1]

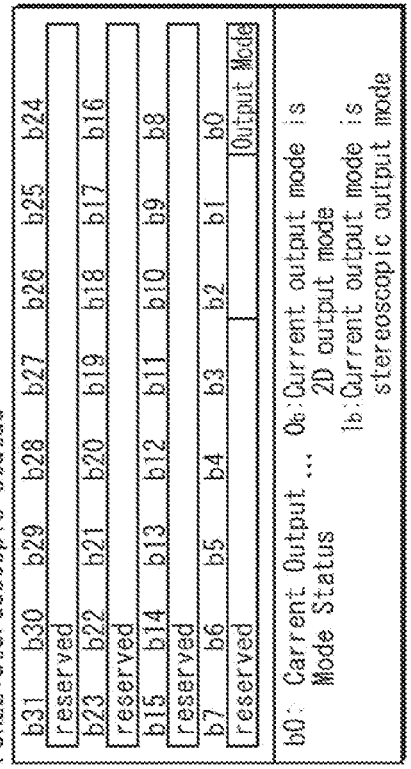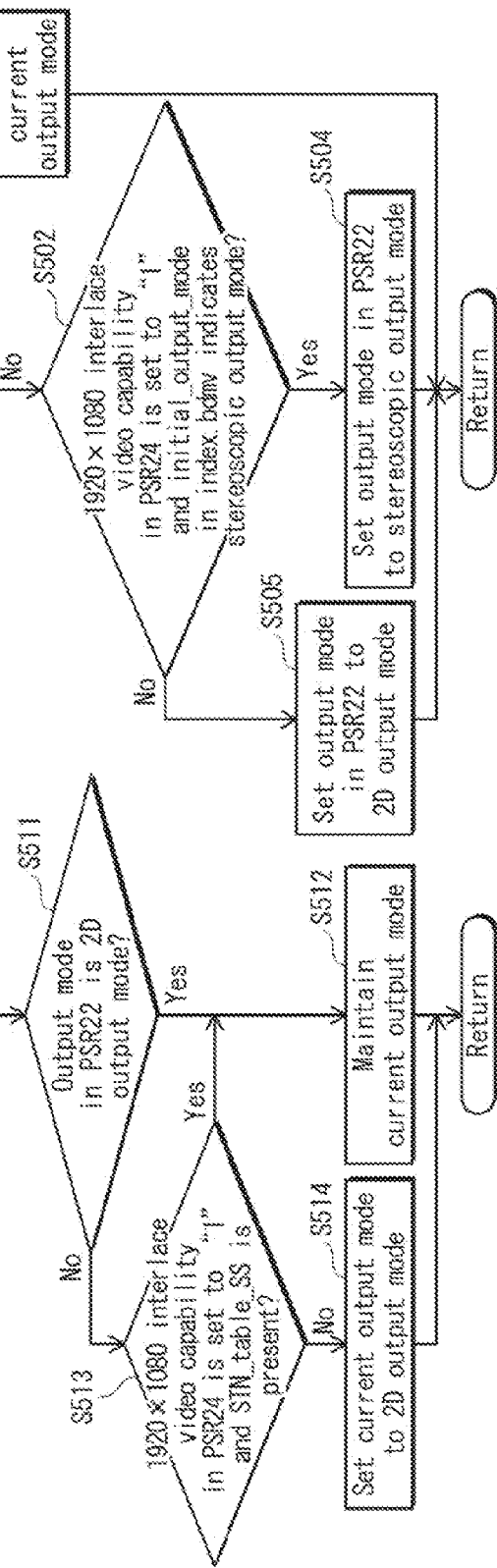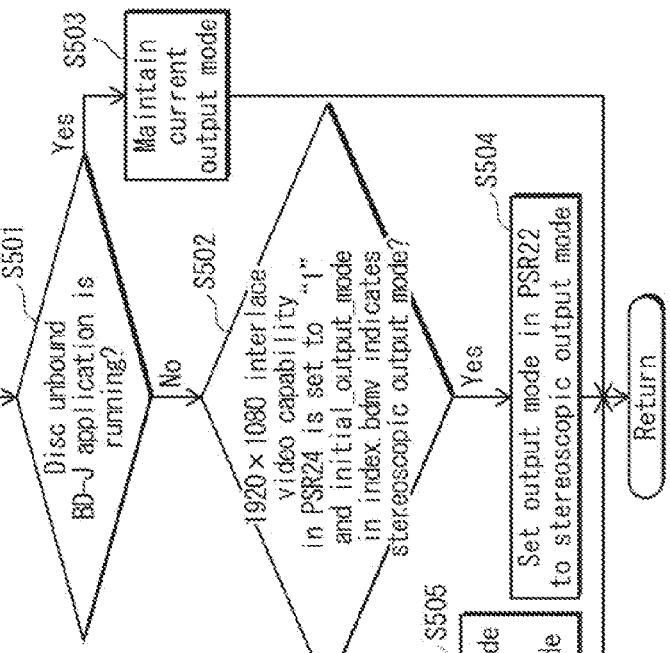

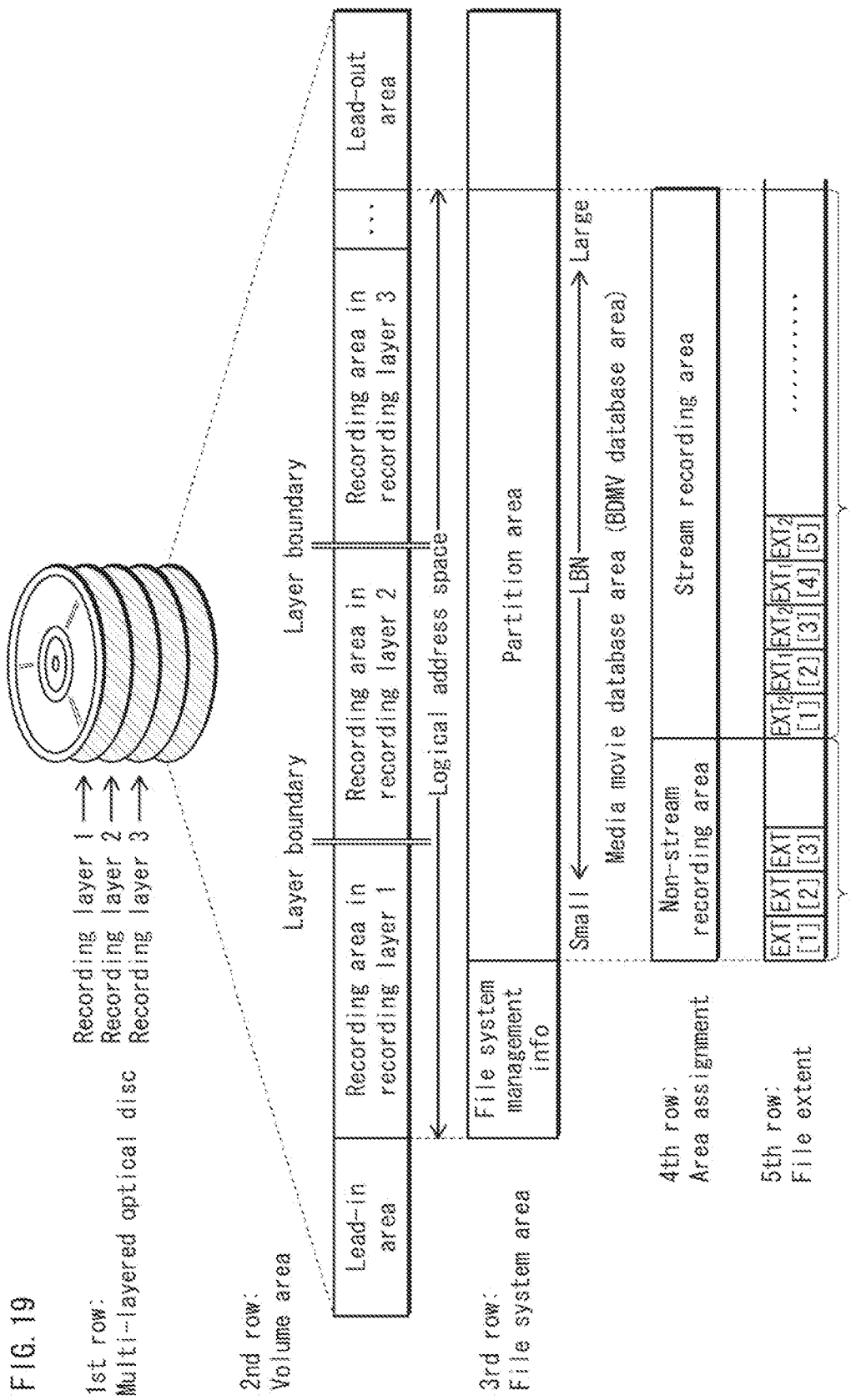

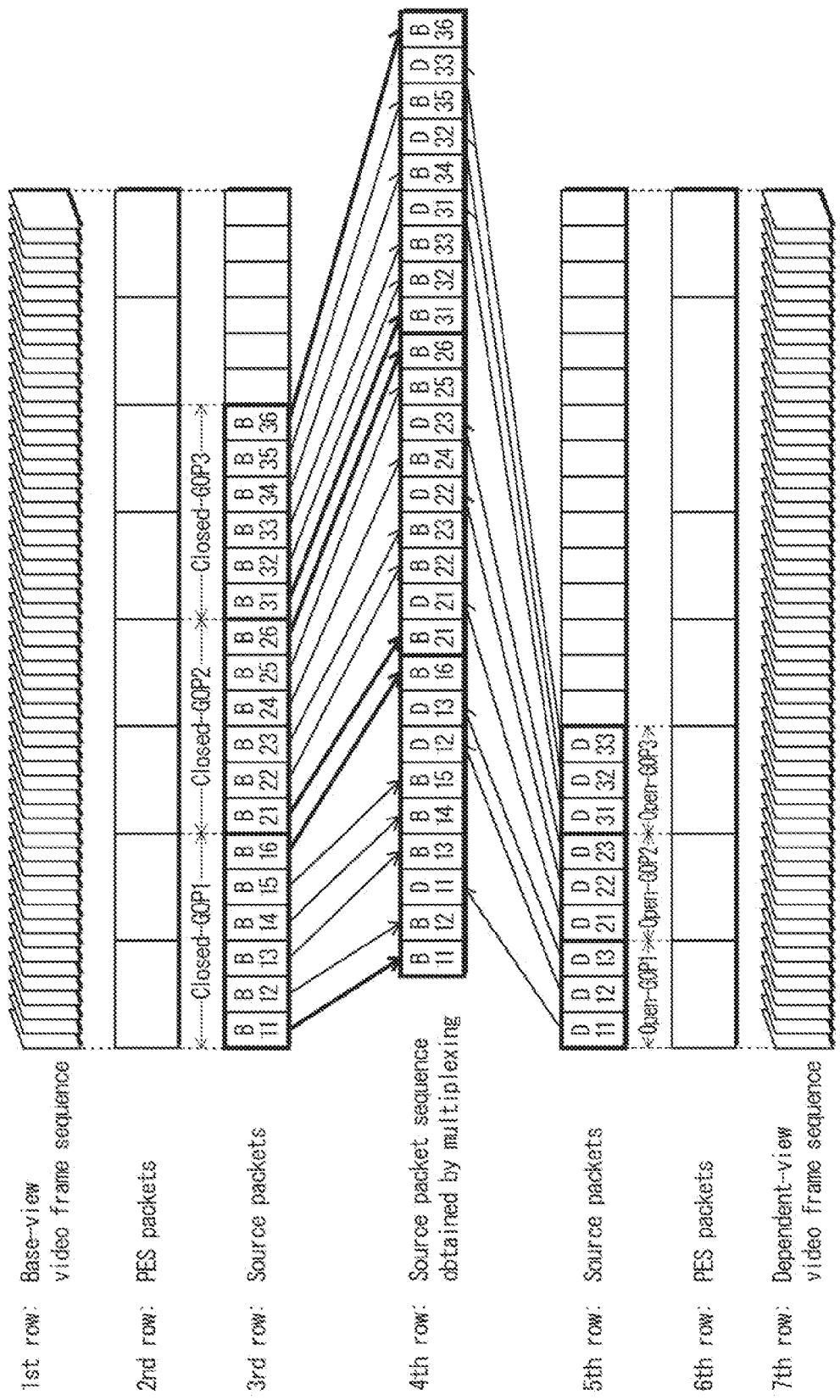

FIG. 23C

Internal structure of clip info

| Clip stream type info |
| Application type info |
| TS recording rate |
| Number of source packets |
| ATC delta |
| Extent start point info table |

FIG. 23D

Extent start point info table

| number_of_extent_start_point |
| SPN_extent_start(0) |
| SPN_extent_start(1) |
| SPN_extent_start(2) |
| ... |
| SPN_extent_start (number_of_extent_start_point) |

FIG. 23B

Clip info file (00002.clpi)

| Clip info |
| Sequence info |
| Program info |
| Characteristic point info |
| Extension data ID1=0x0004 |
| Program info_SS |
| Extent start point info table |
| Characteristic point info_SS |
| Stereoscopic entry map (EP_map_SS) |

FIG. 23A

Clip info file

| Clip info |
| Sequence info |
| Program info |
| Characteristic point info |

FIG. 23E

| Frame rate | Resolution |
|---|---|
| 24Hz | 1920 × 1080 |
| 24Hz (23.976Hz) | 1280 × 720 |
| 25Hz | 960 × 540 |
| 30Hz (29.97Hz) | 720 × 576 |
| 50Hz | 720 × 480 |
| 60Hz (59.94Hz) | |

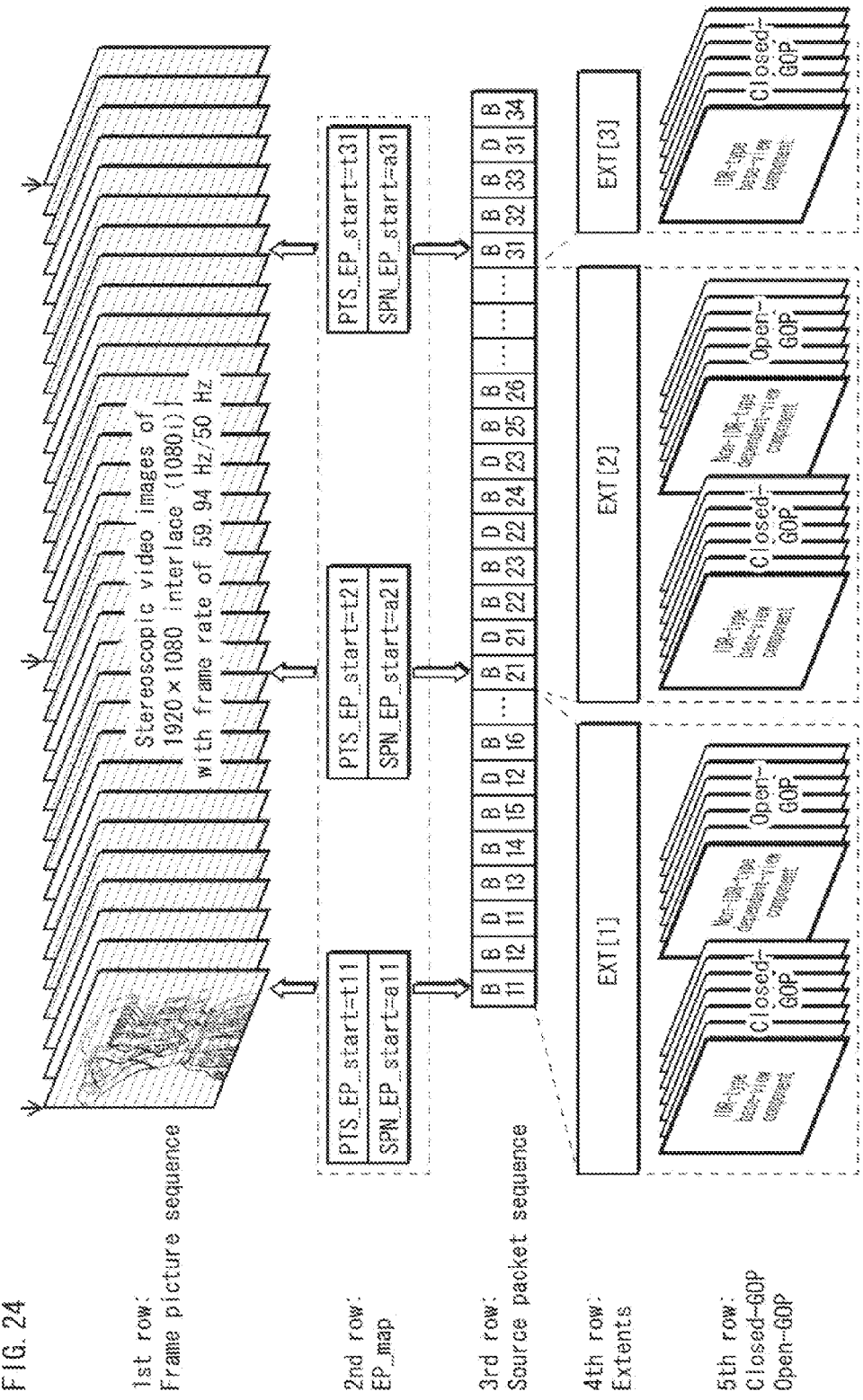

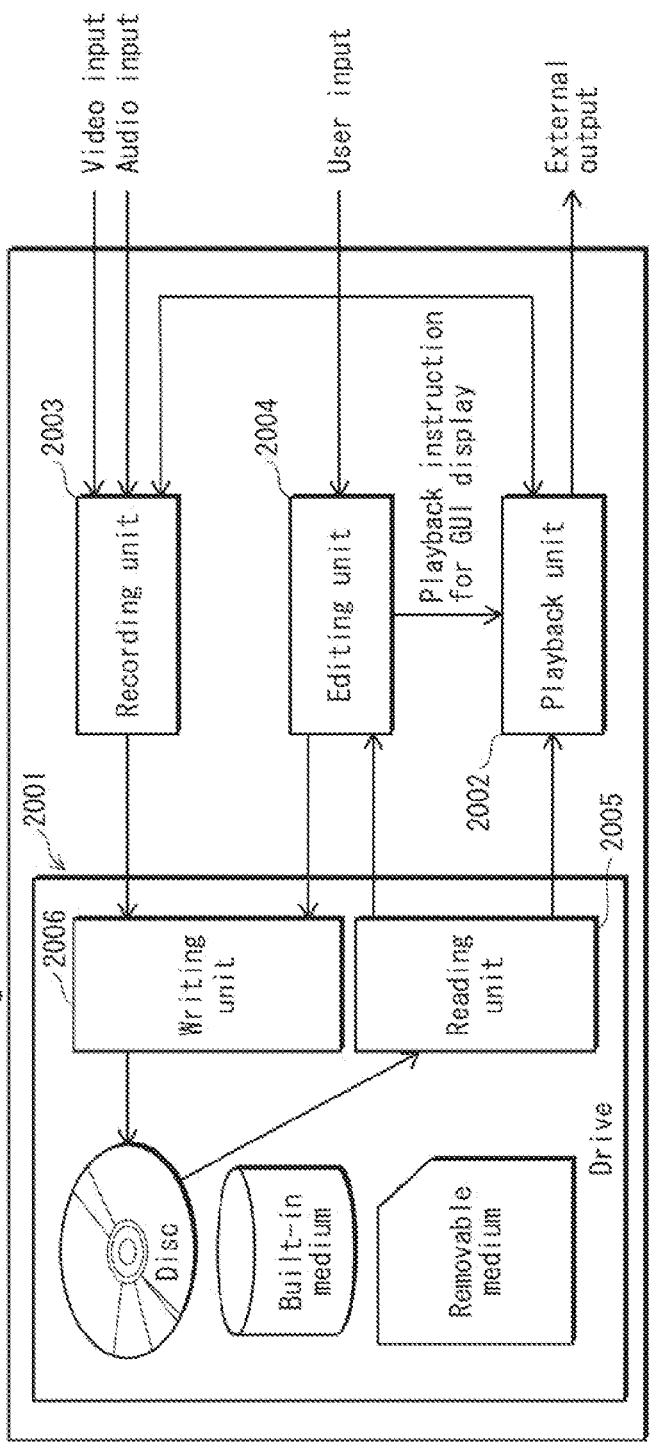
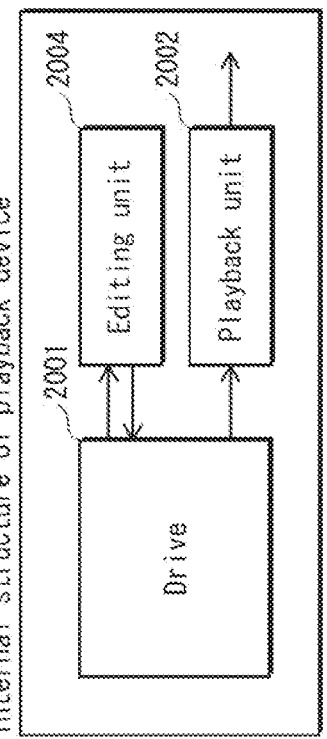
FIG. 28A
FIG. 28B

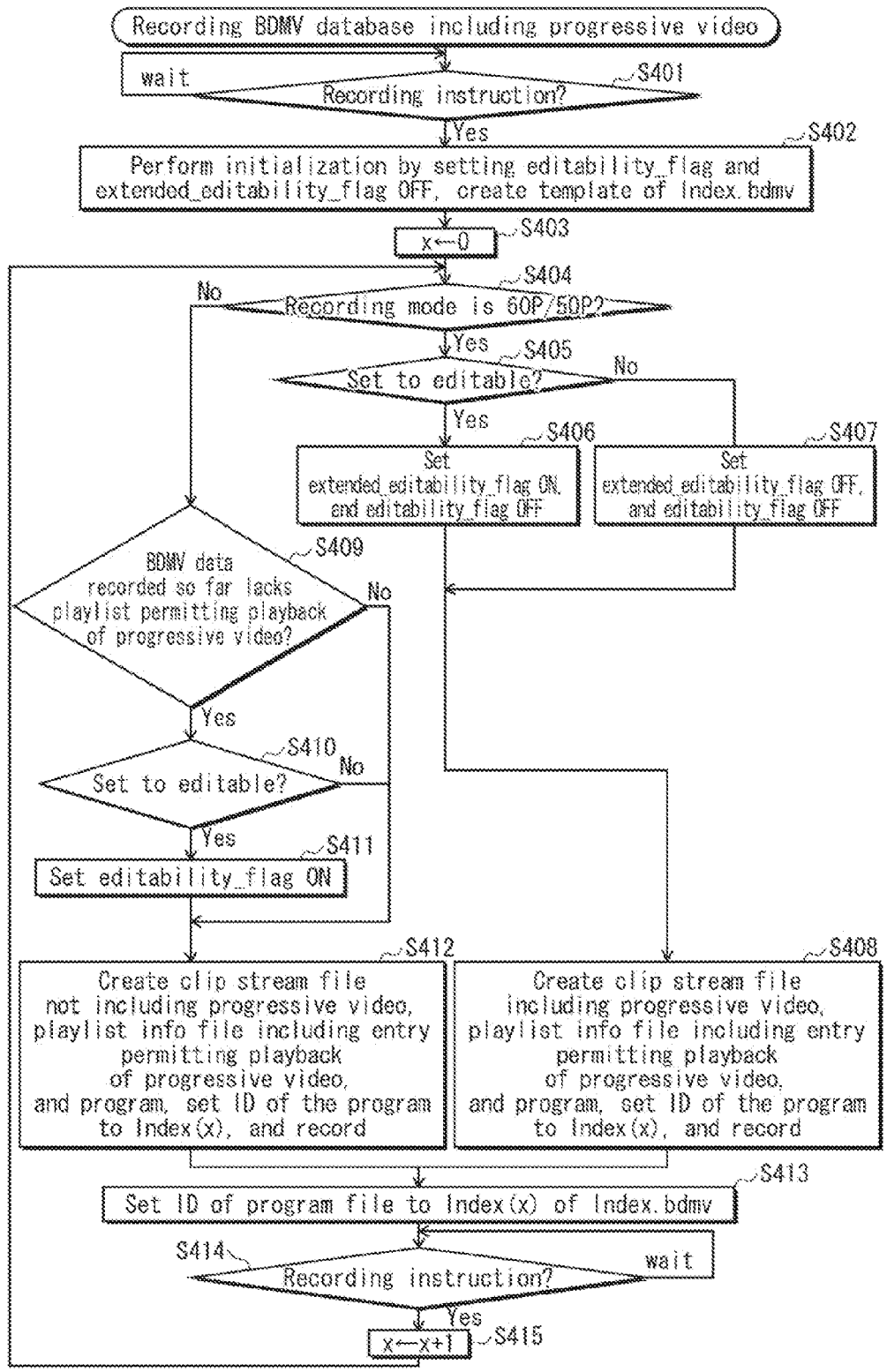

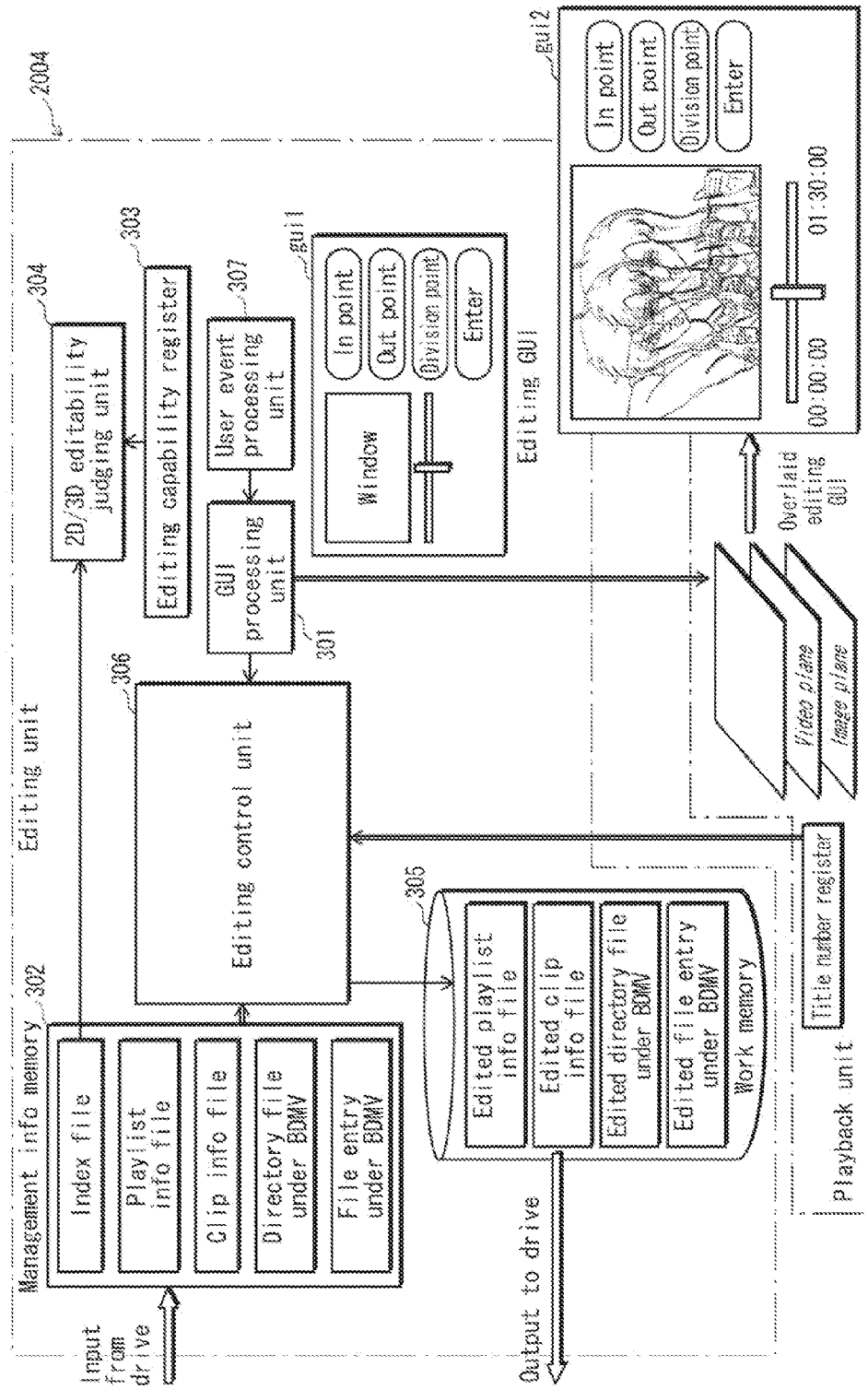

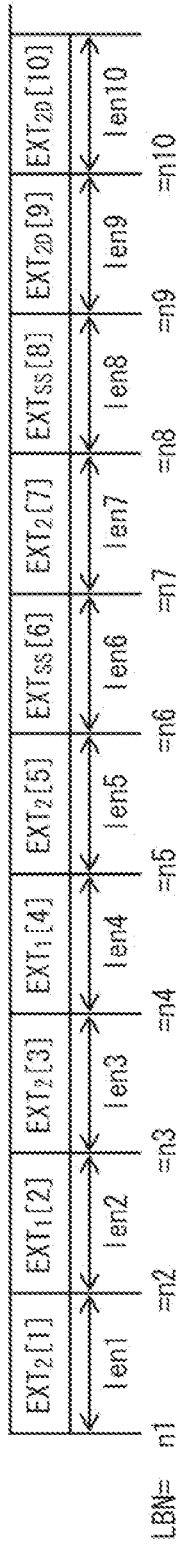
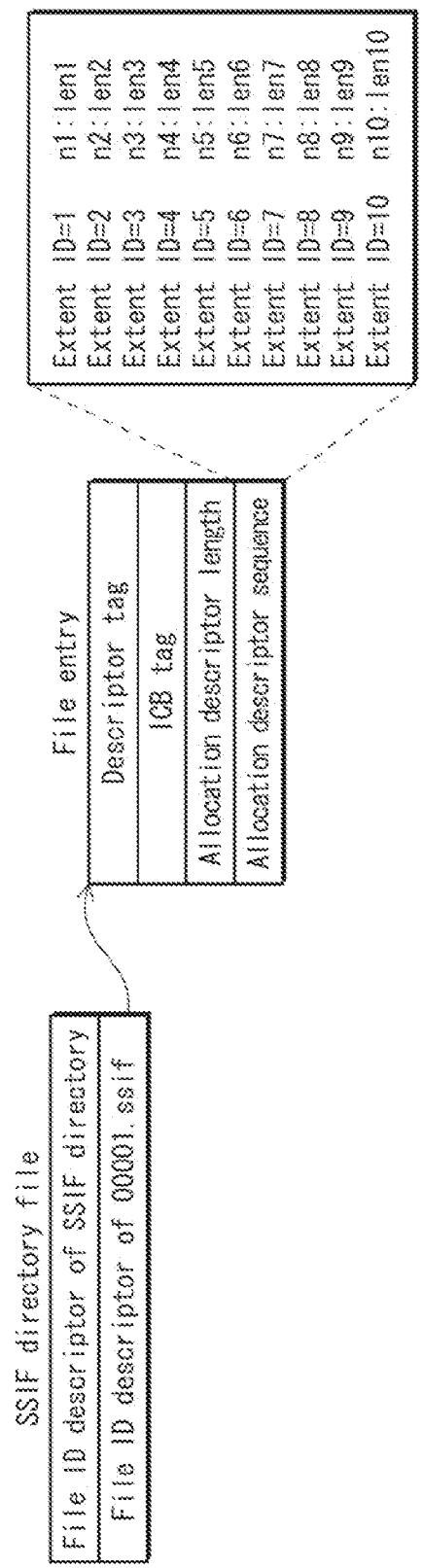
FIG. 50A
FIG. 50B

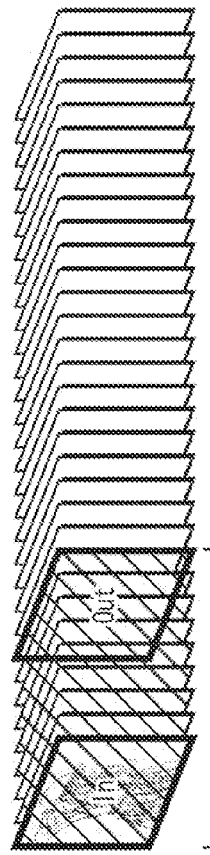

FIG. 58A

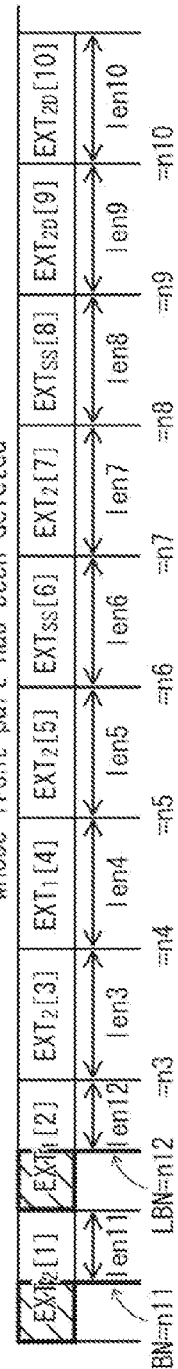

FIG. 58B

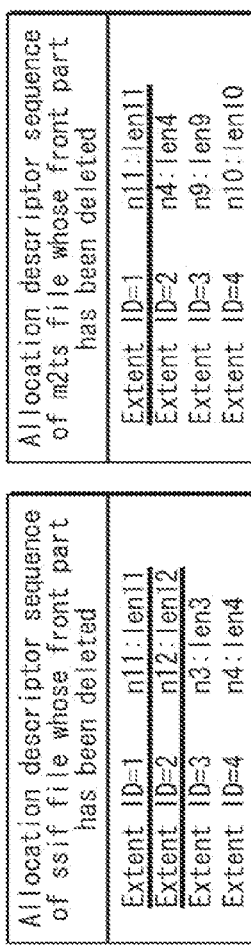

FIG. 58C

Allocation descriptor sequence of ssif file whose front part has been deleted

| Extent ID=1 | n1:len1 |
| Extent ID=2 | n12:len12 |
| Extent ID=3 | n3:len3 |
| Extent ID=4 | n4:len4 |
| Extent ID=5 | n5:len5 |
| Extent ID=6 | n6:len6 |
| Extent ID=7 | n7:len7 |
| Extent ID=8 | n8:len8 |
| Extent ID=9 | n9:len9 |
| Extent ID=10 | n10:len10 |

FIG. 58D

Allocation descriptor sequence of m2ts file whose front part has been deleted

| Extent ID=1 | n1:len1 |
| Extent ID=2 | n4:len4 |
| Extent ID=3 | n9:len9 |
| Extent ID=4 | n10:len10 |

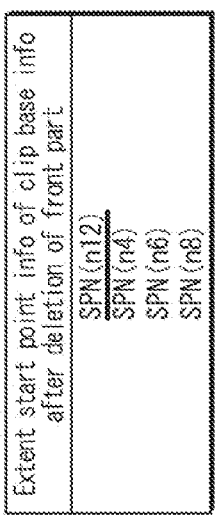

FIG. 58E

Extent start point info of clip base info after deletion of front part

| SPN(n12) |
| SPN(n4) |
| SPN(n6) |
| SPN(n8) |

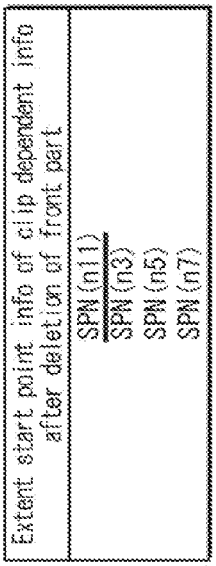

FIG. 58F

Extent start point info of clip dependent info after deletion of front part

| SPN(n11) |
| SPN(n3) |
| SPN(n5) |
| SPN(n7) |

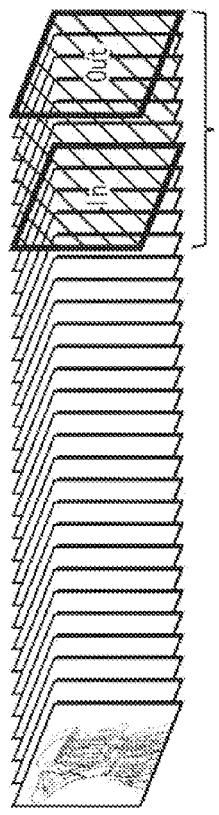

FIG. 59A

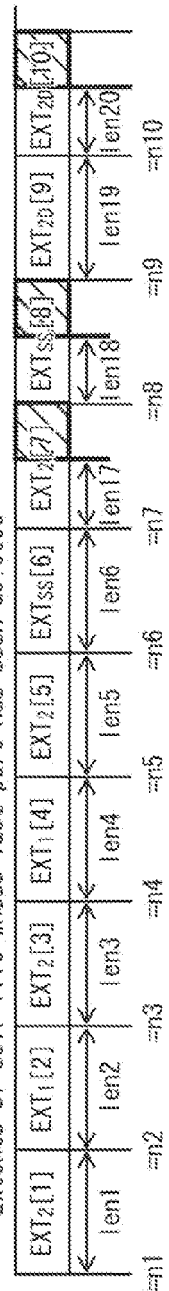

FIG. 59B Extents of ssif file whose last part has been deleted

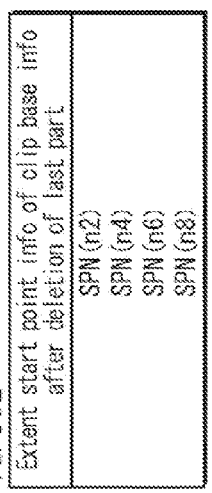

FIG. 59C Allocation descriptor sequence of ssif file whose last part has been deleted

| Extent ID=1 | n1:len1 |
| Extent ID=2 | n2:len2 |
| Extent ID=3 | n3:len3 |
| Extent ID=4 | n4:len4 |
| Extent ID=5 | n5:len5 |
| Extent ID=6 | n6:len6 |
| Extent ID=7 | n7:len7 |
| Extent ID=8 | n8:len18 |
| Extent ID=9 | n9:len9 |
| Extent ID=10 | n10:len20 |

FIG. 59D Allocation descriptor sequence of m2ts file whose last part has been deleted

| Extent ID=1 | n1:len1 |
| Extent ID=2 | n4:len4 |
| Extent ID=3 | n9:len9 |
| Extent ID=4 | n10:len20 |

FIG. 59E Extent start point info of clip base info after deletion of last part

SPN (n2)
SPN (n4)
SPN (n6)
SPN (n8)

FIG. 59F Extent start point info of clip dependent info after deletion of last part SPN (n1)
SPN (n3)
SPN (n5)
SPN (n7)

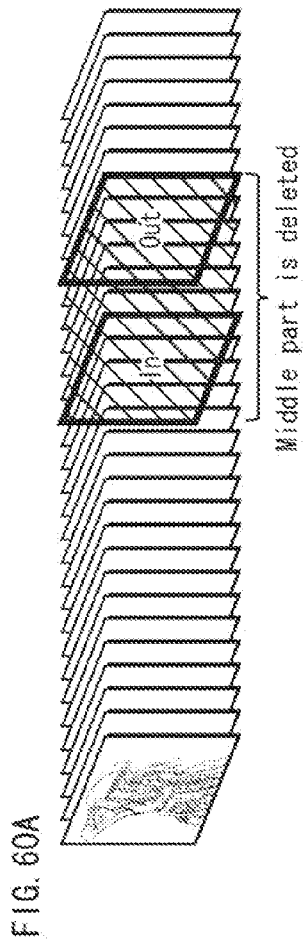

FIG. 61A

Allocation descriptor sequence
of part of m2ts file located
before deleted middle part
Extent ID=2    n2:len2
Extent ID=4    n4:len4

FIG. 61B

Allocation descriptor sequence
of part of m2ts file located
after deleted middle part
Extent ID=9    n19:len19
Extent ID=10   n10:len10

FIG. 61C

Extent start point of
part of file base located
before deleted middle part
SPN(n2)
SPN(n4)
SPN(n16)

FIG. 61D

Extent start point of
part of file dependent located
before deleted middle part
SPN(n1)
SPN(n3)
SPN(n15)

FIG. 61E

Extent start point of
part of file base located
after deleted middle part
SPN(n8)

FIG. 61F

Extent start point of
part of file dependent located
after deleted middle part
SPN(n7)

RECORDING MEDIUM, PLAYBACK DEVICE, RECORDING DEVICE, PLAYBACK METHOD AND RECORDING METHOD FOR EDITING RECORDED CONTENT WHILE MAINTAINING COMPATIBILITY WITH OLD FORMAT

This application claims the benefit of U.S. Provisional Application No. 61/552,929, filed Oct. 28, 2011.

TECHNICAL FIELD

The present invention relates to a technical field of video editing.

BACKGROUND ART

The video editing includes various editing operations ranging from an advanced one that is associated with a special visual effect to a basic one involving a partial deletion, division, or integration of video images. In recording of a video, the video is encoded by an encoding method such as MPEG2 or MPEG4-AVC, stored in a stream file of the MPEG2-TS format, and written onto a recording medium. The video data is recorded in a file format on the recording medium. Accordingly, as is the case with a general computer file, a stream file of the video data can be partially deleted, divided, or integrated by rewriting the file system management information. Since the editing is realized only by rewriting the file system management information, an editing function of a file-system-information-rewriting type is implemented as a standard feature in a recording device or a playback device.

Conventionally, the data format of the video data to be edited had been limited to the realtime AV recording format in which video data had been recorded by the user. However, in recent years, the editing target has widened, and the recording format for recording movies has been included in the target of stream editing such as the partial deletion, division, or integration that is realized by rewriting the file system. The movie recording format for recording movies has been revised variously to provide higher image resolution, higher grayscale of pixels, higher functions, and extra value, and the revision is still going on. Patent Literature 1 below discloses a known technology of the stream editing such as the partial deletion, division, or integration that is realized by rewriting the file system.

CITATION LIST

Patent Literature

Patent Literature 1:
PCT International Application Publication No. WO 02/052556

SUMMARY OF INVENTION

As the editable format widens as described above, a problem concerning the compatibility with a legacy device occurs, where the legacy device is a device that can process only the data of an old format. Suppose here that a recording medium in a movie recording format of the latest revision is loaded in a legacy device and becomes the target of editing by the legacy device. The legacy device then attempts to edit, among the video data having been recorded in the latest movie recording format, only portions that are common to the old recording format. In most cases, for the latest recording format, the common portions are often portions provided to maintain the compatibility with the old recording format. In that case, when the recording medium on which video data is recorded in the new format is loaded in and edited by the legacy device, the remaining portions excluding the common portions are lost by the editing performed by the legacy device. The portions excluding the common portions are portions having been supplemented by the new format. Accordingly, the editing makes it impossible to view some video portions that have been recorded in the new format. That is to say, when a video content of a high image resolution and high grayscale of pixels recorded in the new format is edited by the legacy device, which can process only data of the old recording format, only information that is common to the old recording format remains, but information expanded by the new recording format is lost. That is to say, a valuable video content owned by a user is lost against the will of the user. This is a great problem from a practical point of view.

Patent Literature 1 mentioned above discloses a structure in which, when a failure occurs to the data structure defined in the format, the medium is treated as a non-playable medium. With this structure, however, the user no longer can view the movie recorded on the medium. On the other hand, to realize a higher image resolution and a higher grayscale of pixels, the data size of the compress-encoded image increases to a large extent. A problem with regard to this structure is that the recording medium lacks practical usefulness since it is not possible to delete the above-mentioned data that occupies a large recording area in the recording medium.

It is therefore an object of the present invention to avoid, among data recorded in the latest format, a portion common to data in an old format from being rewritten later.

The above object is fulfilled by a recording medium on which a stream file and an index file are recorded, the index file including an editability flag and an extended editability flag, the editability flag indicating, while set on, the recording medium being treated as an editable medium by a legacy device which does not support recording and editing of stereoscopic video, and while set off, the recording medium being treated as a non-editable medium by the legacy device, and the extended editability flag indicating, while set on, the recording medium being treated as an editable medium by a non-legacy device even when the editability flag is set off, the non-legacy device supporting recording and editing of stereoscopic video.

With the above-described structure, since the editability flag is set OFF when the extended editability flag is present, the information expanded by the new recording format is prevented from being rewritten. This prevents occurrence of an incidence that a valuable video content owned by a user is lost against the will of the user. It is therefore possible to supply a movie, in the latest format, to the non-legacy device, while preventing occurrence of an inappropriate change in the content.

BRIEF DESCRIPTION OF DRAWINGS

FIGS. 2A and 2B illustrate one example of images displayed on the display device.

FIGS. 4A-4C illustrate a compressed slice data sequence stored in one video access unit, a macro block, and a Closed-GOP and an Open-GOP that are composed of MVC view components.

FIGS. 5A and 5B illustrate typical three types of two-dimensional video streams.

FIGS. 6A-6D illustrate syntax of Index.bdmv written in an object-oriented programming language for describing Blu-ray disc format.

FIG. 8 illustrates, in a table format, the condition to set editability_flag to "0" and how the recording device is treated when the extended_editabitily_flag is set to "1".

FIG. 14 illustrates a bit assignment in PSR31.

FIG. 15 illustrates a bit assignment in PSR29.

FIG. 16 illustrates a bit assignment in PSR23.

FIG. 17 illustrates a bit assignment in PSR24.

FIG. 18A-18C illustrate a bit assignment in PSR22 and the mode selection procedure.

FIG. 19 illustrates the internal structure of a multi-layered optical disc.

FIG. 21 illustrates the process of obtaining one transport stream from the MVC1080@24p/50i/60i base-view video stream and the MVC1080@24p/50i/60i dependent-view video stream.

FIGS. 23A-23E illustrate the internal structure of the clip information file.

FIG. 24 illustrates correspondence among the Extents, EP maps, and transport stream obtained by multiplexing the MVC1080@24p/50i/60i base-view xvideo stream and the MVC1080@24p/50i/60i dependent-view video stream.

FIGS. 28A and 28B illustrate the internal structures of the recording device and the playback device.

FIG. 35 is a flowchart illustrating the procedure of recording the BDMV database including Progressive Video represented by the AVC1080@60P/50P video stream.

FIG. 36 illustrates a detailed structure of the editing unit 2004.

FIGS. 50A and 50B illustrate one example of a recording area of an ssif file.

FIGS. 58A-58F illustrate the case where the front part of an ssif file is deleted.

FIGS. 59A-59F illustrate the case where the last part of an ssif file is deleted.

FIGS. 60A-60D illustrate the case where the middle part of an ssif file is deleted.

FIGS. 61A-61F illustrate allocation descriptors of m2ts files located before and after the deleted middle part, and Extent start point information of parts of the file base and file dependent located before and after the deleted middle part.

DETAILED DESCRIPTION OF INVENTION

Figure 1:
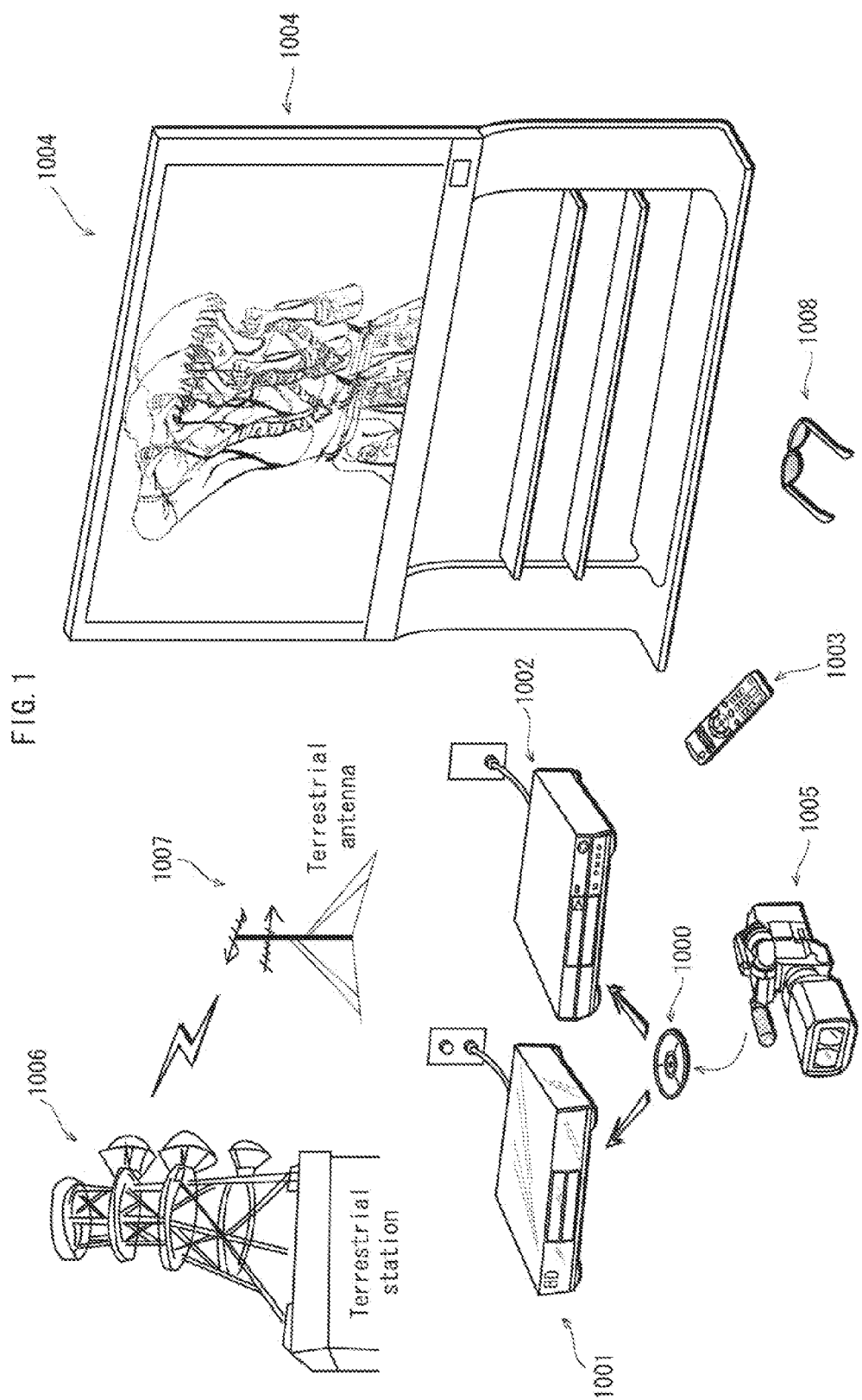
FIG. 1 illustrates a home theater system which includes a playback device, a display device and shutter-type glasses.

A recording medium including the above-described problem solving means can be implemented in the industry as a product such as a disc medium for recording images or a memory card medium. A playback device including the above-described problem solving means can be implemented in the industry as a player device, and a recording device including the above-described problem solving means can be implemented in the industry as a recorder device. A playback method and a recording method including the above-described problem solving means can be implemented in the form of a processing procedure of a computer program incorporated in the above-mentioned player device and recorder device, respectively. A home theater system illustrated in FIG. 1 includes these products in a specific form. FIG. 1 illustrates a home theater system which includes a playback device, a display device and shutter-type glasses. As illustrated in FIG. 1, the home theater system includes a multi-layered optical disc 1000, a recording device 1001, a recording device 1002, a remote control 1003, a TV broadcast display device 1004, a 3D shooting device 1005, a terrestrial station 1006, a terrestrial antenna 1007, station 1006, and active-shutter-type glasses 1008, and provides users with viewing.

The multi-layered optical disc 1000 is a portable recording medium having a format for recording movies.

The recording device 1001 is a legacy device that does not support the latest revised standard of the movie recording format, and executes recording, playback and editing of the optical disc. The recording device 1002 is a non-legacy device that supports the latest revised standard of the movie recording format, and executes recording, playback and editing of the optical disc.

The remote control 1003 is a device for receiving operations made by the user on a hierarchical GUI for the execution of editing operations and recording operations. To receive such operations, the remote control 1003 is provided with: a menu key for calling a menu representing the GUI; arrow keys for moving the focus among GUI parts constituting the menu; an enter key for performing an enter operation on a GUI part of the menu; a return key for returning from lower parts to higher parts in the hierarchy of the menu; and numeric keys.

The display device 1004 receives pixel bit values of one screen from the recording devices 1001 and 1002 via an inter-device interface, and displays an image by driving display elements of the display panel in accordance with the received pixel bit values. The image display is performed in any of: 2D output mode in which one screen image is displayed for one frame period; and 3D output mode in which a left-eye image and a right-eye image of one screen is displayed for one frame period. When a user not wearing the shutter-type glasses sees the screen of the display device, the user sees the image data of two or more view-points (in FIG. 1, the left-eye and right-eye images) in a state where they are overlaid with each other.

The 3D shooting device 1005 is a non-legacy device and executes recording, playback and editing of the optical disc.

The terrestrial station 1006 transmits terrestrial TV broadcasts which include 3D TV programs.

The terrestrial antenna 1007 receives the terrestrial TV broadcasts including the 3D TV programs, and outputs the received broadcasts to the recording devices 1001 and 1002. The recording devices 1001 and 1002 perform recording processes of the input broadcasts.

The active-shutter-type glasses 1008 close one of the right-eye and left-eye shutters and open the other in each of a plurality of display periods that are obtained by dividing a frame period. This structure creates stereoscopic images. In the left-eye display period, the right-eye shutter is set to a closed state. In the right-eye display period, the left-eye shutter is set to a closed state. The shutter-type glasses have a wireless communication function, and can transmit information indicating the remaining capacity of an embedded battery to the display device 1004 upon request therefrom.

The following describes one example of images displayed on the display device of the system with reference to FIGS. 2A and 2B. There are two types of images that can be displayed on the display device: a two-dimensional image as illustrated in FIG. 2A; and a stereoscopic image as illustrated in FIG. 2B. The frame image of the stereoscopic image illustrated in FIG. 2B is an image generated by overlaying a left-eye image with a right-eye image during one frame period.

FIG. 2B illustrates one example of viewing left-eye and right-eye images through the active-shutter-type glasses 1008. A line of sight vw1 represents reception of an image when the active-shutter-type glasses 1008 block light transmission to the right eye. A line of sight vw2 represents reception of an image when the active-shutter-type glasses 1008 block light transmission to the left eye. The line of sight vw1 indicates that the left-eye image is viewed. Also, the line of sight vw2 indicates that the right-eye image is viewed. By wearing the active-shutter-type glasses 1008, the user alternately views the left-eye and right-eye images, and the stereoscopic image is played back. FIG. 2B illustrates that a stereoscopic video image appears at an intersection of the two lines of sight.

With a specific example of the stereoscopic image having been presented, the description is continued in the following, centering on the recording onto the recording medium and the video stream which is a target of editing. The video stream plays back a two-dimensional video or a stereoscopic video by playing back a plurality of frame images.

Figure 3A:
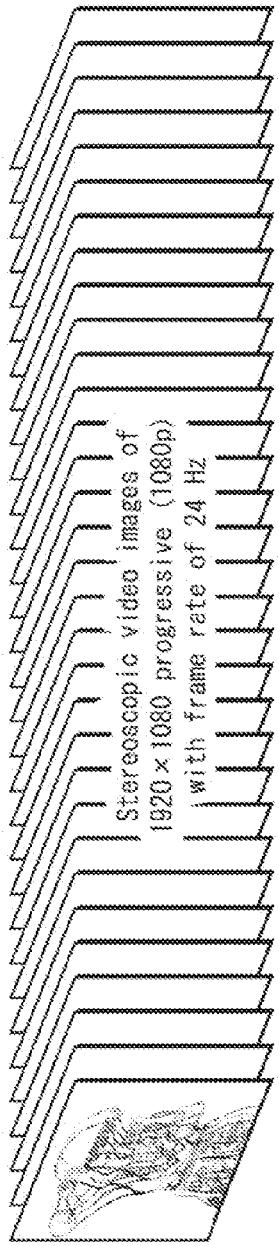
FIGS. 3A-3C illustrate, in comparison, a plurality of frame images constituting the two-dimensional video and a plurality of frame images constituting the stereoscopic video.
Figure 3B:
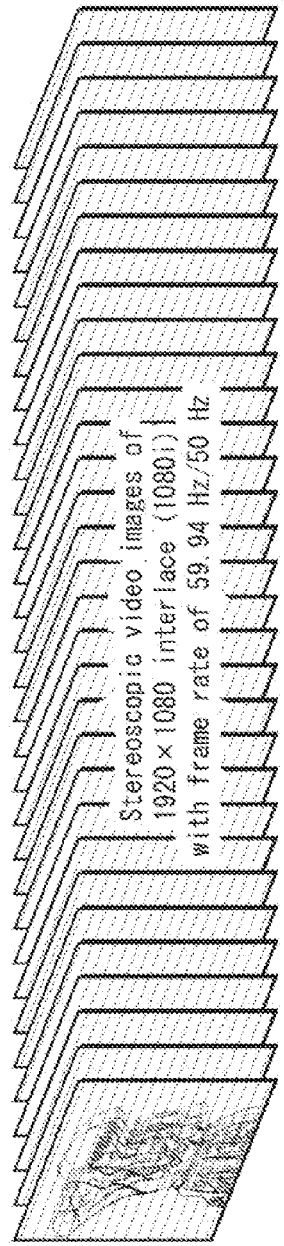
Figure 3C:
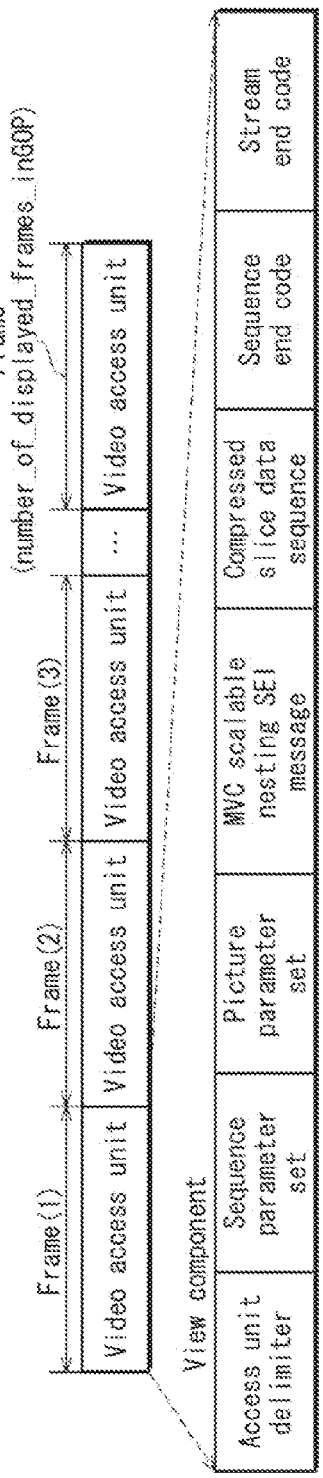

FIGS. 3A-3C illustrate, in comparison, a plurality of frame images constituting the two-dimensional video and a plurality of frame images constituting the stereoscopic video. In FIGS. 3A-3C, the horizontal direction represents a time axis, and a plurality of frame images are provided along the time axis, wherein each frame image is represented by pixels arranged on an X-Y plane. The frame images includes: a frame image that is generated by overlaying a right-eye image and a left-eye image of the progressive method; and a frame image that is generated by overlaying a right-eye image and a left-eye image of the interlace method. FIG. 3A illustrates a progressive 3D video composed of left-eye and right-eye images of the progressive method. The progressive 3D video is composed of frame images of the 1920×1080 progressive method, and its frame rate is 24 Hz (23.976 Hz). These the left-eye and right-eye images are encoded with the MVC. The Multiview Video Coding (MVC) is a subset standard of the MPEG-4 AVC/H.264. The MVC improves the compression efficiency compared with compressing a plurality of viewpoints independently, by using not only the similarity in the time direction of the video but also the similarity among the viewpoints.

FIG. 3B illustrates an interlace 3D video composed of left-eye and right-eye images of the interlace method. The interlaced 3D video is composed of frame images of the 1920×1080 interlace method, and its frame rate is 59.94 Hz, 50 Hz in conversion from the field rate. An interlaced MVC1080@60i/50i video stream, which represents an interlaced MVC1080@60i/50i video, is composed of an MPEG4-MVC1080@60i/50i base-view video stream and an MPEG4-MVC1080@60i/50i dependent-view video stream (these video streams are collectively called "MVC1080@60i/50i video streams"). It is assumed here that an image with horizontal lines, such as the one illustrated in FIG. 3B, represents an interlaced image. Conversely, an image without horizontal lines, such as the one illustrated in FIG. 3A, is assumed to represent a progressive image.

The video streams representing stereoscopic videos include an MVC1080@24P video stream and an MVC1080@60i/50i video stream. In the following, the MVC1080@60i/50i video stream is explained as a representative of these. This is because a stereoscopic playback of the MVC1080@24P video stream is supported by a BD-3D player which is dedicated to a 3D version of the Blu-ray ReadOnly disc, while a stereoscopic playback of the MVC1080@60i/50i video stream is not supported by any of the existing playback devices for Blu-ray ReadOnly disc, and interests of the parties concerned are centered on the MVC1080@60i/50i video stream.

FIG. 3C illustrates data structures assigned to the frame periods. As illustrated in FIG. 3C, each frame period such as "Frame (1)", "Frame (2)", and "Frame (3)" is assigned with a video access unit. The video access units constitute view components of the MPEG4-MVC. The left-eye and right-eye images that are illustrated as being overlaid in FIG. 3B are each composed of view components of the base view and dependent view. The lead line in FIG. 3C indicates the close-up of the internal structure of a view component. The view component is a sequence of: a NAL unit storing a video access unit delimiter; a NAL unit storing a sequence parameter set; a NAL unit storing a picture parameter set; a NAL unit storing an MVC scalable nesting SEI message; a NAL unit storing a compressed slice data sequence; a NAL unit storing a sequence end code; and a NAL unit storing a stream end code. Each of the base-view component and the dependent-view component constitutes an independent video stream (base-view video stream, dependent-view video stream).

FIG. 4A illustrates a compressed slice data sequence stored in one video access unit. As illustrated in FIG. 4A, the compressed slice data sequence stored in one video access unit is composed of 68 slices, namely, slice data 1 to slice data 68. Each slice is composed of 1920×16 pixels. Accordingly, 68 slices are composed of 1920×1080 pixels that constitute an image of one screen.

The lead line cu2 indicates a close-up of the internal structure of a slice. As illustrated in the close-up, each slice of composed of 120 macro blocks. Each macro block stores code words for an image of 16×16 pixels. FIG. 4B illustrates the structure of the macro block. The macro block in this example is of a 16:8:8 format, and includes: a macro block (MB) header; a code word of luminance Y of 16×16 pixels; a code word of red color difference Cr of 8×8 pixels; and a code word of blue color difference Cb of 8×8 pixels. The macro block header contains a picture specifier in which a picture number, which identifies a view component that is to be referenced when the macro block is decoded, is described. It should be noted here that each frame image constituting a two-dimensional video is a picture that is formed by extracting a plurality of slices of one screen from the NAL unit group existing in one access unit of a video stream, and decoding the slices.

On the other hand, the frame images illustrated in FIG. 3B are formed by extracting slices of one screen from an access unit of a base-view video stream, extracting slices of one screen from an access unit of a dependent-view video stream, and displaying, during one frame period, a left-eye/right-eye image which is obtained by decoding a base-view component composed of the slices of the base view, and a right-eye/left-eye image which is obtained by decoding a dependent-view component composed of the slices of the dependent view. Since, as described above, the sequence parameter set and the picture parameter set are included in the video access unit of the base-view video stream, each of the left-eye and right-eye images which are obtained by decoding the base-view components is a "picture".

The picture specifier included in the macro block refers to a picture number that is assigned to a piece of non-compressed picture data among a plurality of pieces of non-compressed picture data that are stored, as reference pictures, in a decoded picture buffer in the MVC video decoder. In the case where odd picture numbers are assigned to decoded images of base-view components and even picture numbers are assigned to decoded images of dependent-view components when the MVC1080@60i/50i video stream is decoded, it is possible to adopt only the decoded view component images of the base-view video stream as the reference pictures, by describing an odd picture number in the picture specifier contained in the header of each macro block. In the MVC video decoder, the picture types (including: an IDR (Instantaneous Decoding Refresh); I (Intra); and B (Bi-directional predictive)) of the non-compressed pictures are managed by making them to correspond to the picture numbers. With the above-described structure, a restriction can be imposed on the macro blocks, the restriction being to exclude certain types of pictures from the reference pictures. For example, it is possible to impose a restriction on the macro blocks of the view components of the dependent-view video stream, the restriction being to exclude view components of the B-picture type from the reference pictures. As described above, in the macro blocks, it is possible to restrict the view components to be used as the reference pictures to certain types, by describing a certain type of picture number in the picture specifier in the macro blocks.

The following describes the units of decoding for decoding the base-view video stream and the dependent-view video stream. As described above, since the sequence parameter set and the picture parameter set are included in the video access unit of the base-view video stream, the view components of the base view can be played back as "pictures". Thus the view components of the base view can constitute either a Closed-GOPs or an Open-GOP as in the MPEG2 video stream or the MPEG4-AVC video stream. At the head of the Closed-GOP, a view component composed of slices encoded by the intra-frame coding is arranged. This view component is a view component composed of slices of the IDR type (hereinafter the view component may also be referred to as "IDR-type view component"). This structure makes it possible to decode a base-view video stream independently by decoding the base-view video stream from the head of a Closed-GOP at which a IDR-type view component is arranged in the encoding order. This structure also makes it possible to perform a partial deletion in units of Closed-GOPs from the base-view video stream.

On the other hand, since the picture header, the picture parameter set, and the sequence head are included in the video access unit of the dependent-view video stream, the view components of the dependent view can be played back as "pictures", as well. However, the view components of the dependent view can constitute only the Open-GOPs. This is because the view components of the dependent view are encoded by the inter-frame predictive coding and the inter-view predictive coding in which the view components in the Closed-GOPs of the base-view video stream are used as the reference images. At the head of the Open-GOP, a view component composed of slices encoded by the inter-frame predictive coding and the intra-view coding is arranged. This view component is a view component composed of slices of the non-IDR type (hereinafter the view component may also be referred to as "non-IDR-type view component").

FIG. 4C illustrates a pair of Closed-GOP and Open-GOP that are composed of view components of the base view and view components of the dependent view, respectively.

The arrows vr1, vr2, vr3 in FIG. 4C symbolically indicate correlation between views, and the arrows fr1, fr2, fr3 symbolically indicate correlation between frames. The view components are compress-encoded based on the correlation between views and the correlation between frames. The Open-GOPs of the dependent view cannot be decoded independently, but are decoded together with the Closed-GOPs of the base view. Also, in partial deletion, Closed-GOPs of the base view including reference pictures of Open-GOPs of the dependent view need to be deleted together by the partial deletion. Here, the frequency of Closed-GOP being inserted into the base-view video stream depends on the encoding conditions. In a stereoscopic video that can be edited, a deletion from any position must be available. For this purpose, a Closed-GOP is preferably inserted, for example, every second in the time axis. However, that would require an enormous amount of data. Accordingly, it is preferable that a Closed-GOP is inserted at variable intervals such as every five seconds or every 10 seconds. The Applicant faced a lot of problems in commercializing the invention. The problems and the means for solving the problems are described in the following embodiments.

Embodiment 1

The present embodiment describes a technical problem, together with the problem solving means, which one having ordinary skill in the art faces when a data format for recording a movie is changed from the one for two-dimensional only to the one for enabling stereoscopic as well.

According to the data format for recording a stereoscopic movie, a two-dimensional playback is available when a video stream, which can be decoded independently (a base-view video stream), among a plurality of video streams for a plurality of viewpoints constituting a stereoscopic video is decoded, and a stereoscopic playback is available when a plurality of video streams for a plurality of viewpoints (a base-view video stream and a dependent-view video stream) are decoded.

When a recording medium, on which stream files storing a plurality of video streams for stereoscopic viewing are recorded, is loaded in a legacy device and is subjected to an editing process, only the base-view video stream is shortened or divided into two portions.

In general, each view component constituting the dependent-view video stream is compress-encoded by a predictive coding method based on the correlation between views. This is because it is well-known that a video image viewed from a view point has a strong correlation with a video image viewed from another view point. If a base-view video stream is partially deleted by a legacy device, pictures constituting a corresponding dependent-view video stream lose some reference pictures. When this happens, a normal decoding is impossible.

Also, even if in the authoring stage the author takes a special care for a disparity not to occur between the left-eye and right-eye images, the efforts by the author may come to nothing if an end user arbitrarily deletes a scene at home. On the other hand, taking into account the current situation where 3D shooting devices have started to spread, and the supply of 3D TV broadcasts has begun in earnest, a recording medium that cannot so much as to allow deletion of an unnecessary scene would not be able to meet the demand for a quick allocation of a free space when the capacity of the medium becomes insufficient. In particular, recording with use of a 3D shooting device consumes an enormous amount of capacity, and the shortage of capacity is a serious problem. It is accordingly expected that such a movie recording format, which cannot delete even a part of video data recorded by a 3D shooting device, cannot stimulate purchasing interest in the consumer, and cannot meet the strong demand from the mass retailers, planning division and sales division of manufacturers and the like.

It is therefore an object of the present embodiment to realize editing of stereoscopic video images without destroying the dependence relationship between views which is assumed by the view components.

When solving the problem in an aspect of the recording medium, the problem is solved by a recording medium on which a stream file and an index file are recorded, the index file including an editability flag and an extended editability flag, the editability flag indicating, while set on, the recording medium being treated as an editable medium by a legacy device which does not support recording and editing of stereoscopic video, and while set off, the recording medium being treated as a non-editable medium by the legacy device, and the extended editability flag indicating, while set on, the recording medium being treated as an editable medium by a non-legacy device even when the editability flag is set off, the non-legacy device supporting recording and editing of stereoscopic video.

The index file is first read from the recording medium when the recording medium is loaded in a playback device, and is resident in the memory of the playback device while the recording medium is loaded. By setting the editability flag and the extended editability flag in the index file, it is possible to maintain the treatment of the editing that is unique to the recording medium.

The above recording medium structured to solve the problem prohibits the legacy device, which does not support recording and editing of stereoscopic video, from performing editing, thereby preventing destruction of the dependency relationship between views which is the premise of the view components of the dependent view. This makes it possible to cause the stream files to be edited correctly while ensuring the correct editing of the stereoscopic video.

With regard to the above recording medium structured to solve the problem, the following lower concept may be provided.

That is to say, in the above recording medium, the recording medium includes a media movie database area which comprises a plurality of subdirectories managed under a predetermined directory of a file system, the index file being stored in the predetermined directory, the stream file being stored in a stream subdirectory which is one of the plurality of subdirectories, the index file includes a presence/absence flag indicating whether or not a stereoscopic content is present in the media movie database area, and the extended editability flag is generated in the index file on a condition that the presence/absence flag indicates that a stereoscopic content is present in the media movie database area.

The editing target whose editability is defined by a flag is "media movie database". The "media movie database" is a collection of data in which data elements constituting a digital movie are, for each type thereof, stored in corresponding sub directories and files in association with a plurality of titles in the index file. The media movie database is on the premise of the data structure of a movie in the two-dimensional (2D) output mode. As an extension of this, the data structure of the movie in the stereoscopic (3D) output mode is added. The media movie database has a directory/file structure that is predetermined in advance for the file system, assuring the recorded data to be recognized as the recorded data of the movie by a playback device corresponding to the recording medium.

A directory layer structure managed under the media movie database area is recognized as the content of the medium when the recording medium is loaded. Thus, by prohibiting writing into and editing of the directory layer structure, it is possible to cause the recording medium to be recognized as a non-editable medium. This makes it possible to set the recording medium to "editable" or "non-editable", while keeping the recording medium to be conforming to the movie recording format for the stereoscopic playback.

Focusing on the movie recording formats, a media movie database specialized for recording a movie onto a Blu-ray disc is called "BDMV database". The BDMV database is stored under a predetermined directory called "BDMV directory". The format for recording a movie is composed of: a directory layer under the predetermined directory (BDMV directory) in the file system"; and an internal data structure of the files that are present in the layers of the predetermined directory.

To judge whether or not a 3D content is present, originally the directory layer needs to be searched. However, with the above-described structure of the present invention, a presence/absence flag (SS_content_exist_flag) indicating whether or not a 3D content is present is provided in the index flag. Thus, by referring to the presence/absence flag (SS_content_exist_flag), it is possible to set an appropriate judgment on whether or not a 3D content is present in the recording medium even if the searching of the directory layer is omitted.

With regard to the above recording medium structured to solve the problem, the following lower concept may be provided.

That is to say, in the above recording medium, when the presence/absence flag is set on, the editability flag is set off, and when the extended editability flag is set on, the recording medium is treated as the editable medium by the non-legacy device, and when the extended editability flag is set off, the recording medium is treated as the non-editable medium by the non-legacy device.

By setting the extended editability flag off, it is possible to lock the editing by the non-legacy device. This makes it possible to protect the recorded content from an erroneous rewriting, thus maintaining the safety of the content.

With regard to the above recording medium structured to solve the problem, the following lower concept may be provided.

That is to say, in the above recording medium, the stream file is classified into either a first stream file or a second stream file, the first stream file containing a plurality of stereoscopic video streams, the second stream file not containing a stereoscopic video stream, playlist information is recorded in the media movie database area, the playlist information is classified into either stereoscopic playlist information or normal playlist information, the stereoscopic playlist information defining a playback path of the plurality of stereoscopic video streams, the normal playlist information defining a playback path of a video stream, and when the playlist information is the stereoscopic playlist information, the presence/absence flag is set on. Here, the playback path is formed by arranging one or more playback sections, which are defined in the time axis for one or more video streams that are present in the clip stream file, in a predetermined order.

The clip stream file is composed of a pair of clip information file and a stream file. The clip information file is information that is associated one-to-one with a stream file so as to realize a random access to a stream. When source packets constituting a stream file are read, the clip information file needs to be read into the memory.

It is possible to cause the non-legacy device to determine whether to treat the loaded recording medium as an editable medium or as a non-editable medium, depending on whether the playlist constitutes the stereoscopic video. Even when a playlist for performing a picture-in-picture playback in the 2D output mode or a playlist for realizing a sound mixing in the 2D output mode is present in the recording medium, it is possible to distinguish these playlists from the playlist for the stereoscopic playback, and set the recording medium as an editable medium or a non-editable medium correctly.

Here, the media movie database area may include a stream area and a non-stream area, the non-stream area may be located on the inner circumference side, the index file may be written in the non-stream area, and the stream file may be written in the stream area. With this structure, when the recording area of an optical disc is formed in a spiral track, the non-stream area is located on the more inner circumference side than the stream area. This makes it possible to read the index file into the memory before a stream is accessed.

This completes the description of an approach for solving the problem in the aspect of the recording medium.

The following describes an approach for solving the problem in the aspect of the playback device. When solving the problem in an aspect of the playback device, the problem is solved by a playback device for reading a stream file from a recording medium and playing back the stream file, the playback device comprising: a reading unit configured to read an index file and the stream file from the recording medium; and a playback unit configured to play back a video stream contained in the stream file read by the reading unit, the index file including an editability flag, the editability flag indicating, while set on, the recording medium being treated as an editable medium by a legacy device which does not support recording and editing of stereoscopic video, and while set off, the recording medium being treated as a non-editable medium by the legacy device, wherein when the index file further includes an extended editability flag having been set on, the playback unit treats the recording medium as an editable medium and plays back the video stream even when the editability flag is set off.

The above structure causes a playback device supporting the movie recording format to set, when the playback device reads the index file, whether to treat the loaded recording medium as an editable medium or as a non-editable medium, regardless of whether or not the playback device can perform recording/editing of the stereoscopic video. This minimizes the number of settings on whether to treat a recording medium as an editable medium or a non-editable medium. This makes it possible to maintain the consistency in the operation of the legacy device and the non-legacy device.

When solving the problem in an aspect of the recording device, the problem is solved by a recording device comprising: an encoder configured to obtain a video stream by performing an encoding process; and a writing unit configured to write the digital stream and an index file onto a recording medium, wherein the index file includes an editability flag and an extended editability flag, the writing unit sets the editability flag to a value indicating either on or off when the writing unit writes the index file onto the recording medium, the editability flag indicates, while set on, the recording medium being treated as an editable medium by a legacy device which does not support recording and editing of stereoscopic video, and while set off, the recording medium being treated as a non-editable medium by the legacy device, and the extended editability flag indicates, while set on, the recording medium being treated as an editable medium by a non-legacy device even when the editability flag is set off, the non-legacy device supporting recording and editing of stereoscopic video.

With the above-described structure, it is possible to cause a playback device, in which a recording medium is loaded, to treat the loaded recording medium depending on the type of the playback device. More specifically, when the recording medium is loaded in a playback device which supports recording/editing of a medium and is of a 2D-playback-only type, the playback device is not permitted to edit the recording medium, and when the recording medium is loaded in a playback device which supports recording/editing of a medium and is of a 2D-and-3D playback type, the playback device is permitted to edit the recording medium.

This satisfies the desire of the amateur movie producers of recording a plurality of video streams, which constitute stereoscopic video, onto a recording medium in an editable format, and putting the movie recording format into the world. This structure will thus contribute to the improvement of the image culture and further development of the video industry.

In the above-described recording device, the recording medium may include a media movie database area which comprises a plurality of subdirectories managed under a predetermined directory of a file system, the index file being stored in the predetermined directory, the stream file being stored in a stream subdirectory which is one of the plurality of subdirectories, the writing unit may write the index file into the predetermined directory and write the stream file into a stream subdirectory which is one of the plurality of subdirectories, and when writing the index file into the media movie database area, the writing unit may generate a presence/absence flag in the index file and set the presence/absence flag to a value indicating whether or not a stereoscopic content is present in the media movie database area.

With this structure, a signaling can be performed so that a playback device is notified whether a 3D content is present in a recording medium immediately after the recording medium is loaded in the playback device. This makes it possible to cause the output mode to transition to the 3D output mode immediately after the recording medium is loaded in the playback device.

The extended editability flag is generated in the index file in conjunction with the presence/absence flag that notifies the playback device whether or not a stereoscopic content is present in the media movie database area. It is therefore possible to realize an editing operation in accordance with the extended editability flag, as an extension of the process in the playback device that supports the movie recording format.

Embodiment 2

Embodiment 1 deals with a stereoscopic video stream. The present embodiment describes a technical problem that one having ordinary skill in the art would face when a movie recording format is revised to extend the attribute of a two-dimensional video stream, and means for solving the problem.

There are two types of video streams that can be recorded with a movie recording format: a video stream composed of progressive pictures; and a video stream composed of interlace pictures. For the video stream composed of progressive pictures, 24 Hz (≈23.976 (=24000/100001) Hz) is defined as the mandatory frame rate in the standard. The video stream that is composed of progressive pictures and whose frame rate is 24 Hz is called a "24P" video stream" (accurately speaking, it is 23.976P, but it is called 24P in general). Other known frame rates that can be applied to the video stream composed of progressive pictures include 24 Hz and 25 Hz.

On the other hand, a representative of the video stream composed of interlace pictures is a video stream composed of 60 Hz interlace pictures (60i video stream). The 60i video stream is a video stream that is composed of interlace pictures and whose frame rate is 29.97 (30000/100001) Hz. When 29.97 Hz is converted into the field picture, the number of pictures per second is approximately 60.

The progressive pictures and the interlace pictures are respectively restricted to the above-mentioned frame rates for the following reasons. That is to say, in the movie industry, movies are generally shot by the progressive method at the above frame rate, and many movies are saved in the form of films. On the other hand, in the broadcast industry, a large number of videos for TV broadcast are created and broadcast in 60i. Because it is assumed that the shot videos are used in movies or broadcast programs, the shooting equipment cannot process a video material whose frame rate exceeds the above frame rate. However, when a fast-moving image is shot at a low frame rate, such as 24 Hz, 23.976 (24000/100001) Hz, or 25 Hz, the movement of the image is jumpy and appears unnatural. This provides insufficient video quality. Even in the interlace pictures shot in 60i, the lines in a slanted direction are deformed and the image deterioration is noticeable.

Therefore, a demand for extending the attribute of video stream was made. The video stream whose attribute is to be extended is a "progressive video stream". A progressive video stream that complies with the MPEG4-AVC and is displayed with the 1920×1080 format at the frame rate of 50 Hz or 60 Hz (59.94 Hz) is called an "AVC1080@60P/50P video stream". Among AVC1080@60P/50P video streams, a video stream that is displayed at the frame rate of 60 Hz is called an "AVC1080@60P video stream", and a video stream that is displayed at the frame rate of 50 Hz is called an "AVC1080@50P video stream".

The AVC1080@60P video stream is a video stream composed of progressive pictures of 1920×1080 resolution and having a frame rate of 60 Hz. More specifically, the AVC1080@60P video stream having an optional frame rate displays 60 pictures per second, which is more than double the AVC1080@24P video stream in GOP data scale, thus generating an excessive scale of GOP. The number of pictures displayed per second being 60 requires the decode timing, which is defined by the decode time stamp (DTS) and the playback timing, which is defined by the presentation time stamp (PTS), to be set precisely by accurate time intervals. In addition to this, the entry map points to the data entries with intervals of double precision.

It should be noted here that the AVC1080@60P/50P video stream complies with the MPEG4-AVC as the encoding method, and does not comply with the MPEG4-SVC (Scalable Video Coding). The reason why video streams of the MPEG4-SVC method are excluded is that the MPEG4-SVC defines encoding video images to have various types of scalabilities such as the space scalability, time scalability, and SNR scalability, and these scalabilities are not supported by the existing Blu-ray disc formats.

The "AVC1080@50P video stream" is a video stream composed of progressive pictures and having the frame rate of 50 Hz. The 60P is seen as an extension of the NTSC method adopting 60i. The 60i NTSC method is a world-wide television broadcasting method, and thus the 60P is assumed to be used in a world-wide geographical region.

In contrast, 50P is seen as an extension of the PAL method adopting 50i. The 50i PAL method is a European scanning method, and thus the use of 50P is restricted to the geographical region of Europe.

FIGS. 5A-5B illustrate typical three types of two-dimensional video streams. FIG. 5A illustrates an AVC1080@60P video stream having the 1920×1080 progressive/60 attribute. FIG. 5B illustrates an AVC1080@60i video stream having the 1920×1080 interlace/60 attribute. FIG. 5B also illustrates an AVC1080@24P video stream having the 1920×1080 progressive/24 which represents a two-dimensional video of the base-view video stream described in Embodiment 1. As illustrated in FIG. 5B, each picture included in the AVC1080@60i video stream is an interlace image. The interlace image is composed of two fields: an odd field; and an even field. It is assumed here that an image with horizontal lines, such as the one illustrated in FIG. 5B, represents an interlace picture. On the other hand, it is assumed that an image without horizontal lines, such as the one illustrated in FIG. 5A, represents a progressive picture.

When compared with the picture sequence of the AVC1080@60P video stream illustrated in FIG. 5A, the AVC1080@24P video stream in FIG. 5B displays a smaller number of images per second, providing a lower level of reproduction of a small movement, such as a jumpy movement of the model in the image. On the other hand, the AVC1080@60P video stream, which displays more than double the images of the AVC1080@24P video stream per second, represents details of the movement of the person in the image and conveys the dynamics.

However, when a recording medium, on which a video stream such as the AVC1080@60P video stream or the AVC1080@50P video stream composed of progressive pictures having an optional rate is recorded, is loaded in a legacy device, the legacy device rewrites the attribute of the video stream to "24P" or "60i" because the legacy device can only recognize video streams having the stream attribute "24P" or "60i". If such a phenomenon, where the stream attribute of the progressive video stream is lost while it is used by various devices, becomes public, it influences various companies such as the manufacturers of such devices and recording mediums, and this might develop into a problem of the whole industry. Furthermore, the phenomenon would spoil the merit of recording the progressive video stream, and might cause sluggish consumption of related products.

It is therefore an object of the present embodiment to secure that the sameness of the stream attribute in editing is not lost even when the stream is used by various devices.

When solving the problem in an aspect of the recording medium, the problem is solved by a recording medium including a stream file and an index file, the stream file including a plurality of video streams, the plurality of video streams including: a video stream composed of progressive pictures and having a mandatory frame rate; and a video stream composed of progressive pictures and having an optional frame rate, the index file including an editability flag and an extended editability flag, the editability flag indicating, while set on, the recording medium being treated as an editable medium by a legacy device which does not support recording and editing of progressive pictures at the optional frame rate, and while set off, the recording medium being treated as a non-editable medium by the legacy device, and the extended editability flag indicating, while set on, the recording medium being treated as an editable medium by a non-legacy device even when the editability flag is set off, the non-legacy device supporting recording and editing of the progressive pictures at the optional frame rate.

Here, the "mandatory frame rate (mandatory rate)" is a frame rate at which a playback device of any version can perform decoding and playback. For example, the version upgrade of the application standards of the BD-ROM disc, BD-R disc, and BD-RE disc has been performed repeatedly since the issuance of the first version, and decoding and playback of the AVC1080@24P video stream and AVC1080@60i video stream are possible in all of the versions. Accordingly, 24 Hz of the AVC1080@24P video stream and 60 Hz of the AVC1080@60i video stream are mandatory rates in the BD-ROM disc application standard.

The "optional frame rate (optional rate)" is a frame rate at which a limited versions of playback devices can perform decoding and playback. Currently, decoding and playback of an AVC1080@60P video stream at 60 Hz are not available with current BD-ROM, BD-R and BD-RE discs, but will be allowed when the standard is revised in the near future. Accordingly, 60 Hz of the AVC1080@60P video stream corresponds to the optional rate in the Blu-ray disc application standard.

In the above-described recording media, when an editability flag is set OFF, editing by a legacy device is prohibited, and on the other hand, when an extended editability flag is present, editing by a non-legacy device, which supports the recording/editing of a video stream composed of a plurality of progressive pictures having an optional frame rate, is allowed. With this structure, editing by a legacy device is prohibited, and editing by a non-legacy device is available. That is to say, only non-legacy devices can edit the recording media.

This satisfies the desire of the amateur movie producers of recording a video stream, which is composed of progressive pictures having an optional rate, onto a recording medium with a movie recording format, editing the video stream on their own will, and putting the movie into the world. This structure will thus contribute to the improvement of the image culture. Here, the above-described recording medium may further include playlist information, wherein the playlist information includes a plurality of pieces of playback section information, each of the plurality of pieces of playback section information including: information indicating a start point and an end point of a playback section in a time axis; and a stream selection table showing a list of elementary streams that are permitted to be played back in the playback section, and the extended editability flag is generated in the index file on a condition that an entry of the video stream composed of progressive pictures and having the optional frame rate is present in a stream selection table in any one of the plurality of pieces of playback section information in the playlist information.

It should be noted here that a pair of an entry in the playlist information, in the above description, and a stream attribute constitutes a stream registration in the stream selection table.

Here, the stream registration is information that, when a playitem containing the stream selection table (STN_table in the BD-ROM disc) itself becomes the current playitem, indicates what kind of stream is the elementary stream that is to be permitted to be played back. Each stream registration is associated with the stream number of the stream. Each stream registration has a data structure in which a pair of a stream entry and a stream attribute is associated with a logical stream number.

The stream number in the stream registration is represented by an integer such as "1", "2", or "3". The largest stream number for a stream type is identical with the number of streams for the stream type.

The playback device is provided with a stream number register for each stream type, and the current stream, namely the elementary stream being played back currently is indicated by the stream number stored in the stream number register.

A packet identifier of the elementary stream (ES) to be played back is written in the stream entry. By making use of this structure in which a packet identifier of the ES to be played back can be written in the stream entry, the stream numbers included in the stream registrations are stored in the stream number registers of the playback device, and the playback device causes the PID filter thereof to perform a packet filtering based on the packet identifiers stored in the stream entries of the stream registrations. With this structure, TS packets of the ESs that are permitted to be played back according to the basic stream selection table are output to the decoder, so that the ESs are played back.

In the basic stream selection table, the stream registrations are arranged in an order of stream numbers. When there are a plurality of streams that satisfy the conditions: "playable by the playback device"; and "the language attribute of the stream matches the language setting of the playback device", a selection-target stream is determined based on the order of the stream number in the stream registration sequences.

With this structure, when, among the stream registrations in the basic stream selection table, there is a stream that cannot be played back by the playback device, the stream is excluded from the playback. Also, when there are a plurality of streams that satisfy the conditions: "playable by the playback device"; and "the language attribute of the stream matches the language setting of the playback device", the person in charge of authoring can notify the playback device of a stream that is to be selected with priority from among the plurality of streams satisfying the conditions. According to the above embodiment for solving the problem, it is possible to cause the non-legacy device to treat a recording medium loaded therein as either an editable medium or a non-editable medium, depending on whether any stream selection table in the playlist information includes an entry that permits playback of a video stream that is composed of progressive pictures and has an optional frame rate. This makes it possible for the non-legacy device to distinguish between: a playlist that permits playback of only the AVC1080@24P video stream; and a playlist that permits playback of only the AVC1080@60i video stream when these playlists are present in a recording medium loaded therein, and appropriately set whether or not to treat the recording medium as an editable medium. This makes it possible to edit the video data freely while maintaining the stream attributes as they are.

The types of elementary streams that can be registered on the stream selection table include: parent-screen video stream; audio stream; presentation graphics stream; and interactive graphics stream.

The parent-screen video stream is a video stream (primary video stream) including pictures in which a child screen is to be inserted in the picture-in-picture. Note that the playback device decides whether or not to perform the picture-in-picture. When the playback device selects a non-picture-in-picture display, only the parent-screen video stream is used to display images on the screen. The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

The presentation graphics (PG) stream is a graphics stream that can be synchronized closely with the video, with the adoption of the pipeline in the decoder, and is suited for representing subtitles. Since a close synchronization of the graphics stream and the video is achieved by the pipeline decoding, the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream. The interactive graphics (IG) stream is a graphics stream which, having information for interactive operation, can display menus with the progress of playback of the video stream and display pop-up menus in accordance with user operations.

Among the stream registration sequences in the stream selection table, entries for the parent-screen video stream in the stream selection table define whether or not permit playback of a progressive video stream. This makes it possible to judge whether or not to permit editing, based on whether or not entries permitting playback of the parent-screen video stream include an entry that permits playback of a progressive video at an optional frame rate. This makes it possible to judge efficiently whether or not a progressive video stream is present in a media movie data set that is the target of editing.

This completes the explanation of the means for solving the problem in an aspect of the recording medium.

When solving the problem in an aspect of the playback device, the problem is solved by a playback device comprising: a reading unit configured to read an index file and a stream file from a recording medium; and a playback unit configured to play back a video stream contained in the stream file read by the reading unit, the index file including an editability flag, the editability flag indicating, while set on, the recording medium being treated as an editable medium by a legacy device which does not support recording and editing of progressive pictures at the optional frame rate, and while set off, the recording medium being treated as a non-editable medium by the legacy device, and when the index file further includes an extended editability flag having been set on, the playback unit treats the recording medium as the editable medium and plays back the video stream even when the editability flag is set off.

With the above structure, when the index file in the movie recording format is read, it is set in a playback device supporting a rewritable medium whether or not to treat the loaded recording medium, on which a video stream composed of progressive pictures and having an optional frame rate is recorded, as an editable medium. Such an addition of a control with use of the extended editability flag does not require large changes. It is therefore possible to realize an editing operation in accordance with the extended editability flag, as an extension of the process in the playback device that supports the movie recording format.

With regard to the above playback device, the following lower concept may be provided. That is to say, in the playback device, the recording medium further includes playlist information, the playlist information includes a plurality of pieces of playback section information, each of the plurality of pieces of playback section information includes: information indicating a start point and an end point of a playback section in a time axis; and a stream selection table showing a list of elementary streams that are permitted to be played back in the playback section, the extended editability flag is generated in the index file on a condition that an entry of the video stream composed of progressive pictures and having the optional frame rate is present in a stream selection table in any one of the plurality of pieces of playback section information in the playlist information, the playback device further comprises: a stream number register storing a current stream number; a playback section information number register storing a number assigned to current playback section information which is one of the plurality of pieces of playback section information; and a demultiplexing unit configured to demultiplex one or more of a plurality of elementary streams shown in a stream selection table included in the current playback section information that correspond to the current stream number, to obtain one or more demultiplexed elementary streams, and the playback unit includes a video decoder configured to decode, among the one or more demultiplexed elementary streams obtained by the demultiplexing, a video stream composed of progressive pictures and having an optional frame rate.

The playback device executes a stream selection procedure based on the stream selection table that is present in each playback section information in the playlist information. The stream selection procedure is a procedure for identifying, among stream registration sequences in the stream selection table, stream registration sequences that satisfy the conditions: "playable by the playback device" and "the language attribute of the stream matches the language setting of the playback device", and selecting one from among the identified stream registration sequences. The stream selection procedure is executed when the current playitem has changed to a new one, or when a request to switch the stream has been received from the user.

A sequential procedure for performing the above-described judgment and selection and setting a stream number in the stream number register of the playback device when a state change occurs in the playback device, such as when the current playitem is switched, is called "procedure to be executed at state change". Since the stream number registers are provided respectively in correspondence with the stream types, the above-described procedure is executed for each stream type.

A sequential procedure for performing the above-described judgment and selection and setting a stream number in the stream number register of the playback device when a request to switch the stream is input by the user is called "procedure at state change request".

The types of the "request to switch the stream" include: issuing a set stream command; issuing a stream change UO; and calling a set stream API.

The non-legacy device (the playback device in the above embodiment) that supports recording/editing of progressive pictures at an optional rate searches the stream selection table, which is the target of the stream selection procedure, for an entry for a progressive video having an optional rate. With this structure, it is possible for a device to determine appropriately whether to treat a recording medium loaded therein as an editable medium or a non-editable medium, without searching the contents of all files stored in the medium movie database.

It is therefore possible to define whether to treat a recording medium as an editable medium or a non-editable medium in accordance with the extended editability flag, as an extension of the process for the index file in the playback device that supports the movie recording format.

Also, the above structure causes a rewritable medium playback device to perform demultiplexing and decoding on the premise of the presence of the stream selection table. Accordingly, it is possible to cause a rewritable medium playback device to play back a progressive video stream on the premise that the video stream is edited.

Embodiment 3

The following describes a specific embodiment for solving the above problem by taking a movie recording format of the Blu-ray disc as one example. As the movie recording format, the BD-RE disc format defined by the BDMVRecording Specification is selected.

The BDMVRecording Specification defines BDMV subsets for realizing the realtime recording and editing of BDMV contents. The format of the subsets is called Realtime Recording Editing Format (RREF). The RREF adapts the recording version of data format of BD-ROM disc to a realtime recording and editing process.

A version of the BDMVRecording Specification that supports recording of the AVC1080@60P/50P video stream and/or the MVC1080@60i/50i video stream corresponds to version 3.1 which is the latest version of the Blu-ray Rewritable format. Accordingly, the format of the product level that is the target of the embodiments of the present application is determined as Blu-ray Rewritable version 3.1 format (BDMVRecording Specification+RREF format).

The Blu-ray Rewritable format version 3.1 defines the transfer and restriction on the BD-ROM application format for recording and editing a BDMV content on the BD-RE or BD-R. The version of the BD-ROM format Part3 that is referred to by the Blu-ray Rewritable format version 3.1 is "version 2.5".

The Blu-ray Rewritable format version 3.1 records the BDMV database in order to realize the following personal BDMV contents authoring and the BDMV realtime recording and editing. The personal BDMV contents authoring assumes the write-once scenario and the non-editing scenario. The write-once scenario and the non-editing scenario are completed by the user, and are present in BD-ROM titles that are not permitted to be edited later.

On the other hand, the BDMV realtime recording and editing (BDMVRecording Specification+RREF) assumes the case where the rewritable and editable is used. It is for the recorder to grasp video contents captured by video cameras. To realize the grasp by the recorder, the RREF supports editing and deleting of contents by products (industrial products) manufactured by different manufacturers. All of the manufactured products that edit any RREF content maintain the RREF content. This is realized by an update or editing operation of the database, or a menu during an operation.

Furthermore, in addition to the use of Blu-ray ReadOnly Recording+Realtime Recording Editing Format (RREF), the present embodiment assumes that a recording device supporting the Blu-ray Rewritable version 3.1 format is a non-legacy device. Also, the present embodiment assumes that a recording device not supporting the Blu-ray Rewritable version 3.1 format, but supporting only formats of the version 3.0 and before is a legacy device.

The following describes how the inventors solved the problem, taking a specific example of the BDMV database.

First, writing the index file in an object-oriented programming language is described. The index file in the BDMV database is called "Index.bdmv".

FIG. 6A illustrates a syntax of Index.bdmv written in an object-oriented programming language for BD-ROM disc. As illustrated in FIG. 6A, in the syntax of the object-oriented programming language, the index file includes type_indicator, version_number, indexes_start_address, extension_data_start_address, reserved_for_future_use, AppInfoBDMV, a "for" statement defining N1 padding_words, indexes, a "for" statement defining N2 padding_words, and ExtensionData.

FIG. 6B illustrates a detailed structure of AppInfoBDMV in the case where the BDMV database complies with a conventional Blu-ray Rewritable format. FIG. 6B illustrates the data structure of AppInfoBDMV of the Blu-ray Rewritable version 3.0 which is a format of a conventional-type rewritable medium. As illustrated in FIG. 6B, in the format of the Blu-ray Rewritable version 3.0, editability_flag, reserved_for_future_use, and content_provider_user_data are defined in AppInfoBDMV. In contrast to FIG. 6B, FIG. 6C includes, in addition to information indicating the editability (editability_flag), information indicating the editability of version 3.1 (extended_editability_flag).

FIG. 6C illustrates the data structure of AppInfoBDMV data extended for BDMVRecording+RREF. In this extension, the editability_flag indicating whether or not the medium is rewritable is adopted as the editability_flag as it is, and among the 15-bit reserved_for_future_use, three bits are replaced with initial_output_mode_preference, SS_content_exist_flag, and extended_editabitily_flag. In the extended data structure illustrated in FIG. 6C, the editabitily_flag is assigned to the $33^{rd}$ bit (b32), which corresponds to the conventional bit position of the editabitily_flag, and thus, in the legacy device, the editabitily_flag is treated as information indicating whether or not the medium is editable.

On the other hand, the extended_editabitily_flag is assigned to the $36^{th}$ bit (b35), which corresponds to the conventional bit position of the reserved area, and thus, for the legacy device, the value of the extended_editabitily_flag is invalid. Accordingly, as far as the editabitily_flag is set to "0" in the BDMV database including a 3D content, even if the extended_editabitily_flag is set to "1" so that the 3D content can be edited, the legacy device does not recognize the value set in the extended_editabitily_flag. That is to say, as far as the editabitily_flag is set to "0", the BDMV database including a 3D content is not edited erroneously by the legacy device.

The "editabitily_flag" is defined as "reserved" in BD-ROM part3-1. When this field is set to "0", it indicates that the medium is a non-editable medium. The non-editable medium must conform to the BDMVRecording Specification, but may or may not conform to the RREF. When the editability_flag is set to "1", it indicates that the recording medium on which the index file is recorded is treated as an "editable medium". The content of the editable medium conforms to the format of the RREF added to the BDMVRecording Specification. When the editability_flag is set to "1", it indicates that the disc is judged as "editable" and can be subjected to an editing process.

The "initial_output_mode_preference" indicates the preference with regard to the initial output mode in the disc. When set to "0", it indicates the 2D output mode, and when set to "1", it indicates the 3D output mode. When the "initial_output_mode_preference" is set to "3D output mode", the playback device is set to the 3D output mode when the disc is loaded in the device, on the premise that the display device has the stereoscopic display capability.

The "SS_content_exist_flag" indicates whether or not a Profile5 function is used. When any of the following conditions is satisfied, this field is set to "1".

The 3D playlist embedded with the stream selection table SS is provided.

The bytecode application that is currently signaled in the application management table in the operation mode object data includes "Profile5" in a set of application profile values in the application descriptor thereof. The "Profile5" is an application profile corresponding to the stereoscopic playback. Accordingly, even when no 3D playlist is present in a title corresponding to the operation mode object, or the playlist itself is not present, the "SS_content_exist_flag" is set "on" when the bytecode application realizes a stereoscopic playback of a menu or the like by performing drawing on the left-eye and right-eye graphics plane devices in the HAVi screen device. In the present application, the 3D content includes not only a content composed of the MVC1080@50i/60i video stream or the MVC1080@24p video stream, but also a 3D video that is realized when the bytecode application draws the left-eye and right-eye graphics on the HAVi screen device.

The 3D output mode is used. When the SS_content_exist_flag is set to "not present (not exist)", the playback device never transitions to the 3D output mode while the disc is loaded therein. Thus the mode selection procedure of the output mode register for indicating the setting of the output mode in the playback device is not executed, and the output mode register is fixed to the 2D output mode. On the other hand, the playback device executes the mode selection procedure only when the SS_content_exist_flag is set to "present (exist)".

As defined by the "if" statement in FIG. 6C, the "extended_editability_flag" is generated in the AppInfoBDMV data when the condition (A), which depends on the presence of the 3D content and/or the AVC1080@60P/50P video stream, is satisfied. When the condition (A) is not satisfied, this field is set to "0". When the editability_flag is set to "0", the disc is judged as "non-editable" by a recording device that is a legacy device. However, if the condition (condition (A)), which depends on the presence of the 3D content and/or the AVC1080@60P/50P video stream, is satisfied, it is judged whether or not the disc is editable by referring to the exetended_editability_flag that is newly provided.

When the condition (A) is satisfied, the exetended_editability_flag indicates whether the BD-R/BD-RE, which supports a version higher than the version of the present format (RREF), is to be treated as either a non-editable medium or an editable medium. When the exetended_editability_flag field is set to "0", it indicates that the disc is treated as a non-editable medium, and when the exetended_editability_flag field is set to "1", it indicates that the disc is treated as an editable medium regardless of the value of the editability_flag.

As described above, when the exetended_editability_flag is present and the exetended_editability_flag is set to "1", the disc is judged as "editable" and can be edited regardless of the value of the editability_flag. When the exetended_editabitily_flag is set to "0", the disc is judged as "non-editable" and cannot be edited.

The "video_format", having four bits, specifies a video format for the high-bandwidth digital output function. Upon insertion of the disc, the video format can be determined by negotiation.

The "frame_rate", having four bits, specifies a video rate for the high-bandwidth digital output function. Upon insertion of the disc, the video rate can be determined by negotiation. Either the video_format or the frame_rate can be set to "0". When either the video_format or the frame_rate is set to "0", both the video_format and frame_rate fields are disregarded by the playback device.

FIG. 6D illustrates in a table format the differences between the meaning of the bits of AppInfoBDMV data in the conventional BD-RE disc illustrated in FIG. 6B and the meaning of the bits of the extended AppInfoBDMV data of the present embodiment illustrated in FIG. 6C. In the table, the bit positions from b0 to b48 in the AppInfoBDMV data are arranged horizontally, and the extended-typeAppInfoBDMV data (AppInformationBDMV@Extended) and the conventional-type AppInfoBDMV data (AppInformationBDMV@Conventional) are arranged vertically. This table can be read as follows. First an item is selected from the horizontally arranged items. Then an item is selected from the vertically arranged items. Finally, the content of a box at an intersection of the items selected from the horizontally and vertically arranged items is read. Then it is understood what information element is assigned to the extended-typeAppInfoBDMV data (AppInformationBDMV@Extended) or the conventional-type AppInfoBDMV data (AppInformationBDMV@Conventional) corresponding to the BDMVRecording Specification at the selected bit position.

As illustrated in FIG. 6D, b32 is assigned to the editability_flag in both the extended format that is the Blu-ray Rewritable version 3.1 and the normal format that is the Blu-ray Rewritable version 3.0. The editability_flag at this position plays the same role in both formats. It is also understood that reading by a playback device not supporting the Blu-ray Rewritable version 3.1 is available. The bits from b33 to b39 are assigned to the initial_output_mode_preference, SS_content_exist_flag, and extended_editabitily_flag in the extended format, and read by the 3D recording/editing device.

A conventional recording device obtains meaningful information based on the data structure defined in FIG. 6B. On the other hand, the reserved areas reserved for the future use are disregarded by a 2D playback device, or even if read by the 2D playback device, they do not provide any function.

Figure 7:
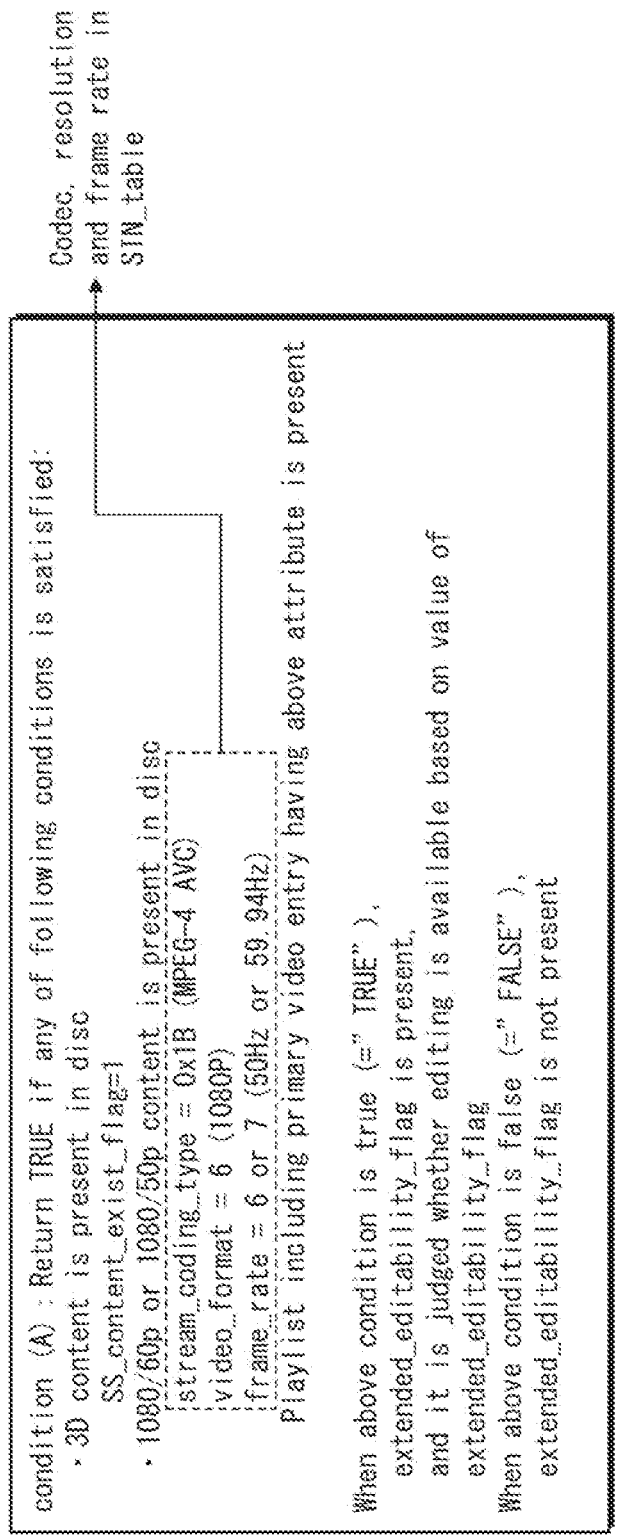
FIG. 7 illustrates the conditions for generating the extended_editabitily_flag.

The extended_editabitily_flag described with reference to FIGS. 6A-6D is provided in Index.bdmv when any of the following conditions is satisfied. FIG. 7 illustrates the conditions for generating the extended_editabitily_flag.

The first condition is that a 3D content is present in the disc. Whether or not a 3D content is present is indicated by the SS_content_exist_flag in AppInfoBDMV( ) in index.bdmv. When the SS_content_exist_flag is set to "1", it indicates that a 3D content is present in the disc, and the condition (A) returns TRUE.

The second condition is that a content including Primary Video Entry of Progressive video is present in the BDMV database. The Primary Video Entry is a stream entry which stores a PID of the parent-screen video stream (primary video stream) in the picture-in-picture, and is paired with the stream attribute of the MPEG-4 AVC@1920×1080/59.94p or the MPEG-4 AVC@1920×1080/50p. More specifically, the Primary Video Entry is a stream entry that indicates the following 1) and 2).

1) Stream_coding_type=0x1B (namely, codec is MPEG-4 AVC), among stream_attributes in the STN_table in PlayList in the disc.

2) Combination of video_format=6 (namely, resolution is 1920×1080p) and frame_rate=6 or 7 (namely, frame rate is 50 Hz or 59.94 Hz).

When any combination among stream_coding_type=0x1B, video_format=6, and frame_rate=6 or 7 is present in the STN_table in PlayList, a content of Progressive video is present in the disc, and the condition (A) returns TRUE.

FIG. 8 illustrates, in a table format, the condition to set editability_flag to "0" and how the recording device is treated when the extended_editabitily_flag is set to "1". The upper portion of the table indicates the condition to set editability_flag to "0" and the lower portion of the table indicates how the recording device is treated when the extended_editabitily_flag is set to "1". A disc, on which a 3D content and a Progressive Video content are recorded, is played back by a conventional-type playback device since the disc is compatible in playback with the conventional-type playback device.

On the other hand, the editing in the conventional device does not support the 3D playback by the MVC1080@24p video stream and the 50i/60i video stream that are new formats, and the progressive playback by the AVC1080@60P/50P video stream. Accordingly, the editing may result in a discard or change of information pertaining to the MVC1080@24p/50i/60i video stream and the AVC1080@60P/50P video stream included in the playlist information file and clip information file. As a result, the MVC1080@24p/50i/60i content and the AVC1080@60P/50P content, which have been recorded originally, may be lost. For this reason, when a playlist including an entry that permits playback of the MVC1080@24p/50i/60i video stream is present, or when a playlist including an entry that permits playback of the AVC1080@60P/50P video stream is present, the editability_flag is set to "0" to prohibit editing by conventional devices. On the other hand, as a supplementary measure, even if the editability_flag is set to 0, a recording device conforming to the Blu-ray Rewritable version 3.1 format (BDMVRecording Specification+RREF) treats the medium as an editable medium.

As described above, it is possible to record the index file onto a recording medium so that it is subjected to the process performed by a recording device, by defining the syntax of the index file in the Blu-ray Rewritable version 3.1 format (BDMVRecording Specification+RREF format) and defining the meaning of the set values of the extended_editability_flag to enable the BD-R disc and the BD-RE disc to be interpreted by a playback device. It is possible to cause a recording device or a playback device supporting the BDMVRecording Specification+RREF to read the data structure unique to the present invention, by setting the parameters as described above by using an object-oriented programming language.

This completes the description of the aspect of the recording device. The following describes the aspect of the playback device. With regard to the playback device, it is sufficient to cause the reading unit to perform a process corresponding to the above Index.bdmv among the above-described structural elements. The improvement of the reading unit is illustrated in detail in FIG. 9.

Figure 9:
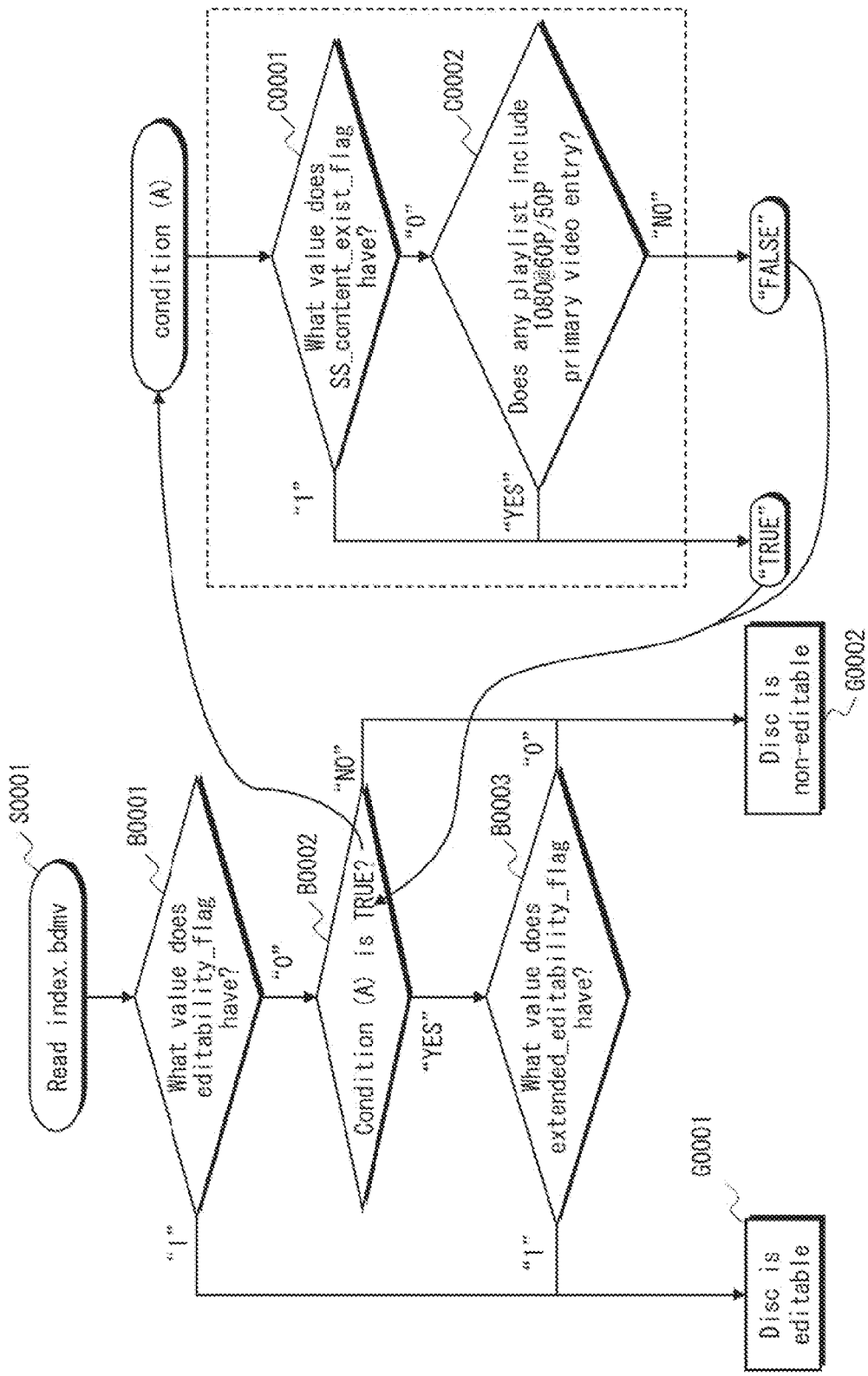
FIG. 9 is a flowchart illustrating the procedure for judging whether or not a disc with data written in the extended format is editable.

FIG. 9 is a flowchart illustrating the procedure for a recording device, which is a non-legacy device, to judge whether or not a disc with data written in the extended format is editable.

After Index.bdmv is read from the disc, the value of the editability_flag is checked first (B0001). When the editability_flag has a value "1", the playback device judges the disc as "editable" (G0001). When the editability_flag is set to a value "1", editing is permitted regardless of whether the playback device supports 3D and Progressive Video.

When the editability_flag has a value "0", it is further judged whether or not the disc satisfies the condition (A) (B0002).

Here, the condition (A) returns TRUE when the disc stores an MVC1080@24p/50i/60i content and/or a Progressive video content, and returns FALSE when the disc stores neither of the contents. Accordingly, first it is judged whether the disc stores an MVC1080@24p/50i/60i 3D video content by checking the value of the SS_content_exist_flag (C0001).

When the SS_content_exist_flag has a value "1", it is judged that the disc stores an MVC1080@24p/50i/60i 3D video content. Thus the condition (A) returns TRUE.

When the SS_content_exist_flag has a value "0", it is judged whether or not a Progressive video content is present. To make the judgment on whether or not a Progressive video content is present, the STN_tables included in all PlayLists in the disc are checked (C0002).

When a Primary video entry having stream_coding_type=0x1B, video_format=0x06, frame_rate=6 or 7 is present in any STN_table, it is judged that a content including the AVC1080@60P/50P video stream is recorded on the disc. Thus the condition (A) returns TRUE. When no Primary video entry having stream_coding_type=0x1B, video_format=0x06, frame_rate=6 or 7 is present in the STN_tables, it is judged that a Progressive video content is not recorded on the disc. In that case, it is judged that neither an MVC1080@24p/50i/60i 3D video content nor a Progressive video content is recorded on the disc, and the condition (A) returns FALSE.

Note that in the above description, first it is judged whether an MVC1080@24p/50i/60i 3D video content is recorded (C0001), and then it is judged whether a Progressive video content is recorded (C0002). However, not limited to this, the order of C0001 and C0002 may be reversed.

That is say, first it may be judged whether a Progressive video content is recorded, and then it may be judged whether an MVC1080@24p/50i/60i 3D video content is recorded. As described above, when the judgment of the condition (A) returns TRUE, the extended_editability_flag is present in APPInfoBDMV( ) of index.bdmv. In that case, the judgment on whether or not the disc is editable is made based on the value of the extended_editability_flag.

When the judgment of the condition (A) returns FALSE, the extended_editability_flag is not present, and thus the judgment on whether or not the disc is editable is made based on the value of the editability_flag. That is to say, in that case, the editability_flag has a value "0", and thus the playback device judges the disc as "non-editable" (G0002).

When the condition (A) is TRUE, then the value of the extended_editability_flag is checked (B0003). When the extended_editability_flag has a value "1", the playback device judges the disc as "editable" regardless of the value of the editability_flag, and permits editing of the disc. When the extended_editability_flag has a value "0", the playback device judges the disc as "non-editable" and does not permit editing of the disc.

The following describes reading by a device that supports only the Blu-ray Rewritable format version 3.0 or before. A player supporting the Blu-ray Rewritable format version 3.0 or before cannot recognize the presence of the extended_editability_flag, and thus judges whether or not the disc is editable based on only the editability_flag.

Accordingly, when the editability_flag has a value "1", a playback device that supports only the Blu-ray Rewritable format version 3.0 or before judges that the disc is "editable" and permits editing of the disc. Also, when the editability_flag has a value "0", a playback device that supports only the Blu-ray Rewritable format version 3.0 or before judges that the disc is "non-editable" and does not permit editing of the disc. With this structure, when the disc stores an MVC1080@24p/50i/60i 3D video content or a Progressive video content, the editability_flag is set to "0", and a playback device that supports only the Blu-ray Rewritable format version 3.0 or before cannot edit the disc that stores an MVC1080@24p/50i/60i 3D video content or a Progressive video content.

This completes the description of an approach for solving the problem in the aspect of the playback device.

FIG. 9 illustrates a method of judging whether or not a BD disc, on which the BDMV database has already been recorded, is editable. When a recording device attempts to record the BDMV database onto an unrecorded medium (blank disc), the recording device needs to conform to the above rules.

Figure 10:
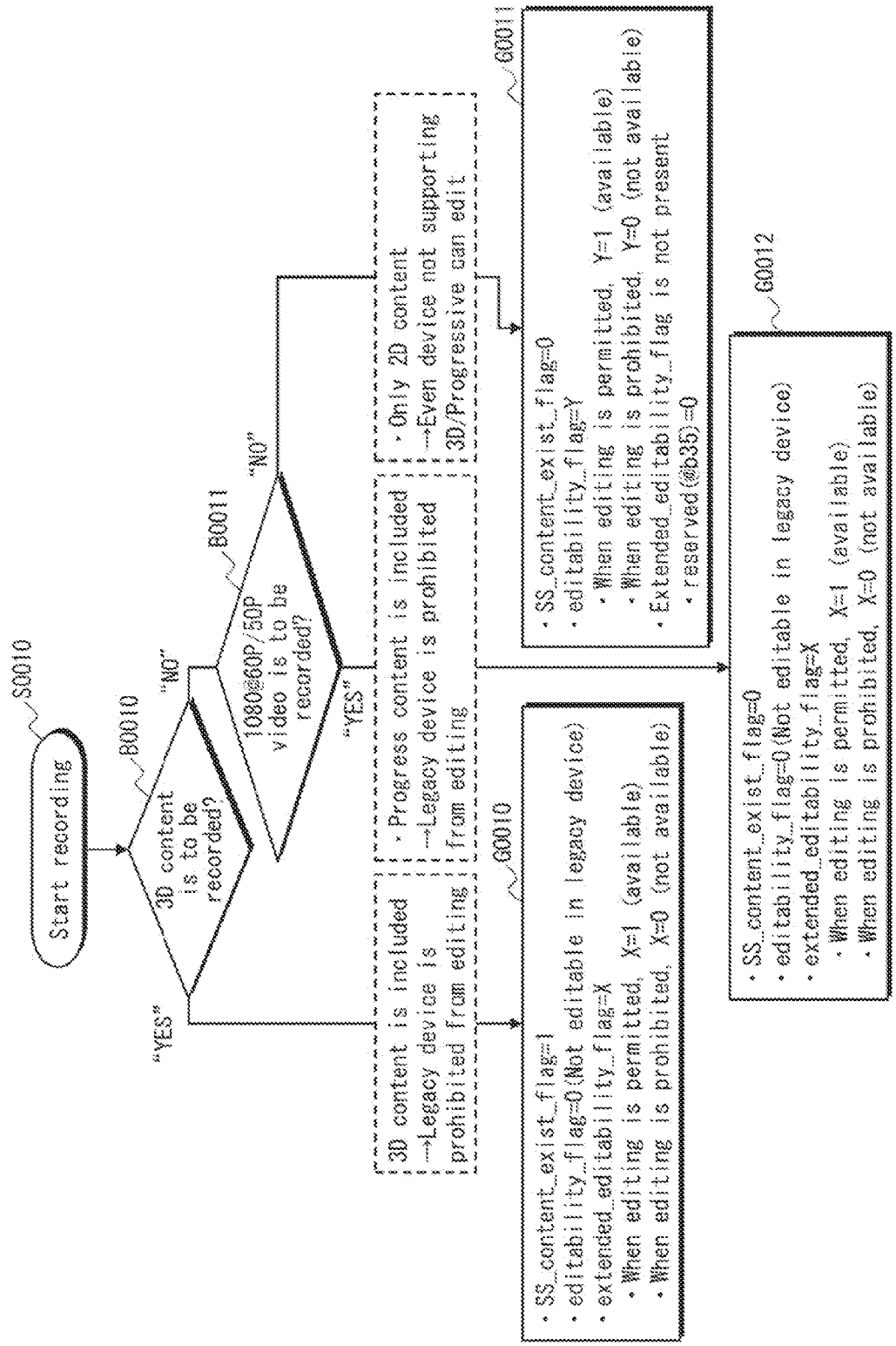
FIG. 10 is a flowchart illustrating the procedure for judging whether or not a blank disc is editable when recording a content newly onto the blank disc.

To cause the recording device to perform the above-described processing of Index.bdmv, it is necessary to cause the writing unit, which is one of the structural elements of the recording device that can solve the problem, to execute the above procedure. The characteristic is described in detail in FIG. 10. FIG. 10 is a flowchart illustrating the procedure for judging whether or not a blank disc is editable when recording a content newly onto the blank disc.

First, it is judged whether or not an MVC1080@24p/50i/60i 3D content is to be recorded (B0010). When it is judged Yes in step B0010, the SS_content_exist_flag is set to "1", the editability_flag is set to "0", and the extended_editability_flag is set to "X" because a legacy device must prohibit editing of a disc when the disc stores an MVC1080@24p/50i/60i 3D video content. Here, "X" is a value that is determined based on the mode setting. When editing is permitted, the extended_editability_is set to "available (X=1)". When editing is prohibited, the extended_editability_is set to "not available (X=0)".

When an MVC1080@24p/50i/60i 3D video content is not included in the BDMV database, it is judged whether or not the AVC1080@60P/50P video stream is to be recorded (B0011). When it is judged that the AVC1080@60P/50P video stream is not to be recorded (No in step B0011), the SS_content_exist_flag is set to "0", the extended_editability_flag is changed to a reserved area, and the editability_flag is set to "Y" because the BDMV database contains only 2D contents and editing of the contents must be made available in a 2D device. Here, "Y" is a value that is determined based on the mode setting. When editing is permitted, the editability_is set to "available (Y=1)" (G0011).

When it is judged that the AVC1080@60P/50P video stream is to be recorded (Yes in step B0011), the SS_content_exist_flag is set to "0", the editability_flag is set to "0", and the extended_editability_flag is set to "X" because a progressive video is contained and the legacy device must be prohibited from editing. Here, "X" is a value that is determined based on the mode setting. When editing is permitted, the extended_editability_is set to "available (X=1)". When editing is prohibited, the extended_editability_is set to "not available (X=0)".

Note that the order of B0010 and B0011 in the flow may be reversed.

Figure 11:
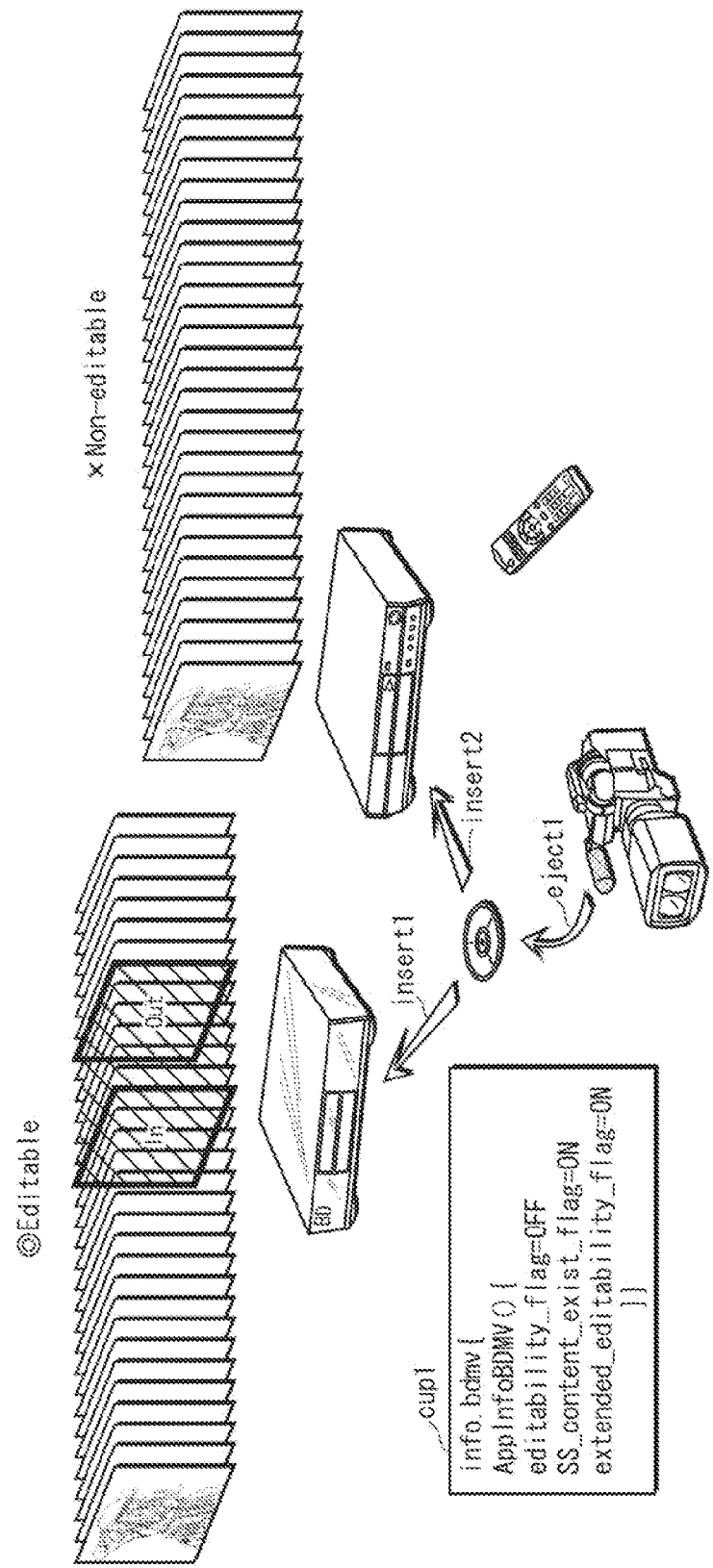
FIG. 11 illustrates the cases where a recording medium, on which an MVC1080@24p/50i/60i 3D video content has been recorded by a 3D shooting device, is loaded in a recording device not supporting the Blu-ray Rewritable version 3.1 and in a recording device supporting the Blu-ray Rewritable version 3.1.

FIG. 11 illustrates the cases where a recording medium, on which an MVC1080@24p/50i/60i 3D video content has been recorded by a 3D shooting device, is loaded in a recording device not supporting the Blu-ray Rewritable version 3.1 and in a recording device supporting the Blu-ray Rewritable version 3.1. The "eject1" in FIG. 11 indicates that a recording medium is removed from the 3D shooting device, and in this state, the editability_flag is set OFF and the extended_editability_flag is set ON in the AppInfoBDMV data in the index file of the recording medium. The "insert2" in FIG. 11 indicates that the recording medium is loaded into the recording device which does not support the Blu-ray Rewritable version 3.1. Here, the editability_flag is set OFF and the extended_editability_flag is set ON. Accordingly, the recording device not supporting the Blu-ray Rewritable version 3.1 cannot perform editing such as partial deletion, division, or integration on the recording medium. The "insert1" in FIG. 11 indicates that the recording medium is loaded into the recording device which supports the Blu-ray Rewritable version 3.1. Here, the editability_flag is set OFF and the extended_editability_flag is set ON. Accordingly, the recording device supporting the Blu-ray Rewritable version 3.1 can perform partial deletion to delete a middle part of a stereoscopic video.

Figure 12:
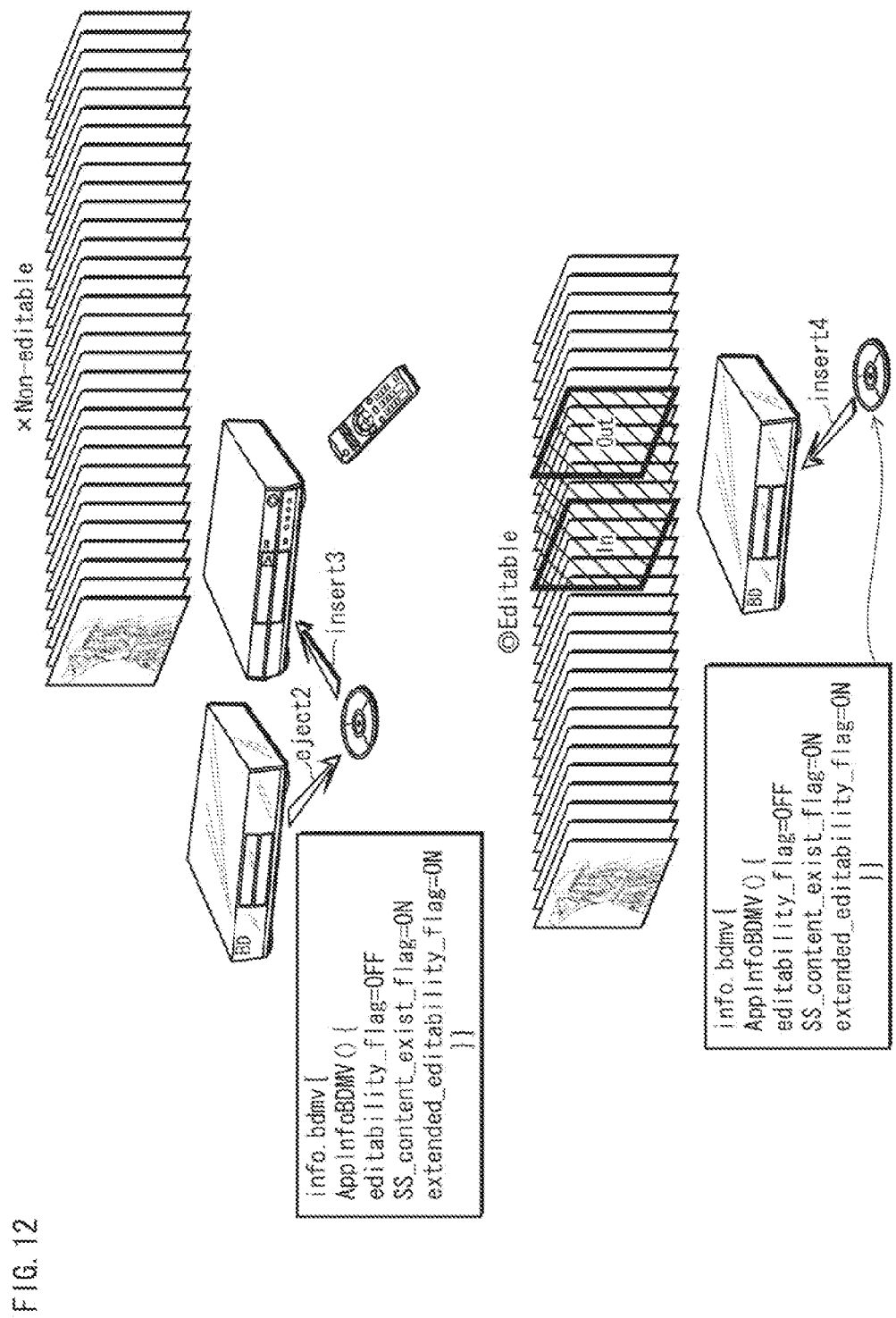
FIG. 12 illustrates a case where a recording device records a TV broadcast.

FIG. 12 illustrates a case where a recording device records a TV broadcast. The arrow "eject2" in FIG. 12 indicates that a recording medium on which the TV broadcast has been recorded is ejected from the recording device. In this state, an MVC1080@24p/50i/60i 3D video content is included in the BDMV database in the recording medium, and thus the SS_content_exist_flag is set ON, the editability_flag is set OFF, and the extended_editability_flag is set ON. The arrow "insert3" in FIG. 12 indicates that the recording medium is loaded into a playback device which does not support the version 3.1. Here, in Index.bdmv, the SS_content_exist_flag is set ON, the editability_flag is set OFF, and the extended_editability_flag is set ON. Accordingly, the playback device that does not support the version 3.1 can perform only a two-dimensional playback of video, but cannot edit the MVC1080@24p/50i/60i 3D video content. The "insert4" in FIG. 12 indicates that the recording medium is loaded into the recording device which supports the Blu-ray Rewritable version 3.1. Here, in Index.bdmv, the SS_content_exist_flag is set ON, the editability_flag is set OFF, and the extended_editability_flag is set ON. Accordingly, the recording device that supports the Blu-ray Rewritable version 3.1 can perform partial deletion to delete a middle part of a stereoscopic video.

As described above, according to the present embodiment, when the Blu-ray Rewritable is further revised after the issuance of the version 3.1 format (BDMVRecording Specification+RREF format), it is possible to add the revised format to the editing target, thereby expanding the target of editing and creating high-value added recording devices and recording mediums.

There is no fear that editing of the BDMV database may create such a quality problem that may involve manufacturers of the recording medium, legacy device that performs editing, and playback device that performs playback. It is thus possible to improve the BDMV database format continuously, streamlining and optimizing the format.

Embodiment 4

The present embodiment explains how to describe the playlist information to realize playback of the interlace 3D. In the playback of the interlace 3D, images having a resolution of 1920×1080 or the like are displayed in the interlace method, and the BDMV database is described with stream attributes that are not interpreted by a playback device for the BD-ROM format.

Accordingly, the BDMV database that realizes playback of the interlace 3D needs to have a data structure that does not create a problem when it is loaded in a conventional 3D playback device that supports the 3D playback of the MVC1080@24P video stream, but not the interlace 3D playback of the MVC1080@60i/50i video stream.

In the stereoscopic playback, a base-view video stream and a dependent-view video stream are selected in accordance with a stereoscopic version of the stream selection table (called STN_table_SS). However, if the STN_table_SS contains stream attribute information of an interlace video, it means that the STN_table_SS contains information unknown to player devices, and the structure might cause some error.

It is therefore an object of the present embodiment to provide interlace video recorded on a recording medium which, when loaded in a playback device that does not support a stereoscopic playback of the interlace video, can be played back without error.

For that purpose, it is necessary to ensure the compatibility in playback by distinguishing the STN_table_SS for the interlace 3D from the conventional STN_table_SS for the BD-3D BDMV data.

Specifically, the problem is solved by a recording medium on which playlist information and a stream file are recorded, wherein first identification information set to a first value is assigned to extent data of, among the playlist information recorded on the recording medium, a piece of playlist information of a version which does not correspond to a stereoscopic playback using interlaced images, second identification information set to a second value is assigned to extent data of, among the playlist information recorded on the recording medium, a piece of playlist information of a version which corresponds to the stereoscopic playback using the interlaced images, the extent data, to which the second identification information set to the second value is assigned, includes a stereoscopic stream selection table that includes one or more entries each having a packet identifier of a dependent-view video stream that is composed of interlace-type view components, the one or more entries being associated with one or more stream attributes of interlaced video.

Also, the above problem is solved by a playback device comprising: a version register storing a version of the playback device; a reading unit configured to read a transport stream from a recording medium; and a demultiplexing unit configured to perform demultiplexing onto the read transport stream, wherein when the version of the playback device is not a predetermined version that corresponds to a stereoscopic playback using interlaced images, a stream selection table is obtained from first extent data corresponding to first identification information set to a first value, when the version of the playback device is the predetermined version that corresponds to the stereoscopic playback using the interlaced images, a stream selection table is obtained from second extent data corresponding to second identification information set to a second value, the demultiplexing unit is caused to perform demultiplexing of a dependent-view video stream having an interlaced-video attribute, by using a packet identifier in a stream entry that corresponds to a stream attribute in the obtained stream selection table, and the first value is a value recognized by a device that can perform only a stereoscopic playback of progressive video, and the second value is a value recognized by a device that can perform both the stereoscopic playback of progressive video and a stereoscopic playback of interlaced video.

The following describes the extension data which pertains to the recording medium of the above aspect. The extension data is provided to store private data in the index file, movie object, movie playlist, and clip information, and is assigned with either of two types of IDs: ID1; and ID2.

The ID1 is an identifier of extension data storing private data of a manufacturer who has registered the manufacturer private data. The value of ID1 is assigned by the licenser of the BDMVRecording Specification, and is encoded when it is stored. The ID1 can have an encoded value in a range from 0x0000 to 0x0FFF.

The ID2 is an identifier of extension data that is defined by a licensed manufacturer. More specifically, the extension data assigned with ID2 stores a model number code of a recording device for which the manufacturer private data is registered in advance. With the structure where the extension data stores a model number code, it is possible to identify the recording device that has recorded the data onto the recording medium, by referring to the extension data in the index file, movie object, or movie playlist.

According to the Blu-ray ReadOnly disc format, as one of the extension data stored in the movie playlist file (MPLS file), extension data assigned with ID1, which includes an encoded value "0x0002", is used to store STN_table_SS. However, the STN_table_SS permitting the playback of the MVC1080@60i/50i video stream should not be stored in the extension data having ID1 that includes an encoded value "0x0002". This is because the STN_table_SS permitting the playback of the MVC1080@60i/50i video stream is unknown information to the playback device that does not support the version 3.1, and if such STN_table_SS is referred to by the playback device, an error may occur.

As a result, an unused encoded value is introduced in the ID1 to describe STN_table_SS. Since an encoded value "4(=0x0004)" is an unused value, ID1 including an encoded value "0x0004" is registered with the extension data of the mpls file, and the STN_table_SS is stored therein. The ID1 including an encoded value "0x0004" is disregarded by existing Blu-ray ReadOnly disc players, and thus does not cause an error in the players.

Figure 13:
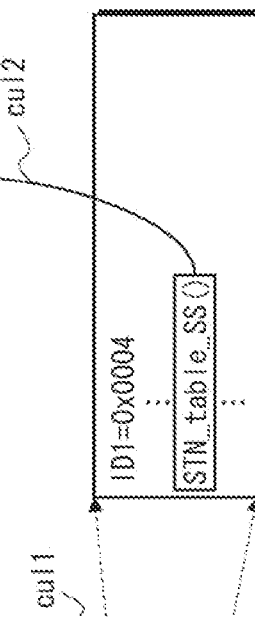
FIG. 13 illustrates the syntax for creating a playlist information file with an object-oriented programming language.

FIG. 13 illustrates the syntax for creating a playlist information file with an object-oriented programming language. The Playlist( ) in FIG. 13 defines the main path information and sub path information. In PlayListMark( ) the playlist mark information is described. In ExtensionData( ) the above-described extension data is described. The addresses of these are written in PlayList_start_address, PlayListMark_start_address, and ExtensionData_start_address.

The following describes the main path information, sub path information and playlist mark information.

The main path information is composed of one or more pieces of main playback section information. The main playback section information is called playitem information, and is information that defines one or more logical playback sections by defining one or more pairs of an "in_time" time point and an "out_time" time point on the TS playback time axis. The playback device is provided with a playitem number register storing the playitem number of the current playitem. The playitem being currently played back is one of the plurality of playitems whose playitem number is currently stored in the playitem number register. Also, the playitem information indicating a playback section includes "stream reference information". The stream reference information is "clip information file name information (clip_information_file_name)" that indicates a clip information file that constitutes a clip stream file together with a transport stream constituting a playitem.

The sub playback section information, called sub path information, is composed of a plurality of pieces of sub playitem information.

The playlist mark information is information that defines the mark point unique to the playback section. The playlist mark information includes an indicator indicating a playback section, a time stamp indicating the position of a mark point on the time axis of the digital stream, and attribute information indicating the attribute of the mark point. The attribute information indicates whether the mark point defined by the playlist mark information is a link point or an entry mark. The link point is a mark point that can be linked by the link command, but cannot be selected when the chapter skip operation is instructed by the user. The entry mark is a mark point that can be linked by the link command, and can be selected even if the chapter skip operation is instructed by the user.

This completes the description of the playlist information file. To distinguish an STN_table_SS including an entry permitting the MVC1080@60i/50i video stream from a conventional STN_table_SS, the value of ID1 that is assigned to the index file may be changed to a different value. The STN_table_SS including an entry of an MVC1080@60i/50i video stream is arranged in extension data with registration of ID1=0x0004.

A stereoscopic version of stream selection table is subjected to the process executed by the playback device as one of Extension_Data described in this syntax.

The lead line cu1 in FIG. 13 indicates a close-up of the internal structure of ExtensionData. As indicated by the close-up, ID1=0x0004 is assigned to the ExtensionData, and the ExtensionData contains an STN_table_SS. The lead line cu2 in FIG. 13 indicates a close-up of the internal structure of the STN_table_SS. As illustrated in this close-up, the STN_table_SS indicates values set for the video format and the frame rate in the case where an interlace 3D video is included in the stream_attribute_SS of the STN_table_SS. According to the example of FIG. 13, the video format is set to "4 (1080i)" and the frame_rate is set to "3 or 4 (25 Hz or 29.97 Hz)". The value "25 Hz or 29.97 Hz" is obtained by converting the value "50 Hz/59.94 Hz" (fields) of the MVC1080@50i/60i video stream into the number of frames per second.

When an STN_table_SS( ) including an entry permitting a playback of an MVC1080@60i/50i video stream is arranged in extension data with ID1 in which another encode value is set, no harmful effect is created on the playback because Blu-ray ReadOnly disc players treat the data as extension information that can be skipped in reading. Also, playback devices supporting the Blu-ray Rewritable version 3.1 that newly supports the interlace 3D can identify, from the extension data of ID1=0x0004 that is a new ID, an STN_table_SS that includes an entry of an MVC1080@60i/50i video stream, and thus can decode the interlace 3D.

The above description is specialized on the STN_table_SS. The following describes general rules for describing the playlist information and the clip information in the 3D video of interlace MVC1080@60i/50i.

Information elements in the clip information file that match the extension data assigned with ID1=0x0004 include program information SS, extent start point information, and characteristic point information SS.

The program information SS is program information extended for the stereoscopic playback. The program information is information indicating the program structures of the main TS and sub TSs managed by the clip information file, and indicates what types of elementary streams are multiplexed in the clip stream file. More specifically, the program information indicates what types of packet identifiers the elementary streams multiplexed in the clip stream file have, and indicates the video format and the frame rate thereof. The program information SS differs from the ordinary program information in that the combination of the video format and the frame rate is defined as follows.

That is to say, the program information SS additionally has: format code=4 indicating 1080i(SMPTE); format code=5 indicating 720P; and format code=6 indicating 1080P.

The frame rates are defined as follows. The following are additional frame rate codes: frame rate code=4 indicating 24000/1001 (=23.996)=3025 Hz; frame rate code=5 indicating 3000/1001 (29.97 Hz; frame rate code=6 indicating 50 Hz; and frame rate code=7 indicating 6000/1001 (59.94). As the combination of format and frame rate in the program information_SS, 1920×1080interlace (1080i) is defined. The "1080i" is defined in SMPTE274M-1998 1920×1080 Scanning and Analog and Digital interface for multiple picture layer.

The extent start point information is information for separating an ATC sequence including a base-view video stream and an ATC sequence including a dependent-view video stream from a plurality of Extents that are present in the stereoscopic interleaved stream file.

The characteristic point information SS is generated by extending the characteristic point information in the clip information file for the sake of the stereoscopic playback. Here, the general characteristic point information is explained. The characteristic point information as defined in the Blu-ray ReadOnly disc format is information indicating the location of a characteristic point in each of a plurality of elementary streams multiplexed in a clip stream file. The information indicating the characteristic point in each elementary stream is called an entry map (EP_map). What is the characteristic point varies depending on the type of the stream. In the case of the parent-screen video stream, the characteristic point is an access unit delimiter indicating the head of an I-picture-type view component located at the head of an Open-GOP or a Closed-GOP.

Also, the characteristic point is represented differently in the ATC sequence and the STC sequence. In the ATC sequence, the characteristic point is represented by a source packet number. In the STC sequence, the same characteristic point is represented by using a PTS that indicates a time point in the STC time axis. To associate these source packet numbers with the playback times, the entry map includes a plurality of entry points. More specifically, in each entry point constituting the entry map, a source packet number that indicates the location of the characteristic point in the ATC sequence is associated with a PTS that indicates the location of the characteristic point in the STC sequence. Each entry point further includes: a flag ("is_angle_change" flag) that indicates whether or not an independent playback from the characteristic point is available; and information (I_size) that indicates the size of the intra picture located at the head of GOP.

The entry map for each elementary stream indicates the source packet numbers of the characteristic points for respective stream types in correspondence with the PTSs. Accordingly, by referencing this entry map, it is possible to obtain, from an arbitrary time point in the ATC sequence, source packet numbers that indicate locations of the characteristic points for the elementary streams that are closest to the arbitrary time point. The above-described characteristic point information is for the two-dimensional playback, not including characteristic points of the dependent-view video stream.

To supplement this, the characteristic information SS for the stereoscopic playback is provided in the clip information file. The characteristic information SS includes an EP_map_SS that indicates correspondence between the SPNs and the PTSs in the time axis of the MVC1080@60i/50i dependent-view video stream. With use of the EP_map_SS, a random access to the dependent-view video stream becomes possible.

The above program information SS, extent start point information, and characteristic information SS are registered in the extension data of the clip information file, with ID1 in which an encode value "4" is set.

The following describes information arranged in the extension data of the playlist information.

The stream selection table SS (StreamNumber_table_StereoScopic (SS)) is a stream selection table that is used together with the basic stream selection table only in the 3D output mode. The stream selection table SS defines the elementary streams that can be selected when a playitem is played back or when a sub path related to the playitem is played back. When there are N pieces of playitems identified as playitems #1-#N, stream registration sequences respectively corresponding to the playitems #1-#N are provided in the stream selection table SS.

Each piece of stream registration information in the stream registration sequences includes a stream number, and a stream entry and a stream attribute corresponding to the stream number. Each stream entry includes a packet identifier (PID). The PIDs are used by the PID filter to demultiplex elementary streams that are to be used only in the 3D playback. The stream selection table SS means an expansion that is unique to the 3D output mode. Therefore, a playlist for which each piece of playitem information is associated with the stream selection table SS (STN_table_SS) is called "3D playlist".

The stream registration sequences provided in the stream selection_table_SS include: (1) a stream registration sequence composed of a stream entry and a stream attribute of the MVC1080@60i/50i video stream attached with the stream number; (2) stream registration sequences composed of stream entries and stream attributes of the left-eye and right-eye PG streams representing the stereoscopic presentation graphics, attached with the stream numbers, respectively; (3) stream registration sequences composed of stream entries and stream attributes of the left-eye and right-eye IG streams representing the stereoscopic interactive graphics, attached with the stream numbers, respectively; (4) a stream registration sequence composed of a stream entry and a stream attribute of the PG stream or the text subtitle stream, which is a subtitle stream permitted to be played back in the 1plane+Offset when the top arrangement layout is adopted for the subtitle to be arranged at the top of the screen; and (5) a stream registration sequence composed of a stream entry and a stream attribute of the PG stream or the text subtitle stream, which is a subtitle stream permitted to be played back in the 1plane+Offset when the bottom arrangement layout is adopted for the subtitle to be arranged at the bottom of the screen.

Note that the "1 plane+offset" is an output mode for realizing the stereoscopic viewing with one graphics by changing the coordinates of the pixels in the plane memory leftward and rightward in one frame period. The amount change in the 1plane+Offset mode is stored in the MVC scalable nesting SEI message in the video access unit that is present at the head of each GOP in the dependent-view video stream (see FIG. 3C), and a value unique to each frame in the GOP is set as the amount change.

The STN_table_SS also includes the following information elements other than the stream registration sequences: (1) a pop-up display fix offset that is to be applied to a 1plane+Offset playback of the base-view video stream when a pop-up menu is displayed using the IG stream; (2) a validity flag indicating whether or not a 1plane+Offset playback of each drawing area is valid when the text subtitle stream is displayed in the 1plane+Offset mode; (3) a presence/absence flag indicating whether or not a stereoscopic PG stream realizing a stereoscopic playback by the left-eye and right-eye graphics is present; (4) a top arrangement presence/absence flag indicating whether or not a top arrangement subtitle stream realizing the arrangement of the subtitle in the upper part of the screen is present; (5) a bottom arrangement presence/absence flag indicating whether or not a bottom arrangement subtitle stream realizing the arrangement of the subtitle in the lower part of the screen is present; and (6) a presence/absence flag indicating whether or not a stereoscopic IG stream realizing an interactive stereoscopic playback by the left-eye and right-eye graphics is present.

Each stream entry in the stream selection table SS indicates a packet identifier that is to be used in the demultiplexing by the playback device, when the playback device is in the stereoscopic output mode, and the corresponding stream number is set in the stream number register of the playback device. A difference from the stream selection table in the playitem information is that the stream registration sequences in the stream selection table SS are not targeted by the stream selection procedure. That is to say, the stream registration information in the stream registration sequences of the stream selection table is interpreted as the priorities of the elementary streams, and a stream number in any piece of stream registration information is written into the stream number register. On the other hand, a stream registration sequence in the stream selection table SS is not used in the stream selection procedure, but is used only for the purpose of extracting a stream entry and a stream attribute corresponding to a stream number when the stream number is stored in the stream number register.

The following explains the sub path entry extension. The sub path entry extension is an entry indicating the location of an elementary stream for the stereoscopic playback, and includes an entry ID of clip information of a clip stream file including the elementary stream, a sub path ID, and a stream PID. This completes the explanation of the sub path entry extension.

The following explains the in-plane validation information sequence.

The in-plane validation information is information defining which part, among a plurality of parts constituting the pixel area of the video plane, is to be validated to arrange a display frame for a video image when the corresponding piece of playlist information is selected as the current playlist, and is composed of "bottom_margin", "top_margin", "top_down_offset", and "bottom_up_offset".

The "top_margin" and "bottom_margin" define the vertical widths of the top area and bottom area of the screen when a normal layout is adopted, respectively.

The "bottom_up_offset" is an offset indicating to what degrees the top area of the screen is narrowed to shift the display frame of the video image upward and the bottom area is widened when the bottom arrangement layout is adopted, and is used in place of the top_margin when the bottom arrangement layout is adopted.

The "top_down_offset" is an offset indicating to what degrees the top area of the screen is widened to shift the display frame of the video image downward and the bottom area is narrowed when the top arrangement layout is adopted, and is used in place of the top_margin when the top arrangement layout is adopted.

This completes the explanation of information elements in the clip information file and playlist information file that match the extension data assigned with ID1=0x0004.

The extension data is accessed during playback of a playlist as follows.

A playback based on the playlist is explained. When a playback of a playlist is instructed by a movie object or bytecode application, the version of the playlist is checked.

Also, the version of clip information file, which is referred to by clip_information_file_name in playitem information in the playlist that is set to the current playitem, is checked.

When the current output mode is 3D output mode and the version of the playlist is version 2.4, STN_table_SS and sub path extension are extracted from the extension data assigned with ID1=0x0004. When the current output mode is not 3D output mode or the version of the playlist is not version 2.4, STN_table_SS and sub path extension are extracted from extension data assigned with ID1=0x0002. The STN_table_SS extracted from the extension data assigned with ID1=0x0004 includes a PID of MVC1080@60i/50i video stream in correspondence with the stream attribute of the MVC1080@60i/50i video stream, and the sub path extension extracted from the extension data assigned with ID1=0x0004 includes a packet identifier of the dependent-view video stream. Thus based on these, it is possible to cause the PID filter to demultiplex the base-view video stream and the dependent-view video stream. Furthermore, the STN_table_SS is used to realize a stereoscopic playback using the left-eye and right-eye PG streams and the left-eye and right-eye IG streams, or a 1plane+Offset playback using the PG stream, IG stream and text subtitle stream.

When the current output mode is 3D output mode and the version of the clip information is version 2.4, the program information SS, characteristic point information SS, and extent start point information are extracted from the extension data assigned with ID1=0x0004. When the current output mode is not the 3D output mode or the version of the clip information is not version 2.4, the program information SS, characteristic point information SS, and extent start point information are extracted from the extension data assigned with ID1=0x0002. The program information SS extracted from the extension data assigned with ID1=0x0004 includes stream attributes, such as the encoding method, video format, and frame rate, of the MVC1080@60i/50i video stream. These stream attributes are set in the video decoder.

Furthermore, the ATC sequences 1 and 2 are demultiplexed based on the extent start point information extracted from the extension data assigned with ID1=0x0004, and a random access is performed based on the characteristic point information.

Embodiment 5

The present embodiment pertains to an improvement in the index file indicating correspondence between operation mode object programs and titles.

The following describes the correspondence indicated by the index file. The index file defines the correspondence between a plurality of title numbers that can be stored in the title number register provided in the playback device and operation mode object programs. It should be noted here that the title numbers that can be stored in the title number register include "0", "1"-"999", and an undefined value "0xFFFF". A title number "0" is a title number of the top menu title.

The top menu is a menu of the highest rank in the hierarchy of menus in the recording medium, and is a menu at the core of the structure where a selected title transitions among a plurality of titles. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded.

The operation mode object program is a pair of program and object data that defines the operation mode of a title when it is set as the current title. The operation mode object program divides into two types: a type in which the object data for the operation mode and the program are stored in one file; and a type in which the object data and the program are stored in different files. The former type of operation mode object program is a movie object that is activated in a command-based operation mode. The movie object is composed of navigation commands. Also, the operation mode object program sets whether or not a resuming is available at a title call.

The latter type of operation mode object program is a pair of bytecode application and operation mode object data, the bytecode application being activated in a bytecode-interpreter-based operation mode. The operation mode object data includes an application management table for application signaling, and causes the playback device to perform a title boundary operation. In the java mode of the Blu-ray ReadOnly disc (BD-J mode), the above operation mode object is called a "BD-J object", and a bytecode application whose operation is defined by the BD-J object is called a "BD-J application".

The index file includes entries (title indexes) in one-to-one correspondence with title numbers. An operation mode program file and a title access type are described in each title index. With this structure, the index file defines in detail how each title operates in a corresponding operation mode. The restrictions pertaining to the Blu-ray REwritable disc version 3.1 are as follows.

A playlist group played back by the first play title or the top menu title should not include the AVC1080@60P/50P video stream. When the first play title or the top menu title is to play back a playlist that includes a stream selection table including an entry permitting the AVC1080@60P/50P video stream, an alternative playlist including a mandatory format must be prepared. The HDMV navigation command or the BD-J application must determine whether or not to play back a playlist by checking the AVC1080@60P/50P video stream capability (and the 50&25 Hz capability if necessary). The titles other than the first play title or the top menu title must be authored as follows. When a playlist played back from a title includes the AVC1080@60P/50P video stream, the playback is instructed by a navigation command or a BD-J application.

When the stream selection table of the playlist includes an entry that permits playback of an AVC1080@60P/50P video stream without checking the AVC1080@60P/50P video stream capability in PSR29, which is described below, the title access type in the index file must be set to "title search not available". The version number of the playlist is set to version 2.4 (version_number=0x0240), version 2.0 (version_number=0x0200), or version 1.0 (version_number=0x0100). When the playlist information file includes a primary video stream entry that satisfies the following conditions, it is set to version 2.4.

Stream encoding type is MPEG4-AVC (0x1B).
Video format=6, frame rate is 6 or 7.

The number of entries of the secondary video stream must be set to 0 when the AVC1080@60P/50P video stream is present.

When the title access type in the index file is set to "title search available", the title search is allowed for a title that is not to play back a playlist that includes a stream selection table including an entry permitting the AVC1080@60P/50P video stream.

As described above, according to the present embodiment, operation mode object programs associated with the first play title and the top menu title, which are at the core of the playback control among a plurality of titles, exclude, from the target of playback, a playback path that is composed progressive pictures and has an optional frame rate. With this structure, even if the above recording medium is loaded in a playback device that does not support a progressive playback at a high frame rate exceeding the mandatory frame rate, or a menu is called by the user, a video stream composed of progressive pictures and having a high frame rate is not supplied to the video decoder of an existing-type playback device. This prevents the screen from blacking out upon loading of a recording medium, or blacking out upon input of a menu call.

Embodiment 6

The present embodiment enables the playback devices described in the above embodiments to be used as Profile5 BD-R/BD-RE players. The Profile5 BD-R/BD-RE player can play back: (i) a BDMV database including a 3D video content of MVC1080@24p/50i/60i on which an editing operation such as partial deletion, division, or integration has been performed; (ii) the MVC1080@60i/50i video stream; and (iii) the AVC1080@60P/50P video stream. The Profile5 BD-R/BD-RE player is more improved than the BD-3D player in that it can play back these.

On the other hand, the BDMVRecording Specification defines that a main performer of the content playback control is the operation mode object program recorded on the recording medium.

When the BD-RE version 3.1 is loaded in such a Profile5 BD-R/BD-RE player, the operation mode object program activated in the Profile5 BD-R/BD-RE player cannot determine which of a BD-3D player and a Profile5 player the player to be the operation platform is. If a stream is played back while the above information are unclear, an inappropriate image may be output.

It is therefore an object of the present embodiment to prevent the operation mode object program from instructing to play back while the playback device as the operation platform is unknown.

The following describes an improvement for solving the problem. The improvement is provided in the player status register and the player setting register. A description is given of the player status register. The player status register is reset to initial values when an optical disc is loaded, and the validity of the stored values is checked when the status of the playback device changes, such as when the current playitem is changed. The values that can be stored in the player status register include a current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and the 60P capability of a partner device which is detected through negotiation with the partner device, which is for example a TV system, stereo, amplifier or the like, when the device is connected with the partner device.

Each of the player status registers and player setting registers has a word length of 32 bits, each 32-bit register is assigned with a register number, and a register to be accessed is identified by the register number. The value of an arbitrary bit range [bx:by] in a 32-bit sequence stored in the player setting register/player status register of a certain register number is treated as an environment variable ("system parameter") that is a variable of an operation system in which the program runs.

A player profile register is the 31$^{st}$ register (PSR31) in the player setting register provided in the Profile5 player.

FIG. 14 illustrates a bit assignment in PSR31. As illustrated in FIG. 14, among the 32 bits of PSR31, a bit sequence from b16 to b19 indicates a player profile. A bit sequence from b0 to b15 indicates the version of the player profile. A profile indicator is present in b20 of PSR31.

The following describes a Profile5 indicator (b20) provided in PSR31 indicating player profile and player version. The Profile5 indicator indicates whether or not the player is Profile5. When the Profile5 indicator is set to "1", the player profile is set to "0011" (Profile2). When the player version is set to "0x0240", the BD-RE/BD-R player is a player which complies with Blu-ray ReadOnlyFormat Part3 Audio Visual Basic Specifications Version 2.4 or 2.5.

That is to say, when Player Profile=0011b, and Profile5 indicator="1", the playback device complies with and supports BD-RE Profile 5. Any playback device supporting BD-RE Profile 5 can play back/edit the MVC1080@24p/50i/60i3D video stream. When the playback device supports the interlace 3D (Stereoscopic 1920×1080 interlace video Capability@PSR24) or Progressive video (Progressive Video Capability@PSR29), the player version represented by the bit sequence from b0 to b17 is set to "0x0240" (BD-ROM Ver2.4 or later). When activated, the bytecode application or the movie object program can confirm whether or not the playback device, which is the basis of the operation, is a Profile5 player. Even when the player profile is set to "0011" indicating an existing profile, it is possible to judge whether or not the operation platform is a Profile5 player by referring to the player indicator. This makes it possible to cause a player, in which a proper capability is present, to execute a playback function that is not provided in the above-mentioned BD-3D player.

To secure the compatibility of decoding the progressive video with the progressive non-supporting devices, the version number of a playlist that permits playback of progressive video, namely the AVC1080@60P/50P video stream, is set to "2.4" for distinction. Therefore, a logic for making a judgment by referring to the version number may be provided in the procedure for searching the playlist for an entry paired with a stream attribute of the AVC1080@60P/50P video stream (step C0009 in FIG. 9). A playlist having a value "version_number=0x0240" (version 2.4) includes an entry paired with a stream attribute of the AVC1080@60P/50P video stream. Accordingly, the playback device can judge whether or not a stream entry paired with a stream attribute of the AVC1080@60P/50P video stream is present by checking whether or not the version_number is set to 0x0240 before checking the entries in the STN_table.

It should be noted here that the particular value of "version_number" does not uniquely identify the presence of the progressive video. That is to say, a progressive video may be present in a playlist whose version_number is set to other than "0x0240". More specifically, even when version_number is set to other than "0x0240", a progressive video content is present and the condition (A) returns TRUE if the STN_table contains a combination of "stream_coding_type=0x1B", "video_format=6", and "frame_rate=6 or 7".

This completes the description of the PSR31. The following describes PSR29 in detail.

FIG. 15 illustrates a bit assignment in PSR29. The bit "b0" in PSR29 represents "HD_Secondary_video_Capability". More specifically, when bit "b0" is set to "1", it indicates that the playback device has the capability to play back HDTV-compatible child-screen video (secondary video) in the picture-in-picture playback (1b: HD Secondary Video is capable), and when bit "b0" is set to "0", it indicates that the playback device does not have the capability to play back HDTV-compatible secondary video (0b: HD Secondary Video is incapable). Note that here the HDTV means a video having a resolution of 1920×1080 or 1280×720, and the above bit indicates whether or not the playback device has a capability to decode and output this video.

The bit "b1" in PSR29 represents "50&25 Hz_video_Capability". More specifically, when bit "b1" is set to "1", it indicates that the playback device has the capability to play back a 50&25 Hz video, namely, a video stream of PAL method to display 50 frames or 25 frames per second (1b: 50&25 Hz Video is capable), and when bit "b0" is set to "0", it indicates that the playback device does not have the capability to play back the 50&25 Hz video (0b: 50&25 Hz Video is incapable).

The following describes a bit "b4" newly provided in PSR29 "Player Status Register for Player Capability for Video" in the BDMV Recording Specification. The bit "b4" represents "Progressive Video Capability" and indicates whether or not the playback device supports progressive video. When bit "b4" is set to "1", it indicates that the playback device has the capability to play back the progressive video (1b: Progressive Video capable). The Player Version is set to "0x0240".

FIG. 16 illustrates a bit assignment in PSR23. The values set in PSR23 represent the properties of the display device connected with the playback device. Navigation commands or bytecode applications cannot rewrite the values of PSR23. The values of PSR23 are provided by the display device via an interface and automatically set before a playback is started. When these values cannot be obtained automatically, the values are set by the user.

The bit "b0" in PSR23 represents "Stereoscopic Display Capability" of the display device. More specifically, when bit "b0" is set to "0", it indicates that the display device connected with the playback device does not have the capability to display 1920×1080/23.976 Hz progressive video or 1920×1080/59.94 Hz progressive video.

When bit "b0" is set to "1", it indicates that the display device connected with the playback device has the capability to display 1920×1080/23.976 Hz progressive video or 1920×1080/59.94 Hz progressive video.

The bit "b1" in PSR23 represents "Stereoscopic 1280×720 50p video Display Capability" of the display device. More specifically, when bit "b1" is set to "0", it indicates that the display device connected with the playback device does not have the capability to display 1280×720/50 Hz progressive video. When bit "b1" is set to "1", it indicates that the display device connected with the playback device has the capability to display 1280×720/50 Hz progressive video.

The bit "b2" in PSR23 is a glasses-free 3D availability flag indicating whether 3D glasses are required for stereoscopic viewing. When set to "0", the glasses-free 3D availability flag ("No 3D glasses required for stereoscopic display") indicates that viewers need to wear 3D glasses to view the 3D output mode of a TV system connected with the playback device; and when set to "1", the glasses-free 3D availability flag indicates that viewers do not need to wear 3D glasses to view the 3D output mode of the TV system.

A bit sequence from bit "b8" to bit "b19" represents the horizontal size of the screen ("Horizontal display size"), and indicates the horizontal size of the display device connected with the playback device in cm unit. When set to "0x000", it indicates "undefined", and when set to a value in a range from "0x001" to "0xFFE", it indicates the horizontal size of the display device connected with the playback device in cm unit. When set to "0xFFE", it indicates that the horizontal size of the display device is 4094 cm. When set to "0xFFF", it indicates that the horizontal size of the display device is larger than 4094 cm.

The bit "b3" in PSR23 represents "Stereoscopic 1920×1080 interlace video Display Capability". When set to "1", the bit "b3" in PSR23 indicates that the digital TV display device connected with the playback device is capable of displaying the interlace 3D video.

FIG. 17 illustrates a bit assignment in PSR24. The values set in PSR24 represent the 3D capability of the playback device. Any program recorded on the recording medium cannot rewrite the values of PSR24. The bit "b0" in PSR24 represents "Stereoscopic 1280×720 50p Video Display Capability". More specifically, when bit "b0" is set to "0", it indicates that the playback device does not have the capability to process for display of 1280×720/50 Hz progressive video. When bit "b0" is set to "1", it indicates that the playback device has the capability to process for display of 1280×720/50 Hz progressive video.

The bit "b1" in PSR24 indicates whether or not the stereoscopic 1280×720 entropy encoding mode has the CABAC decoding capability. The entropy encoding mode divides into CAVLC (Context-based Adaptive VLC) and CABAC.

In CAVLC, the encoding table used to encode the current macro block is switched depending on the state of the DCT coefficient of the adjacent macro block.

The CABAC (Context-based Adaptive Binary Arithmetic Coding) differs from CAVLC in that (i) the probability distribution is varied for each macro block, (ii) the intersymbol correlation is taken into account by using the context, and (iii) non-integer codeword is used by adopting the arithmetic encoding. In H.264, these encoding methods are used. This is because CAVLC and CABAC are used for different purposes since CAVLC requires a small amount of processing and provides a modest effect, while CABAC requires a large amount of processing and provides a high effect. The bit "b1" in PSR24 represents "Stereoscopic 1280×720 CABAC Decoding Capability", and when set to "0", it indicates that the playback device does not have the capability to decode the CABAC stereoscopic video. When set to "1", the bit "b1" indicates that the playback device has the capability to decode the CABAC stereoscopic video.

The bit "b2" in PSR24 represents "Stereoscopic PG Capability". When the bit "b2" is set to "0", it indicates that the playback device does not have the capability to play back the stereoscopic PG. When the bit "b2" is set to "1", it indicates that the playback device has the capability to play back the stereoscopic PG.

The bit "b3" in PSR24 represents "Stereoscopic IG Capability". When the bit "b3" is set to "0", it indicates that the playback device does not have the capability to play back the stereoscopic IG. When the bit "b3" is set to "1", it indicates that the playback device has the capability to play back the stereoscopic IG.

The bit "b4" in PSR24 indicates presence/absence of the capability to display the text subtitle display area by the plane shift. When the bit "b4" is set to "0", it indicates that the playback device does not have the capability to display the text subtitle display area by the plane shift. When the bit "b4" is set to "1", it indicates that the playback device has the capability to display the text subtitle display area by the plane shift.

The bit "b5" in PSR24 indicates presence/absence of the capability to process the BD-J mode in the 3D output mode. When the bit "b5" is set to "1", it indicates that the playback device has the capability to process the BD-J mode in the 3D output mode. When the bit "b5" is set to "0", it indicates that the playback device does not have the capability to process the BD-J mode in the 3D output mode.

The bit "b6" in PSR24 indicates whether or not the secondary audio in the sound mixing can be played back.

The bit "b7" in PSR24 indicates presence/absence of the capability to process the limited BD-J mode in the 3D output mode. When the bit "b7" is set to "1", it indicates that the playback device has the capability to process the limited BD-J mode in the 3D output mode. When the bit "b7" is set to "0", it indicates that the playback device does not have the capability to process the limited BD-J mode in the 3D output mode.

The bit "b8" in PSR24 indicates presence/absence of "Stereoscopic 1920×1080 Interlace Video Capability", and the bit "b9" in PSR24 indicates presence/absence of "Stereoscopic 1920×1080 Interlace Video Output Conversion Capability". These bits have been newly provided in PSR24 "3D Capability" in the BDMV Recording Specification. The following describes the bits b8 and b9 in more detail.

The bit "b8" representing "Stereoscopic 1920×1080 Interlace Video Capability" indicates whether or not the playback device can decode the interlace 3D video.

When set to "1", the bit "b8" indicates that the playback device can decode the 1920×1080 interlace 3D video, and when set to "0", the bit "b8" indicates that the playback device cannot decode the 1920×1080 interlace 3D video. When the playback device is a player not supporting Profile5, it does not support the 3D playback as well, and thus the capability to decode the 1920×1080 interlace 3D video is not implemented in the playback device either. Accordingly, when the Profile 5 indicator in PSR31, which indicates whether or not Profile5 is supported, is set to "0", the bit "b8" representing "Stereoscopic 1920×1080 Interlace Video Capability" is not set to "1".

The bit "b9" representing "Stereoscopic 1920×1080 Interlace Video Output Conversion Capability" indicates whether or not the playback device has the 3D output conversion function to convert the interlace 3D video into an HDMI v1.4a compatible 3D video (for example, 3D video of the side-by-side method). According to the current Blu-ray Rewritable version 3.1 standard, even when the playback device has a function to decode the interlace 3D video, a 3D TV with which the playback device is connected may not support the interlace 3D video. Thus having the function to convert the decoded interlace 3D video so that the video can be displayed on a 3D TV compatible with the HDMI v1.4a is mandatory, and in that case, the bit "b9" must be set to "1". Note that the standard may be revised in future, and the rule that the conversion function is mandatory may be relaxed. On the other hand, it is obvious that a playback device that cannot decode the interlace 3D video cannot convert the interlace 3D video into an HDMI v1.4a compatible 3D video, and in that case, the bit "b9" is set to "0". A player that can decode the interlace 3D video is obliged to have the 3D output conversion function. Therefore, allowable combinations of values in [b8,b9] are [0 (incapable), 0 (incapable)] and [1 (capable), 1 (capable)]. Combinations of values [1 (capable), 0 (incapable)] and [0 (incapable), 1 (capable)] are not allowed in [b8,b9].

The following explains the navigation model of the MVC1080@24p/50i/60i 3D video. Ability to play back the 3D interlace video stream is treated as optional in the BD-R/BD-RE player. The navigation commands or bytecode applications check the video capability indicated in PSR24, and define the output modes in PSR22. When the 3D interlace capability is set to "0", the output mode is defined as the 2D output mode before a playlist starts to be played back.

FIG. 18A illustrates a bit assignment in PSR22. The bit "b0" in PSR22 represents the current output mode. When the output mode changes, the video output in the playback device must change accordingly. The value of the output mode must be controlled by the selection model.

The status transition in PSR22 is realized by a predetermined procedure called "mode selection procedure". The mode selection procedure includes: "Initialization" as a procedure upon loading of an optical disc; and "Procedure when playback condition is changed" as a procedure when the status of the player is changed.

FIG. 18C illustrates the processing procedure of the Initialization. In step S501, it is judged whether or not a disc unbound BD-J application is running. In step S502, it is judged whether or not the Stereoscopic Display Capability in PSR23 indicates "Capable", and the Initial_output mode information in the index file (index.bdmv) indicates "3D output mode".

When it is judged Yes in step S501, the control proceeds to step S503 in which the current output mode is maintained. When it is judged No in step S501 and Yes in step S502, the control proceeds to step S504 in which the output mode in PSR22 is set to the 3D output mode. When it is judged No in step S501 and No in step S502, the control proceeds to step S505 in which the output mode in PSR22 is set to the 2D output mode.

According to the above-described Initialization procedure, when the initial_output_mode information in the Index.bdmv is set ON, the playback device is set to the 3D output mode immediately after a disc is loaded in the playback device, on the condition that the playback device has the capability to play back the stereoscopic presentation mode. With this structure, when the initial_output_mode information is set ON, the viewer can immediately be soaked in the virtual reality by the stereoscopic playback by wearing the 3D glasses immediately after inserting the recording medium into the playback device.

FIG. 18B illustrates the processing procedure of the Procedure when playback condition is changed. In step S511, it is judged whether or not the output mode in PSR22 is set to the 2D output mode. In step S513, it is judged whether or not the interlace 3D video capability in PSR24 is set to "Capable" and STN_table_SS is present in the playlist.

When it is judged Yes in step S511, the control proceeds to step S512 in which the current output mode is maintained. When it is judged No in step S511 and Yes in step S513, the current output mode is maintained (step S512). When it is judged No in step S511 and No in step S513, the current output mode is set to the 2D output mode (step S514).

As described above, according to the present embodiment, the above bit structure allows the bits of the bit length to indicate a plurality of different types, and when information indicating the capabilities pertaining to the AVC1080@60P/50P video stream and MVC1080@60i/50i video stream are set in the player setting register, the number of identifiers and the number of types can be determined appropriately based on the register size. This accelerates use in home electric appliances and mobile devices.

Embodiment 7

The present embodiment relates to an improvement in setting whether or not a recording medium is editable when the recording medium is loaded in a device. The specific procedure of the improvement depends on how stream files are recorded on the recording medium to a large extent. Before the present embodiment is described in detail, a description is given of the basic structure of the recording medium and how stream files are recorded on the recording medium on the premise of the basic structure.

First, a detailed description is given of the recording medium whose editability is to be set. In the following description, a multi-layered optical disc is used as the recording medium whose editability is to be set. The reason why the multi-layered optical disc is taken as one example of the removable medium is that it has the strictest physical restriction for writing and reading, and when writing to the multi-layered optical disc has no problem, the writing is applicable to the other mediums. The structural elements as the means for solving the problem are on the premise of the internal structure of an existing recording medium. To enhance the understanding, the following describes existing data elements that are the premise of the structural elements indispensable for solving the problem.

FIG. 19 illustrates the internal structure of a multi-layered optical disc.

In this figure, the first row illustrates one example of a multi-layered optical disc, and the second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the BD-ROM, basically, sectors with consecutive logical addresses are also consecutive in the physical disposition on the optical disc. That is to say, data stored in the sectors with consecutive logical addresses can be read without performing a seek operation. However, at the boundaries between recording layers, consecutive data reading is not possible even if the logical addresses are consecutive. It is thus presumed that the logical addresses of the boundaries between recording layers are registered in the recording device in advance.

In the volume area, file system management information is recorded immediately after the lead-in area. Following this, a partition area managed by the file system management information exists. The file system is UDF (Universal Disc Format), ISO9660 or the like. In the present embodiment, a file system of the Extension2.3 format is adopted. With use of this file system, data stored in the logical address space can be read based on the directory/file structure. The location of a file in the file system is identified by file path information (called "file path") which is composed of a directory name and a file name that are each composed of not more than 255 characters. Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using the directory/file structure.

The fourth row shows assignment of the areas contained in the file system area which is managed by the file system. The file system area is mainly assigned as a media movie database area. A non-stream recording area is present in the innermost circumference side of the media movie database area. The non-stream recording area is followed by a stream recording area. The fifth row shows the contents recorded in the non-stream recording area and the stream recording area. Extents constituting an AV stream file are recorded in the stream recording area. Extents constituting a non-AV stream file are recorded in the non-stream recording area.

Figure 20:
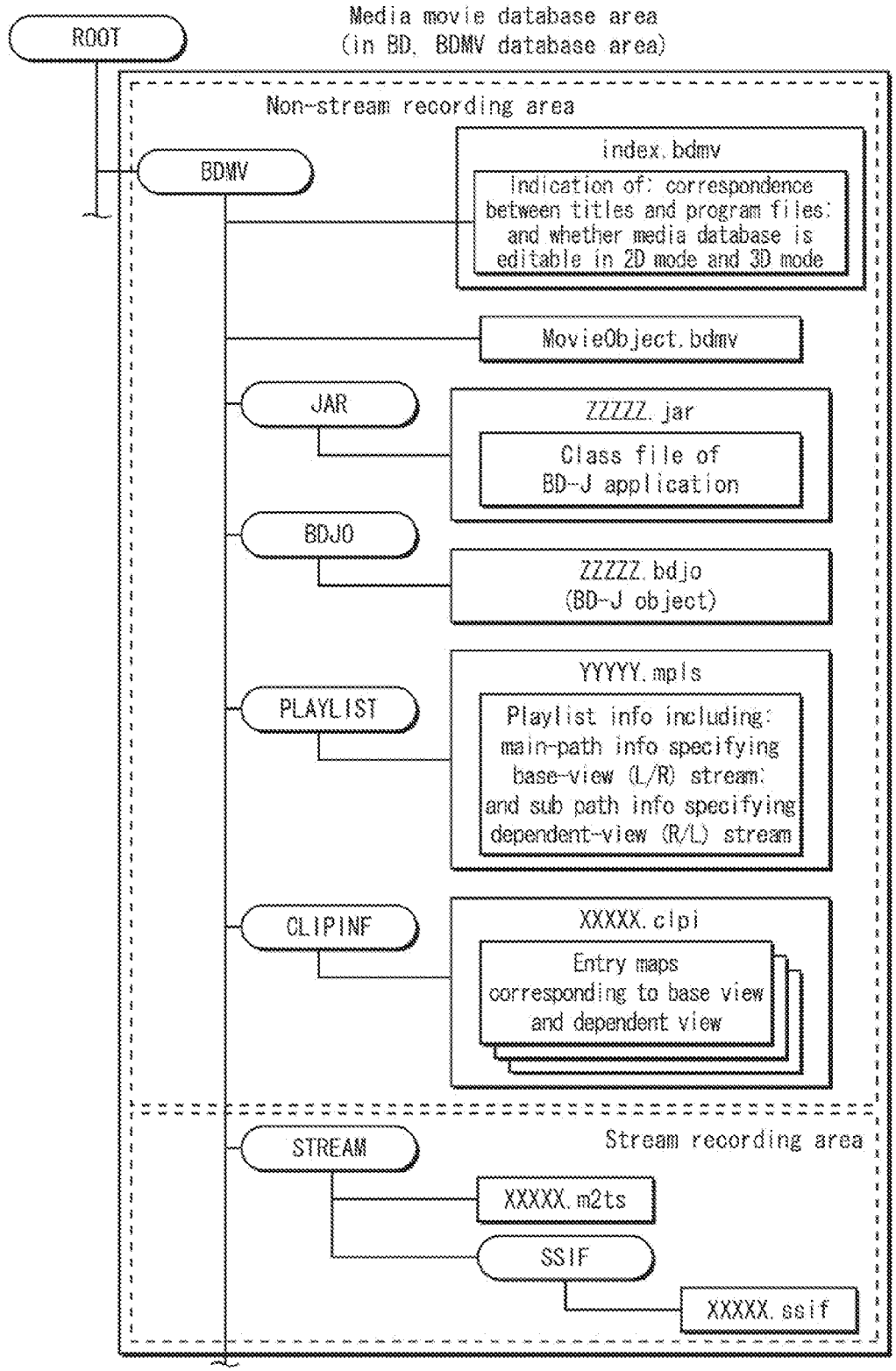
FIG. 20 illustrates the directory hierarchical structure of the media movie database area.

The following describes the internal structure of the media movie database area. FIG. 20 illustrates the directory hierarchical structure of the media movie database area.

In the directory hierarchical structure of the media movie database area, a BDMV directory is provided under a ROOT directory, and structural elements of the media movie database are stored in the BDMV directory. Five sub directories called "JAR directory," "BDJO directory," "PLAYLIST directory," "CLIPINF directory," and "STREAM directory" are present under the BDMV directory. Also, two types of files (i.e. index.bdmv and MovieObject.bdmv) are arranged under the BDMV directory.

The file "index.bdmv" (the file name "index.bdmv" is fixed) is an index file.

The file "MovieObject.bdmv" (the file name "MovieObject.bdmv" is fixed) stores one or more movie objects. The movie object is a program file that defines a control procedure to be performed by the playback device in the operation mode (HDMV mode) in which a command interpreter is a controller. The movie object includes one or more commands and mask flags that each define whether or not to mask a menu call or a title call when the call is performed by the user onto the GUI.

The BDJO directory stores a program file with extension "bdjo" (xxxxx.bdjo ["xxxxx" is variable, the extension "bdjo" is fixed]). This program file stores a BD-J object that defines a control procedure to be performed by the playback device in the BD-J mode.

A substance of such a Java™ application is a Java™ archive file (YYYYY.jar) stored in the JAR directory under the BDMV directory. An application may be, for example, a Java™ application that is composed of one or more xlet programs having been loaded into a heap area (also called work memory) of a virtual machine. The application is constituted from the xlet programs having been loaded into the work memory, and data.

The "PLAYLIST directory" stores a playlist information file with extension "mpls" ("xxxxx.mpls" ["XXXXX" is variable, and the extension "mpls" is fixed]).

The "CLIPINF directory" stores a clip information file with extension "clpi" ("xxxxx.clpi" ["xxxxx" is variable, and the extension "clpi" is fixed]).

The Extents constituting the files existing in the above directories are recorded in the non-AV data area.

The "STREAM directory" is a directory storing a stream file, and stores a stream file ("xxxxx.m2ts" ["XXXXX" is variable, and the extension "m2ts" is fixed]). An "SSIF directory", as a directory for storing stereoscopic interleaved stream files, is present under the STREAM directory.

As described above, the media movie database area includes a "ROOT directory area", a "BDMV directory area", a "JAR directory area", a "BDJO directory area", a "PLAYLIST directory area", a "CLIPINF directory area", a "STREAM directory area", and a "SSIF directory area". The above-described directory areas have a common internal structure. The common internal structure is that the "directory area" includes a "directory file" and a "lower file recording area".

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory. In the above example, directory names such as JAR, BDJO, and PLAYLIST are described in the "file identification descriptor of lower directory" of the BDMV directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file. File names such as Index.bdmv and MoveObject.bdmv are described in the "file identification descriptor of lower directory" of the BDMV directory.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory. Furthermore, it is possible to reach the file entries of the SSIF directory.

The "file recording area of lower file" is an area in which the substance of the lower file that belongs to a directory. A "file entry" of the lower entry and one or more "Extents" are recorded in the "file recording area of lower file".

The stream file that constitutes the main feature of the present application is a file recording area that is present in the directory area of the directory to which the file belongs. It is possible to access the stream file by tracing the file identification descriptors of the directory files, and the allocation identifiers of the file entries.

In the following description, a transport stream file (called "1 TS-2VSm2ts file") is adopted as a target of editing operations such as partial deletion, division, and integration, wherein the 1TS-2VSm2ts file is obtained by multiplexing two video streams: an MVC1080@24p/50i/60i base-view video stream; and an MVC1080@24p/50i/60i dependent-view video stream.

Here, a base-view component and a dependent-view component constituting a combination of left-eye image and right-eye image are generated by performing the following processes in order: (1) generating elementary streams; (2) generating transport streams; and (3) converting the TS (transport stream) packets constituting the transport streams into source packets. FIG. 21 illustrates the process of obtaining one transport stream from the MVC1080@24p/50i/60i base-view video stream and the MVC1080@24p/50i/60i dependent-view video stream. In FIG. 21, the first row illustrates a frame sequence constituting the MVC1080@24p/50i/60i base-view video; the second row illustrates a PES packet sequence obtained by converting the MVC1080@24p/50i/60i base-view video into PES packets; and the third row illustrates a source packet sequence obtained by converting the MVC1080@24p/50i/60i base-view video into source packets.

In FIG. 21, the seventh row illustrates a frame sequence constituting the MVC1080@24p/50i/60i dependent-view video; the sixth row illustrates a PES packet sequence obtained by converting the MVC1080@24p/50i/60i dependent-view video into PES packets; and the fifth row illustrates a source packet sequence obtained by converting the MVC1080@24p/50i/60i dependent-view video into source packets. The fourth row illustrates a transport stream that is formed by arranging, in the order of arrival time stamps, the source packets constituting the MVC1080@24p/50i/60i base-view video and the source packets constituting the MVC1080@24p/50i/60i dependent-view video.

As illustrated in the fourth row of FIG. 21, in the process of multiplexing the MVC1080@24p/50i/60i base-view video stream and the MVC1080@24p/50i/60i dependent-view video stream, first the first packet (B11) of the first GOP (Closed-GOP1) of the MVC1080@24p/50i/60i base-view video stream is arranged. The packets (D11, D12, D13) of the first GOP (Open-GOP1) of the MVC1080@24p/50i/60i dependent-view video stream corresponding to the Closed-GOP1 are arranged between the first packet (B11) and the last packet (B16) of the Closed-GOP1. Following the last packet (B16) of the Closed-GOP1, the first packet (B21) of the second GOP (Closed-GOP2) of the MVC1080@24p/50i/60i base-view video stream is arranged, and similar to the above, the packets (D21, D22, D23) of the second GOP (Open-GOP2) of the MVC1080@24p/50i/60i dependent-view video stream corresponding to the Closed-GOP2 are arranged before the last packet (B26) of the Closed-GOP2. By multiplexing the MVC1080@24p/50i/60i base-view video stream and the MVC1080@24p/50i/60i dependent-view video stream in this way, 1TS is generated, wherein the 1TS ensures that the GOPs of the MVC1080@24p/50i/60i dependent-view video stream is not divided when a division is made at a boundary between GOPs of the MVC1080@24p/50i/60i base-view video stream.

The Closed-GOPs of the MVC1080@24p/50i/60i base-view video stream and the Open-GOPs of the MVC1080@24p/50i/60i are multiplexed in the state where the GOPs are divided into a plurality of packets. Also, in the digital stream, the first packet among the plurality of packets obtained by dividing the Closed-GOPs of the MVC1080@24p/50i/60i base-view video stream is recorded at a recording position that precedes a recording position of the first packet among the plurality of packets obtained by dividing the Open-GOPs of the MVC1080@24p/50i/60i dependent-view video stream. When the last view component of a Closed-GOP or an Open-GOP in the encoding order is stored into a source packet, a residual space may be generated in the source packet. In that case, the residual space of the source packet is filled with padding. The padding is filled so that the last portion of the last video access unit of a GOP and the access unit delimiter of the first video access unit of the next Closed-GOP are not stored in the same source packet. With this structure, among the NAL units constituting the video access unit, a NAL unit storing the access unit delimiter of the first view component of the Closed-GOP is bounded at a boundary between source packets without fail. This facilitates the deletion of a set of Closed-GOPs and Open-GOPs all at once.

Figure 22A:
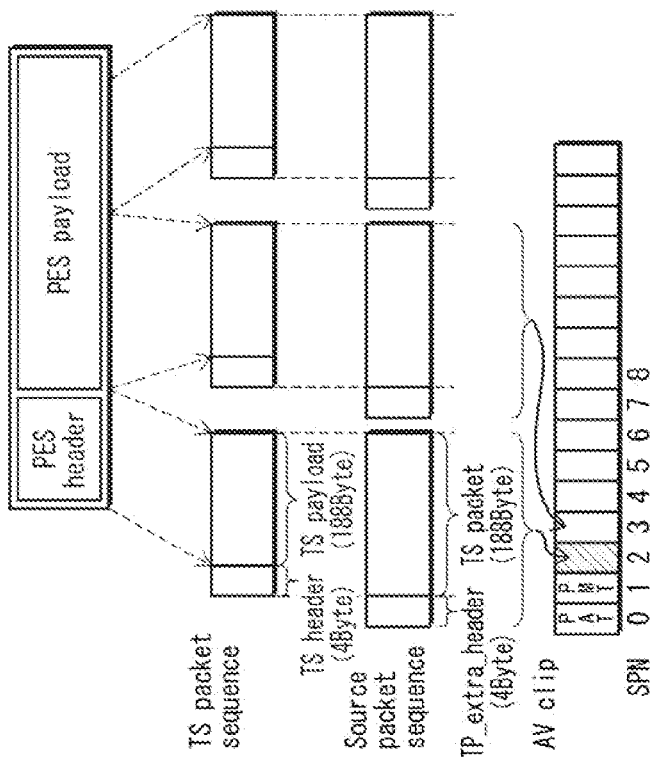
FIGS. 22A-22C illustrate one example of PES packets, TS packets, source packets, and PMT.

FIG. 22A illustrates in detail how the video stream is stored in the PES packet sequence. The first row of FIG. 22A indicates a video frame sequence of the video stream. The second row of FIG. 22A indicates a PES packet sequence. As indicated by arrows yy1, yy2, yy3 and yy4 in FIG. 22A, the view components that are a plurality of video presentation units in the video stream, including Intra-type view components, B (Bi-prediective)-type view components, and P (Predictive)-type view components constituting the MVC1080@24p/60i/50i video stream, are separated from each other and stored in the payloads of the PES packets. Each PES packet has a PES header in which a PTS (Presentation Time-Stamp), which indicates the presentation time of the picture, and a DTS (Decoding Time-Stamp), which indicates the decoding time of the picture, are stored.

In the case of the AVC1080@60P/50P video stream, pictures are stored in place of the view components in the case of the MVC1080@24p/60i/50i video stream, as described above.

Figure 22B:
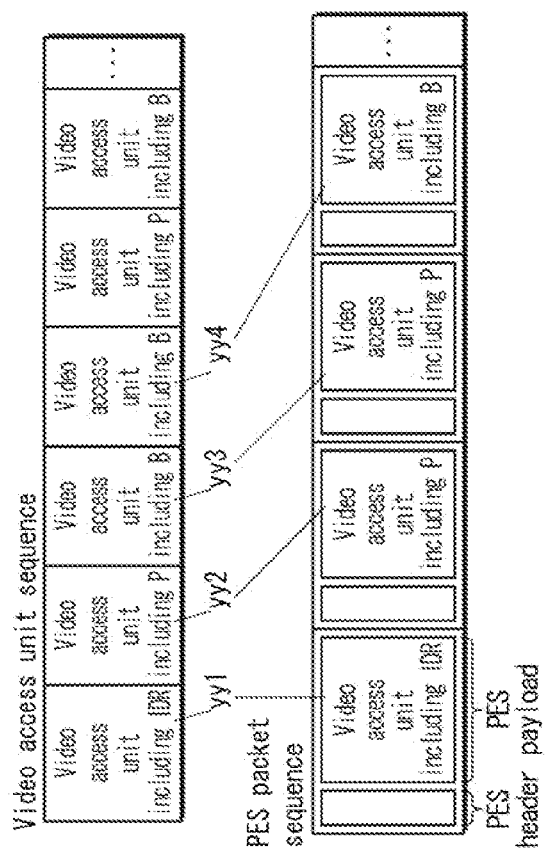

FIG. 22B illustrates the format of the TS packets that are ultimately written in the stream file storing the digital stream. Each TS packet is a fixed-length, 188-byte packet composed of a 4-byte TS header carrying information such as a PID identifying the stream, and a 184-byte TS payload storing data. The PES packets are stored in the divided form in the TS payloads. In the case of the Blu-ray ReadOnly disc, each TS packet is attached a 4-byte TP_Extra_Header, thus constituting a 192-byte source packet. The source packets are written in the stream file. The TP_Extra_Header stores information such as an ATS (Arrival_Time_Stamp). The ATS shows a transfer start time at which the TS packet is to be transferred to a PID filter of a system target decoder, which will be described later. The source packets are arranged in the stream file as illustrated in the lower row of FIG. 22B, where the numbers incrementing by one starting with the head of the stream file are called SPNs (Source Packet Numbers).

In addition to TS packets of audio, video, subtitles and the like, the stream file also includes TS packets of a PAT (Program Association Table), a PMT (Program Map Table) and a PCR (Program Clock Reference). The PAT shows a PID of a PMT used in the stream file storing the digital stream, and is registered with the PID arrangement of the PAT itself. The PMT stores the PIDs in the streams of video, audio, subtitles and the like, and attribute information corresponding to the PIDs. The PMT also has various descriptors relating to the stream file storing the digital stream. The descriptors include copy control information indicating whether or not copying of the stream file storing the digital stream is permitted. The PCR stores STC time information corresponding to an ATS showing when the PCR packet is transferred to a decoder, in order to achieve synchronization between an ATC (Arrival Time Clock) that is a time axis of ATSs, and an STC (System Time Clock) that is a time axis of PTSs and DTSs. A PAT packet and a PMT packet are stored at the head of a transport stream of the stream file storing the digital stream.

Figure 22C:
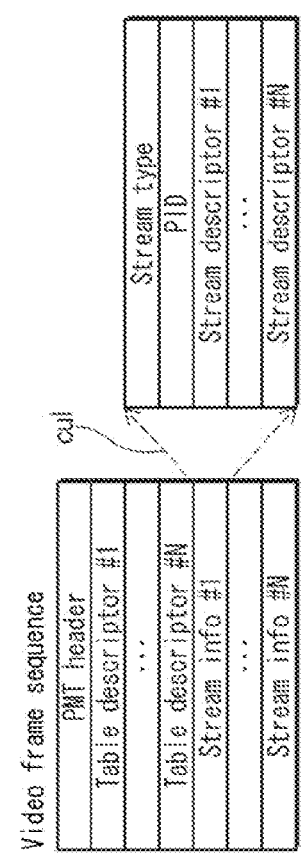

FIG. 22C illustrates the data structure of the PMT in detail. The lead line cu1 indicates a close-up of the internal structure of the stream information. The encoding method, resolution, frame rate and the like of the MVC1080@24p/60i/50i video stream and the AVC1080@60P/50P video stream are described in the stream descriptors included in the stream information. This completes the description of the process of generating the 1TS-2VSm2ts file.

FIGS. 23A-23E illustrate the internal structure of the clip information file. FIG. 23A illustrates the clip information file for 2D, and FIG. 23B illustrates the clip information file for 3D. Each of these clip information file includes "clip information", "sequence information", "program information", and "characteristic point information".

This completes the explanation of the clip information file for 2D. The following describes in detail the clip information file for 3D. FIG. 23B illustrates the internal structure of the clip information file for 3D. The clip information file for 3D includes "clip information", "sequence information", "program information", and "characteristic point information" as the ordinary clip information file, and further includes "program information SS", "extent start point information table", and "characteristic point information SS" in sequence after "ID1=0x0004".

FIG. 23C illustrates the internal structure of the clip information. The clip information is classified as clip information for 2D, clip base information which, paired with a file base, constitutes a clip stream file, and clip dependent information which, paired with a file dependent, constitutes a clip stream file. As shown in FIG. 23C, the clip information includes: "clip stream type information" indicating the stream type to which the corresponding clip stream file belongs; "application type information" indicating the type to which the application composed of the corresponding clip stream file belongs, such as a movie application, a time-base slide-show application, or a browsable slide-show application; "TS recording rate" indicating a transfer rate at which the TS packets in the clip stream file are transferred in the playback device after the source packets pass through the source packet depacketizer; "number of source packets" indicating the number of source packets constituting the corresponding clip stream file; "ATC delta"; and "Extent start point information table".

The above application type in the clip information indicates a type of transport stream to which a main TS or a sub TS referred to by a main path or a sub path belongs. Application types 1-3 indicate transport streams of a movie, a time-base slide-show, and a browsable slide-show, and application types 4-6 indicate transport streams that constitute a main path of the browsable slide-show, a sub path of the browsable slide-show, and a sub path of an interactive graphics. Application type 7 indicates a sub TS that includes an MVC1080@24p/60i/50i dependent-view video stream and is supplied from an additional content storage area for building virtual package. Application type 8 indicates a sub TS that is stored in a stereoscopic interleaved stream file together with a main TS, and includes an MVC1080@24p/60i/50i dependent-view video stream.

Application type 10 indicates a main TS of an AVC1080@60P/50P video stream.

The "application type=10" must be applied to all application types to which "application type=1" is applied, except for some restrictions. The format ID of the clip information must be set to "0x48", "44", "50", or "52". When the stream encoding information of an AVC1080@60P/50P video stream is included, the navigation command and BD-J application must check the bit "b1" of PSR24 and "b4" of PSR29 to check for the AVC1080@50P video stream capability at 50 Hz.

<Extent Start Point>

The following explains the Extent start point. As described above, the stereoscopic interleaved stream file is composed of the main TS and the sub TS. The pair of Extent start point information tables enables the stereoscopic interleaved stream file to be divided into two AV streams. An Extent start point information table is supplied, to the playback device, in a piece of clip information that is referenced by a sub playitem of a playlist which includes a sub path of "sub path type=8".

FIG. 23D illustrates the internal structure of the Extent start point information table. As illustrated in FIG. 23D, the Extent start point information table includes: "number_of_extent_start_points"; and as many "SPN_extent_start_point" as the number indicated by the "number_of_extent_start_points".

The "number_of_extent_start_points" indicates the number of Extents that belong to the related AV stream file. Extent start point information tables, in the same pair, for extracting a file base Extent and a file dependent Extent have the same value in the "number_of_extent_start_points".

The number of "SPN_extent_start"s (SPN_extent_start[0] through SPN_extent_start [number_of_extent_start_point]) is "number_of_extent_start_point+1". Each SPN_extent_start is specified by the Extent identifier [extent_id], and is a 32-bit value that indicates a source packet number of the source packet that corresponds to the extent_id$^{th}$ Extent in the AV stream file.

FIG. 23E illustrates the frame rates and resolutions indicated by the stream attribute information. As illustrated in FIG. 23E, the frame rates include 24 Hz, 24 Hz (23.976 Hz), 25 Hz, 30 Hz, 50 Hz, and 60 Hz. These frame rates are each identified by a four-bit code. The resolutions include 1920×1080, 1280×720, 960×540, 720×576, and 720×480. For each of the resolutions 720×480, 720×576 and 1920×1080, the progressive display method and the interleave display method are available.

FIG. 24 illustrates correspondence among the Extents, EP maps, and transport stream obtained by multiplexing the MVC1080@24p/50i/60i base-view video stream and the MVC1080@24p/50i/60i dependent-view video stream. The first row illustrates a frame image sequence. The second row illustrates EP maps that associate, in time axis, the frame images illustrated in the first row with the source packets illustrated in the third row. The source packet sequence illustrated in the third row of FIG. 24 is the same as the source packet sequence illustrated in the fourth row of FIG. 21.

The fourth row illustrates Extents that are used to recording the source packet sequence illustrated in the third row in a divided form. The fifth row illustrates the Open-GOPs and Closed-GOPs that are present in the Extents.

The second row indicates that the entry addresses in the EP_map are represented by using the packet numbers (a11, a21, a31 in FIG. 24) of the first packets among the plurality of packets obtained by dividing the Closed-GOPs of the MVC1080@24p/50i/60i base-view video stream.

A plurality of entry times (t11, t21, t31) in the time axis are associated with the entry addresses indicating the heads of the Closed-GOPs of the MVC1080@24p/50i/60i base-view video stream. With this structure, by reading the packets from the recording medium in accordance with the entry addresses, it is possible to supply the Closed-GOPs of the MVC1080@24p/50i/60i base-view video stream to the video decoder in a reliable manner without supplying extra data. Thus it is possible to perform a partial deletion from a desired entry time of the user, in a random access to a digital stream.

It should be noted with regard to the fifth row that each of a plurality of packets obtained by dividing an Open-GOP of the MVC1080@24p/50i/60i dependent-view video stream is present before an entry address that is immediately after an entry address of a Closed-GOP of the MVC1080@24p/50i/60i base-view video stream. By reading packets from packet (m) specified by entry address (i) in the EP_map to packet (n−1), which is placed immediately before packet (n) specified by entry address (i+1) in the EP_map, it is ensured that a pair of Closed-GOP of a completed MVC1080@24p/50i/60i base-view video stream and Open-GOP of the MVC1080@24p/50i/60i dependent-view video stream is supplied to the video decoder in a reliable manner.

With the above structure, when a random access is performed by referring to the EP_map, it is ensured that a pair of Closed-GOP of a completed MVC1080@24p/50i/60i base-view video stream and Open-GOP of the MVC1080@24p/50i/60i dependent-view video stream, which realize the stereoscopic viewing, is supplied to the video decoder in a reliable manner. This enables the video decoder to realize a high-speed operation in response to a skip by the user, and perform a partial deletion in units of GOPs quickly. This completes the description of the clip information.

Figure 25A:
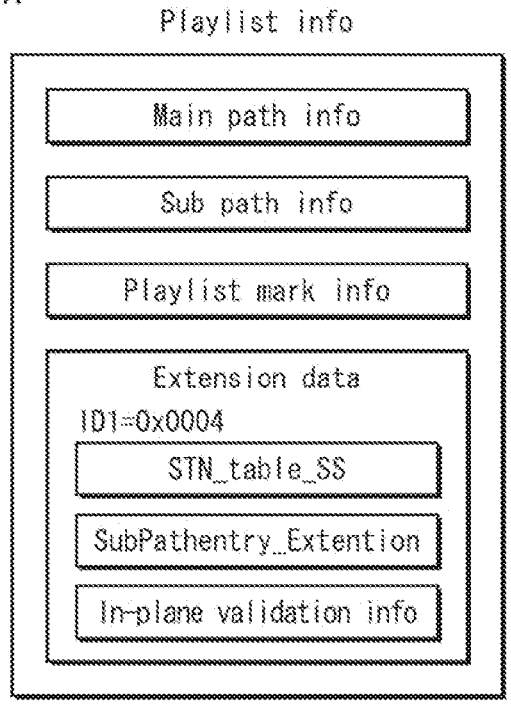
FIGS. 25A-25D illustrate the internal structures of the playlist information file.
Figure 25B:
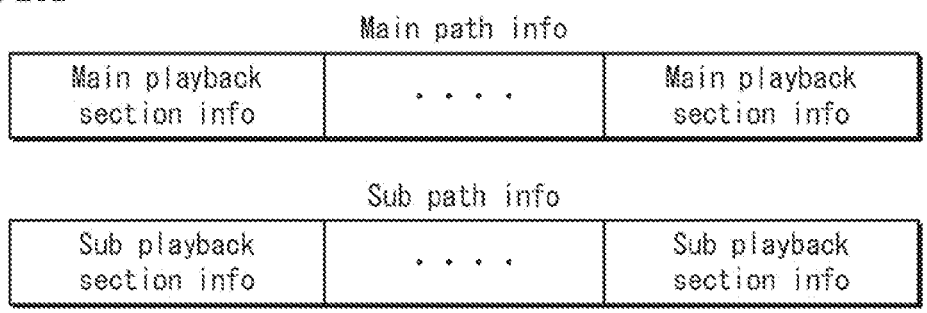
Figure 25C:
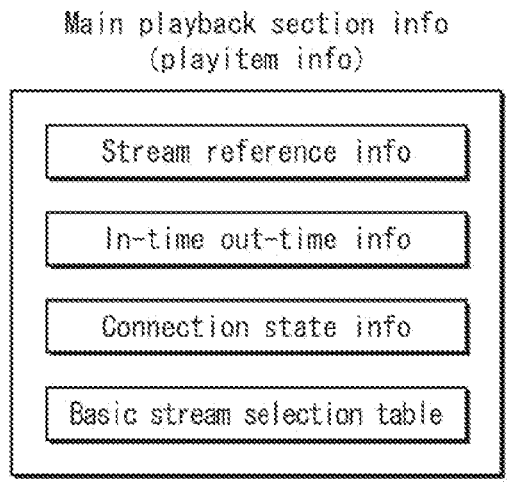

The following describes the playlist information file. FIGS. 25A-25D illustrate the internal structures of the playlist information file. The playlist information includes main path information, sub path information, playlist mark information, and extension data. These constitutional elements will be described in the following. FIG. 25B shows the internal structures of the main path information and the sub path information. As illustrated in FIG. 25B, the main path information is composed of one or more pieces of main playback section information. The sub path information is composed of one or more pieces of sub playback section information. FIG. 25C illustrates the internal structure of the playitem information. As illustrated in FIG. 25C, the playitem information includes "stream reference information", "in-time out-time information", "connection state information", and a "basic stream selection table".

The stream reference information includes: "clip information file name information (clip_information_file_name)" that indicates a clip information file that constitutes a clip stream file together with a transport stream constituting a playitem; "clip encoding method identifier (clip_codec_identifier)" that indicates the encoding method of the transport stream; and "STC identifier reference (STC_ID_reference)" that indicates STC sequences in which in-time and out-time are set, among the STC sequences of the transport stream. This completes the description of the playitem information.

The "connection state information" indicates the type of connection between the playitem including the connection state information itself and a preceding playitem. When set to "1", the connection condition of a playitem indicates that a seamless connection is not ensured between a digital stream specified by the playitem and a digital stream specified by a preceding playitem that precedes the playitem. When set to "5" or "6", the connection condition of the playitem indicates that a seamless connection is ensured between a digital stream specified by the playitem and a digital stream specified by a preceding playitem that precedes the playitem. When set to "5", the connection condition indicates a seamless connection associated with a clean break. When set to "6", the connection condition indicates a "seamless connection with continuous ATSs and PTSs".

Figure 25D:
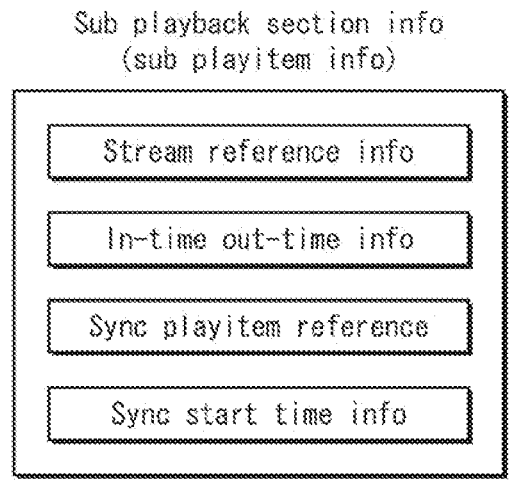

FIG. 25D illustrates the internal structure of the sub playitem information. As illustrated in FIG. 25D, the sub playitem information is information that defines playback sections by defining pairs of an "in_time" and an "out_time" on the STC sequence time axis, and includes "stream reference information", "in-time out-time information", "sync playitem reference", and "sync start time information". The "stream reference information", as is the case with the playitem information, includes: "clip information file name information", "clip encoding method identifier", and "STC identifier reference".

The "in-time out-time information (SubPlayItem_In_Time, SubPlayItem_Out_Time)" indicates the start point and end point of the sub playitem on the STC sequence time axis.

The "sync playitem reference (Sync_Playitem_Id)" is information that uniquely indicates a playitem with which the sub playitem is to be synchronized. The sub playitem In_Time exists on playback time axis of the playitem specified by this sync playitem identifier.

The "sync start time information (Sync_Start_PTS_of_Playitem)" indicates a time point on the STC sequence time axis of the playitem specified by the sync playitem identifier, which corresponds to the start point of the sub playitem specified by the sub playitem In_Time. This completes the description of the data structure of the playlist information.

Figure 26:
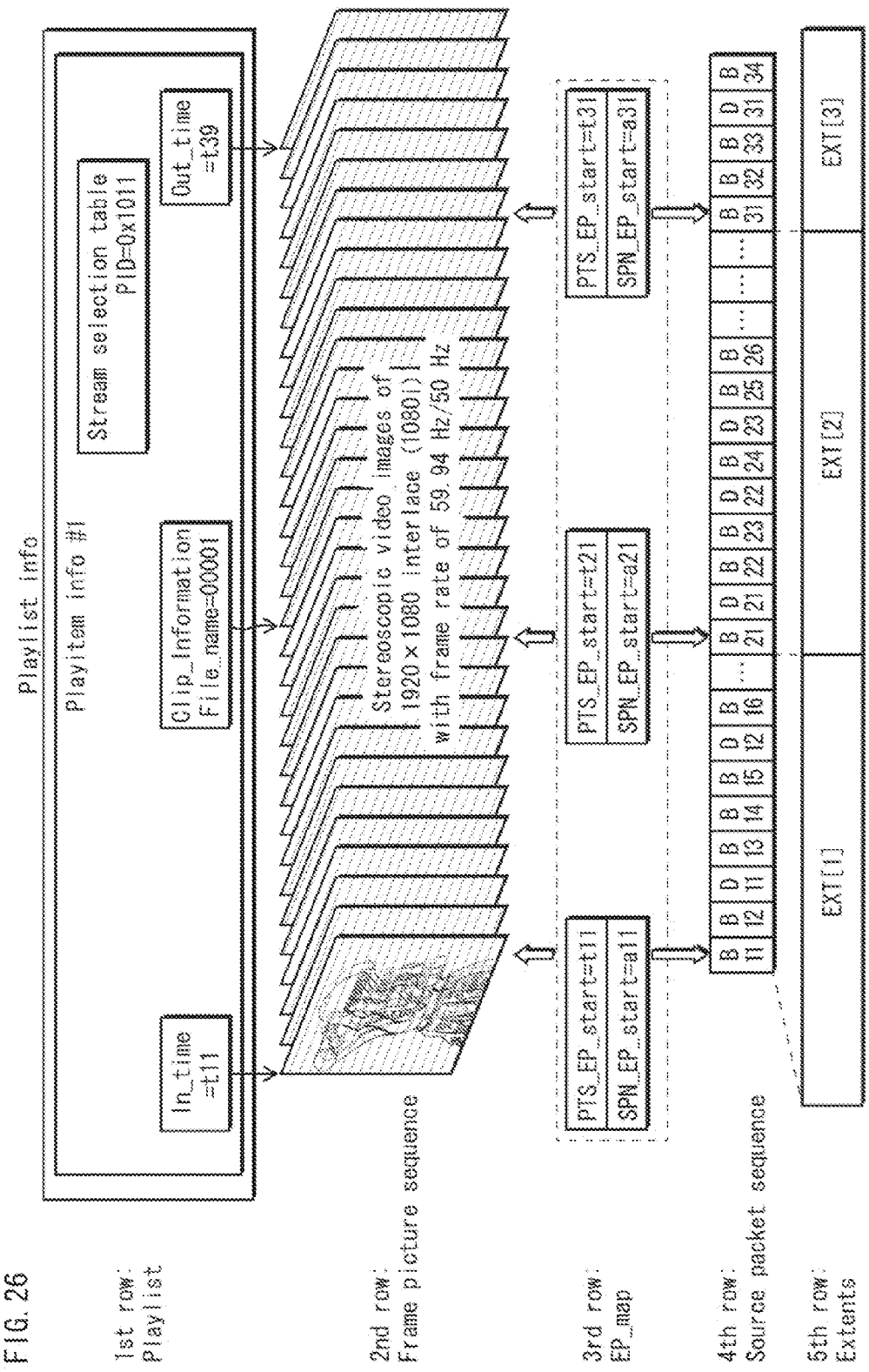
FIG. 26 illustrates a correspondence among a playlist, Extents, an EP_map, and a source packet sequence obtained by multiplexing the MVC1080@24p/50i/60i base-view video stream and the MVC1080@24p/50i/60i dependent-view video stream.

FIG. 26 illustrates a correspondence among a playlist, Extents, an EP_map, and a source packet sequence obtained by multiplexing the MVC1080@24p/50i/60i base-view video stream and the MVC1080@24p/50i/60i dependent-view video stream. The second through fifth rows of FIG. 26 illustrate the same frame image sequence, EP_map, source packet sequence, and Extents as the first through fifth rows of FIG. 24. The playlist information in the first row defines a playback path for a transport stream formed from the source packet sequence in the fourth row. The first row indicates playlist information that includes playitem information #1. In the first row, the version number of a playlist information file (MPLS file) storing playlist information is set to "version 2.4". Also, each stream selection table in the playitem information #1 includes PID 0X1011. This PID is a PID of the parent screen video stream. When this PID is described in the stream selection tables, the MVC1080@24p/50i/60i video stream is permitted to be played back. Also, "In_Time" and "Out_Time" indicate t11 and t39 that are the playback start time and playback end time of the frame image sequence in the second row, respectively.

With the above settings in the playitem information, the PIDs are described in the stream selection table, and the playback-permitted MVC1080@24p/50i/60i base-view video stream and MVC1080@24p/50i/60i dependent-view video stream are played back for a time period from In_Time to Out_Time.

Figure 27:
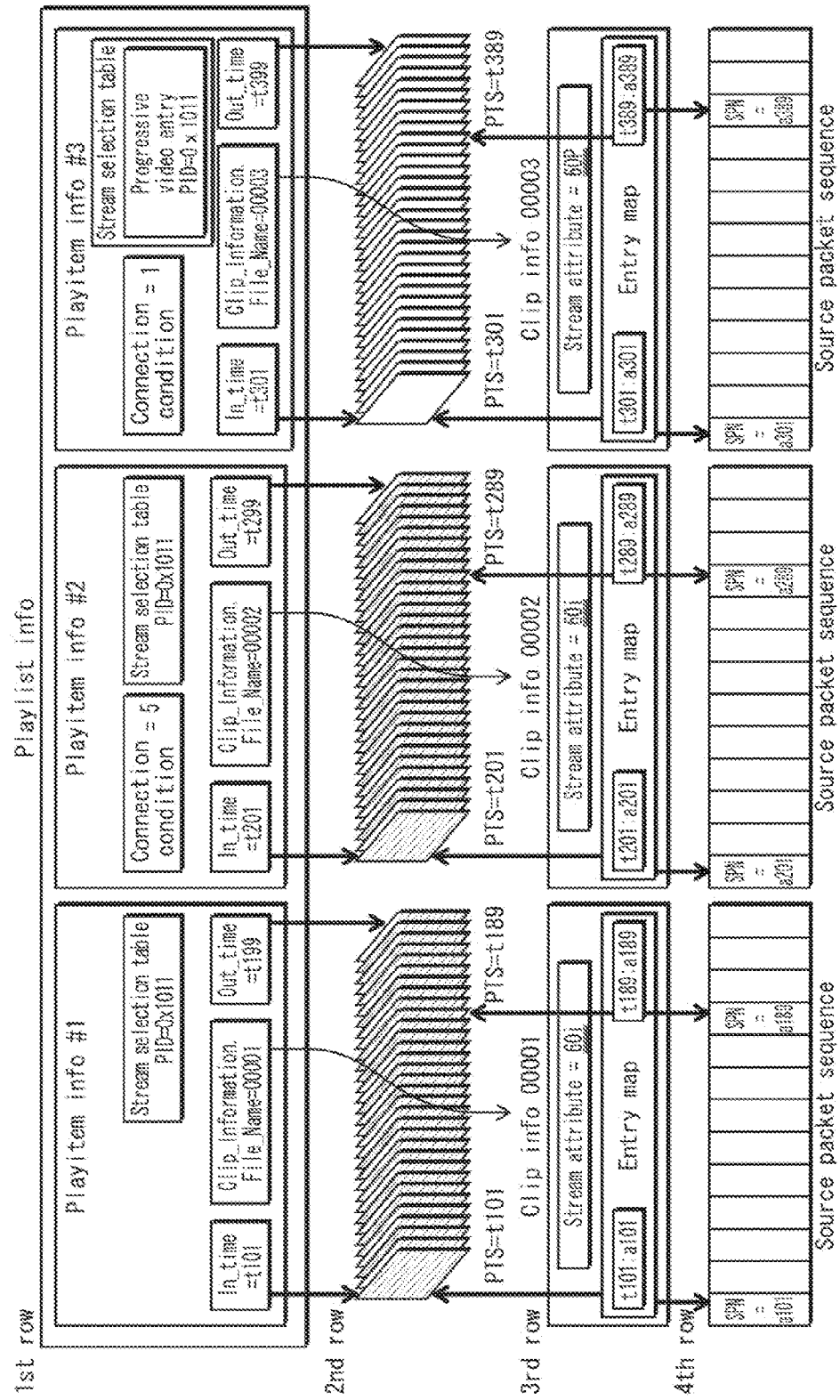
FIG. 27 illustrates parameter settings for generating a playlist including playback-permitted entries of an AVC1080@60P/50P video stream.

FIG. 27 illustrates parameter settings for generating a playlist including playback-permitted entries of an AVC1080@60P/50P video stream. The first row indicates playlist information composed of three pieces of playitem information #1, #2 and #3. The second row indicates an AVC1080@60i video stream, an AVC1080@60i video stream, and an AVC1080@60P video stream. The third row indicates three clip information files 00001-00003 that, in pairs with respective three stream files containing the three video streams of the second row, constitute three AV clip stream files. The fourth row indicates source packet sequences that constitute the stream files containing the video streams.

In the first row of FIG. 27, the version number of playlist information files (MPLS files) storing those playlist information is set to "2.4", which is a particular version number for identifying "60P playlist". Each stream selection table included in the playitem information #1-#3 has a PID "0x1011". In playitem information #3, a stream entry including this PID is paired with a stream attribute indicating the progressive video. This PID is a PID of the parent screen video stream. When this PID is described in the stream selection tables, the parent screen video stream is permitted to be played back via all the playitems. With the above settings in the playitem information, the PIDs are described in the stream selection table, and the playback-permitted AVC1080@60i video stream and AVC1080@60P video stream are played back for a time period from In_Time to Out_Time.

In the case where the PTS of the first picture of the first GOP in the first AVC1080@60i video stream, which is on the left-hand side in the second row, is t101, the PTS of the first picture of the last GOP in the AVC1080@60i video stream is t189, the first source packet number of the first GOP of a plurality of GOPs constituting a stream file including this AVC1080@60i video stream is a101 and the first source packet number of the last GOP of the plurality of GOPs constituting the AVC1080@60i video stream is a189, a correspondence "t101:a101" and a correspondence "t189:a189" are indicated in the entry map. Also, in the playitem information #1, In_Time is set to t101, Out_Time is set to t199, and clip_information_file_name is set to 00001.CLPI in correspondence with the third row.

In the case where the PTS of the first picture of the first GOP in the second AVC1080@60i video stream, which is in the middle of the second row, is t201, the PTS of the first picture of the last GOP in the AVC1080@60i video stream is t289, the first source packet number of the first GOP of a plurality of GOPs constituting a stream file including this AVC1080@60i video stream is a201 and the first source packet number of the last GOP of the plurality of GOPs constituting the AVC1080@60i video stream is a289, a correspondence "t201:a201" and a correspondence "t289:a289" are indicated in the entry map. Also, in the playitem information #2, In_Time is set to t201, Out_Time is set to t299, and clip_information_file_name is set to 00002.CLPI.

In the case where the PTS of the first picture of the first GOP in the third AVC1080@60P video stream, which is on the right-hand side in the second row, is t301, the PTS of the first picture of the last GOP in the AVC1080@60P video stream is t389, the first source packet number of the first GOP of a plurality of GOPs constituting a stream file including this AVC1080@60P video stream is a301 and the first source packet number of the last GOP of the plurality of GOPs constituting the AVC1080@60P video stream is a389, a correspondence "t301:a301" and a correspondence "t389:a389" are indicated in the entry map. Also, in the playitem information #3, In_Time is set to t301, Out_Time is set to t399, and clip_information_file_name is set to 00003.CLPI.

In the above example case, only the third video stream is an AVC1080@60P video stream, and the version number of the playlist information file (MPLS file) storing the playlist information is set to a value "0x0240" that indicates version 2.4.

This completes the description of the BDMV Recording Specification. As a restriction on the BDMV database treated in the BDMV Recording Specification+RREF, the region playback control is prohibited in all cases of the BDMV Recording Specification. A new profile is added in the BDMV Recording Specification. This is the BD-R/BD-RE profile 5, and is defined on the BD-ROM. It is added in the profile 1, 3, 4 which is an existing profile. These are restrictions imposed on the Blu-ray ReadOnly disc format in the BD-RE version 3.1 format.

In the following, a detailed description is given of the restrictions imposed on the Blu-ray ReadOnly disc by RREF.

The RREF is a subset of the BDMV Recording Specification, and is intended to be a real-time recording or an editing application that are implemented on a manufactured product such as a recorder or a camera. The RREF provides a framework for facilitating the maintenance of the database in the management of addition, editing and deletion. The RREF restricts the BD data model, and restricts the correspondence among titles, movie objects, and playlists. Each title other than the first play title or the top menu title refers to only one movie object, and the movie object plays back only one playlist. A movie object referred to by one title is not referred to by any other titles. Each of the first play title and the top menu title may have one or more movie objects. These movie objects can play back one or more playlists. A movie object referred to by the title should not be referred to by the first play title or the top menu title.

Playlists unique to the RREF include a main playlist, an alternative playlist, and a menu playlist.

The main playlist causes a clip stream file, which is recorded on a disc by the user, to be played back. Playitems included in the main playlist do not refer to any of clip stream files referred to by another main playlist or the menu playlist. The main playlist refers to one or more clip stream files. Two or more playlists do not refer to a same clip stream file.

The alternative playlist realizes a re-use of a clip stream file in the RREF. More specifically, the playlist information of the alternative playlist has a hierarchical structure composed of playitem information and clip stream files. Here, the clip stream files and the playitem information are in a one-to-many relationship. That is to say, one clip stream file is referred to by a plurality of pieces of playitem information as a multi-reference.

The menu playlist is a playlist defining a playback path that permits playback of an IG stream for a menu display and a video stream drawing the background image of the menu. The menu playlist is used for the first play title and the top menu title. A clip stream file referred to by a menu playlist is prohibited to be referred to by another menu playlist. The menu playlist refers to a dedicated clip stream file. The clip stream file is restricted to be used for display of a menu that can be played back only by the system, and is not used for the actual playback content recorded on the disc. A menu defined by the user is not targeted to be played back by the menu playlist.

The RREF restricts the relationship between playlists and clip stream files as follows. The interactive data base layer does not include: a BD-J object, title scene search, metadata, browsable slide show, click sound, title with interactive graphics (excluding the first play title and the top menu), or playitem playback of a random shuffle.

The stream layer does not include a secondary video stream or a secondary audio stream. Also, there is no 2TS input. There is no Out-of-MUX, excluding the case where a preload IG is realized. With regard to audio, up to eight Dolby digital codecs and LPCMs without down mix are allowed in total. The first play title and the top menu are allowed. With regard to graphics streams, up to two IG streams and up to eight PG streams are allowed, but a text subtitle stream is not allowed. There is no support for the multi-angle playback.

Since use of a BD-J object is not allowed, the BDJO directory and the JAR directory are empty.

In the STN_table_SS, the fixed offset during pop-up display, the drawing area offset validity flag, the stereoscopic presentation graphics presence/absence flag, the top arrangement presence/absence flag indicating whether a subtitle arranged in the upper part of the screen is present, the bottom arrangement presence/absence flag indicating whether a subtitle arranged in the lower part of the screen is present, and the stereoscopic interactive graphics presence/absence flag are all set to 0 (OFF).

The restrictions pertaining to the RREF are as follows. In the extension data, the in-plane validation information indicating the sub path entry extension or how much offsets for top arrangement and bottom arrangement are set is prohibited from being recorded. The TS packet recording rate is set to be lower than 3.5 Mbps. The ATC delta is set to a value obtained by calculating "188/TS packet recording rate". As the elementary streams stored in the transport streams for the RREF, only the primary audio stream, the primary video stream, the graphics stream, the MVC1080@24p/60i/50i base-view video stream, and the MVC1080@24p/60i/50i dependent-view video stream are allowed. With regard to the PID assignment, PID "0x1011" is assigned to the primary audio stream and the MVC1080@24p/60i/50i base-view video stream, and PID "0x1012" is assigned to the MVC1080@24p/60i/50i dependent-view video stream.

As described above, according to the present embodiment, by defining the bit assignment to the extent of the level of field in the BDMV database, it is possible to keep appropriate values indicating the number of target processes and the number of target data. With this structure, it is possible to keep a minimum amount of data to be resident in the memory. This contributes to reduction in the cost of the device and the power consumption.

Embodiment 8

The present embodiment describes how to solve the problem in the aspects of implementing a recording device and a playback device.

The following describes realization of problem solving means in a BD-RE player supporting a Blu-ray Rewritable disc version 3.1 format.

The internal structure of the device disclosed in the present embodiment may include any one or more of the problem solving means described in Embodiments 1 to 10. Describing all of the possible internal structures incorporating the problem solving means described in the above embodiments and combinations of two or more of the problem solving means described therein would require an enormous pages of the Description, and thus is not preferable. Thus, the following discloses an internal structure that includes all the problem solving means described in the above embodiments, as the representative thereof.

FIGS. 28A and 28B illustrate the internal structures of the recording device and the playback device. FIG. 28A illustrates the internal structure of a recording device 1001.

As illustrated in FIG. 28A, the recording device includes a drive 2001, a playback unit 2002, a recording unit 2003, and an editing unit 2004. The drive 2001 performs reading/writing from or to the optical disc, removable medium and built-in medium, and perform ejecting/loading of the optical disc. The playback unit 2002 reads structural elements such as the program file, playlist file, and clip stream file, among the BDMV database stored in the optical disc, removable medium and built-in medium, in accordance with the settings for the current title, decodes the clip stream file, and outputs non-compressed pictures and audio to another device. The recording unit 2003 performs an encoding process on broadcast waves, and audio and video input from an external source, creates a combination of data elements such as a program file, playlist file and clip stream file, and writes these data elements in association with indexes onto the recording medium loaded in the drive, as the BDMV database. The editing unit 2004 causes the playback unit to play back a part of the clip stream file referred to by the playlist information, generates an editing GUI in which the played-back video, namely part of the clip stream file, is incorporated, and executes an editing operation on the recording medium in accordance with a user operation input on the GUI. The drive 2001 includes a reading unit 2005 and a writing unit 2006. The reading unit 2005 reads data from the optical disc based on a request received from the playback unit 2002. The writing unit 2006 writes data onto the optical disc in accordance with an instruction from the recording unit 2003 or the editing unit 2004. The playback unit 2002 receives data which has been read from the disc by the drive 2001, outputs a video signal to a TV broadcast display device, and outputs an audio signal to a speaker.

The editing unit 2004 performs processing and editing of the BDMV database read from the disc by the drive 2001, and instructs the drive 2001 to write the edited database. The recording unit 2003 stores AV information obtained from the broadcast waves or the like, performs processing or editing on the information in accordance with an instruction input by the user, and instructs to write the edited information onto the disc via the drive 2001. FIG. 28B illustrates the internal structure of the playback device. A playback device supporting the Blu-ray Rewritable format in version 3.1 onwards is called a Profile5 player. Referring to the player profile register makes it possible to judge whether or not a playback device is a Profile5 player.

As illustrated in FIG. 28B, the playback device, which is a Profile5 player, includes a drive 2001, a playback unit 2002, and an editing unit 2004. The editing unit 2004 is an optional unit that is added as necessary. There may be a playback device that does not include the editing unit 2004. In that case, the playback device can be implemented as a simple playback device, such as a portable Blu-ray ReadOnly disc player, that does not have a recording function or an editing function. In the present application, however, the playback device includes the drive 2001, playback unit 2002, and editing unit 2004.

Also, in the present application, a "recording device" refers to such a recording device that includes structural elements such as the drive 2001, playback unit 2002, recording unit 2003, and editing unit 2004 and can perform recording, playback, and editing.

This is because devices such as the BD recorder and BD camcorder are recognized by the dealers as having functions such as recording, playback, and editing, and it is hard to imagine that a device having merely a recording function is traded as a recorder device.

The following described the internal structure of the playback device.

Upon loading of a recording medium on which the BDMV database is recorded, the playback device initializes the editing mode in accordance with SS_content_exist_flag that is present in the index file in the BDMV database, and then performs a playback of a stream in accordance with the current title setting in the device. More specifically, the playback device activates an operation mode object program associated with the current title, as a program that defines the operation mode of the current title among the plurality of titles described in the index file, and plays back a clip stream file via the playlist information in accordance with an instruction from the operation mode object program. Upon loading of a recording medium, the playback device reads the index file, sets whether the recording medium is editable in accordance with SS_content_exist_flag, editability_flag, and extended_editability_flag, and when it is to treat the loaded recording medium as an editable medium, the playback device executes editing of the loaded recording medium in accordance with the definitions of the Blu-ray ReadOnly Recording+Realtime Recording Editing Format (RREF).

Figure 29:
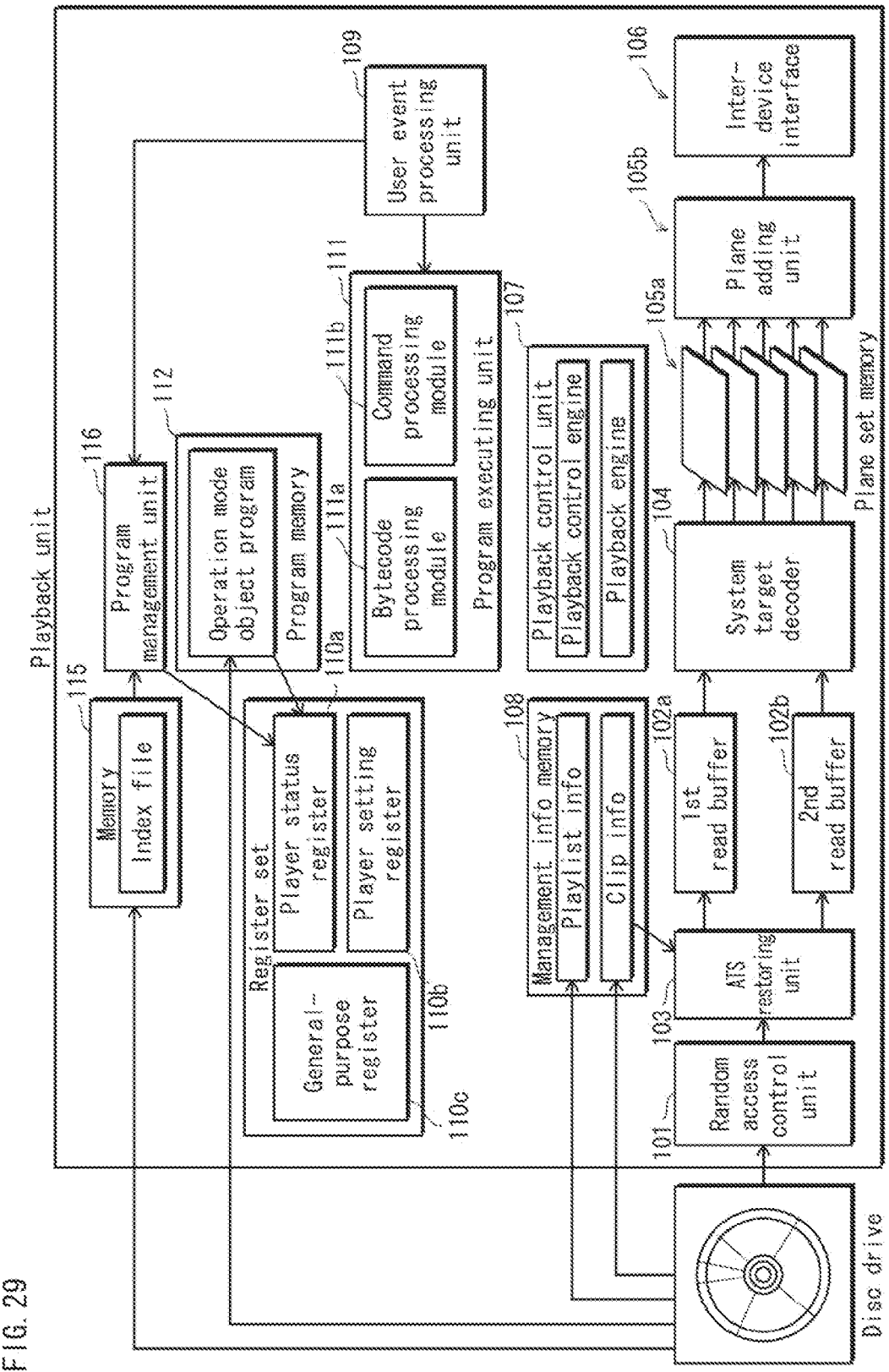
FIG. 29 illustrates the internal structure of the playback unit 2002.

FIG. 29 illustrates the internal structure of the playback unit 2002. As illustrated in FIG. 29, the playback unit 2002 includes a random access control unit 101, a first read buffer 102a, a second read buffer 102b, an ATS restoring unit 103, a system target decoder 104, a plane memory set 105a, a plane overlay unit 105b, an inter-device interface 106, a playback control unit 107, a management information memory 108, a user event processing unit 109, a register set 110, a program executing unit 111, a program memory 112, a memory 115, and a program management unit 116.

The random access control unit 101 executes a random access from an arbitrary time point in the time axis of the MVC1080@24p/60i/50i video stream and the AVC1080@60P/50P video stream. More specifically, when instructed to play back a video stream from an arbitrary time point on a time axis of the video stream, the random access control unit 101 searches for a source packet number of an access unit that corresponds to the arbitrary time point, by using EP_map and EP_map_SS that are extracted from the extension data assigned with ID1=0x0002 or 0x0004. The access unit includes picture data that can be decoded independently, or includes a pair of view components. With this search, the random access control unit 101 identifies a source packet number of a source packet that stores an access unit delimiter of the access unit. The random access control unit 101 then reads and decodes data based on the source packet number. When executing a scene jump, the random access control unit 101 executes a random access by executing the above search using the time information indicating the branch destination. Here, to obtain an LBN from the starting source packet number "ax" described in EP_map, the source packet is converted into the LBN by performing a calculation ((ax)*192/2048). In this expression, "192" is the number of bytes representing the source packet size, and "2048" is the number of bytes representing the sector size (logical block size). The above conversion provides the logical address of the data to be read.

The first read buffer 102a stores TS packets constituting a main TS read from the drive 2001.

The second read buffer 102b stores TS packets constituting a sub TS read from the drive 2001.

The ATS restoring unit 103 separates an ATC sequence constituting the MVC1080@24p/60i/50i base-view video stream and an ATC sequence constituting the MVC1080@24p/60i/50i dependent-view video stream, from the source packets stored in the 1TS-2VSm2ts file read from one recording medium, and writes the ATC sequences into the two read buffers, respectively. With this structure, the playback device can deal with the ATC sequence constituting the MVC1080@24p/60i/50i base-view video stream and the ATC sequence constituting the MVC1080@24p/60i/50i dependent-view video stream, as if they were read from different recording mediums.

The system target decoder 104 decodes the streams by performing the demultiplexing process onto the source packets read into the first read buffer 104 and the second read buffer 102b. The system target decoder 104 allows for the decoded MVC1080@24p/60i/50i base-view video stream and MVC1080@24p/60i/50i dependent-view video stream to be subjected to a stereoscopic playback.

The plane set memory 105a is composed of a plurality of plane memories. These plane memories constitute a layer model, and the storage contents of these plane memories are overlaid with each other by the layer overlay. A grayscale bit sequence of one screen of non-compressed image is written to these plane memories. The writing is performed each time the playback start time indicated by the presentation time stamp of each access unit in the MVC1080@24p/60i/50i video stream is reached. As a process specialized for the video editing, the plane set memory 105a stores an editing GUI and decoded images of view components into different plane memories.

The plane adding unit 105b performs the layer overlay in the plurality of plane memories. The layer overlay is realized by executing a superimposing process onto all combinations of the two layers in the layer model. In the superimposing process, pixel values of pixel data stored in the plane memories between layers are superimposed. The plane adding unit 105b realizes the layer overlay by executing a superimposing process onto all combinations of the two layers in the layer model. In the superimposing process, pixel values of pixel data stored in the plane memories of the two layers are superimposed.

The superimposing between layers is performed as follows. A transmittance $\alpha$ as a weight is multiplied by a pixel value in unit of a line in the plane memory of a certain layer, and a weight of ($1-$transmittance $\alpha$) is multiplied by a pixel value in unit of a line in the plane memory of a layer below the certain layer. The pixel values with these luminance weights are added together. The resultant pixel value is set as a pixel value in unit of a line in the layer. The layer overlay is realized by repeating this superimposing between layers for each pair of corresponding pixels in unit of a line in adjacent layers in the layer model. As a process specialized for the video editing, the plane overlay unit 105b overlays the editing GUI with the decoded images of view components of the MVC1080@24p/60i/50i video stream. This also applies to the pictures in the AVC1080@60P/50P video stream.

The inter-device interface 106 transitions to a data transfer phase via a negotiation phase, when a connection with another device in the home theater system is made via an interface, and performs data transmission/reception in the data transfer phase. In the negotiation phase, the capabilities (including the decode capability, playback capability, and display frequency) of the partner device are grasped, and the capabilities are set in the player setting register so that the transfer method for the succeeding data transfers is determined. The negotiation phase includes a mutual authentication phase. After this negotiation phase, one line of the pixel data in the non-compressed/plaintext format in the picture data after the layer overlay is transferred to the display device at a high transfer rate in accordance with the horizontal sync period of the display device. The inter-device interface 106 complies with HDMI4.1a3D, and can output odd fields and even fields in the non-compressed/plaintext format for the interlace 3D. The inter-device interface 106 has a conversion function to convert interlaced stereoscopic images into progressive stereoscopic images. Thus, even if the display device connected with the playback device is specialized for the progressive stereoscopic images, the playback device can display stereoscopic images on the display device.

On the other hand, in the horizontal and vertical blanking intervals, audio data in the non-compressed/plaintext format is transferred to other devices (including an amplifier and a speaker as well as the display device) connected with the playback device. With this structure, the devices such as the display device, amplifier and speaker can receive both the picture data and the audio data that are in the non-compressed/plaintext format, and the output for playback can be realized. Furthermore, when the partner device has the decode capability, a pass-through transfer of the video and audio streams is possible. In the pass-through transfer, it is possible to transfer the video stream and audio stream in the compressed/encrypted format, as they are.

The playback control unit 107 has a function to control the playback of the clip stream file by controlling the drive 100 and the system target decoder 104. The playback control unit 107 interprets the playlist information and controls the playback process of the clip stream file based on a playback instruction from the program executing unit 111 or a notification from the user event processing unit 109. For the above controls, the playback control unit 107 includes: a playback control engine for interpreting the playlist information; and a playback engine for controlling the playback process of the clip stream file. Also, the playback control unit 107 performs the playback operation by referring to the system parameters. When instructed by the program executing unit 111 or the like to playback a playlist for playing back a clip stream file including the MVC1080@24p/60i/50i base-view video stream, the playback control unit 107 identifies a clip stream file including the MVC1080@24p/60i/50i base-view video stream and a clip stream file including the MVC1080@24p/60i/50i dependent-view video stream that are to be played back by the play items of the playlist. After this, the playback control unit 107 requests the drive 2001 to read, in units of Extents, GOPs of the MVC1080@24p/60i/50i base-view video stream and GOPs of the MVC1080@24p/60i/50i dependent-view video stream. As a process specialized for the video editing, the playback control unit 107 starts playing back the menu playlist for the interactive editing, and causes the video decoder to decode the view components to be overlaid with the GUI.

The management information memory 108 stores, among a plurality of pieces of playlist information and clip information recorded on the recording medium, processing targets of the playback control unit 107 (the current playlist information and the current clip information).

The register set 110 includes a plurality of player status registers, a plurality of player setting registers, and a general-purpose register.

The program executing unit 111 includes a command processing module 111a and a bytecode processing module 111b. The command processing module 111a includes a command interpreter, and performs the control of the HDMV mode by decoding and executing a navigation command constituting a movie object. The byte code processing module 111b is a platform unit of a so-called Java™ virtual machine. The byte code processing module 111b converts (i) the byte codes constituting the BD-J application stored in the heap memory and (ii) the byte codes constituting the system application, into native codes, and causes the MPU to execute the native codes.

The program memory 112 stores a control program that is a target of execution by the program executing unit 111.

The index memory 115 is a memory into which the index file is read when a disc medium is loaded in the playback device.

The program management unit 116 selects a title as the current title based on the playback device status or a user operation from among a plurality of titles defined in the index file, and stores the title number of the selected title into the current title number register, which is one of player status registers. Furthermore, the program management unit 116 selects an operation mode object program corresponding to the current title number, and instructs the navigation command processing module and the bytecode processing module to process the selected operation mode object program.

The user event processing unit 109, in response to a user operation that is input via a remote control, requests the program executing unit 111 or the playback control unit 107 to execute a process. For example, when the user presses a button on the remote control, the user event processing unit 109 requests the program executing unit 111 to execute a command corresponding to the button. For example, when a fast forward/rewind button on the remote control is pressed, the user event processing unit 109 requests the playback control unit 107 to execute a fast forward/rewind process onto a digital stream of a playlist that is currently played back.

Figure 30:
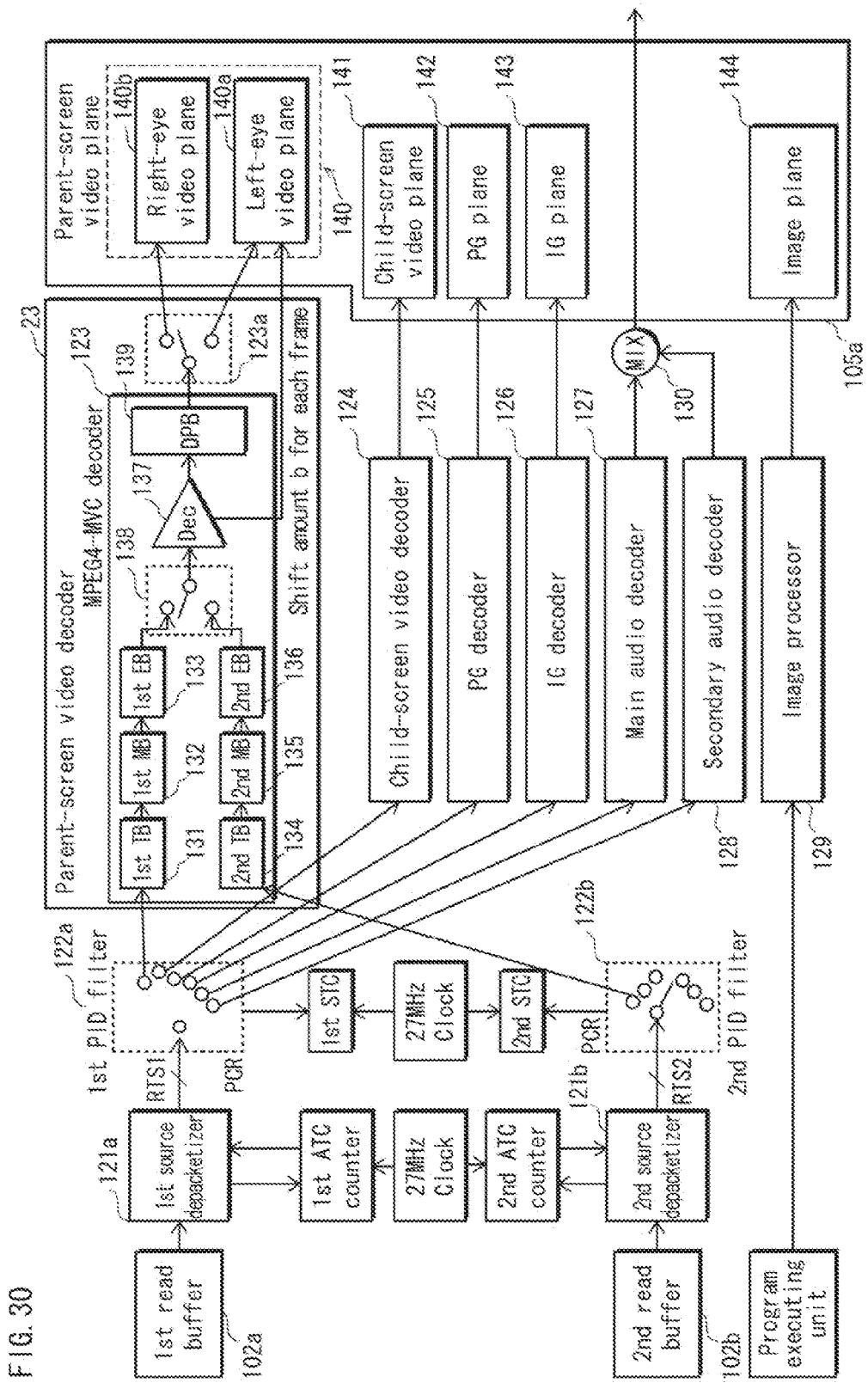
FIG. 30 illustrates the internal structure of the system target decoder 104.

The following describes the internal structure of the system target decoder 104 with reference to FIG. 30. FIG. 30 illustrates the internal structure of the system target decoder 104. In FIG. 30, reference signs in a range from 121 to 129 are assigned to structural elements of the system target decoder 104 for the sake of understanding. More specifically, the system target decoder 104 includes a first source depacketizer 121a, a second source depacketizer 121b, a first PID filter 122a, a second PID filter 122b, a parent-screen video decoder 123, a child-screen video decoder 124, a PG decoder 125, an IG decoder 126, a primary audio decoder 127, a secondary audio decoder 128, and an image processor 129.

The first source depacketizer 121a interprets the source packets stored in the first read buffer 102a, extract TS packets, and sends the TS packets to the first PID filter 122a.

The second source depacketizer 121b interprets the source packets stored in the second read buffer 102b, extracts TS packets, and sends the TS packets to the second PID filter 122b. When the TS packets are sent, the input times at which the TS packets are input to the decoders are adjusted based on the ATSs of the source packets. More specifically, at the instant when an ATC value generated by the ATC counter and an ATS value of a source packet become the same, only a TS packet corresponding to the source packet is transferred to the PID filter at the recording rate of the clip stream file.

As a result, the first PID filter 122a transfers, among TS packets having been output from the source depacketizer, a TS packet having a PID that matches a PID required for playback, to any of the video decoder, child-screen video decoder, IG decoder, PG decoder, audio decoder and secondary audio decoder, based on the PID of the TS packet. For instance, in the case of the BD-ROM, a TS packet having a PID 0x1011 is transferred to the parent-screen video decoder, TS packets having PIDs 0x1b00 to 0x1b1F are transferred to the child-screen video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder.

The second PID filter 122b transfers, among TS packets having been output from the second source depacketizer 121b, a TS packet having a PID that matches a PID required for playback, to the second transport buffer of the video decoder. As a process unique to the present embodiment, the first and second PID filters 122*a* and 122*b* execute demultiplexing based on the display mode. More specifically, when the display mode is the 2D output mode, the first PID filter 122*a* demultiplexes only TS packets that belong to the MVC1080@24p/60i/50i base-view video stream, and outputs the demultiplexed TS packets to the video decoder. When the display mode is the 3D output mode, the first PID filter 122*a* demultiplexes TS packets that belong to the MVC1080@24p/60i/50i base-view video stream, and the second PID filter 122*b* demultiplexes TS packets that belong to the MVC1080@24p/60i/50i dependent-view video stream, and the demultiplexed TS packets are output to the video decoder.

The parent-screen video decoder 123 is an MPEG4-MVC video decoder, and when the 3D output mode is set, inputs the two lines of the MVC1080@24p/60i/50i base-view video stream and the MVC1080@24p/60i/50i dependent-view video stream, and performs a screen output for the stereoscopic playback. The MPEG4-MVC is a subset of MPEG4-AVC. Accordingly, a video stream of the MPEG4-AVC format can be decoded. That is to say, in the 2D output mode, the parent-screen video decoder 123 decodes an AVC1080@60P/50P video stream that is permitted to be played back in the stream selection table.

The child-screen video decoder 124 has the same structure as the parent-screen video decoder. The child-screen video decoder 124 performs decoding of an input child-screen video stream, and writes resultant pictures to the child screen video plane at the timings of display times (PTS).

The PG decoder 125 extracts a presentation graphics stream from the TS packets input from the source depacketizer, decodes the extracted presentation graphics stream, and writes the non-compressed graphics data to the PG plane at the timing of the display time (PTS).

The IG decoder 126 extracts an interactive graphics stream from the TS packets input from the source depacketizer, decodes the extracted interactive graphics stream, and writes the non-compressed graphics data to the IG plane at the timing of the display time (PTS).

The primary audio decoder 127 has a buffer. While accumulating data in the buffer, the primary audio decoder 127 removes information such as a TS header and a PES header, and performs audio stream decode processing to obtain decompressed LPCM-state audio data. The primary audio decoder 127 outputs the obtained audio data to the audio mixer at the timings of playback times (PTS). Possible compression encoding formats of the audio stream multiplexed on the clip stream file include AC3 and DTS, and therefore the decoding scheme used to decode the compressed audio is changed in accordance with the stream attributes.

The secondary audio decoder 128 has the same structure as the primary audio decoder. The secondary audio decoder 128 performs decoding of an input secondary audio stream, and outputs resultant decompressed LPCM-state audio data to the audio mixer at the timing of display times. Possible compression encoding formats of the audio stream multiplexed on the clip stream file include DolbyDigitalPlus and DTS-HD LBR, and therefore the decoding scheme used to decode the compressed audio is changed in accordance with the stream attributes.

The audio mixer 128*a* mixes (superimposes) the decompressed audio data output from the primary audio decoder and the decompressed audio data output from the secondary audio decoder with each other, and outputs the resultant audio to a speaker or the like.

The image processor 129 decodes image data (PNG, JPEG, GIFF format), and outputs the resultant decoded image data to the image plane in accordance with a display time designated by the program executing unit. With the above decoding of the image data, a GUI for the video editing is constructed in the image plane.

The following describes the internal structure of the parent-screen video decoder 123. In FIG. 30, reference signs in a range from 131 to 139 are assigned to structural elements of the parent-screen video decoder 123 for the sake of understanding. More specifically, the parent-screen video decoder 123 includes a first TB 131, an first MB 132, a first EB 133, a second TB 134, a second MB 135, a second EB 136, a compressed video decoder 137, a buffer switch 138, a DPB 139, and a picture switch 123*a*.

The first TB (Transport Buffer) 131 is a buffer in which TS packets output from the first PID filter 122*a* are temporarily stored as they are, where the TS packets include a NAL unit which is a part of the MVC1080@24p/60i/50i base-view video stream or the AVC1080@60P/50P video stream.

The first MB (Muliplexed Bufffer) 132 is a buffer for storing PES packets temporarily when the MVC1080@24p/60i/50i base-view video stream or the AVC1080@60P/50P video stream is output from the first TB 131 to the first EB 133. When data is transferred from the first TB 131 to the first MB 132, the TS header of each TS packet is removed.

The first EB (Elementary Buffer) 133 is a buffer that stores a video access unit in an encoded state. When data is transferred from the first MB 132 to the first EB 133, the PES header is removed.

The second TB (Transport Buffer) 134 is a buffer in which TS packets output from the second PID filter 122*b* are temporarily stored as they are, where the TS packets include the MVC1080@24p/60i/50i dependent-view video stream.

The second MB (Muliplexed Bufffer) 135 is a buffer for temporarily storing PES packets constituting the MVC1080@24p/60i/50i dependent-view video stream when the MVC1080@24p/60i/50i dependent-view video stream is output from the second TB 134 to the second EB 136. When data is transferred from the second TB 134 to the second MB 136, the TS header of each TS packet is removed.

The second EB (Elementary Buffer) 136 is a buffer that stores video access units of the MVC1080@24p/60i/50i dependent-view video stream in an encoded state. When data is transferred from the second MB 135 to the second EB 136, the PES header is removed.

The compressed video decoder 137 preloads the view components constituting the MVC1080@24p/60i/50i dependent-view video stream into the elementary buffer, and decodes the view component of a picture type (IDR type) at the head of the closed GOP in the MVC1080@24p/60i/50i base-view video stream that is intended to refresh the decoder. When this decoding is performed, the coded data buffer and the decoded data buffer are all cleared. After the view component of the IDR type is decoded, the compressed video decoder 137 decodes: a view component that follows the MVC1080@24p/60i/50i base-view video stream that has been compress-encoded based on the correlativity with the above view component; and a view component of the MVC1080@24p/60i/50i dependent-view video stream. When non-compressed picture data for the view component is obtained by the decoding, the picture data is stored in the decoded data buffer, and is set as a reference picture.

By using the reference picture, the motion compensation is performed onto (i) view components following the MVC1080@24p/60i/50i base-view video stream and (ii) view components of the MVC1080@24p/60i/50i dependent-view video stream. The motion compensations allow for non-compressed picture data to be obtained for the view component following the MVC1080@24p/60i/50i base-view video stream and for the view component of the MVC1080@24p/60i/50i dependent-view video stream. The obtained non-compressed picture data are stored in the decoded data buffer and used as reference pictures. The decoding is performed when a decode start time specified by a decode time stamp of each access unit arrives. In the case of the AVC1080@60P/50P video stream, compressed pictures in the access units, in place of the view components, are processed in the same manner.

The buffer switch 138 transfers the pictures stored in the first and second EBs to the compressed video decoder 137 at the timings of decoding times (DTS). Here, the decode switch information obtained when the compressed video decoder 137 decodes a video access unit may be used to determine from which of the first EB or the second EB the next access unit is extracted.

The DPB (Decoded Picture Buffer) 139 is a buffer for storing the decoded frame/field images temporarily. The compressed video decoder 137 makes use of the DPB 139 to refer to pictures that have already been decoded when it decodes video access units such as a P-picture and a B-picture encoded by the inter-picture predictive encoding.

The following describes the internal structure of the plane memory set. In FIG. 30, reference signs in a range from 141 to 149 are assigned to structural elements of the plane memory set for the sake of understanding. More specifically, the plane memory set includes a parent-screen video plane 140, a child-screen video plane 141, a PG plane 142, an IG plane 143, and an image plane 144.

The parent-screen video plane 140 includes a left-eye video plane 140a and a right-eye video plane 140b and stores one screen of pixel data that is non-compressed picture data obtained by decoding by the video decoder 23. The video plane 140 may have a 1-plane structure or a 2-plane structure. In the 2-plane structure, the video plane 140 is composed of a pair of a left-eye video plane and a right-eye video plane. A left-eye video and a right-eye video, which are obtained by decoding a multi-view video stream, are stored in the left-eye video plane and the right-eye video plane constituting the 2-plane structure, respectively. When having the 1-plane structure, the video plane 140 stores pixel data that is non-compressed picture data obtained by decoding a normal video stream.

To which of the left-eye plane memory and the right-eye plane memory the picture data after decoding is to be written is determined in accordance with the base-view indicator in the playlist information. When the base-view indicator specifies the MVC1080@24p/60i/50i base-view video stream as "for the left eye", the picture data that is to be the view component of the MVC1080@24p/60i/50i base-view video stream is written to the left-eye plane memory, and the picture data that is to be the view component of the MVC1080@24p/60i/50i dependent-view video stream is written to the right-eye plane memory.

When the base-view indicator specifies the MVC1080@24p/60i/50i base-view video stream as "for the right eye", the picture data that is to be the view component of the MVC1080@24p/60i/50i base-view video stream is written to the right-eye plane memory, and the picture data that is to be the view component of the MVC1080@24p/60i/50i dependent-view video stream is written to the left-eye plane memory. These view components are output to the display device in sequence. More specifically, in one frame period, the picture data stored in the left-eye plane memory and the picture data stored in the right-eye plane memory are output simultaneously.

The child-screen video plane 141 receives picture data for child-screen video output from the system target decoder 104.

The PG plane 142 stores graphics data that is obtained by decoding the presentation graphics stream and is output from the system target decoder 104. The PG plane 142 also may have a 1-plane structure or a 2-plane structure. In the 2-plane structure, the PG plane 142 is composed of a pair of a left-eye video plane and a right-eye video plane. A left-eye presentation graphics and a right-eye presentation graphics, which are obtained by decoding left-eye and right-eye PG streams, are stored in the left-eye plane and the right-eye plane constituting the 2-plane structure, respectively. When having the 1-plane structure, the PG plane 142 stores pixel data that is non-compressed graphics obtained by decoding a PG stream.

The IG plane 143 stores graphics data that is obtained by decoding the interactive graphics stream and is output from the system target decoder 104. In the 2-plane structure, the IG plane 143 is composed of a pair of a left-eye plane and a right-eye plane. A left-eye interactive graphics and a right-eye interactive graphics, which are obtained by decoding left-eye and right-eye IG streams, are stored in the left-eye plane and the right-eye plane constituting the 2-plane structure, respectively. When having the 1-plane structure, the IG plane 143 stores pixel data that is non-compressed graphics obtained by decoding an IG stream.

The image plane 144 stores image data output from the system target decoder 104.

The 1plane+Offset playback by the plane shift is realized by the above-described video plane 140, PG plane, IG plane and image plane. The video decoder outputs an offset that indicates to what extent an output video, which is displayed based on the pictures stored in the video plane, is to be shifted from the standard position in the horizontal direction (horizontal axis), and then each pixel data stored in the video plane is shifted by amount of the offset. By realizing the 1plane+Offset playback, it is possible to play back, by the stereoscopic playback, even an editing menu that has not been intended to be played back by the stereoscopic playback.

With regard to the structural elements of the playback device having been explained so far, the contents of the processes performed by the structural elements may be described in an object-oriented programming language, and then be implemented as software in the playback device. Here, the contents of the processes performed by the structural elements can be generalized as processing procedures for dealing with input data, various external events, and internal parameters of the device. Such generalized processing procedures are illustrated in the flowcharts of FIGS. 31 and 40.

Figure 31:
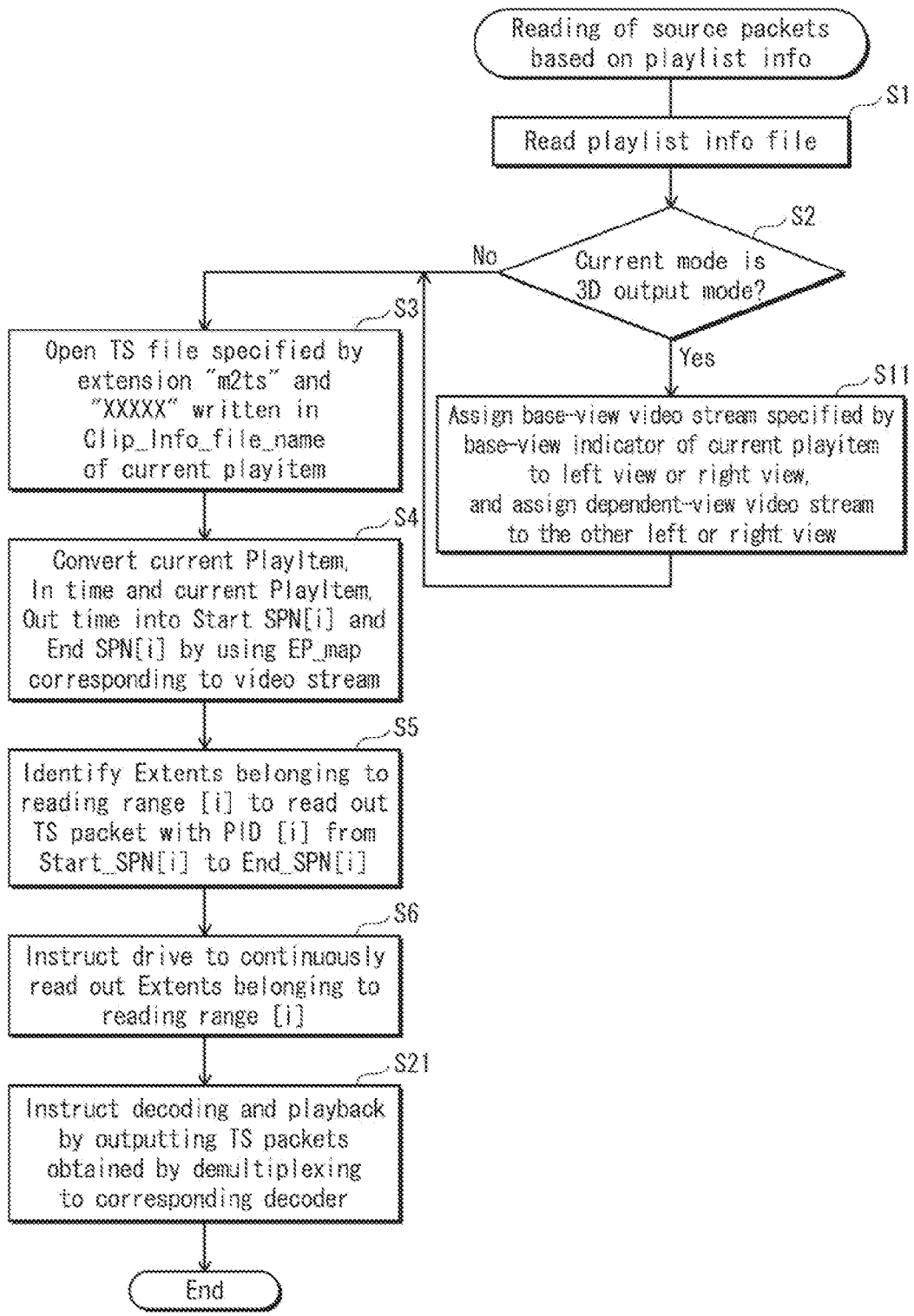
FIG. 31 illustrates the procedure of reading source packets based on the playlist information.

FIG. 31 illustrates the procedure of reading source packets based on the playlist information. In the flowchart, a variable "i" indicates the $i^{th}$ reading range. Accordingly, in the following description of the flowchart, an information element related to the $i^{th}$ reading range is attached with an additional character [i].

In step S1, the playlist information file is read. In step S2, it is judged whether or not the current output mode is the 3D output mode. When it is judged that the current output mode is the 2D output mode, the steps S3 through S6 are executed.

In step S3, a stream file specified by extension "m2ts" and "XXXXX" written in Clip_Information_file_name of the current playitem is opened. In step S4, the current PlayItem.In time and the current PlayItem.Out time are converted into Start SPN[i] and End SPN[i] by using the entry points of the EP_map corresponding to the packet ID of the MVC1080@24p/60i/50i video stream.

In step S5, Extents belonging to reading range [i] are identified to read out TS packet [i] having packet ID [i] from Start_SPN[i] to End_SPN[i]. In step S6, the drive of the recording medium is instructed to continuously read out Extents belonging to reading range [i].

When it is judged in step S2 that the current output mode is the 3D output mode, the control proceeds to step S11 in which the MVC1080@24p/60i/50i base-view video stream specified by the base-view indicator of the current playitem information is assigned to either the left-eye video plane or the right-eye video plane, and the MVC1080@24p/60i/50i dependent-view video stream is assigned to the other one of the left-eye and right-eye video planes, and then the control proceeds to step S3. In step S21, decoding and playback are instructed by outputting TS packets obtained by demultiplexing to the decoder. The explanation so far pertains to the MVC1080@24p/50i/60i video stream.

Here, in the digital stream, the recording position of the starting packet among a plurality of packets obtained by dividing the Closed-GOP in the MVC1080@24p/50i/60i base-view video stream precedes the recording position of the starting packet among a plurality of packets obtained by dividing the Open-GOP in the MVC1080@24p/50i/60i dependent-view video stream. Also, all of the plurality of packets obtained by dividing the Open-GOP in the MVC1080@24p/50i/60i dependent-view video stream are present before an entry address immediately after the entry address of the Closed-GOP in the MVC1080@24p/50i/60i base-view video stream. As a result, by reading out packets from packet (m) specified by entry address (i) in the EP_map to packet (n−1) immediately before packet (n) specified by entry address (i+n), it is ensured that a pair of Closed-GOP of a completed MVC1080@24p/50i/60i base-view video stream and Open-GOP of the MVC1080@24p/50i/60i dependent-view video stream is supplied to the video decoder in a reliable manner. With regard to the AVC1080@60P/50P video stream, the processing may be simpler. More specifically, the processes of steps S3 through S21 may be executed in sequence when it is judged No in step S2 in FIG. 31. This completes the explanation of the playback unit. The following explains the internal structure of the recording unit, which is the core of the recording device.

The recording device includes the playback unit and the recording unit. As the recording process, the recording device obtains a pair of the MVC1080@24p/60i/50i base-view video stream and the MVC1080@24p/60i/50i dependent-view video stream or the AVC1080@60P/50P video stream by encoding images input from the imaging element or via broadcasting, creates clip information file, playlist file, operation mode object program, and index file corresponding to these video streams, and writes a BDMV database containing these onto a recording medium.

Figure 32:
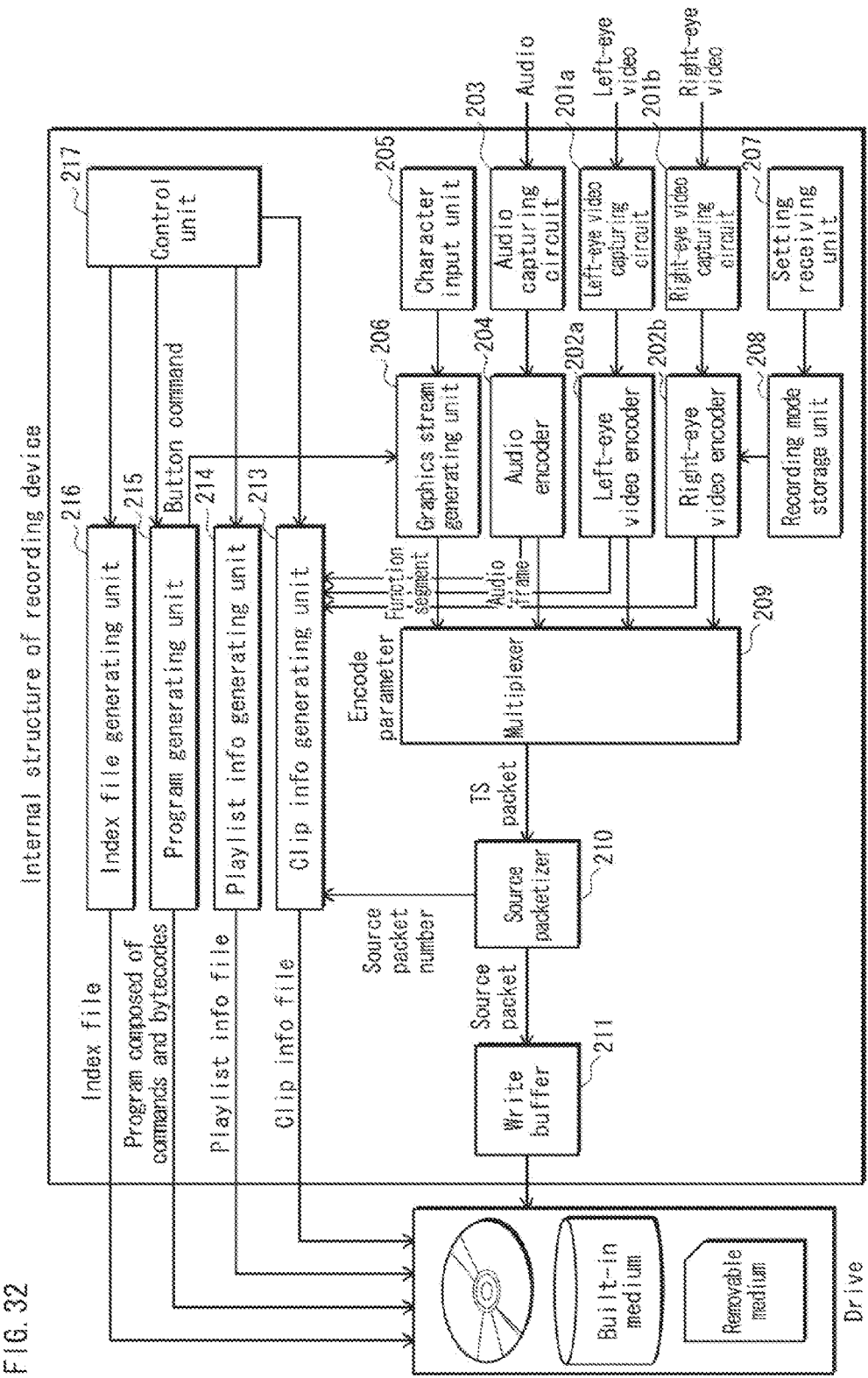
FIG. 32 illustrates the internal structure of the recording unit.

FIG. 32 illustrates the internal structure of the recording unit. As illustrated in FIG. 32, the recording unit includes: a left-eye video capturing circuit 201*a* for receiving incident light to a left-eye camera and outputting 24 left-eye progressive images per second; a right-eye video capturing circuit 201*b* for receiving incident light to a right-eye camera and outputting 24 right-eye progressive images per second; a left-eye video encoder 202*a* and a right-eye video encoder 202*b* for generating a group of pictures, which is a collection of compressed picture data, by encoding the 24 left-eye progressive images per second and the 24 right-eye progressive images per second output from the left-eye and right-eye video capturing circuits 201*a* and 201*b*; an audio capturing circuit 203 for capturing external audio and outputting non-compressed audio data; an audio encoder 204 for encoding the non-compressed audio data; a character input unit 205 for receiving an input character sequence to be displayed on a button graphics in the top menu; a graphics stream generating unit 206 for generating a collection of functional segments which include the button attached with the input character sequence; a setting receiving unit 207 for receiving an input setting regarding the device; a recording mode storage unit 208 for storing a recording mode which complies with an input instruction; a multiplexer 209 for obtaining a TS packet sequence by multiplexing a collection of the group of pictures, which is a collection of compress-encoded video data, compress-encoded audio data, and the collection of functional segments; a source packetizer 210 for converting the TS packets obtained by the multiplexer 209 into source packets; and a write buffer 211 for buffering the source packets to be written onto the recording medium.

Also, to generate information pertaining to the playback control, the recording device further includes: a clip information generating unit 213 for generating clip information which includes the entry map, sequence information, and stream attribute information, based on the encode parameters of the video and audio encoders and the first source packet number of the first GOP at the head of the group of pictures output from the source packetizer 210; a playlist information generating unit 214 for generating playlist information indicating the playback paths, by using the PTSs defining the playback times; a program generating unit 215 for generating the operation mode object program; an index file generating unit 216 for creating the index file and, each time a program is generated, adding an index, which defines the program and a title number, into the index file; and a control unit 217 for, each time a video stream is generated, generating and updating the clip information, playlist information, program, and index file, and performing a control to write the generated and updated clip information, playlist information, program, and index file onto the recording medium.

The items for the recording mode settings received by the setting receiving unit 207 includes: a setting of the 2D recording/3D recording; a setting of a display method such as interlace/progressive; and a setting of editable/non-editable to define the recording medium as an editable medium or a non-editable medium. The setting receiving unit 207 displays the setup menu having these items to receive settings input for the items from the user. The input settings are used to determine which of the AVC1080@60P/50P video stream or the MVC1080@24p/60i/50i video stream the input video is to be made into, and which of the editable medium or the non-editable medium a recording medium, on which the BDMV database obtained by the encoding is recorded, is to be made into. The settings are then confirmed and stored in the recording mode storage unit 208.

The multiplexer 209 causes the recording position of the starting packet among a plurality of packets obtained by dividing the Closed-GOP in the MVC1080@24p/50i/60i base-view video stream to precede the recording position of the starting packet among a plurality of packets obtained by dividing the Open-GOP in the MVC1080@24p/50i/60i dependent-view video stream, in the digital stream. Also, the multiplexer 209 causes all of the plurality of packets obtained by dividing the Open-GOP in the MVC1080@24p/50i/60i dependent-view video stream to be present before an entry address immediately after the entry address of the Closed-GOP in the MVC1080@24p/50i/60i base-view video stream.

As described in a previous embodiment, the RREF can manage only titles having a simple structure. Accordingly, a clip stream file generated by the recording operation before the stop operation is performed (including the MVC1080@24p/60i/50i video stream and the AVC1080@60P/50P video stream), a playlist file that has referred to this, and an operation mode object that has referred to this are managed as one title in the index file.

When a broadcast received from a TV broadcast station is to be recorded, the recording device includes: a selected station register storing a station setting in the own device; a receiving unit for obtaining a transport stream by receiving broadcast waves; and a demultiplexing unit for obtaining a video stream, an audio stream, and a subtitle stream by extracting TS packets in accordance with a PMT table corresponding to the station setting stored in the selected station register. The recording device performs transcoding and encoding onto the video stream, audio stream, and subtitle stream obtained by the demultiplexing. In this case, too, a clip stream file obtained by the encoding process performed by the recording operation before the stop operation is performed (including the MVC1080@24p/60i/50i video stream and the AVC1080@60P/50P video stream) is managed as one title through the operation mode object program.

Figure 33:
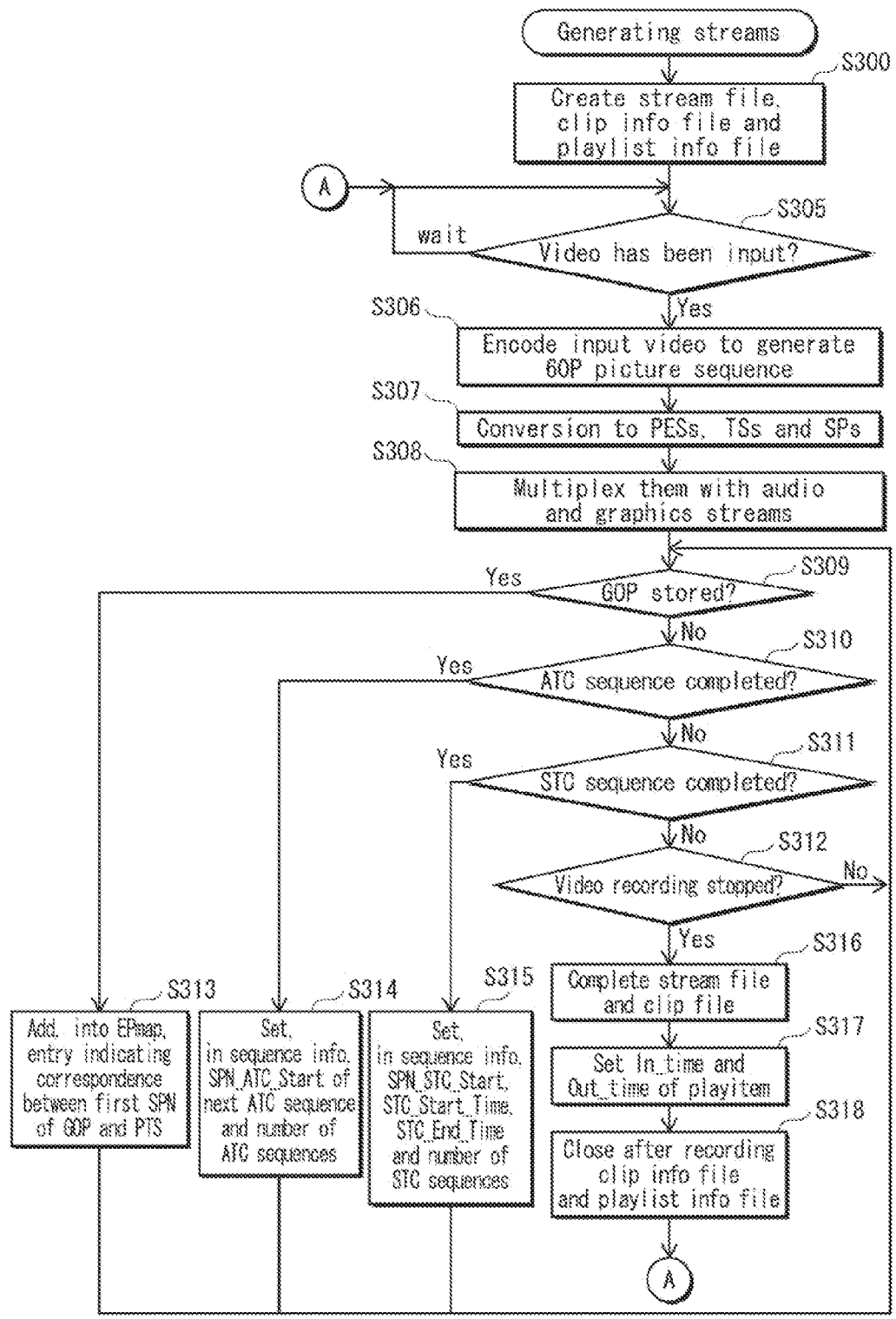
FIG. 33 is a flowchart illustrating the stream generation procedure.
Figure 34:
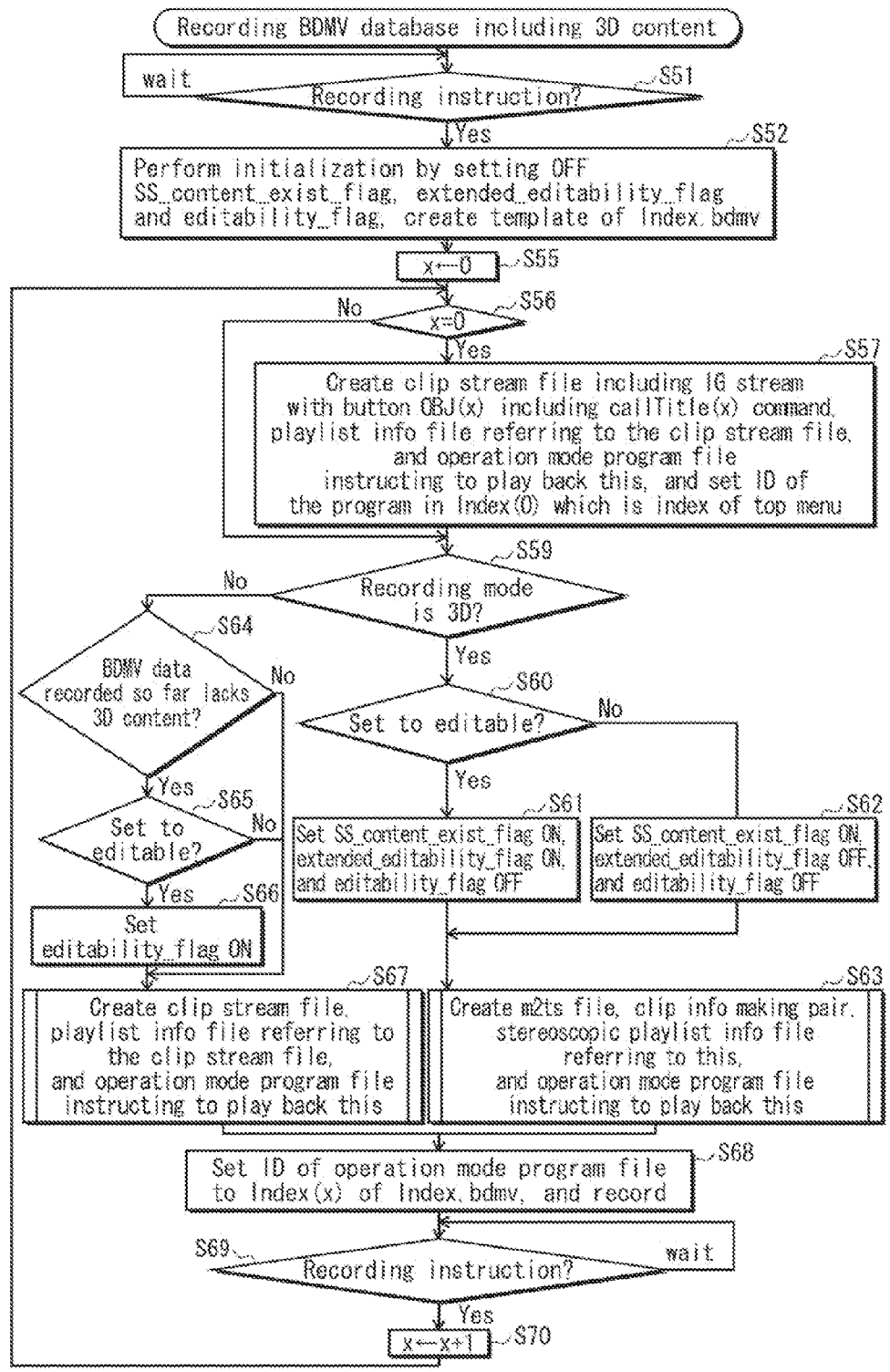
FIG. 34 is a flowchart illustrating the procedure of recording the BDMV database including the 3D content represented by the MVC1080@24p/50i/60i stream.

With regard to the structural elements of the recording device, the contents of the processes performed by the structural elements may be described in an object-oriented programming language, and then be implemented as software in the recording device. Here, the contents of the processes performed by the structural elements can be generalized as processing procedures for dealing with various external events and internal parameters of the device. Such generalized processing procedures are illustrated in the flowcharts of FIGS. 33-35. The following describes the processing procedure for implementing the structural elements of the recording device.

The main process in the procedure of the recording device is the stream generation procedure that is connected with the encoding process performed by the encoder. The AVC1080@60P/5 OP video stream, the MVC1080@24p/60i/50i base-view video stream, and the MVC1080@24p/60i/50i dependent-view video stream are generated by the stream generation procedure. A series of processes performed by the recording operation through the stop operation generate the clip stream file and playitem information corresponding thereto. The series of processes is called a stream generation process. Processes common to the AVC1080@60P/50P video stream and the MVC1080@24p/60i/50i video stream are illustrated in FIG. 33. FIG. 33 is a flowchart illustrating the stream generation procedure.

In step S300, a stream file, a clip information file and a playlist information file are created.

In step S305, an input of video is waited. When it is judged in step S305 that video has been input, the control proceeds to steps S306-S308. The steps S306-S308 are performed as follows. The input video is encoded and converted into a picture sequence (step S306). The picture sequence is converted to PES packets, TS packets, and source packets (step S307). The packets are multiplexed with audio and graphics streams (step S308).

Subsequently, the control proceeds to a loop of steps S309-S311.

In step S309, a storage state is monitored by checking whether or not storing GOPs is completed. In step S310, it is judged whether or not the ATC sequence is completed. In step S311, it is judged whether or not the STC sequence is completed. In step S312, it is judged whether or not a video recording stop operation has been entered. When it is judged in step S309 that storing GOPs is completed, the control proceeds to step S313 in which an entry indicating correspondence between the first source packet number of the first GOP and a presentation time stamp is added into the entry map. When it is judged in step S310 that the ATC sequence is completed, the control proceeds to step S314 in which SPN_ATC_Start, which is the first source packet number of the next ATC sequence and the number of ATC sequences are set in the sequence information of the clip information file. When it is judged in step S311 that the STC sequence is completed, the control proceeds to step S315 in which SPN_STC_Start, which is the first source packet number of the next STC sequence, STC_Start_time, which is the playback start time of the STC sequence and STC_End_time, which is the playback end time of the STC sequence, are set in the sequence information of the clip information file.

When it is judged in step S312 that a video recording stop operation has been entered, the stream file and the clip information file are completed (step S316), In_time and Out_time of the playitem information are set (step S317), and the clip information file and the playlist information file are recorded and then the process is closed (step S318). With the above process, the AVC1080@60P/50P video stream, the progressive or interlace MVC1080@24p/60i/50i base-view video stream, and the progressive or interlace MVC1080@24p/60i/50i dependent-view video stream are generated.

Suppose that a plurality of clip information files are referred to by one piece of playlist information and managed as one title. Then each time a clip information file is generated in the stream generation process, an index corresponding to the title needs to be added in the index file. The contents of the process for generating the index file vary depending on whether the MVC1080@24p/50i/60i video stream is recorded or the AVC1080@60P/50P video stream is recorded as the BDMV database. The following describes the index file generation procedure associated with the recording of the BDMV database, for each of the cases where the AVC1080@60P/50P video stream is recorded and where the MVC1080@24p/50i/60i video stream is recorded.

FIG. 34 is a flowchart illustrating the procedure of recording the BDMV database including the 3D content represented by the MVC1080@24p/50i/60i stream. In this flowchart, a variable x is a control variable for specifying a processing-target title. Accordingly, in the following description of the flowchart, the processing-target title in the $x^{th}$ round of process in a loop or an index in Index.bdmv is attached with an additional character [x].

In step S51, a judgment is made on whether a recording instruction has been input, thereby waiting for the instruction to be input. When it is judged in step S51 that a recording instruction has been input, the control proceeds to step S52 in which a template of Index.bdmv is created by performing an initialization by setting OFF all of the SS_content_exist_flag, extended_editability_flag and editability_flag in the AppInfoBDMV data. The control then proceeds to step S55 in which x is initialized to 0.

In step S56, it is judged whether or not variable x is 0. When it is judged in step S56 that variable x is 0, the control precedes to step S57 in which a clip stream file including an IG stream provided with a button object (x) including a CallTitle(x), a playlist information file referring thereto, and an operation mode object program instructing to play back this are created, and the identifier of the operation mode object program is set in Index(0) which is the index of the top menu title.

When it is judged in step S56 that variable x is not 0, the control proceeds to step S59. In step S59, it is judged whether or not the recording mode is the 3D recording mode. In step S60, it is judged whether or not the device is set to editable. When it is judged Yes in both of steps S59 and S60, the control proceeds to step S61 in which the SS_content_exist_flag is set ON, the extended_editability_flag is set ON and the editability_flag is set OFF in the AppInfoBDMV data. When it is judged Yes in step S59 and judged No in step S60, the control proceeds to step S62 in which the SS_content_exist_flag is set ON, the extended_editability_flag is set OFF and the editability_flag is set OFF in the AppInfoBDMV data. Subsequently, the control proceeds to step S63 in which an m2ts file and a clip information file that make a pair, a playlist information file referring to this, and an operation mode object program instructing to play back this are created, and the created files and program are recorded.

When it is judged in step S59 that the recording mode is not the 3D recording mode (step S59: No), the control proceeds to step S64. In step S64, it is judged whether or not the BDMV data recorded so far lacks a 3D video content of MVC1080@24p/50i/60i. In step S65, it is judged whether or not the device is set to editable. When it is judged Yes in both of steps S64 and S65, the control proceeds to step S66 in which the editability_flag is set ON. Subsequently, the control proceeds to step S67 in which a clip stream file, a playlist information file referring to this, and an operation mode object program instructing to play back this are created, and the created files and program are recorded. Subsequently, the control proceeds to step S68 in which the identifier of the operation mode object program is set in the index of Index-.bdmv.

Subsequently, the control proceeds to step S69. In step S69, it is judged whether or not a recording instruction has been input. When it is judged in step S69 that a recording instruction has been input, the control proceeds to step S70 in which the variable x is incremented, and the control returns to step S56. In this way, each time the loop circles around, the control variable x is incremented, and a title that is the data element specified by the variable is subjected to the process of this loop.

FIG. 35 is a flowchart illustrating the procedure of recording the BDMV database including Progressive Video represented by the AVC1080@60P/50P video stream. In this flowchart, a variable x is a control variable for specifying a processing-target title. Accordingly, in the following description of the flowchart, the processing-target information element in the $x^{th}$ round of process in a loop is attached with an additional character [x].

In step S401, a judgment is made on whether a recording instruction has been input, thereby waiting for the instruction to be input. When it is judged in step S401 that a recording instruction has been input, the control proceeds to step S402 in which a template of Index.bdmv is created by performing an initialization by setting OFF both the extended_editability_flag and editability_flag in the AppInfoBDMV data.

In step S404, it is judged whether the recording mode is the 60P mode or the 50P mode. In step S405, it is judged whether or not the device is set to editable. When it is judged Yes in both of steps S404 and S405, the control proceeds to step S406 in which the extended_editability_flag is set ON and the editability_flag is set OFF. When it is judged Yes in step S404 and No in step S405, the control proceeds to step S407 in which the extended_editability_flag is set OFF and the editability_flag is set OFF. Subsequently, the control proceeds to step S408 in which a clip stream file including progressive video represented by the AVC1080@60P/50P video stream, and a playlist information file including an entry permitting playback of progressive video represented by the AVC1080@60P/50P video stream, and an operation mode object program instructing to play back this are created, and the created files and program are recorded.

When it is judged No in step S404, the control proceeds to step S409. In step S409, it is judged whether or not BDMV database recorded so far lacks playlist including a progressive video entry permitting playback of a progressive video. In step S410, it is judged whether or not the device is set to editable. When it is judged Yes in both of steps S409 and S410, the control proceeds to step S411 in which the editability_flag is set ON. Subsequently, the control proceeds to step S412 in which a clip stream file not including a progressive video, a playlist information file including an entry permitting playback of a progressive video, and an operation mode object program instructing to play back this are created, and the created files and program are recorded. Subsequently, the control proceeds to step S413 in which the identifier of the operation mode object program is set in the index of Index-.bdmv. Subsequently, the control proceeds to step S414. In step S414, it is judged whether or not a recording instruction has been input. When it is judged in step S414 that a recording instruction has been input, the control proceeds to step S415 in which the variable x is incremented, and the control returns to step S404.

This completes the explanation of the recording device.

The following explains the editing unit 2004. FIG. 36 illustrates a detailed structure of the editing unit 2004. The editing unit 2004 includes a GUI processing unit 301, a management information memory 302, an editing capability register 303, a 2D/3D editability judging unit 304, a work memory 305, an editing control unit 306, and a user event processing unit 307.

The GUI processing unit 301 creates a GUI screen composed of GUI parts such as a scalable window, a slide bar, a pulldown menu, a button, and a software keyboard, and passes the GUI screen to the playback unit 2002, thereby causing the display device to display an editing GUI overlaid with a stereoscopic video. Also, the GUI processing unit 301 changes the state of the GUI screen in accordance with a user operation. In partial deletion, the GUI processing unit 301 outputs time codes, which are the In point and the Out point of the deletion range, to the editing control unit. In division, the GUI processing unit 301 outputs a time code that is a division point. When two or more titles are selected from a displayed list of titles as targets of integration, the GUI processing unit 301 outputs a set of playlists to be played back when the titles are selected. As a process specialized for RREF, the GUI processing unit 301 defines In_Time, Out_Time in a playitem of the alternative playlist, by receiving a specification of In_Time, Out_Time via the slide bar. The editing GUI can be drawn by an interactive control segment or an object definition segment of the IG stream in the menu playlist. Alternatively, the editing GUI may be drawn or described by using image data such as JPEG or GiFF, or OSD (On Screen Display) graphics or BML (Broadcast Markup Language).

The management information memory 302 is a buffer composed of memories or the like for storing management information such as an index file, a playlist file, and a clip information file which are input from the BD drive 2001.

The editing capability register 303 indicates whether or not the device has an editing capability. It is determined whether or not to edit the BDMV database, based on values set in this register, the editability_flag, and the extended_editability_flag.

The 2D/3D editability judging unit 304 judges whether or not the BDMV database, which is accessible from the BD drive, can be edited by the recording device, and whether or not editing should be prohibited. When the 2D/3D editability judging unit 304 judges that the BDMV database is "non-editable", the control is performed for the editing control unit 306 not to execute an editing process even if the editing control unit 306 receives an editing processing instruction from the user event processing unit 307.

The work memory 305 temporarily stores an intermediate result and a final result obtained through an editing process of the BDMV database.

The editing control unit 306, when the top menu is called and a list of titles are displayed, receives a user operation for editing a title that is in the focused state in the top menu. Upon receiving a user operation for editing the title, the editing control unit 306 loads an operation mode object program corresponding to the title, and starts a stream playback by a playlist by running the operation mode object program. This causes the playback unit to display a GUI, with a playback video of the title being embedded in a window. In the editing process, the control unit 306 reads a playlist information file and a clip information file from the optical disc 1000, reads a directory file of the BDMV directory and a file entry managed under the BDMV directory, and reads a directory file of the STREAM directory and a file entry managed under the STREAM directory from the recording medium.

The control unit 306 then performs the editing by using the playlist information file, clip information file, a file entry of the 1TS-2VSm2ts file, and the directory file of the STREAM directory. The reason why the file entry of the 1TS-2VSm2ts file, not the 1TS-2VSm2ts file itself, is the target of editing is that the RREF does not allow for a substantial editing that requires re-encoding of a stream or transcoding, and that editing such as a partial deletion, division and integration do not require re-encoding. When the editing, in which only the playlist information file, clip information file, 1TS-2VSm2ts file, directory file under the BDMV directory, and file entries are edited, is completed, the edited data is output to the driver so as to be re-written onto the recording medium.

In the editing process, the editing control unit 306 reads the file system management information of the file system of the disc, such as the directory file, file identification descriptor, and file entries, as well as the index file. The editing control unit 306 performs the editing of the clip information file by rewriting the allocation descriptor in the file entry and editing the file identification descriptor.

The operation for specifying the target of editing in the editing process is similar to the operation for selecting a title. That is to say, the device urges the user to select any of a plurality of titles in the index file, and causes an operation mode object program, playlist information file, and clip information file corresponding to the selected title to be read into a memory. The device then executes a partial deletion or division by, for example, updating a file entry, a file identification descriptor, and playlist information file and clip information file read into the memory.

The user event processing unit 307 requests the editing control unit 306 to perform a process in response to a user operation input via the remote control. For example, when the user presses a button on the remote control, the user event processing unit 307 runs a program that executes a command associated with the button, and, for example, instructs the editing control unit 306 to divide or delete recorded data via the remote control.

This completes the description of the structural elements of the editing unit 3004. A final editing result is obtained through various editing processes performed by the above structural elements. The following describes the editing unit 3004 by using a specific example of processes performed by the above structural elements, for better understanding thereof. The specific example of processes described here is an execution of a partial deletion of a stereoscopic fashion catalogue video. The partial deletion is classified into three cases: (i) a case where a front part of the stereoscopic video is deleted; (ii) a case where a last part of the stereoscopic video is deleted; (iii) a case where a middle part of the stereoscopic video is deleted. The description is provided for each of the three cases.

Figures 37A, 37B, 37C:
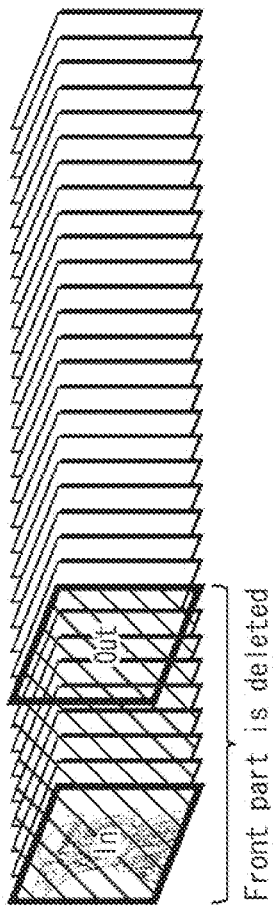
FIGS. 37A-37C illustrate the case where the front part is deleted.

FIGS. 37A-37C illustrate the case where the front part is deleted. Specifically, the front part is specified as the deletion range as illustrated in FIG. 37A, and the deletion is performed. The base-view components and dependent-view components belonging to the deletion range are present in the hatched portion of an Extent EXT[1] illustrated in FIG. 37B. It is supposed here that, after the deletion, the starting point of the Extent EXT[1] is represented by n11, and the data length is represented by len11. In this case, allocation descriptors of the Extent EXT[1] in the m2ts file are written as illustrated in FIG. 37C. That is to say, the starting LBN and data length of the Extent EXT[1] are described as "n11: len11".

Figure 38:
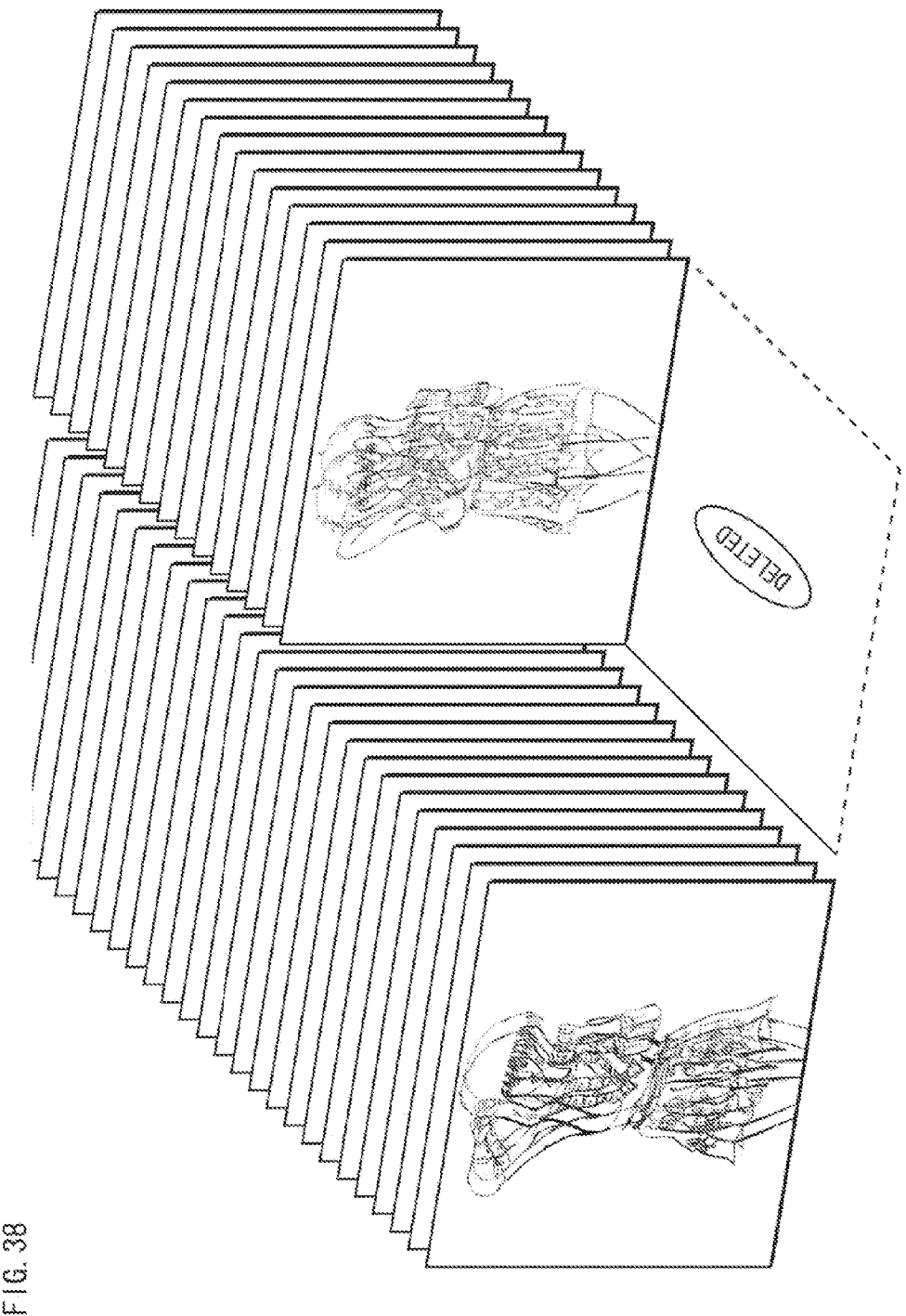
FIG. 38 illustrates how stereoscopic video images change due to deletion of the front part.
Figure 39:
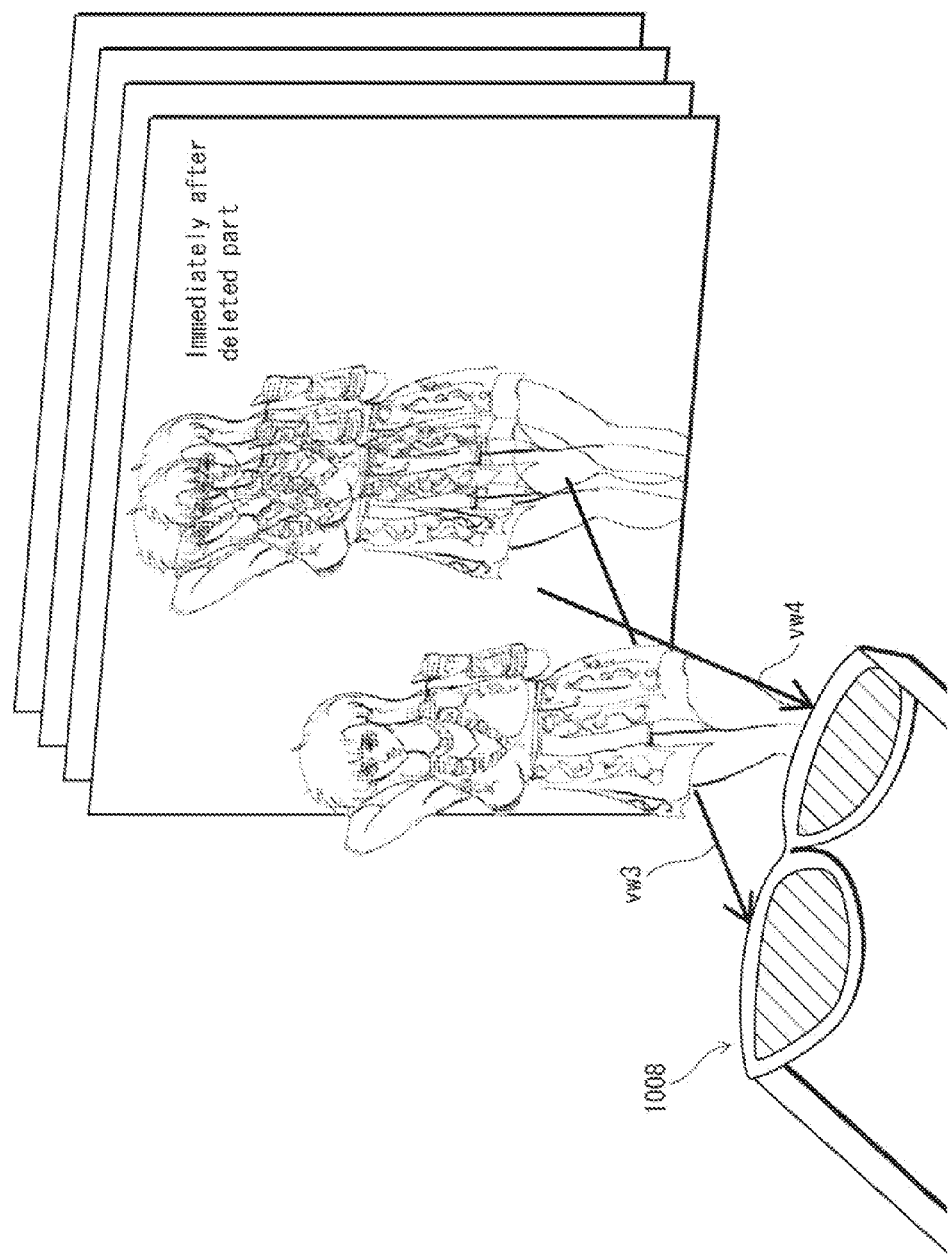
FIG. 39 illustrates a stereoscopic video image that is viewed by wearing the 3D glasses.

It should be noted here that, when an Extent that includes a base-view component and a dependent-view component is deleted, either one of the left-eye and right-eye images is not left undeleted. Accordingly, there is no fear that an incompatibility may occur between the left-eye and right-eye images. FIG. 38 illustrates how stereoscopic video images change due to deletion of the front part. The left-hand side of the drawing illustrates the original stereoscopic video images, and the right-hand side of the drawing illustrates the stereoscopic video images after the deletion of the front part thereof. The deleted front part, indicated by "DELETED" in the drawing, becomes unrecognized by the device, and a frame image of a female model that had followed the deleted front part becomes the starting frame image. FIG. 39 illustrates a stereoscopic video image that is viewed by wearing the 3D glasses. A line of sight vw3 represents reception of an image when the active-shutter-type glasses 1008 block light transmission to the right eye. A line of sight vw4 represents reception of an image when the active-shutter-type glasses 1008 block light transmission to the left eye. The line of sight vw3 indicates that the left-eye image is viewed. Also, the line of sight vw4 indicates that the right-eye image is viewed. By wearing the active-shutter-type glasses 1008, the user alternately views the left-eye and right-eye images, and the stereoscopic image is played back.

In the case where FIGS. 38 and 39 illustrate the stereoscopic fashion catalogue video, an image of a model that is not suitable for a product, or an image of an out-of-season product can be deleted easily.

Figures 40A, 40B, 40C:
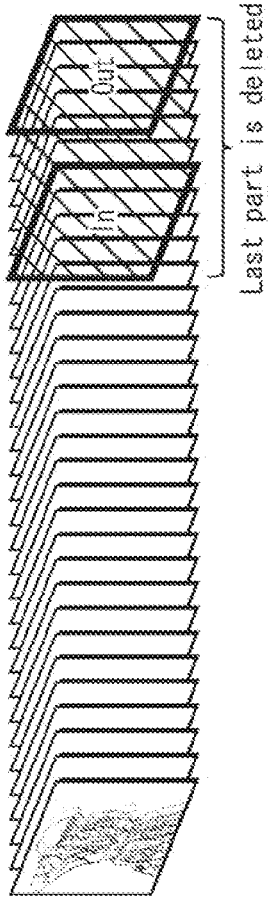
FIGS. 40A-40C illustrate the case where the last part is deleted.

FIGS. 40A-40C illustrate the case where the last part is deleted. Specifically, the last part is specified as the deletion range as illustrated in FIG. 40A, and the deletion is performed. The base-view components of the MVC1080@24p/60i/50i base-view video stream and dependent-view components of the MVC1080@24p/60i/50i dependent-view video stream belonging to the deletion range are present in the hatched portion of an Extent EXT[7] illustrated in FIG. 40B. It is supposed here that, after the deletion, the data length of the Extent EXT[7] is represented by len17. In this case, the allocation descriptor of the Extent EXT[7] in the m2ts file is written as illustrated in FIG. 40C. That is to say, the data length of the Extent EXT[7] is rewritten as "len17". As described above, a part of the Extent EXT[7] that includes a base-view component and a dependent-view component is deleted.

Figures 41A, 41B, 41C, 41D:
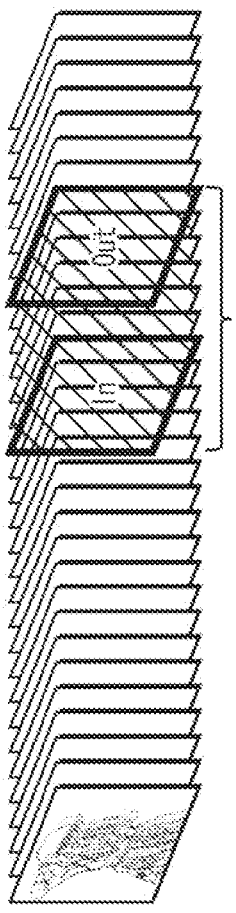
FIGS. 41A-41D illustrate the case where the middle part is deleted.

FIGS. 41A-41D illustrate the case where the middle part is deleted. Specifically, the middle part is specified as the deletion range as illustrated in FIG. 41A, and the deletion is performed. The base-view components of the MVC1080@24p/60i/50i base-view video stream and dependent-view components of the MVC1080@24p/60i/50i dependent-view video stream belonging to the deletion range are present in the hatched portion of an Extent EXT[5] illustrated in FIG. 41B. It is supposed here that, after the deletion, the starting point of the Extent EXT[5] is represented by n15, and the data length is represented by len15.

In this case, an Extent that precedes the deletion range and an Extent that succeeds the deletion range become different files. FIG. 41C illustrates allocation descriptors of the m2ts file that precedes the deletion range; and FIG. 41D illustrates allocation descriptors of the m2ts file that succeeds the deletion range. As illustrated in FIG. 41C, the allocation descriptors of the m2ts file that precedes the deletion range are allocation descriptors having Extent IDs "1" through "4", among the allocation descriptors of the m2ts file before deletion.

Also, as illustrated in FIG. 41D, the allocation descriptors of the m2ts file that succeeds the deletion range are allocation descriptors having Extent IDs "5" through "7", among the allocation descriptors of the m2ts file before deletion. Among these allocation descriptors, the allocation descriptor having EXT[5] is written as illustrated in FIG. 41D. That is to say, the starting LBN and data length of the Extent EXT[5] are rewritten as "n15: len15".

The division is operated in the same manner as the deletion of the middle part. More specifically, a division point, instead of the deletion range in case of the partial deletion, is set in the time axis, and the m2ts file is divided at the division point into two m2ts files.

This completes the description of the editing unit.

Note that the processes of partial deletion illustrated in FIGS. 37-41 are merely examples of a limited aspect. On the other hand, to commercialize a product that causes a device to perform various editing procedures including the partial deletion, it is necessary to cover various arrangement patterns of Extents. FIGS. 42-48 illustrate flowcharts indicating generalized procedures of the partial deletion presuming such various patterns.

Figure 42:
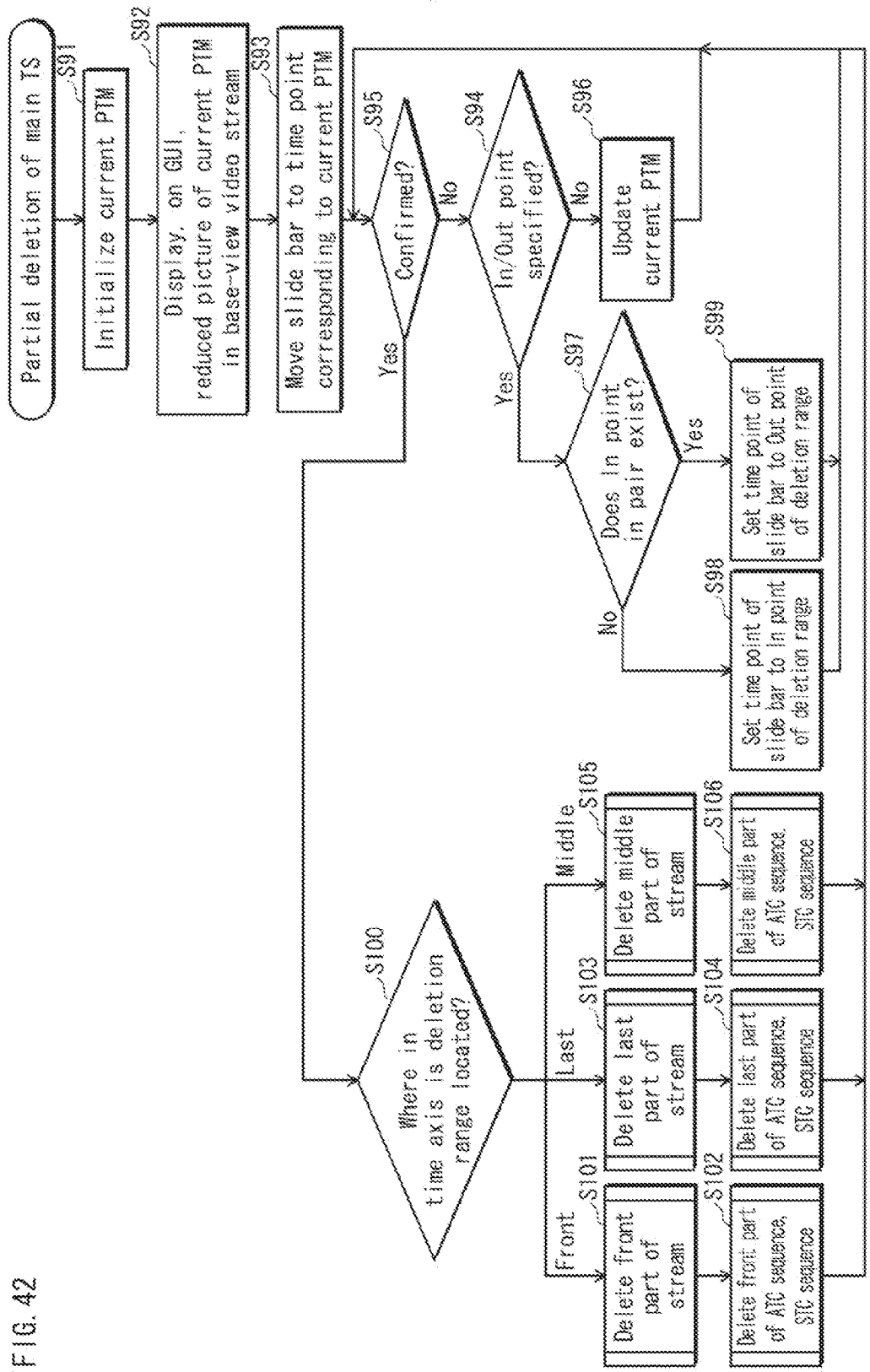
FIG. 42 is a flowchart illustrating the procedure for partial deletion of the main TS.

FIG. 42 is a flowchart illustrating the procedure for partial deletion of the main TS. This flowchart is the highest-ranked main routine, and is executed only when it is judged, in the judgment on the editability illustrated in FIG. 9 using the set value "X" in the extended_editability_flag of the AppInfoBDMV data in the Index.bdmv, that the medium is treated as an editable medium.

In step S91, the current PTM is initialized. In step S92, a reduced picture of the current PTM in the MVC1080@24p/60i/50i base-view video stream is displayed on the GUI. In step S93, the slide bar is moved to a time point corresponding to the current PTM, and then the control proceeds to a loop composed of steps S94-S96. In step S94, it is judged whether or not In/Out point has been specified. In step S95, it is judged whether or not In/Out point has been confirmed. In step S96, the current PTM is updated. When it is judged Yes in step S94, the control proceeds to step S97. In step S97, it is judged whether or not it is an Out point and an In point paired with the Out point exists. When it is judged that an In point paired with the Out point does not exist (No in step S97), it means that it is the first specification of In point. When it is judged No in step S97, the control proceeds to step S98 in which the time point of the slide bar is set to the In point of the deletion range, and the control returns to the loop. When it is judged Yes in step S97, the control proceeds to step S99 in which the time point of the slide bar is set to the Out point of the deletion range, and the control returns to the loop.

After the deletion range is confirmed, it is judge Yes in step S95, and the control proceeds to step S100. In step S100, it is judged where in the time axis the deletion range is located. When it is judged that the deletion range is located at the front part, the control proceeds to step S101 in which the front part of the stream is deleted, and then the control proceeds to step S102 in which the front parts of the ATC sequence and the STC sequence are deleted. When it is judged that the deletion range is located at the last part, the control proceeds to step S103 in which the last part of the stream is deleted, and then the control proceeds to step S104 in which the last parts of the ATC sequence and the STC sequence are deleted. When it is judged that the deletion range is located at the middle part, the control proceeds to step S105 in which the middle part of the stream is deleted, and then the control proceeds to step S106 in which the middle parts of the ATC sequence and the STC sequence are deleted.

Figure 43:
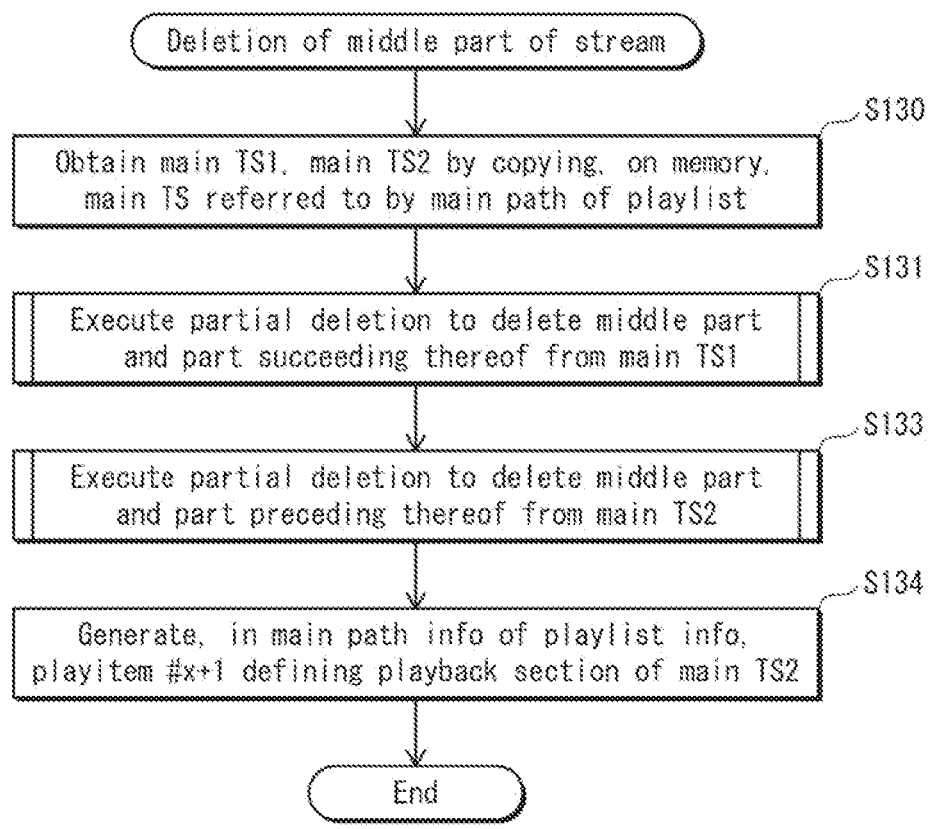
FIG. 43 is a flowchart illustrating the procedure for deletion of a middle part of a stream.

FIG. 43 is a flowchart illustrating the procedure for deletion of a middle part of a stream. This flowchart is a detailed expansion of the procedure of step S106 of the flowchart of FIG. 42 that is the highest-ranked routine. Note that in the following description, two transport streams newly obtained during deletion of the middle part of the main TS are referred to as main TS1 and main TS2. Also, two playitems corresponding to the main TS1 and main TS2 are referred to as "PlayItem#x" and "PlayItem#x+1".

In step S130, the main TS1 and main TS2 are obtained by copying the main TS referred to by the main path information of the 3D playlist. In step S131, the specified middle part and a part succeeding the middle part of the main TS1 are specified as a new "deletion range", and a partial deletion is executed. In step S133, the specified middle part and a part preceding the middle part of the main TS2 are specified as a new "deletion range", and a partial deletion is executed, and the remaining part of the main TS2 is recorded as sub TS2.

In step S134, playitem information #x that defines a playback section in the main TS1, and playitem information #x+1 that defines a playback section in the main TS2, are generated in the main path information in the playlist information.

In the deletion of a part of stream illustrated in each of the above flowcharts, when the deletion range corresponds to one Extent, the starting address and the data length described in an allocation descriptor corresponding to the deletion range are deleted, and the next and onward Extents are moved forward in the order and the vacant Extent ID is filled thereby. However, in the actuality, it is rare that the deletion range overlaps with an Extent of the same size, and therefor in general, most cases are a partial overlap. The partial overlap is processed as illustrated in FIGS. 44 and 45.

Figure 44:
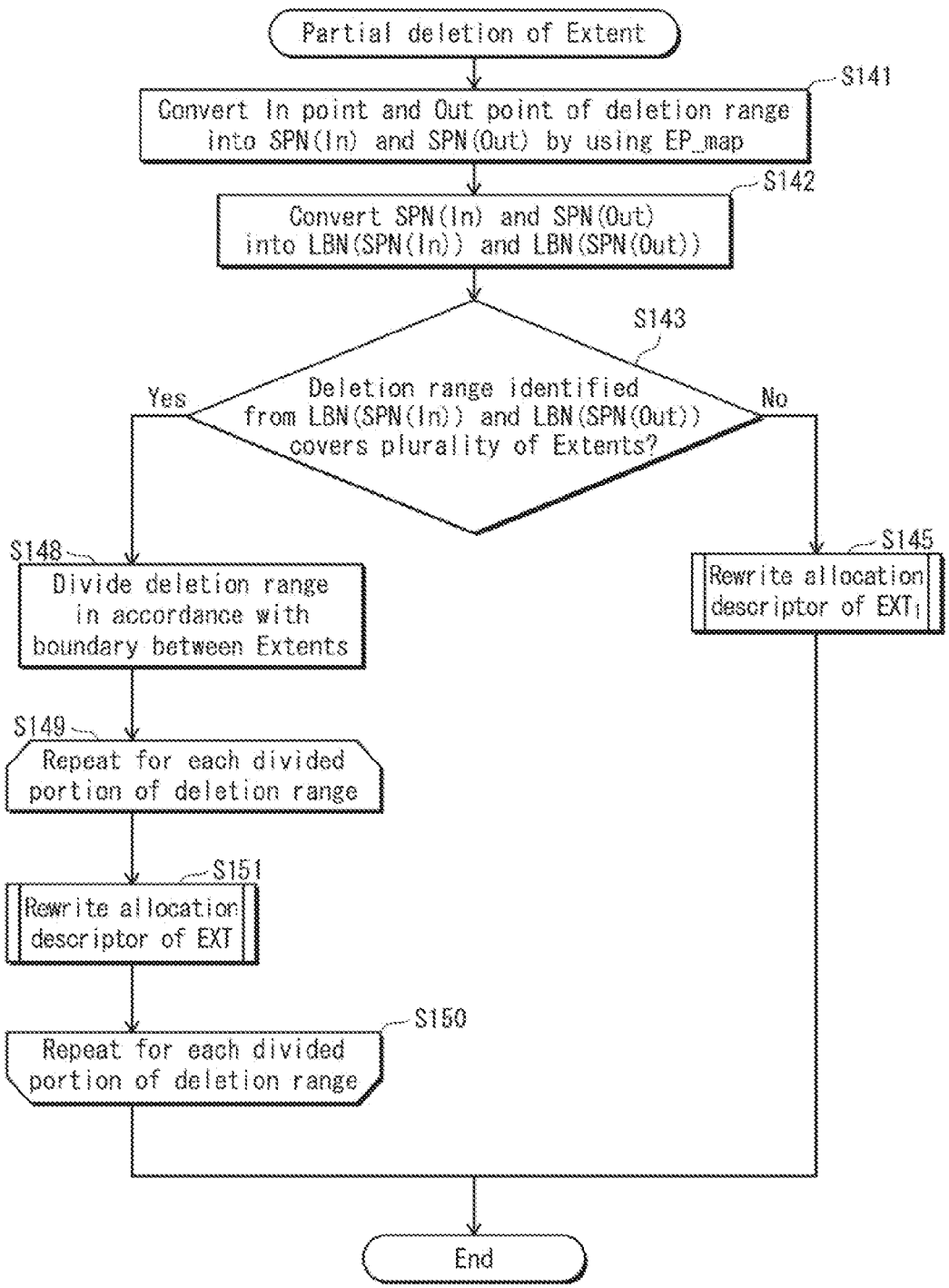
FIG. 44 is a flowchart illustrating the partial deletion of Extent.
Figure 45:
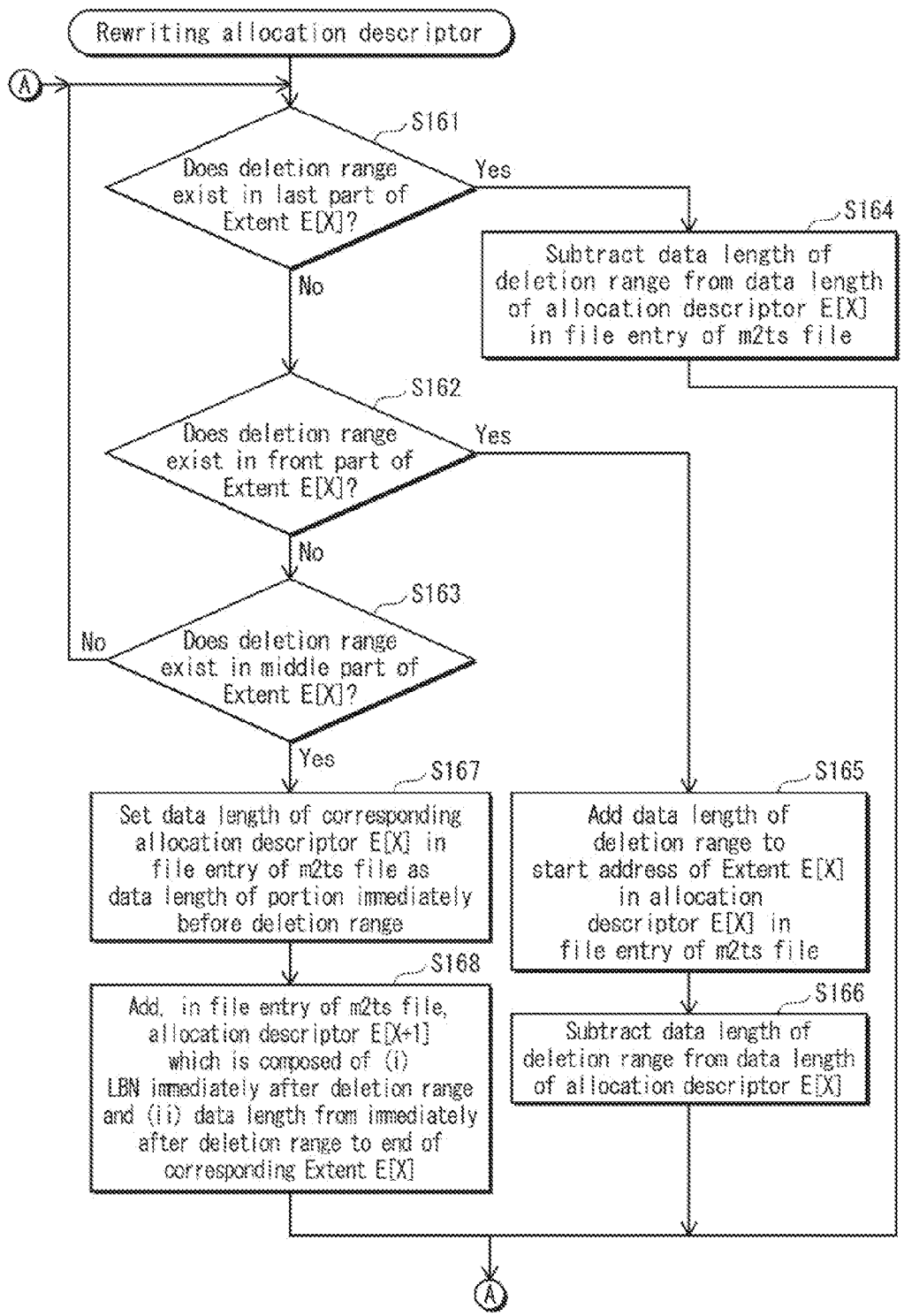
FIG. 45 is a flowchart illustrating the rewriting of allocation descriptors.

FIG. 44 is a flowchart illustrating the partial deletion of Extent. This flowchart is a detailed expansion of the procedure of steps S131, S133 of the flowchart of FIG. 43 illustrating the higher-ranked routine. In this flowchart, variables "In" and "Out" are control variables for specifying the starting point and end point of a processing-target deletion range.

In step S141, the In point and Out point of the deletion range in time axis are converted into SPN(In) and SPN(Out) by using the EP_map. In step S142, SPN(In) and SPN(Out) are converted into logical addresses in the recording medium, thereby LBN(SPN(In)) and LBN(SPN(Out)) indicating the location of the deletion range in the target Extent are obtained. In step S143, it is judged whether or not the deletion range identified by LBN(SPN(In)) and LBN(SPN(Out)) covers a plurality of Extents. When it is judged that the deletion range exists in one Extent, the control proceeds to step S145 in which the allocation descriptor of EXT is rewritten.

When it is judged that the deletion range covers a plurality of Extents, the control proceeds to step S148 in which the deletion range is divided in accordance with the boundary between Extents, and the rewriting of the allocation descriptor of Extent in step S151 is repeated for each of the divided portions obtained by the division (step S149). The loop ends on a condition that it is judged Yes in a step, and the control unit maintains the same state until this condition is satisfied. Each time the loop circles around, the control variables "In" and "Out" are changed to values of the next data element, and the data element indicated by the control variables is subjected to the process of the loop. The processing structure is to process each of a plurality of data elements each time the loop circles around.

FIG. 45 is a flowchart illustrating the rewriting of allocation descriptors. This flowchart is a detailed expansion of the procedure of steps S145, S151 of the flowchart of FIG. 44 illustrating the higher-ranked routine. In this flowchart, variable "E[x]" is a control variable for specifying an Extent and an allocation descriptor as the processing target. Accordingly, in the following description of the flowchart, the processing-target Extent and allocation descriptor in the $x^{th}$ round of process in a loop are referred to as "Extent E[x]" and "allocation descriptor E[x]", respectively.

In the present flowchart, the control first goes to a loop composed of steps S161-S162-S163. In step S161, it is judged whether or not the deletion range exists in the last part of Extent E[x]. In step S162, it is judged whether or not the deletion range exists in the front part of Extent E[x]. In step S163, it is judged whether or not the deletion range exists in the middle part of Extent E[x]. The contents of the judgment step correspond to a plurality of location patterns of the deletion range in the Extent, and a process corresponding to a value that may be taken by the deletion range is executed. The judgment step has a role of branching the processing procedure to an appropriate procedure depending on the location pattern, among a plurality of predetermined location patterns of the deletion range, which is taken by the processing-target Extent.

When it is judged Yes in step S161, the control proceeds to step S164 in which the last part of Extent E[x] is cut by subtracting the data length of the deletion range from the data length of the allocation descriptor E[x] in the file entry of the m2ts file. When it is judged Yes in step S162, the control proceeds to step S165 in which the front part of Extent E[x] is cut by first adding the data length of the deletion range to the starting address of Extent E[x] in the allocation descriptor E[x] in the file entry of the m2ts file, and then in step S166, subtracting the data length of the deletion range from the data length of the allocation descriptor E[x].

When it is judged that the deletion range exists in the middle part of Extent E[x], the data length of the corresponding allocation descriptor E[x] in the file entry of the m2ts file is set as the data length of the portion immediately before the deletion range (step S167), and an allocation descriptor E[x+1] which is composed of (i) an LBN immediately after the deletion range and (ii) the data length from immediately after the deletion range to the end of the Extent E[x] is added in the file entry of the m2ts file (step S168).

Figure 46A:
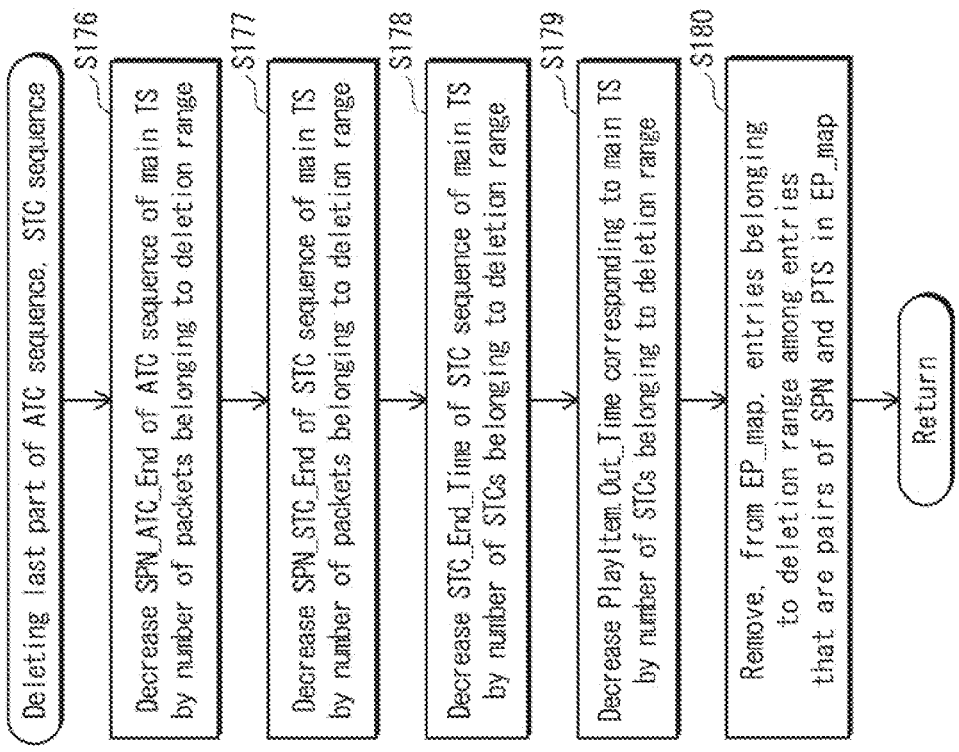
FIGS. 46A and 46B illustrate the procedures for deleting the front part and end part of ATC sequence and STC sequence.

FIG. 46A illustrates the procedure for deleting the front part of ATC sequence, STC sequence. This flowchart is a detailed expansion of the procedure of step S102 of the flowchart of FIG. 42 that is the higher-ranked routine.

In step S171, the SPN_ATC_Start of the ATC sequence of the main TS is increased by the number of packets belonging to the deletion range. In step S172, the SPN_STC_Start of the STC sequence of the main TS is increased by the number of packets belonging to the deletion range. In step S173, the STC_Start_Time of the STC sequence of the main TS is increased by the number of STCs belonging to the deletion range. In step S174, the PlayItem.In_Time corresponding to the main TS is increased by the number of STCs belonging to the deletion range. In step S175, among the entries that are pairs of SPN and PTS in the EP_map, entries belonging to the deletion range are removed from the EP_map.

Figure 46B:
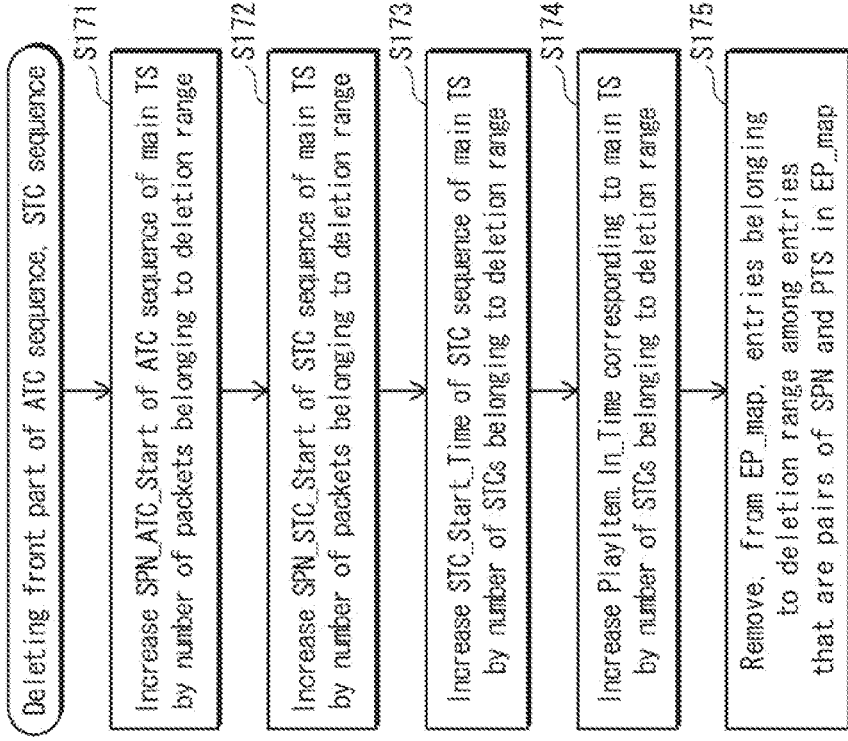

FIG. 46B illustrates the procedure for deleting the last part of ATC sequence, STC sequence. This flowchart is a detailed expansion of the procedure of step S104 of the flowchart of FIG. 42 that is the higher-ranked routine.

In step S176, the SPN_ATC_End of the ATC sequence of the main TS is decreased by the number of packets belonging to the deletion range. In step S177, the SPN_STC_End of the STC sequence of the main TS is decreased by the number of packets belonging to the deletion range. In step S178, the STC_End_Time of the STC sequence of the main TS is decreased by the number of STCs belonging to the deletion range. In step S179, the PlayItem.Out_Time corresponding to the main TS is decreased by the number of STCs belonging to the deletion range. In step S180, among the entries that are pairs of SPN and PTS in the EP_map, entries belonging to the deletion range are removed from the EP_map.

Figure 47:
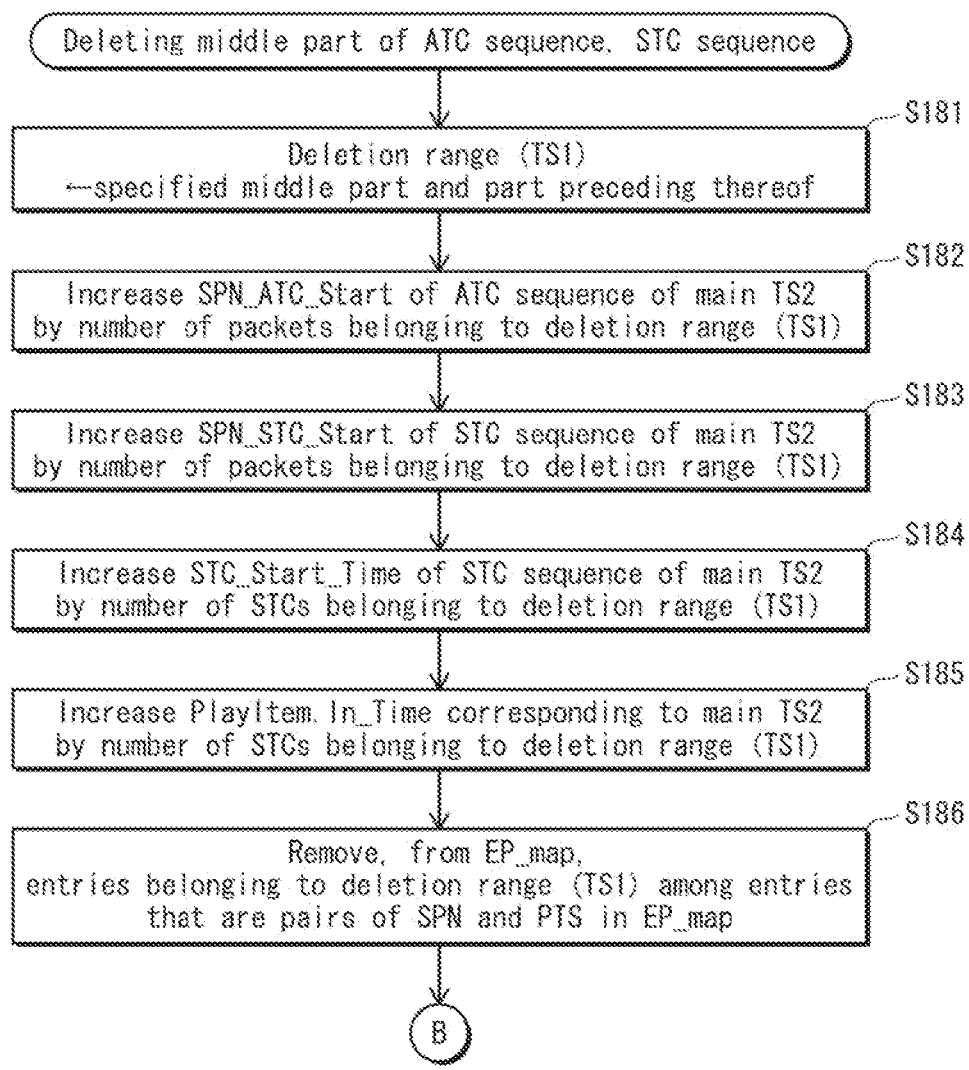
FIG. 47 illustrates the procedure for deleting the middle part of ATC sequence and STC sequence.

FIG. 47 illustrates the procedure for deleting the middle part of ATC sequence, STC sequence. This flowchart is a detailed expansion of the procedure of step S106 of the flowchart of FIG. 42 that is the higher-ranked routine.

In step S181, the specified middle part and the part preceding thereof are set as the deletion range (TS1), the control proceeds to step S182 in which the SPN_ATC_Start of the ATC sequence of the main TS2 is increased by the number of packets belonging to the deletion range (TS1). In step S183, the SPN_STC_Start of the STC sequence of the main TS2 is increased by the number of packets belonging to the deletion range (TS1). In step S184, the STC_Start_Time of the STC sequence of the main TS2 is increased by the number of STCs belonging to the deletion range (TS1). In step S185, the PlayItem.In_Time corresponding to the main TS2 is increased by the number of STCs belonging to the deletion range (TS1). In step S186, among the entries that are pairs of SPN and PTS in the EP_map, entries belonging to the deletion range (TS1) are removed from the EP_map.

Figure 48:
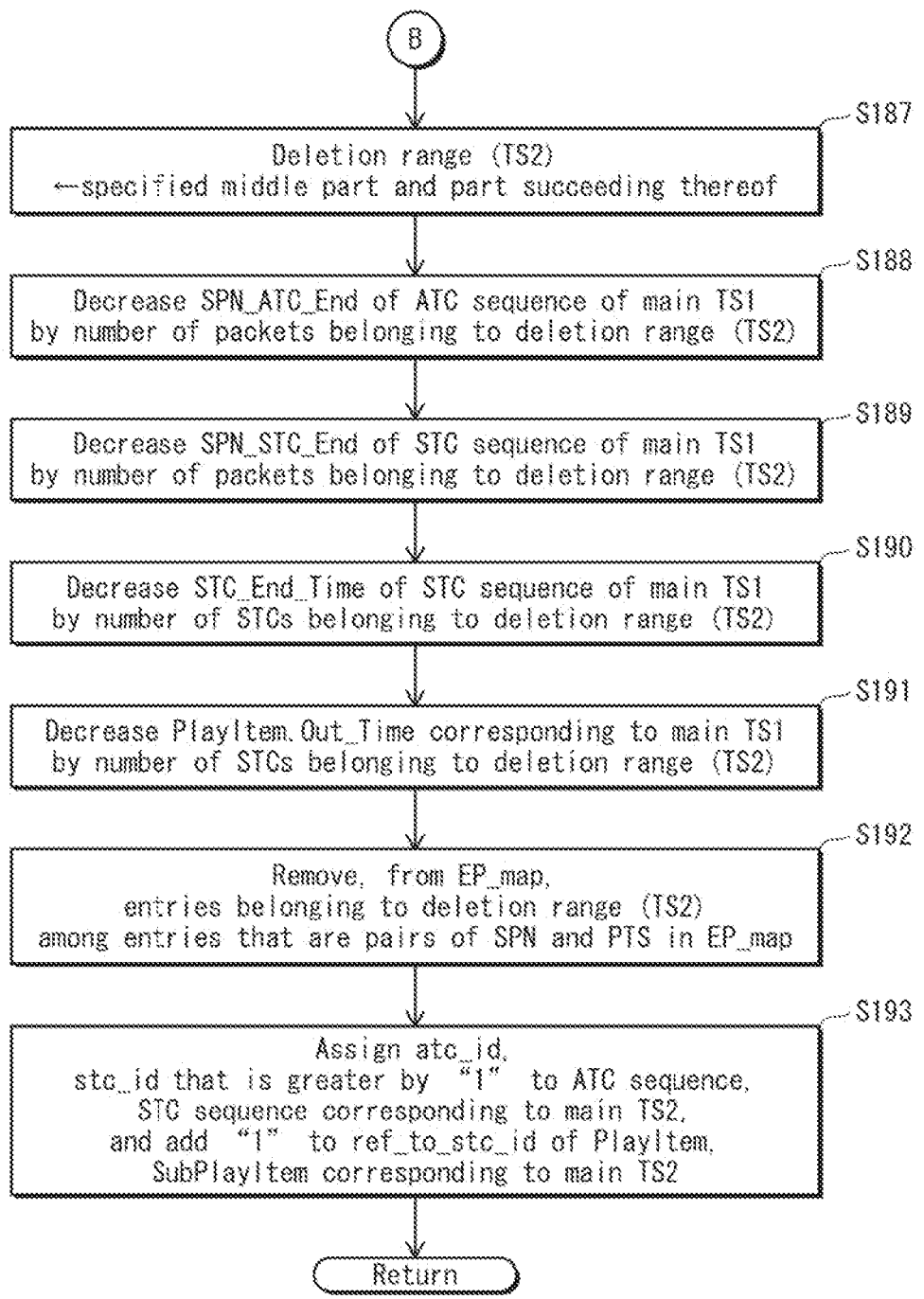
FIG. 48 illustrates a continuation of the procedure for deleting the middle part of ATC sequence and STC sequence.

FIG. 48 illustrates a continuation of the procedure for deleting the middle part of ATC sequence, STC sequence. In step S187, the specified middle part and a part succeeding the middle part are set as the deletion range (TS2). In step S188, the SPN_ATC_End of the ATC sequence of the main TS1 is decreased by the number of packets belonging to the deletion range (TS2). In step S189, the SPN_STC_End of the STC sequence of the main TS1 is decreased by the number of packets belonging to the deletion range (TS2). In step S190, the STC_End_Time of the STC sequence of the main TS1 is decreased by the number of STCs belonging to the deletion range (TS2). In step S191, the PlayItem.Out_Time corresponding to the main TS1 is decreased by the number of STCs belonging to the deletion range (TS2). In step S192, among the entries that are pairs of SPN and PTS in the EP_map, entries belonging to the deletion range (TS2) are removed from the EP_map. In step S193, the atc_id, stc_id that is greater by "1" is assigned to the ATC sequence, STC sequence corresponding to the main TS2, and add "1" to the ref_to_stc_id of PlayItem, SubPlayItem corresponding to the main TS2.

Figure 49:
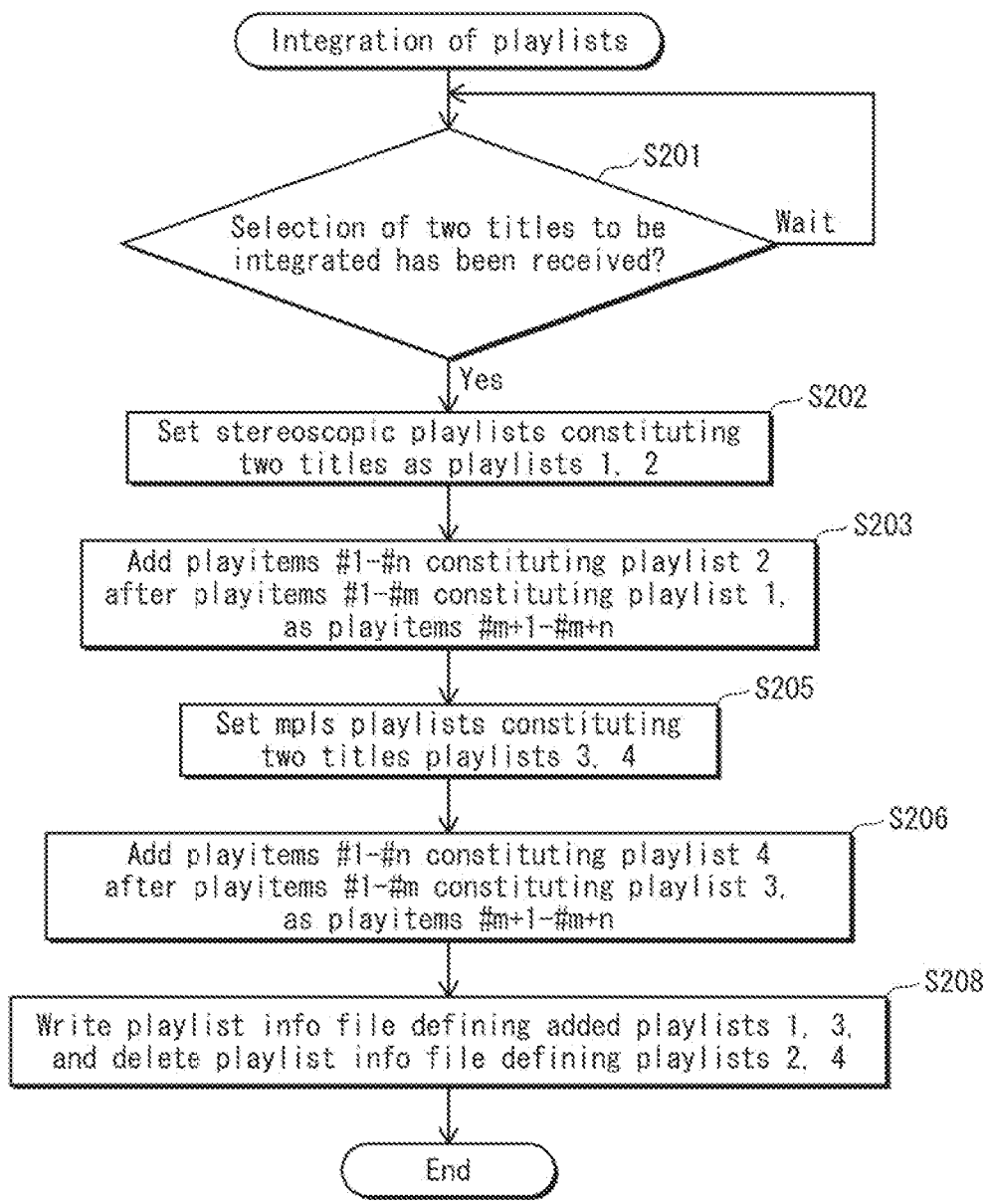
FIG. 49 is a flowchart illustrating the procedure for the integration of playlists.

FIG. 49 is a flowchart illustrating the procedure for the integration of playlists. This flowchart is also executed only when it is judged, in the judgment on the editability using the set value "X" in the extended_editability_flag of the AppInfoBDMV data in the Index.bdmv, that the medium is treated as an editable medium. In the present flowchart, two playlists that are targets of integration are referred to as playlists 1 and 2. In step S201, a selection of two titles to be integrated is received. When a selection is received, the control proceeds to step S202 in which the 3D playlists constituting the two titles are set as playlists 1, 2. In step S203, playitem information #1-#n constituting the playlist 2 are added after playitem information #1-#m constituting the playlist 1, as playitems #m+1#m+n.

In step S205, mpls playlists constituting the two titles are set as playlists 3, 4. In step S206, playitem information #1-#n constituting the playlist 4 are added after playitem information #1-#m constituting the playlist 3, as playitems #m+1-#m+n. In step S208, playlist information files defining the added playlists 1, 3 are written, and playlist information files defining the playlists 2, 4 are deleted.

Each of the above-described processes is provided as a subroutine, and is executed only after a call is made from a higher flowchart. When each of these processes ends, the control returns to a process in the higher flowchart. With this structure, after the hardware resource is restored, the process in the higher flowchart is resumed.

As described above, according to the present embodiment, the function to edit a stereoscopic video can be added by a function expansion without greatly changing the hardware or software structure of the Blu-ray Recording disc player and the Blu-ray Rewritable disc player that are the basis of the device. This enables the product manufacturers to produce new products while making use of the design know-how that have been acquired through the past product development, and shorten the design period for the application products.

Embodiment 9

The present embodiment relates to an improvement in which a BD-J application, whose operation is defined by a BD-J object, realizes playback of an interlace 3D and a playlist including a stream selection table which includes an entry permitting playback of the AVC1080@60P/50P video stream.

When an editing application for RREF is implemented as a system application that runs on the BD-J platform, the APIs that can be used thereby include "Java2Micro_Edition (J2ME) Personal Basis Profile (PBP 1.0)" and "Globally Executable MHP specification (GEM1.0.2) for package media targets". Use of these APIs makes it possible to realize controls with use of the data structures and playback units described in the above embodiments by using the extension API for the BD-J platform (called "BD-J extension") such as java.net for the network process, java.awt for the GUI process, java.lang for the language process, java.io for the input/output process with the recording medium, and java.util which is a utility. The BD-J extension includes methods having been inherited from the methods of the following classes: java.net, java.awt, java.lang, java.io, java.util, and javax.media. The interface of these classes is provided as an embedded interface or a super interface. It is therefore possible to create an application that is suited for playback of the playlist of the AVC1080@60P/50P video stream, as an extension of a programming technique using the classes: java.net, java.awt, java.lang, java.io, java.util, and javax.media.

For example, the extension API in the BD-J platform includes a get method that instructs to obtain a value held by b4 of PSR31, PSR29, b3 of PSR231, or b8, b9 of PSR24.

The methods of the set/get class include methods inherited from the methods of java.lang.object class. Also, when an argument in a method call is inauthentic, the java.lang.IllegalArgumentException event, which is an event of the java.lang class, is thrown. Since the class has inherited the methods and events of java.lang.object, the programmer can create a program that uses values held by the PSR, as an extension of java.lang.object.

In the present embodiment, a procedure for playing back a playlist including a stream selection table having an entry for which playback of the AVC1080@60P/50P video stream is permitted, and a procedure for playing back a playlist including an interlace 3D, are described in an object-oriented programming language as follows.

i) An instance of a BDLocator class, which takes a file path of the above playlist file (bd://1.PLAYLIST:00001) as an argument, is generated. Let "loc" denote an instance variable of the BDLocator class, and then "BDLocator loc=newBDlocator(bd://1.PLAYLIST:00001" is described.

ii) An instance of a MediaLocator class, which takes a variable name of the instance variable of the BDLocator class as an argument, is generated. Let "loc" denote the variable name of the instance variable of the BDLocator class, and let "ml" denote a variable name of an instance variable of the MediaLocator class, and the following is described:

MediaLocator ml=new MediaLocator(loc)

iii) An instance of a javax.media.Manager.creat playback device class, which takes a variable name of the instance variable of the MediaLocator class as an argument, namely a player instance, is generated. Let "m1" denote the variable name of the instance variable of the MediaLocator class, and "PlaybackDevice" denote a variable name of an instance variable of the player instance, and then "PlaybackDevice=Manager.creatPlaybackDevice(m1)" is described.

iv) Lastly, start( ), which is a member function of a JMF player instance, is called to start the playback of the playlist. When "PlaybackDevice" denotes the variable name of the instance variable of the player instance, "Player.start( )" is described. By conditioning the above playlist playback with use of a capability value obtained by a status obtaining method, it is possible to describe, in an object-oriented programming language, a code that causes a playlist to be played back only when a capability such as the one described in Embodiment 6 is provided.

The following describes the HAVi device configuration. The HAVi device configuration of the BD-J terminal adopts a layer model in which a screen overlay is realized by overlaying: a background plane device for storing a decoded image of JPEG image as the background image; a subtitle plane device for storing a subtitle to be displayed; and a BD-J plane device for drawing a menu or a gadget. In the 3D output mode, each of the background plane device, subtitle plane device, and BD-J plane device is composed of left-eye and right-eye plane memories. As restrictions on playback of the AVC1080@60P/50P video stream and the MVC1080@60i/50i video stream, scaling of the video plane device is not permitted, and the background plane is set to non-display.

The following describes restrictions defined in the BDM-VRecording Specification. When b4 of PSR29 is set to "1", or when b8, b9 of PSR24 is set to "1", the player does not support video scaling or playback of the AVC1080@60P/50P video stream and the MVC1080@60i/50i video stream. While the AVC1080@60P/50P video stream or the 3D interlaced video stream is played back, the background plane is maintained to be set in the non-visible state, or only an update of the stored content is performed. While the AVC1080@60P/50P video stream or the 3D interlaced video stream is played back, the scaling API call returns FALSE. This means that the set transform API of the background plane playback control of JavaTV returns FALSE. Also, the size set API call of the AWTvideosize control returns FALSE as well.

While the MVC1080@50i/60i or AVC1080@60P/50P is played back, the scaling API call by the BD-J application fails. This means that "org.dvb.media.BackgroundVideoPresentationcontrol.setVideoTransformation" returns FALSE.

The JMF players of older versions operate as follows. When PSR31 indicates a version lower than 0250, the implementation depends on a situation where a JMF player is prefetched or started in the case where a player of version X uses a playlist of version Y(Y>X). In this situation, a method that is the same as a method used by any of the prefetched or started JMF players is held. When the BD-J application plays back a playlist of version 2.5 or after, a code for avoiding connection in terms of compatibility is used. This code has been programmed as follows.

The version indicated by PSR31 is checked.
The version of the playlist is compared with the version indicated by PSR31.
The playlist is played back when the version indicated by PSR31 is higher than the version of the playlist. When the version indicated by PSR31 is lower than the version of the playlist, an alternative playlist or a playlist of a lower version is played back.
When the version Y of the playlist satisfies Y>X, it fails by issuing a resource unavailable event.

In the BD-J package of the player device, a system API defining prefetch of the playlist information (blulay.prefetched.playlistloagding) is present. In the situation where the version Y of the playlist satisfies Y>X, the operation of the JMF player by the "blulay.prefetched.playlistloagding" changes as well. The JMF player should not be played back when the "blulay.prefetched.playlistloagding" is set to No or an undefined value. This is because a normal playback cannot be guaranteed if a playlist of a version higher than that of the player device is played back. If the Start method or SyncStart method, which are method functions of the JMF player, is called from a BD-J application, the player device needs to return the ResourceUnavailable event to the BD-J application.

The JMF player should not be played back even if the "blulay.prefetched.playlistloagding" is set to Yes. This is because a normal playback cannot be guaranteed if a playlist of a version higher than that of the player device is played back. If the Start method or SyncStart method, which are method functions of the JMF player, is called from a BD-J application, the player device needs to return the ResourceUnavailable event to the BD-J application.

As defined in JavaTV, when ResorceAvailableEvent occurs, the JMF player needs to be closed. When the JMF player is closed, the operation of the JMF player becomes undefined.

Embodiment 10

The following describes restrictions imposed on the PG stream and IG stream in the Blu-ray Rewritable disc version 2.5, and restrictions imposed on the IG stream in the RREF.

An overlap may be present in the active period of the presentation control segment in the PG stream, but an overlap should not be present in the active period of the interactive control segment in the IG stream. This is because the PG stream assumes a decoder model that performs decoding by the pipeline.

A value "PTS(DSn[PCS])" of the presentation time stamp of the packet, which stores the presentation control segment PCS that belongs to the $n^{th}$ display set DSn and defines the interactive control of the PG stream, indicates the end point of the active period of the presentation control segment. A value "DTS(DSn+1[PCS])" of the decode time stamp of the packet, which stores the presentation control segment PCS that belongs to the display set DSn+1 that is immediately after the display set DSn, indicates the start point of the active period of the presentation control segment.

A value "PTS(DSn[ICS])" of the presentation time stamp of the packet, which stores the interactive control segment ICS that belongs to the $n^{th}$ display set DSn and defines the interactive control of the IG stream, indicates the end point of the active period of the interactive control segment. A value "DTS(DSn+1[ICS])" of the decode time stamp of the packet, which stores the interactive control segment ICS that belongs to the display set DSn+1 that is immediately after the display set DSn, indicates the start point of the active period of the interactive control segment. In this case, the playback times of the two presentation control segments and interactive control segments belonging to different display sets differ by one frame or two frames. The difference depends on the frame rate. When the related video stream is the AVC1080@60P/50P video stream, the following is satisfied.

$$PTS(DSn[PCS|ICS])+(90000/\text{frame\_rate})\times 2 \leq PTS(DSn+1[PCS|ICS])$$

When the related video stream is not the AVC1080@60P/50P video stream, the following is satisfied.

$$PTS(DSn[PCS|ICS])+(90000/\text{frame\_rate}) \leq PTS(DSn+1[PCS|ICS])$$

Embodiment 11

The above embodiments are described on the premise that one transport stream, which is a multiplex of the base-view video stream and the dependent-view video stream, is edited. In the present embodiment, editing such as a partial deletion, division and integration is performed on a stereoscopic interleaved stream file in which a transport stream including the base-view video stream and a transport stream including the dependent-view video stream are arranged in an interleaved manner.

FIGS. 50A and 50B illustrate one example of a recording area of the stereoscopic interleaved stream file (ssif file). FIG. 50A illustrates a plurality of Extents constituting an ssif file. FIG. 50B illustrates file system information pertaining to the recording area. As illustrated in FIG. 50B, the file system information includes a directory file of the SSIF directory and a file entry of the ssif file. The SSIF directory file includes: a file identification descriptor of the SSIF directory; and a file identification descriptor of the ssif file. The file entry of the ssif file includes a descriptor tag, an ICB tag, an allocation descriptor length, and an allocation descriptor sequence. The "descriptor tag" is a tag that indicates that the descriptor itself is a file entry. The "ICB tag" is a tag that indicates attribute information of the file entry itself. The lead line indicates the close-up of the structure of the allocation descriptor sequence. As indicated by the close-up, each Extent ID that identifies each Extent is associated with a pair of the starting address of an Extent and the data length of the Extent (n1:len1, n2:len2, n3:len3 . . . ). That is to say, the ssif file illustrated in FIG. 50A is composed of 10 Extents: EXT2[1], EXT1[2], EXT2[3], EXT1[4], EXT2[5], EXTss[6], EXT2[7], EXTss[8], EXT2D[9], and EXT2D[10]. The starting addresses (LBN=n1, n2, n3 . . . ) and data lengths (len1, len2, len3 . . . ) of these Extents are described in the allocation descriptor of the file entry corresponding to the ssif file. The recording devices and playback devices recognize the substance of an Extent as the data continuing from the starting address described in the allocation descriptor. Accordingly, the front part of an Extent can be deleted by rewriting the LBN to a greater value and shortening the data length in the allocation descriptor. Also, the last part of an Extent can be deleted by maintaining the starting address and shortening the data length in the allocation descriptor.

A device supporting the file system accesses a file in accordance with the allocation descriptor. Accordingly, if description corresponding to a part of a file is removed from the description in the allocation descriptor, the presence of the part of the file is no more recognized by the device. In FIG. 50A, a value "x" in a pair of parentheses ([x]) denotes an Extent ID. Let "x" denote an arbitrary value taken by the Extent ID, then the ssif file is a file composed of four types of Extents: (1) EXT1[x] which can be accessed in both the 2D output mode and the 3D output mode; (2) EXT2[x] which can be accessed only in the 3D output mode; (3) EXT2D[x] which can be accessed only in the 2D output mode; and (4) EXTss[x] which is a copy of EXT1[x] and can be accessed only in the 3D output mode.

The ssif file is opened in any of three formats depending on the aspect of use. The three formats are: m2ts file; file base; and file dependent.

Figure 51:
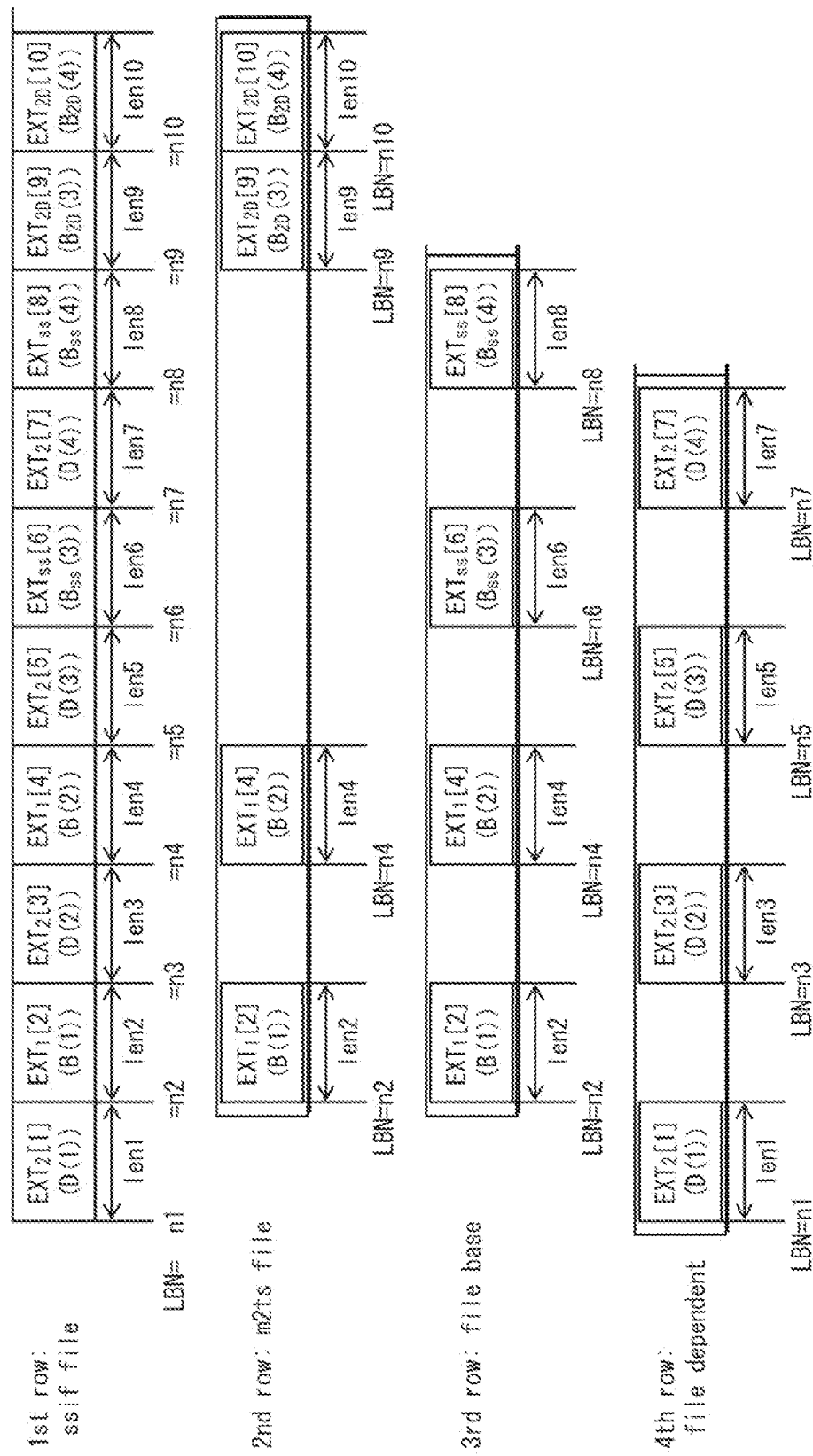
FIG. 51 illustrates how Extents included in an ssif file become the structural elements of the files of the three formats.

FIG. 51 illustrates how Extents included in an ssif file become the structural elements of the files of the three formats.

One or more Extents in the ssif file constitutes one data block. The data block is classified into: a base-view data block composed of Closed-GOPs and Open-GOPs as the base-view components; and a dependent-view data block composed of Open-GOPs as the dependent-view components. In the interleave format of the ssif file, the dependent-view data block and the base-view data block are arranged alternately. For the sake of simplification, it is presumed here that the data block is composed of one Extent.

In FIG. 51, each of the dependent-view data blocks and the base-view data blocks is assigned with a data block number (1, 2, 3, 4, . . . ). The data block numbers are ordinal numbers of the data blocks in the ssif file, and data blocks having the same number are read together from the ssif file. In this way, it is possible to create variations of the ssif file by changing the combination of the three types of Extents (EXT2[x], EXTss[x], and EXT2D[x]).

In FIG. 51, the first row illustrates the Extents constituting the ssif file. The second row illustrates a file (m2ts file) that is composed of base-view data blocks and 2D base-view data blocks. The m2ts file is composed of four Extents: EXT1[2], EXT1[4], EXT2D [9], and EXT2D[10]. These Extents include base-view data blocks B[1], B[2], b2D[3], and b2D[4] that constitute the main TS that includes the MVC1080@24p/60i/50i base-view video stream. Thus, when the file is opened, the base-view data blocks and the 2D base-view data blocks are read into the memory.

The third row illustrates a file (file base) that is composed of only base-view data blocks. The file base is composed of four Extents EXT1[2], EXT1[4], EXTss[6], and EXTss[6]. These Extents include base-view data blocks B[1], B[2], Bss[3], and Bss[4], and thus, when the file base is opened, the base-view data blocks are read into the memory.

The fourth row illustrates a file (file dependent) that is composed of only dependent-view data blocks. The file dependent is composed of four Extents EXT2[1], EXT2[3], EXT2[5], and EXT2[7]. These Extents include dependent-view data blocks D[1], D[2], D[3], and D[4]. Thus, when the file dependent is opened, a source packet sequence constituting the dependent-view data blocks constituting the sub TS including the MVC1080@24p/60i/50i dependent-view video stream is read into the memory.

As described above, the ssif file is opened as any of the m2ts file, the file base and the file dependent by reading necessary Extents among the Extents constituting the ssif file.

Furthermore, since the Extents included in the ssif file are defined by the allocation descriptor as described above, the ssif file is read in a format corresponding to the output mode by the recording device. The above-described EXT1[x], EXT2[x], EXT2D[x], and EXTss[x] constitute different stream files such as the file base, file dependent and m2ts file. Thus these Extents each need to have a sufficient length as not to cause an underflow in the read buffer. The following explains the lower limit of each of the Extents constituting the file base, file dependent and m2ts file. The lower limit of EXT1[x] of the file base is determined so that an underflow does not occur in a double buffer in a jump period which extends from the last Extent in a base-view data block to the first Extent in the next dependent-view data block, and a jump period which extends from the last Extent in the dependent-view data block to the first Extent in the next base-view data block, during a playback in the 3D output mode. Here, the double buffer is composed of a first read buffer and a second read buffer. The first read buffer is the same as the read buffer provided in a playback device for playing back the Blu-ray ReadOnly disc in the 2D output mode.

Here, let TFjump3D(n) denote the time period required for a jump from the last Extent in the $n^{th}$ base-view data block to the first Extent in the $p^{th}$ dependent-view data block, and let TBjump3D(n) denote the time period required for a jump from the last Extent in the $p^{th}$ dependent-view data block to the first Extent in the $(n+1)^{th}$ base-view data block. Note that TFjump3D(n) and TBjump3D(n) are jump time periods in the 3D output mode in the BD-3D player model.

Also, let Rud3D denote the speed at which each base-view data block is read into the first read buffer and at which each dependent-view data block is read into the second read buffer, and let Rbext3D denote the average speed at which the base-view data block is transferred from the first read buffer to the video decoder. Then, the lower limit of EXT1[n] is represented by the following expression for the condition A.

Lower limit of EXT1$[n]$≥(Rud3D×Rbext3D)/(Rud3D−Rbext3D)×(TFjump3D($n$)+EXT2$[n]$/(Rud3D+TBjump3D($n$)))   <Condition A>

The lower limit of EXT2[n] is determined so that an underflow does not occur in the double buffer in a jump period which extends from an Extent in a dependent-view data block to an Extent in the next base-view data block, and a jump period which extends from an Extent in the base-view data block to an Extent in the next dependent-view data block, during a playback in the 3D output mode. Here, let TFjump3D(n+1) denote the time period required for a jump from the last Extent in the $(n+1)^{th}$ base-view data block to the first Extent in the $(p+1)^{th}$ dependent-view data block, and let Rdext3D denote the average speed at which the dependent-view video stream file is transferred from the second read buffer to the decoder. Then, the lower limit of EXT2[n] is represented by the following expression for the condition B. Note that the speed Rud3D and the average speed Rbext3D are the speeds in the 3D output mode in the BD-3D player model.

Lower limit of EXT2$[n]$≤(Rud3D×Rbext3D)/(Rud3D−Rdext3D)×(TBjump3D($n$)+EXT1$[n+1]$/(Rud3D+TFjump3D($n+1$)))   <Condition B>

The lower limit of EXT2D is determined so that an underflow does not occur in the read buffer of the playback device in a jump period which extends from the last Extent in a base-view data block to the first Extent in the next base-view data block, during a playback in the non-3D output mode.

Here, let Tjump2D(n) denote the time period required for a jump from the n$^{th}$ base-view data block to the (n+1)$^{th}$ base-view data block, let Rud2D denote the speed at which each base-view data block is read into the read buffer, and let Rbext2D denote the average speed at which the base-view data block is transferred from the read buffer to the video decoder. Then, the lower limit of EXT2D is represented by the following expression for the condition C.

Lower limit of EXT2D≤(*Rud2D*×*Rb*ext2D)/(*Rud2D*−
  *Rb*ext2D)×*T*jump2D(*n*)    <Condition C>

EXTss is calculated as follows. When a jump from a reading of an Extent to the next Extent is to be made, the buffer should be occupied by a sufficient amount of data immediately before the jump. Accordingly, when a stereoscopic interleaved stream file is to be read, the read buffer needs to store one Extent, and occurrence of a buffer under flow should be avoided. Accordingly, Sextss, which is the minimum Extent size is calculated as a value satisfying the following Condition D.

*S*ext*SS*[Byte]≤ceil[(*T*jump+*T*diff×*Rud*72)/(1000×8)]×
  (*R*ext*ss*×192)/(*Rud*72×188−*R*ext*ss*×192)]    <Condition D>

In the above Condition D, Rud72 represents a data rate of 72 mbps in transfer from the BD-ROM drive in the 3D output mode, and Tdiff represents a delay time that occurs when reading Extent EXT2[n] constituting a dependent-view data block.

This completes the explanation of how Extents are allocated in accordance with BD-ROM part3-1 2.4. In the Blu-ray Rewritable version 3.1 format, the stereoscopic interleaved stream files need to be allocated in the same manner as above. Without this allocation, the seamless playback cannot be guaranteed.

This completes the explanation of the Extents constituting the ssif file. Having finished explaining the ssif file structure, a description is given of the stream structure of the ssif file. In the stream structure of the ssif file, a main transport stream (main TS) including a base-view stream is stored in a base-view component, and a sub transport stream (sub TS) including a dependent-view stream is stored in a dependent-view component. Accordingly, a base-view component and a dependent-view component are generated by performing the following processes in order: (1) generating elementary streams; (2) generating transport streams; and (3) converting the TS (transport stream) packets constituting the transport streams into source packets.

Figure 52:
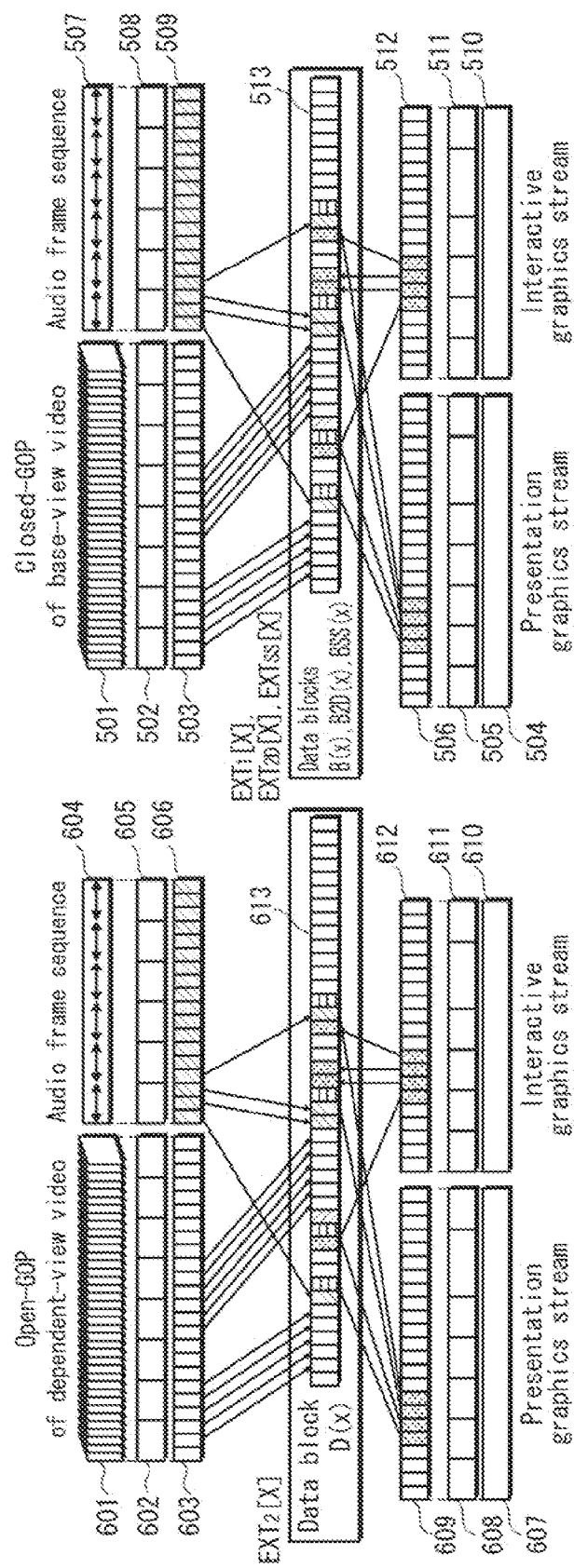
FIG. 52 illustrates the procedure for generating the dependent-view data block and the base-view data block.

FIG. 52 illustrates the procedure for generating the dependent-view data block and the base-view data block.

The right-hand side of FIG. 52 schematically illustrates how base-view data blocks (B[x], b2D[x], Bss[x]) to be stored in Extent EXT1[x] are generated by multiplexing. First, Closed-GOP 501, which is composed of base-view components, and a plurality of audio frames 507, which are access units of the audio stream, are converted into PES packet sequences 502 and 508, and further into TS packets 503 and 509, respectively.

Similarly, data of a PG stream 504 and an interactive graphics 510 are converted into PES packet sequences 505 and 511, and further into TS packets 506 and 512, respectively. The base-view data block is generated by multiplexing these TS packets into one stream. The base-view data block is stored in EXT1[x], EXT2D[x], and EXTss[x] illustrated in FIG. 51. A transport stream including the base-view video stream obtained in the above procedure is called "main TS".

As described above, the parent-screen video stream, audio stream, PG stream, and IG stream are multiplexed into the Closed-GOP of the base-view data block.

The left-hand side of FIG. 52 schematically illustrates how a dependent-view data block (D[x]) to be stored in Extent EXT2[x] is generated by multiplexing. First, Open-GOP 601, which is composed of dependent-view components, and a plurality of audio frames 604, which constitute the audio stream, are converted into PES packet sequences 602 and 605, and further into TS packets 603 and 606, respectively. Similarly, data of a PG stream 607 and an interactive graphics 610 are converted into PES packet sequences 608 and 611, and further into TS packets 606 and 612, respectively. The dependent-view data block is generated by multiplexing these TS packets into one stream. The dependent-view data block is stored in EXT2[x] as illustrated in FIG. 52. Also, a transport stream including the dependent-view video stream obtained in the above multiplexing procedure for generating the transport stream is called "sub TS".

Figure 53:
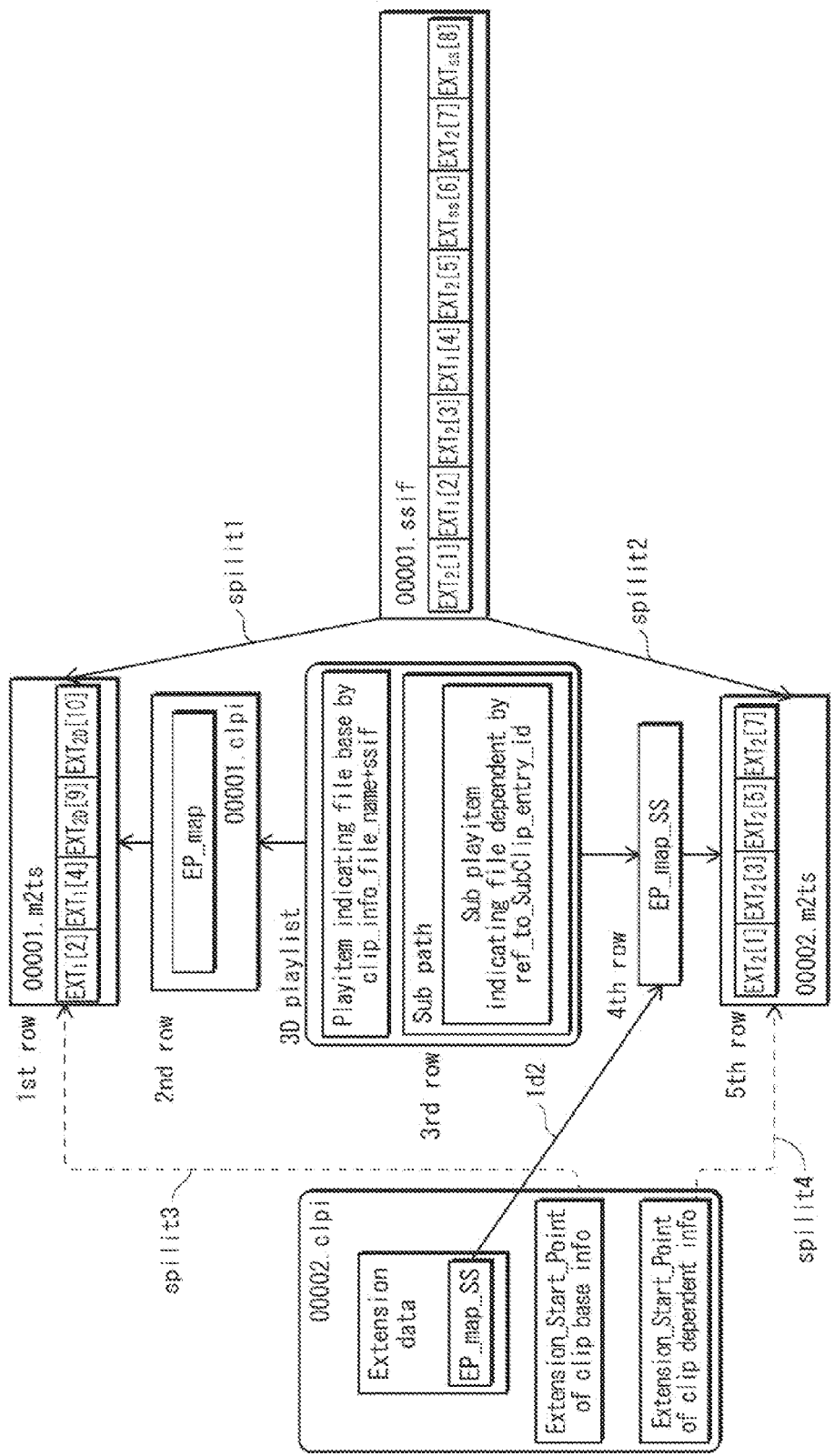
FIG. 53 illustrates the relationships among the clip information file, playlist, and ssif file.

FIG. 53 illustrates the relationships among the clip information file, playlist, and stereoscopic interleaved stream file. The right-hand side of FIG. 53 illustrates the stereoscopic interleaved stream file, and the left-hand side illustrates the clip information file.

The arrows split1 and split2 indicate that an m2ts file and a file dependent are obtained by dividing the stereoscopic interleaved stream file on the right-hand side. In the middle portion of FIG. 53, the first row illustrates Extents EXT1[x], EXT2D[x] constituting the m2ts file, the second row illustrates the basic entry map (EP_map) in 00001.clpi that is clip information for the m2ts file, the third row illustrates a 3D playlist, the fourth row illustrates EP_map_SS which is a stereoscopic version of the entry map, and the fifth row illustrates Extent EXT2[x] constituting the file dependent.

As illustrated on the left-hand side of FIG. 53, the clip information file for the file base and file dependent includes EP_map_SS in the characteristic point information, extent start point information for the file base, and extent start point information for extracting Extents for the file dependent. The arrows split3 and split4 schematically indicate that the extent start point information for the file base and for extracting Extents for the file dependent provides a method for dividing the stereoscopic interleaved stream file.

The following describes the characteristic point information. The characteristic point information SS includes EP_map_SS. The EP_map_SS, as is the case with the basic entry map, includes a plurality of entry points. However, the EP_map_SS differs from the basic entry map in that the following restrictions are imposed on it. That is to say, when an Extent, which is specified by an Extent ID value of clip information of application type "=1" (namely, clip information of application type "primary video stream"), includes a source packet that is referred to by PTS_EP_Start of the base-view video stream, an Extent, which is specified by the same Extent ID value of clip information of application type "=8" (namely, "stereoscopic playback"), must include a source packet that is referred to by PTS_EP_Start of the same value of the dependent-view video stream.

Figure 54:
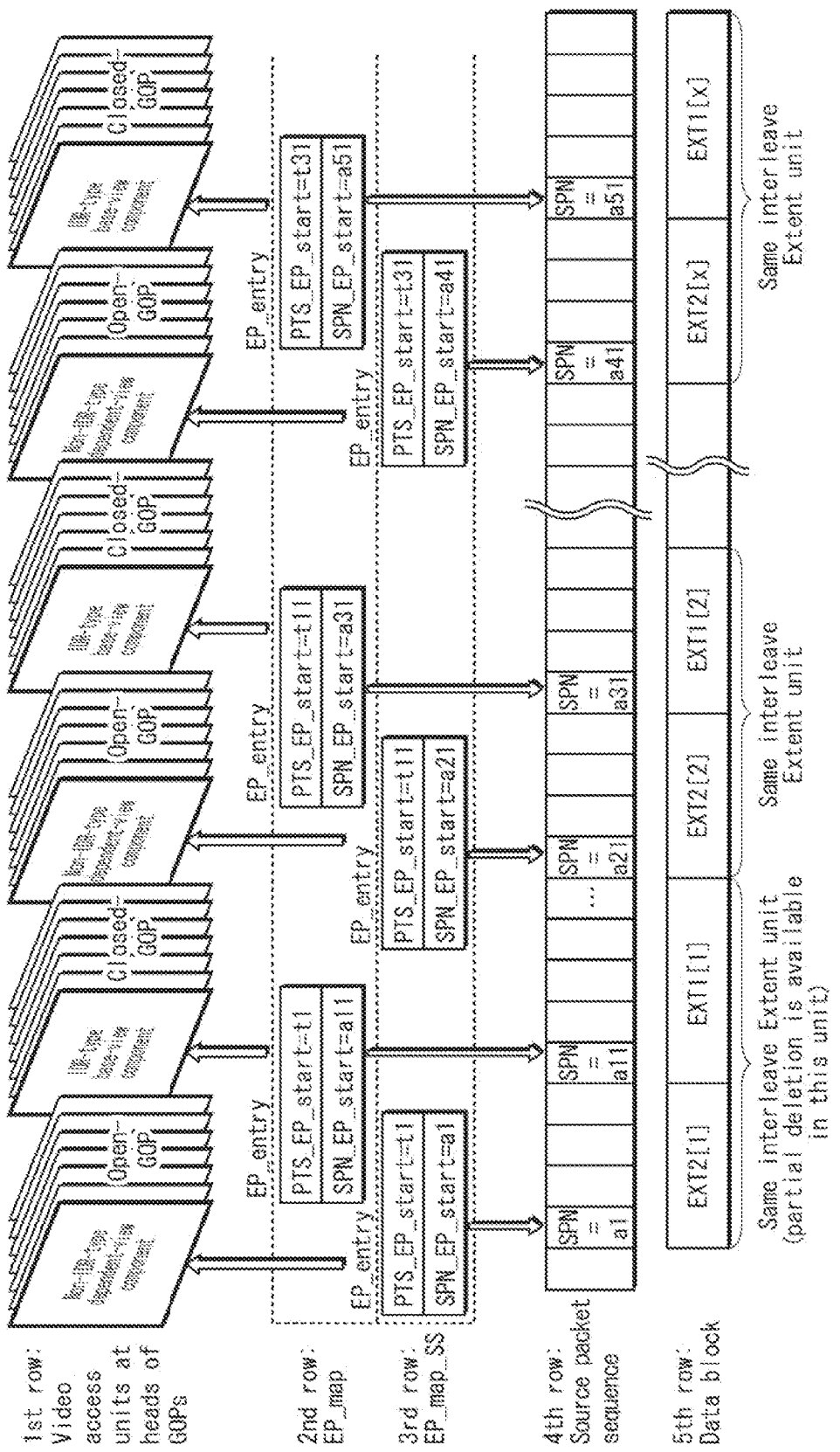
FIG. 54 illustrates one example of identifying the location of an Extent by using the EP_map, EP_map_SS, allocation descriptor, and Extent start point information.

FIG. 54 illustrates the basic entry map (EP_map) and the stereoscopic version of entry map (EP_map_SS). In FIG. 54, the fifth row illustrates a plurality of pairs of dependent-view data block and base-view data block. The fourth row illustrates a source packet sequence constituting the dependent-view data block and the base-view data block. The first row illustrates a plurality of pairs of: Open-GOP which is composed of dependent-view components of the MVC1080@24p/60i/50i dependent-view video stream; and Closed-GOP which is composed of base-view video components of the MVC1080@24p/60i/50i base-view video stream. The second row illustrates EP_map which is the basic entry map, and the third row illustrates EP_map_SS which is the stereoscopic version of entry map.

Here, among presentation time stamps t1, t11, t31 included in the EP_map, an arbitrary time stamp is referred to as PTS(i). Also, among source packet numbers a11, a31, a51, a source packet number corresponding to PTS(i) is referred to as SPN(i). Then, a Closed-GOP, whose starting component is a base-view component to be played back at PTS(i), is present within a range from a packet (m) specified by SPN(i) in the EP_map to a packet (n−1) which is immediately before a packet (n) specified by SPN(i+1) in the EP_map.

Furthermore, among presentation time stamps t1, t11, t31 included in the EP_map_SS, an arbitrary time stamp is referred to as PTS(i). Also, among source packet numbers a1, a21, a41, a source packet number corresponding to PTS(i) is referred to as SPN(j). Then, an Open-GOP, whose starting component is a dependent-view component to be played back at PTS(i), is present within a range from a packet (u) specified by SPN(j) in the EP_map_SS to a packet (v−1) which is immediately before a packet (v) specified by SPN(j+1) in the EP_map_SS.

Each pair of Closed-GOP composed of base-view components and Open-GOP composed of dependent-view components can be decoded independently. Accordingly, it is possible to provide stereoscopic video images per second by reading a plurality of source packets constituting the Closed-GOP and Open-GOP from the recording medium and supplying them into the video decoder. Thus, by freeing the logical blocks occupied by the Closed-GOPs composed of base-view components of the MVC1080@24p/60i/50i video stream and Open-GOPs composed of dependent-view components of the MVC1080@24p/60i/50i video stream, it is possible to partially delete the base-view video stream and dependent-view video stream without an inconsistency caused between viewpoints.

With the execution of such a deletion in which dependent-view data blocks of the MVC1080@24p/60i/50i dependent-view video stream and base-view data blocks of the MVC1080@24p/60i/50i base-view video stream are dealt with in association with each other, it is possible to delete matching portions from the m2ts file, file base and file dependent.

When a source packet located at the head of GOP(i) of the base-view video stream and a source packet located at the head of GOP(i) of the dependent-view video stream belong to a pair of successive Extents (interleaved Extent units), entries pointing to a source packet located at the head of GOP(i) of the MVC1080@24p/60i/50i base-view video stream and a source packet located at the head of GOP(i) of the MVC1080@24p/60i/50i dependent-view video stream are added in the basic entry map EP_map and the extended version of entry map EP_map_SS. Accordingly, by using both the basic entry map EP_map and the extended version of entry map EP_map_SS, it is possible to ensure a continuous reading of the GOP(i) of the MVC1080@24p/60i/50i base-view video stream and the GOP(i) of the MVC1080@24p/60i/50i dependent-view video stream.

With this structure, since the address of the IDR picture located at the head of Closed-GOP in the MVC1080@24p/60i/50i base-view video stream is associated with a playback start time, it is possible to grasp the range of source packets that constitute the Closed-GOP, among the MVC1080@24p/60i/50i base-view and dependent-view video streams. For the purpose of efficiently performing the above-described processes of facilitating such grasping and freeing part of the recording area of the video stream, the EP_map and the EP_map_SS are provided in the extension data to which ID1 having a value of 0x0002 or 0x0004 is assigned.

Figure 55:
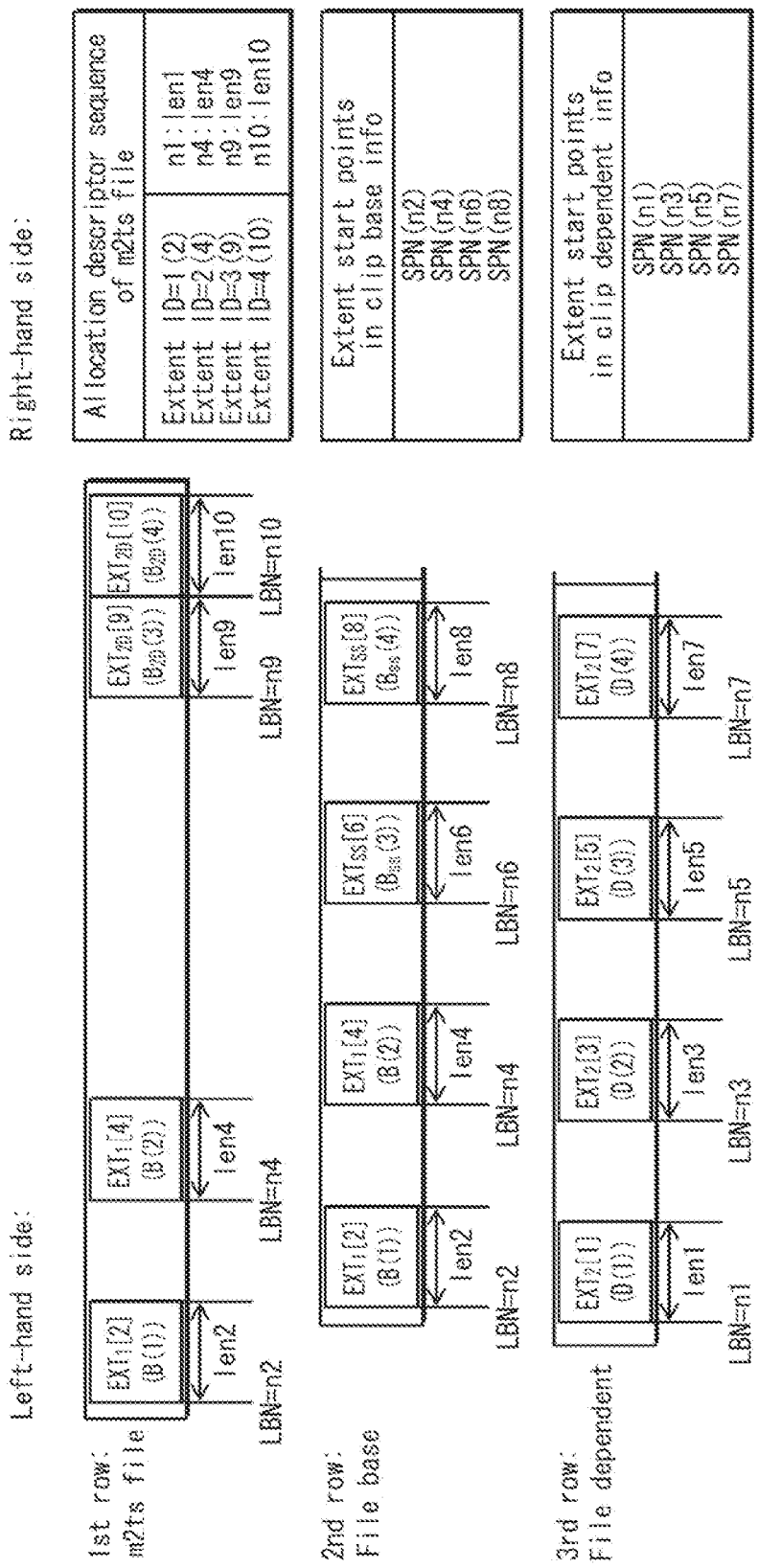
FIG. 55 illustrates one example of identifying the location of an Extent by using the allocation descriptor and Extent start point information.

FIG. 55 illustrates one example of identifying the location of an Extent by using the EP_map, EP_map_SS, allocation descriptor, and Extent start point information.

The first row to the third row on the left-hand side of FIG. 55 are the same as the first row to the third row of FIG. 50. FIG. 55 differs from FIG. 50 in that specific values of the allocation descriptors and Extent start points are provided on the right-hand side. On the right-hand side of the first row, the allocation descriptors of the m2ts file are shown. The m2ts file is composed of Extents EXT1[x], EXT2[x], EXT2D[x] that have been extracted from the ssif file. Thus, in the allocation descriptors of the m2ts file, Extent IDs in an independent form are assigned to the Extents. The allocation descriptors of the m2ts file include addresses (n2, n4) and data lengths (len1, len4) of EXT1[2], EXT1[4], as well as addresses (n9, n10) and data lengths (len9, len10) of EXT2D. When such allocation descriptors are written in the file entry of the m2ts file in the STREAM directory, EXT1[x] and EXT2D[x] of the stereoscopic interleaved stream file are recognized as the Extents of the m2ts file.

On the right-hand side of the second row in FIG. 55, the starting addresses of the Extents of the file base are shown in association with Extent start point information for extracting Extents of the file base. As illustrated on the left-hand side, the starting data of the Extents of the file base are present in the logical blocks with Logical Block Number (LBN)=n2, n4, n6, n8. On the right-hand side, Source Packet Numbers SPN (n2), SPN(n4), SPN(n6), SPN(n8), that are obtained by converting the LBNs into the source packet numbers, are shown as the start points of the Extents.

On the right-hand side of the third row in FIG. 55, the starting addresses of the Extents of the file dependent are shown in association with Extent start point information for the file dependent. As illustrated on the left-hand side, the starting data of the Extents of the file dependent are present in the logical blocks with Logical Block Number (LBN)=n1, n3, n5, n7. On the right-hand side, Source Packet Numbers SPN (n1), SPN(n3), SPN(n5), SPN(n9), that are obtained by converting the LBNs into the source packet numbers, are shown as the start points of the Extents.

The Extents of the m2ts file, file base, and file dependent are read independently of each other by using the allocation descriptors of the m2ts file, and the Extent start point information of the file base and file dependent.

Figure 56:
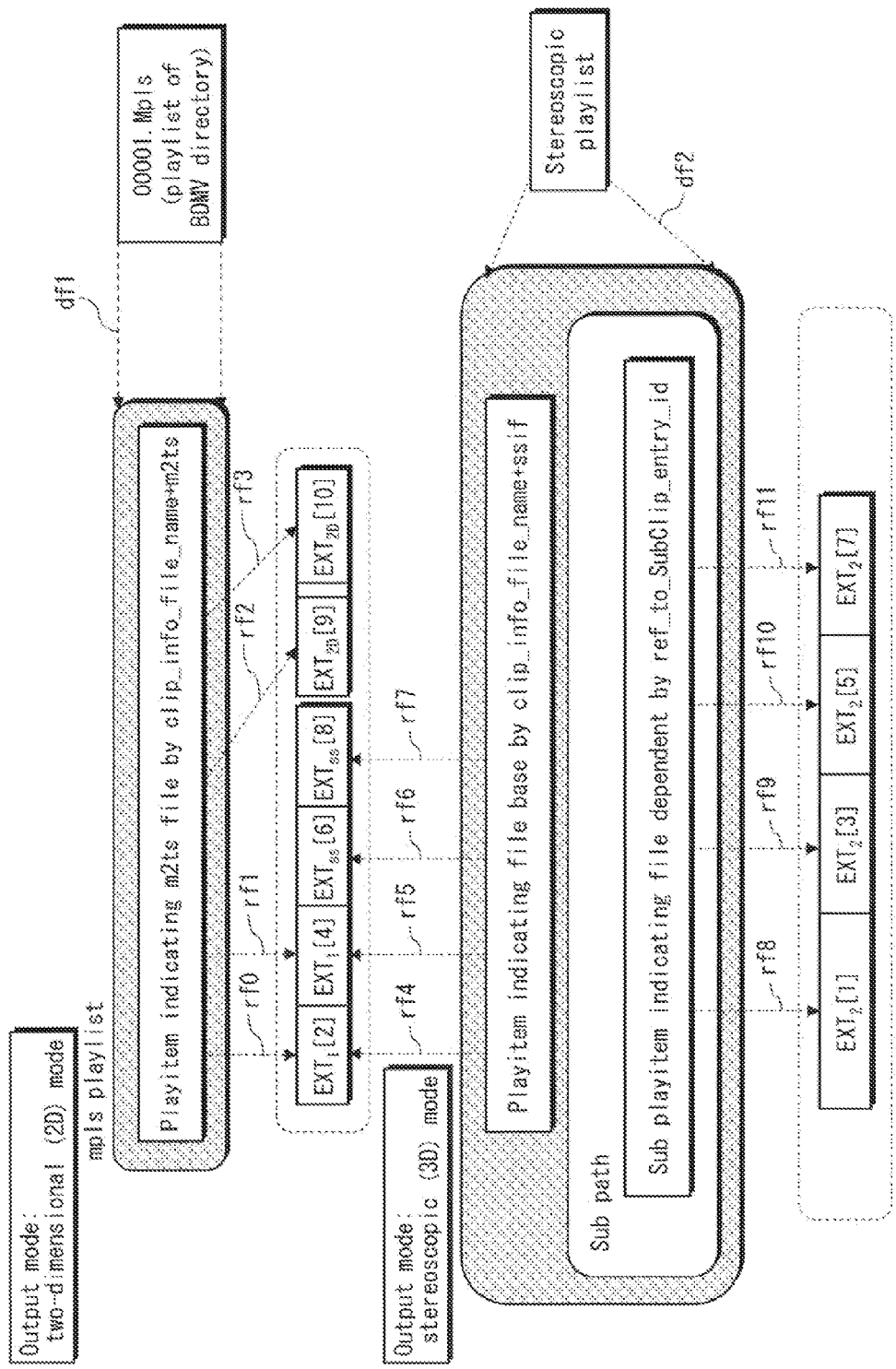
FIG. 56 illustrates a playlist, which is defined by the playlist file (mpls file) recorded in the BDMV directory, and a 3D playlist.

FIG. 56 illustrates a playlist, which is defined by the playlist file (mpls file) recorded in the BDMV directory, and a stereoscopic playlist. The first row shows the playlist information of the BDMV directory. The second row shows the base-view data blocks. The third row shows the stereoscopic playlist. The fourth row shows the dependent-view data blocks.

The arrows rf0, rf1, rf2, and rf3 indicate a playback path formed by combining the extension "m2ts" and a file name "00001" described in "clip_information_file_name" in the playitem information of the playlist information in th BDMV directory. In this case, the playback path on the base-view side is formed from Extents EXT1[2], EXT1[4], EXT2D[9], and EXT2D[10].

The arrows rf4, rf5, rf6, and rf7 show a playback path specified by the playitem information of the stereoscopic playlist information. In this case, the playback path on the base-view side is formed from Extents EXT1[2], EXT1[4], EXTss[6], and EXTss[8].

The arrows rf8, rf9, rf10, rf11 show a playback path specified by the sub playitem information of the stereoscopic playlist information. In this case, the playback path on the dependent-view side is formed from Extents EXT2[1], EXT2[3], EXT2[5], and EXT2[7]. These data blocks constituting the playback paths specified by the playitem information and the sub playitem information can be read by opening files by combining the extension "ssif" and file names written in "clip_information_file_name" in the playitem information.

When main TSs and sub TSs are stored in the interleaved stream file, a file name of the m2ts file is written in "clip_information_file_name" in the playitem information of the playlist in the BDMV directory. Also, a file name of the file base is written in "clip_information_file_name" in the playitem information of the stereoscopic playlist. Since the file base is a virtual file and its file name is the same as that of the interleaved stream file, the file name of the interleaved stream file can be written in "clip_information_file_name" in the playitem information. A file name of the file dependent is written in "ref_to_subclip_entry_id" in the stream registration information in STN_table_SS. The file name of the file dependent is created by adding "1" to the identification number of the interleaved stream file.

As described above, base-view and dependent-view data blocks of the MVC1080@24p/60i/50i video stream are stored in one ssif file, and the ssif file can be opened as any of the m2ts file, file base, and file dependent. With this structure, the decoder can treat the ssif file in the same manner as a regular stream file. Thus the storage method of the MVC1080@24p/60i/50i base-view and dependent-view video streams can be positively used for storing the ssif file.

In the normal playlist information not including the STN_table_SS, the m2ts file is described in "clip_information_file_name", and only the Extents of the m2ts file are referred to. On the other hand, in the playlist information including the STN_table_SS, the file name of the file base is described in "clip_information_file_name" in the playitem information in the main-path information, and the file name of the file dependent is described in the SubPlayItem in the sub-path information. Accordingly, by opening files in accordance with "clip_information_file_name" in the playitem information and "clip_information_file_name" in the SubPlayItem, it is possible to access, in sequence, the data blocks to be supplied to the decoder in the 3D output mode.

The above data structure ensures an associated selection in which a pair of the MVC1080@24p/60i/50i base-view video stream and the MVC1080@24p/60i/50i dependent-view video stream is selected in accordance with a selection of a playlist.

Figure 57A:
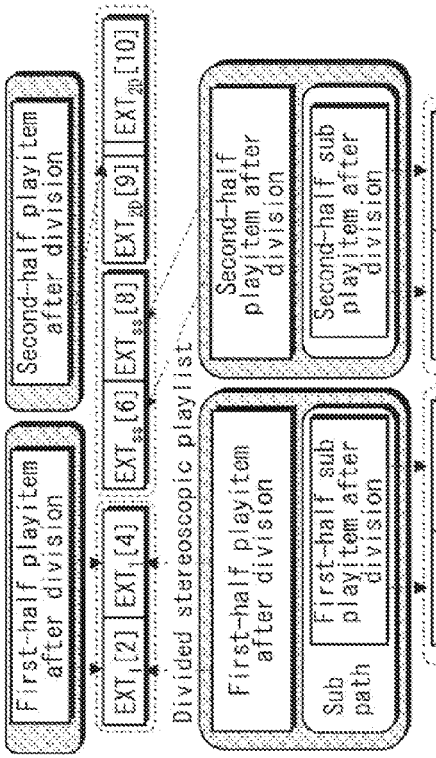
FIGS. 57A-57C illustrate three patterns of editing of the playlist.
Figure 57B:
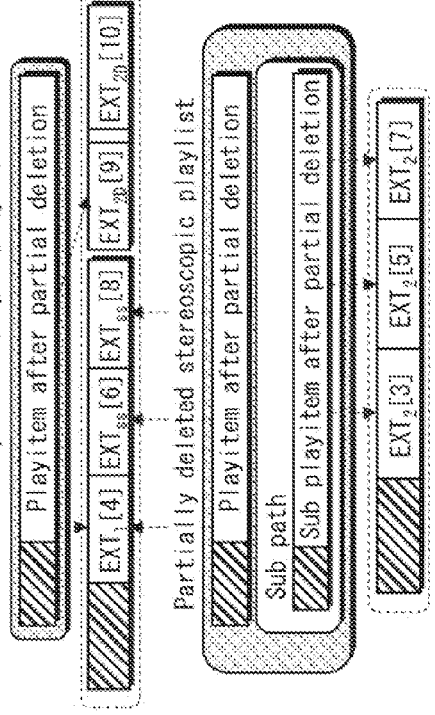
Figure 57C:
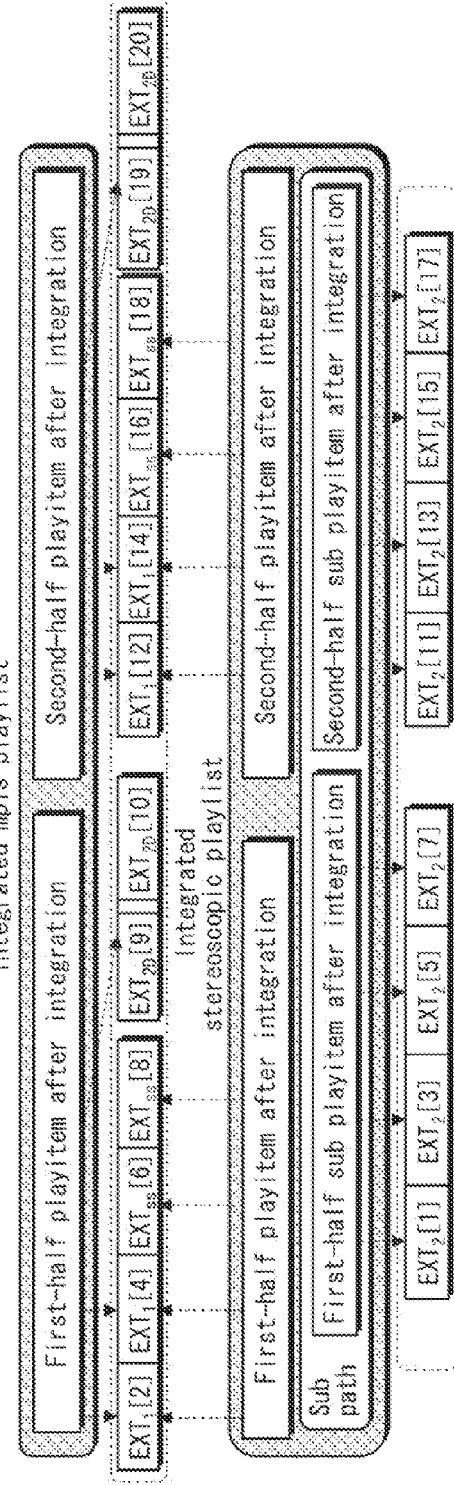

In optical discs, this 3D playlist becomes the target of playback. Editing the playlist includes the partial deletion, division, and integration. FIGS. 57A-57C illustrate three patterns of editing of the playlist. FIG. 57A illustrates a partially deleted movie playlist and a partially deleted 3D playlist. These are the cases where EXT2[1] and EXT1[2] have been deleted from the ssif file. FIG. 57B illustrates the cases where the ssif file is divided at positions immediately after EXT2[3] and EXT1[4]. FIG. 57C illustrates the case where two mpls playlists and two 3D playlists are integrated into one.

This completes the explanation of the 3D playlist. The following describes the AVC1080@60P/50P video stream.

FIGS. 58A-58F illustrate the case where the front part is deleted. Specifically, the front part is specified as the deletion range as illustrated in FIG. 58A, and the deletion is performed. The base-view components and dependent-view components belonging to the deletion range are present in the hatched portion of an Extent EXT2[1] and the hatched portion of an Extent EXT1[2] illustrated in FIG. 58B. It is supposed here that, after the deletion, the starting points of the Extents EXT2[1] and EXT1[2] are represented by n11 and n12, and the data lengths are represented by len11 and len12, respectively. In this case, allocation descriptors of the Extents EXT2[1] and EXT1[2] in the ssif file are written as illustrated in FIG. 58C. That is to say, the starting LBN and data length of the Extent EXT2[1] are described as "n11:len11", and the starting LBN and data length of the Extent EXT1[2] are described as "n12:len12". As described above, parts of the Extent EXT1[2] storing a base-view component and the Extent EXT2[1] storing a dependent-view component are deleted together. The Extent with "ID=1" in the m2ts file is described as illustrated in FIG. 58D. That is to say, in the allocation descriptor of the Extent with "ID=1", the starting LBN is rewritten from n1 to n11, and the data length is rewritten from len1 to len11. The other Extents are not rewritten.

FIG. 58E illustrates the Extent start point information of the file base. As illustrated in FIG. 58E, the Extent start point information of the file base includes source packet numbers SPN(n2), SPN(n4), and SPN(n16) of Extents EXT1[2], EXT1[4], and EXTss[6], respectively, among the original allocation descriptors of the file base. The first source packet number has been rewritten from n2 to n12 in connection with the deletion of the front part.

FIG. 58F illustrates the Extent start point information of the file dependent. As illustrated in FIG. 58E, the Extent start point information of the file dependent includes source packet numbers SPN(n1), SPN(n3), SPN(n5), and SPN(n7) of Extents EXT2[1], EXT2[3], EXT2[5], and EXT2[7], respectively, among the original allocation descriptors of the file base. The first source packet number has been rewritten from n1 to n11 in connection with the deletion of the front part.

FIGS. 59A-59F illustrate the case where the last part is deleted. Specifically, the last part is specified as the deletion range as illustrated in FIG. 59A, and the deletion is performed. The base-view components of the MVC1080@24p/60i/50i base-view video stream and dependent-view components of the MVC1080@24p/60i/50i dependent-view video stream belonging to the deletion range are present in the hatched portions of Extent EXT2[7], EXTss[8], and EXT2D[10] illustrated in FIG. 59B. It is supposed here that, after the deletion, the data length of the Extent EXT2[7] is represented by len17, and the data lengths of the Extents EXTss[8], EXT2D[10] are represented by len18, len20, respectively. In this case, allocation descriptors of the Extents EXT2[7], EXTss[8], and EXT2D[10] in the ssif file are written as illustrated in FIG. 59C. That is to say, the data lengths of the Extents EXT2[7], EXTss[8], and EXT2D[10] are rewritten as "len17", "len18", and "len20", respectively. As described above, parts of the Extents EXTss[8], EXT2D[10] storing base-view components and the Extent EXT2[7] storing a dependent-view component are deleted together.

The allocation descriptor of the Extent with "ID=4" in the m2ts file is described as illustrated in FIG. 59D. That is to say, the data length of the Extent with "ID=4" is rewritten from "len10" to "len20". The other Extents are not rewritten. FIG. 59E illustrates Extent start points of the file base. FIG. 59F illustrates Extent start points of the file dependent. The source packets described in these are not rewritten.

FIGS. 60A-60D illustrate the case where the middle part is deleted. Specifically, the middle part is specified as the deletion range as illustrated in FIG. 60A, and the deletion is performed. The base-view components of the MVC1080@24p/60i/50i base-view video stream and dependent-view components of the MVC1080@24p/60i/50i dependent-view video stream belonging to the deletion range are present in the hatched portions of Extents EXT2[5], EXTss[6], and EXT2D[9] illustrated in FIG. 60B. It is supposed here that, with regard to the Extents EXT2[5], EXTss[6], and EXT2D[9] after the deletion, the starting addresses are represented by n15, n16, and n19, and the data lengths are represented by len15, len16, and len19, respectively.

In this case, an Extent that precedes the deletion range and an Extent that succeeds the deletion range become different files. FIG. 60C illustrates allocation descriptors of the ssif file that precedes the deletion range; and FIG. 60D illustrates allocation descriptors of the ssif file that succeeds the deletion range. As illustrated in FIG. 60C, the allocation descriptors of the ssif file that precedes the deletion range are allocation descriptors having Extent IDs "1" through "4", among the allocation descriptors of the ssif file before deletion.

Also, as illustrated in FIG. 60D, the allocation descriptors of the ssif file that succeeds the deletion range are allocation descriptors having Extent IDs "5" through "10", among the allocation descriptors of the ssif file before deletion. Among these allocation descriptors, the allocation descriptors having EXT2[5], EXTss[6], and EXT2D[9] are written as illustrated in FIG. 60D. That is to say, the starting LBNs of the Extents EXT2[5], EXTss[6], and EXT2D[9] are rewritten as "n15", "n16", and "n19", respectively, and the data lengths thereof are rewritten as "len15", "len16", and "len19", respectively.

FIG. 61A illustrates allocation descriptors of the m2ts file that precedes the deleted middle part; and FIG. 61B illustrates allocation descriptors of the m2ts file that succeeds the deleted middle part. As illustrated in FIG. 61A, the allocation descriptors of the m2ts file that precedes the deleted middle part are allocation descriptors having Extent IDs "2" and "4", among the allocation descriptors of the m2ts file before deletion.

Also, as illustrated in FIG. 61B, the allocation descriptors of the m2ts file that succeeds the deleted middle part are allocation descriptors having Extent IDs "9" and "10", among the allocation descriptors of the m2ts file before deletion. In the allocation descriptor having Extent ID "9", the data length has been rewritten from "len9" to "len19".

FIG. 61C illustrates the Extent start point information of part of the file base located before the deleted middle part; and FIG. 61D illustrates the Extent start point information of part of the file dependent located before the deleted middle part. As illustrated in FIG. 61C, the Extent start point information of part of the file base located before the deleted middle part includes source packet numbers SPN(n2), SPN(n4), and SPN(n16) of Extents EXT1[2], EXT1[4], and EXTss[6], respectively, among the original allocation descriptors of the file base. The last source packet number has been rewritten from n6 to n16 in connection with the deletion of the middle part.

As illustrated in FIG. 61D, the Extent start point information of part of the file dependent located before the deleted middle part includes source packet numbers SPN(n1), SPN(n3), and SPN(n15) of Extents EXT2[1], EXT2[3], and EXT2[5], respectively, among the original allocation descriptors of the file dependent. The last source packet number has been rewritten from n5 to n15 in connection with the deletion of the middle part.

FIG. 61E illustrates the Extent start point information of part of the file base located after the deleted middle part; and FIG. 61F illustrates the Extent start point information of part of the file dependent located after the deleted middle part. As illustrated in FIG. 61E, the Extent start point information of part of the file base located after the deleted middle part includes source packet number SPN(n8) of Extent EXTss[8], among the original allocation descriptors of the file base.

As illustrated in FIG. 61F, the Extent start point information of part of the file dependent located after the deleted middle part includes source packet number SPN(n7) of Extent EXT2[7], among the original allocation descriptors of the file dependent.

The editing operations, such as partial deletion, division and integration, of the ssif file can be realized by executing the processes on the main TS illustrated in FIGS. 40 to 49 onto the sub TS, as well. On the other hand, since the ssif file has four types of Extents (EXT1[x], EXT2[x], EXT2D[x], and EXTss[x]), the partial deletion of Extent is performed as illustrated in FIG. 62, instead of FIG. 44.

Figure 62:
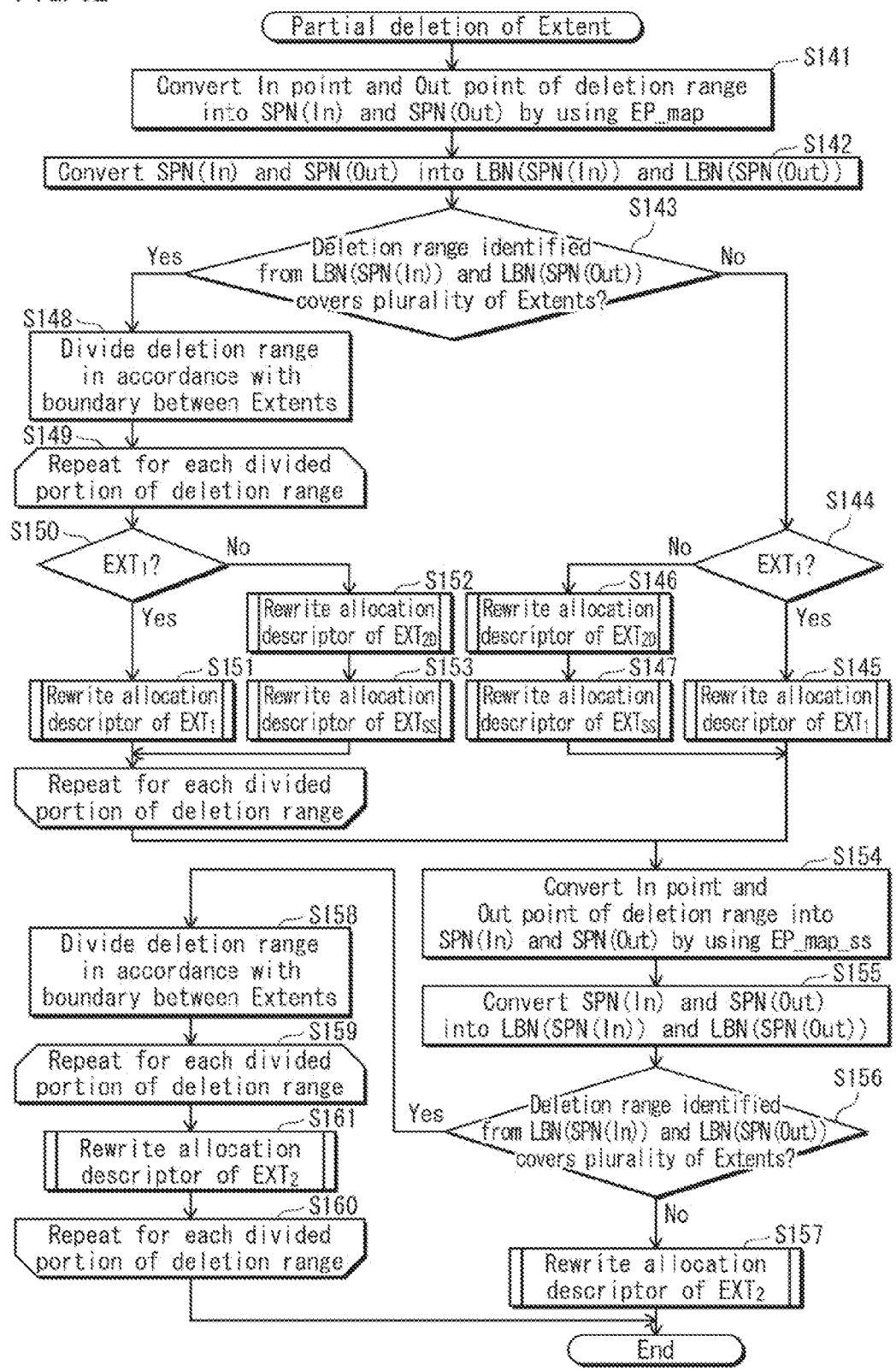
FIG. 62 is a flowchart illustrating the partial deletion of Extent.

FIG. 62 is a flowchart illustrating the partial deletion of Extent. In this flowchart, variable "In" and "Out" are control variables for specifying the start point and end point of a deletion range that is the processing target.

In step S141, the In point and Out point of the deletion range in the time axis are converted into SPN(In) and SPN(Out) by using EP_map. In step S142, SPN(In) and SPN(Out) are converted into logical addresses in the recording medium, thereby LBN(SPN(In)) and LBN(SPN(Out)) indicating the location of the deletion range in the target Extent are obtained. In step S143, it is judged whether or not the deletion range identified by LBN(SPN(In)) and LBN(SPN(Out)) covers a plurality of Extents. When it is judged that the deletion range exists in one Extent, the control proceeds to step S144. In step S144, it is judged whether or not the Extent in which the deletion range exists is EXT1. When it is judged Yes in step S144, the control proceeds to step S145 in which the allocation descriptor of EXT1 is rewritten. When it is judged in step S144 that the Extent in which the deletion range exists is not EXT1, the control proceeds to step S146 in which the allocation descriptor of EXT2D is rewritten, and then in step S147, the allocation descriptor of EXTss is rewritten.

When it is judged that the deletion range covers a plurality of Extents, the control proceeds to step S148 in which the deletion range is divided in accordance with the boundary between Extents, and the process of steps S151-S153 is repeated for each of the divided portions obtained by the division (step S149). The process of steps S151-S153 is performed as follows. It is judged whether or not the Extent in which the deletion range exists is EXT1 (step S150). When it is judged Yes step S150, the allocation descriptor of EXT1 is rewritten (step S151). When it is judged No in step S150, the allocation descriptor of EXT2D is rewritten (step S152), and then the allocation descriptor of EXTss is rewritten (step S153). The loop ends on a condition that it is judged Yes in a step, and the control unit maintains the same state until this condition is satisfied.

In step S154, the In point and Out point of the deletion range in the time axis are converted into SPN(In) and SPN(Out) by using EP_map_SS. In step S155, SPN(In) and SPN(Out) are converted into logical addresses in the recording medium, thereby LBN(SPN(In)) and LBN(SPN(Out)) indicating the location of the deletion range in the target Extent are obtained. In step S156, it is judged whether or not the deletion range identified by LBN(SPN(In)) and LBN(SPN(Out)) covers a plurality of Extents. When it is judged that the deletion range exists in one Extent, the control proceeds to step S157. In step S157, the allocation descriptor of EXT2 is rewritten.

When it is judged that the deletion range covers a plurality of Extents, the control proceeds to step S158 in which the deletion range is divided in accordance with the boundary between Extents, and the process of step S161 is repeated for each of the divided portions obtained by the division (step S160). In step S161, the allocation descriptor of EXT2D is rewritten. Each time the loop circles around, the control variables "In" and "Out" are changed to values of the next data element, and the data element indicated by the control variables is subjected to the process of the loop. The processing structure is to process each of a plurality of data elements each time the loop circles around.

<Supplementary Notes>

Up to now, the present invention has been described through the best embodiments that the Applicant recognizes as of the application of the present application. However, further improvements or changes can be added regarding the following technical topics. Whether to select any of the embodiments or the improvements and changes to implement the invention is optional and may be determined by the subjectivity of the implementer.

(Location of Extended_Editability_Flag)

In the above embodiments, the editability_flag and the extended_editability_flag, as editable/non-editable information, are provided in the index file and indicate whether or not the whole BDMV is editable. However, the editable/non-editable information may be provided in a playlist file or a clip information file, not in the index file.

When the editable/non-editable information (editability_flag, extended_editability_flag) is provided in a playlist file, it is possible to manage the editable/non-editable information in units of playlists. Also, when the editable/non-editable information (editability_flag, extended_editability_flag) is provided in a clip information file, it is possible to manage the editable/non-editable information in units of clip information files. Furthermore, as far as it is a method that can produce the same effect as the present embodiment, information for managing the editability of the 2D content and the 3D video content of MVC1080@24p/50i/60i may be provided in any file under the BDMV directory.

(Target Movie Recording Format)

In the above embodiments, the target movie recording format is of a version that supports a stereoscopic video stream and a video stream having an optional frame rate. However, not limited to this, the target movie recording format may be a version of a movie recording format that enables the image resolution or the pixel grayscale levels to be increased. Also, the target movie recording format may be a version of a realtime recording format.

(Embodiment of Integrated Circuit)

Among the structural elements of the playback unit, recording unit and editing unit described in the embodiments, components which correspond to logic circuits and storage elements, namely, the core of logic circuits excluding a mechanical part composed of the drive unit of the recording medium, connectors to external devices, and the like, may be realized as a system LSI. The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as a power supply, ground, and an interface with other circuits. Since, as described above, the pins in the system LSI play a role of an interface, the system LSI, which is connected with other circuits via the pins, plays a role as the core of the playback device.

The architecture of the integrated circuit includes a front-end unit, a signal processing unit, a back-end unit, a media I/O, a memory controller, and a host microcomputer, and the integrated circuit is connected with the drives, memory, and transmission/reception unit of the playback device via the media I/O and the memory controller. The drives of the playback device include a drive of the read-only medium, a drive of the local storage, and a drive of the removable medium.

The front-end unit includes a preprogrammed DMA master circuit and an I/O processor, and executes the overall packet process. The packet process corresponds to a process performed by a demultiplexer. The above packet process is realized by executing DMA transfers between the read buffer, the various plane memories and the various buffers provided in the memory of the playback device.

The signal processing unit includes a signal processor and a SIMD processor, and executes the overall signal process. The signal process includes decoding by the video decoder and decoding by the audio decoder.

The back-end unit includes an adder and a filter, and executes the overall AV output process. The AV output process includes a pixel process in which an image overlay, resizing, and image format conversion for the layer overlay are performed. The back-end unit 73 also executes a digital/analog conversion and the like.

The media I/O is an interface with drives and networks.

The memory controller is a slave circuit for memory accesses, and performs reading and writing packets and picture data from/to a memory in response to requests from the front-end unit, signal processing unit, and back-end unit. Through the reading/writing from or to the memory via the memory controller, the memory functions as the read buffer, and various buffers for the video plane, graphics plane, and video decoder.

The host microcomputer includes MPU, ROM, and RAM. The CPU provided in the host microcomputer includes an instruction fetch unit, a decoder, an execution unit, a register file, and a program counter. Programs for executing various processes described in the embodiments above are stored, as built-in programs, in the ROM provided in the microcomputer of the host microcomputer together with the basic input/output system (BIOS) and various middleware (operation systems). Therefore, the main functions of the playback device can be built in the system LSI.

(Embodiments of Program)

The program described in each embodiment may be implemented as computer code recorded on a non-transitory computer-readable recording medium, and may be provided to a recording device or a playback device in this form.

(Encoding Condition of AVC1080@60P/50P Video Stream)

The bit rate from the PID filter to the transport buffer is 28 Mbps. This Rts1 is described in the TS_Recording_Rate. The elementary buffer 1, which is an elementary stream buffer, has 3.75 MB, and the elementary picture buffer 1, which is a decoded picture buffer, has 12.382912 MB.

The format ID of the AVC1080@60P/50P video stream is set to "48", "44", "50", or "53" when HDMVTS includes the AVC1080@60P/50P video stream. In the level 4.2 of the AVC1080@60P/50P video stream, level "idc" of SPS is set to "42". When b4 of PSR29 is set to "1", indicating that a capability to playback the AVC1080@60P/50P video stream is provided, the decoder supports the level 4.2 of a high profile.

(Maximum Number of Frames in AVC1080@60P/50P Video Stream)

The following describes the maximum number of frames in the AVC1080@60P/50P video stream. Here, the transfer rate in the transfer from the transport buffer to the multiplexed buffer is represented as Rx1, and the transfer rate in the transfer from the multiplexed buffer to the elementary buffer is represented as Rbx1. Also, the frame_mbs_only_flag is a flag indicating that the picture includes only frame macro blocks that are composed of one image sample. In that case, the maximum number of frames that can be displayed in the GOP of the AVC1080@60P/50P video stream is 1920×1080, and in the case of 50/60 Hz, the frame_mbs_only_flag is set to "1", Rbx is 2.8 Mbps, Rx is 1.2×2.8 Mbps, and the maximum number of frames is 50/60. The frame_mbs_only_flag is set to "1", Rbx is 2.8 Mbps, Rx is 1.2×2.8 Mbps, and the maximum number of frames is 50/60. The frame_mbs_only_flag is set to "1", Rbx is 1.5 Mbps, Rx is 1.2×1.5 Mbps, and the maximum number of frames is 100/120.

(Restrictions on Macro Block)

The maximum size of one slice is one macro block row (macro block row, or a pair of macro block rows). The slice is composed of one or more macro block rows. The complete field pair or the maximum number of frames in the decoded picture buffer is set to level 4.1, 4.2, or 4 frames in 1920×1080, compared with the maximum DP B size in the ISO/IEC14496.

The minimum compression ratio (MinCR) of the main profile and profiles having the same Minprofile are restricted as follows. In the movie stream, when the main profile is 4.1, 4.2, MinCR is 4.

When the level idc of the SPS specifies 4.1, 4.2, the picture is composed of multi slice of four or more slices per picture. The number of macro blocks in any slice should not exceed ½ of the total number of macro blocks. The number of rows in a macro block in each slice should match the height of the current picture, or correspond to the interlace encoding mode. When the frame_mbs_only_flag is set to "1", a slice of the 1920×1080 format has 17 macro block rows. In the 1920×1080 format, the mbs_only is set to "1", and when the mb_adaptive_frame_field_type is set to "0", an even-number slice has eight macro block rows, and an odd-number slice has nine macro block rows (8/9/8/9 configuration).

When the mb_adaptive_frame_field_type is set to "1", an even-number slice has 16 macro block rows, and an odd-number slice has 18 macro block rows (16/18/16/18 configuration). When the mb_adaptive_frame_field_type is set to "0", it indicates that an encoded picture in the sequence includes a coded frame or a coded field. When the mb_adaptive_frame_field_type is set to "1", it indicates that an encoded picture in the sequence is a coded frame including only frame macro blocks.

(Combination of Parameters Permitted for Sequence Parameter Set in AVC1080@60P/50P Video Stream)

The following describes the SPS parameters for the AVC1080@60P/50P video stream. In the 1920×1080 format, a combination of parameters permitted for SPS in the AVC1080@60P/50P video stream is: the vertical size is 1080; the pic_width_in_mbs_minus1 is 119; the Pic_height_IN_map_unit_minus1 is 67; the frame rate is 59.94/50; and the method is progressive.

Here, the pic_width_in_mbs_minus1 indicates the width of the decoded picture in the macro block unit. The Pic_height_IN_map_unit_minus1 indicates the height of the slice group unit in the decoded frame/field.

The format=4 or the frame_rate=3 or 4 is set to the stream attribute SS of the STN_table_SS. When stereoscopic 1920×1080 interlace video capability (b8 of PSR24) is set to "1", a combination of parameters permitted in the MVC format is as follows. A permitted combination of parameters is: the vertical size is 1080; the pic_width_in_mbs_minus1 is 119; the Pic_height_in_map_unit_minus1 is 33; the frame rate is 29.57/25; and the method is interlace.

Here, the pic_width_in_mbs_minus1 indicates the width of the decoded picture in the macro block unit. The Pic_height_in_map_unit_minus1 indicates the height of the slice group unit in the decoded frame/field.

(Maximum Number of Frames in MVC1080@60i/50i Base-View Video Stream and MVC1080@60i/50i Dependent-View Video Stream)

Here, the transfer rate in the transfer from the transport buffer to the multiplexed buffer is represented as Rx1, and the transfer rate in the transfer from the multiplexed buffer to the elementary buffer is represented as Rbx1.

When the mbs_only_flag is set to "0", the values in Rbx1, Rbx2 of the base-view video stream are as follows.

When the maximum field in the 1920×1080/29.97 Hz is 60 fields, in the level 4.1, Rx1 is 1.2×40 Mbps, and Rbx1 is 40 Mbps. In the level 4, Rx1 is 1.2×24 Mbps, and Rbx1 is 24 Mbps.

When the maximum field in the 1920×1080/25 Hz is 60 fields, in the level 4.1, Rx1 is 1.2×40 Mbps, and Rbx1 is 40 Mbps. In the level 4, Rx1 is 1.2×24 Mbps, and Rbx1 is 24 Mbps.

When the maximum field in the 1920×1080/29.97 Hz is 120 fields, Rx1 is 1.2×15 Mbps, and Rbx1 is 15 Mbps.

When the maximum field in the 1920×1080/25 Hz is 100 fields, Rx1 is 1.2×15 Mbps, and Rbx1 is 15 Mbps.

The information recording medium of the present invention stores 3D video images supplied via broadcast waves or network distributions, or 3D video images shot by the user using a 3D-supporting video camera or the like. Accordingly, the present invention has high usability in the commercial device industry as a technology for protecting the 3D video contents of the user and enabling the user to view 3D video images more safely on various devices.

REFERENCE SIGNS LIST

1000 optical disc
1001 2D/3D recording device
1002 recording device
1003 remote control
1004 TV broadcast display device

The invention claimed is:

1. A non-transitory recording medium on which a stream file and an index file are recorded, the index file including an editability flag and an extended editability flag, the editability flag indicating, while set on, the recording medium being treated as an editable medium by a legacy device which does not support recording and editing of stereoscopic video, and while set off, the recording medium being treated as a non-editable medium by the legacy device, the extended editability flag indicating, while set on, the recording medium being treated as an editable medium by a non-legacy device even when the editability flag is set off, the non-legacy device supporting recording and editing of stereoscopic video, the recording medium including a media movie database area which comprises a plurality of subdirectories managed under a predetermined directory of a file system, the index file being stored in the predetermined directory, the stream file being stored in a stream subdirectory which is one of the plurality of subdirectories, the index file including a presence/absence flag indicating whether or not a stereoscopic content is present in the media movie database area, and the extended editability flag being generated in the index file on a condition that the presence/absence flag indicates that a stereoscopic content is present in the media movie database area.

2. The non-transitory recording medium of claim 1, wherein when the presence/absence flag is set on, the editability flag is set off, and when the extended editability flag is set on, the recording medium is treated as the editable medium by the non-legacy device, and when the extended editability flag is set off, the recording medium is treated as the non-editable medium by the non-legacy device.

3. The non-transitory recording medium of claim 2, wherein the stream file is classified into either a first stream file or a second stream file, the first stream file containing a plurality of stereoscopic video streams, the second stream file not containing a stereoscopic video stream, playlist information is recorded in the media movie database area, the playlist information is classified into either stereoscopic playlist information or normal playlist information, the stereoscopic playlist information defining a playback path of the plurality of stereoscopic video streams, the normal playlist information defining a playback path of a video stream, and when the playlist information is the stereoscopic playlist information, the presence/absence flag is set on.

4. The recording medium of claim 3, wherein the stereoscopic playlist information includes an extended stream selection table that includes a pair of a stream entry and a stream attribute, the stream file is a transport stream file obtained by multiplexing a base-view video stream and a dependent-view video stream, the stream entry indicates, to a demultiplexing unit of a playback device, a packet constituting the dependent-view video stream that is to be output to a video decoder of the playback device, and the stream attribute indicates that the dependent-view video stream has a frame format in accordance with an interlaced method and has a frame rate in accordance with a display frequency of the interlaced method.

5. The recording medium of claim 4, wherein the stream attribute includes encoding method information indicating that an encoding method applied to the dependent-view video stream is MPEG-4 MVC, and the stream attribute indicates that a horizontal-direction resolution of interlaced pictures is 1080, and the stream attribute indicates that the frame rate is 25 Hz or 29.97 Hz.

6. The recording medium of claim 3, wherein the playlist information includes a piece of playback section information defining a playback section of a base-view video stream and a piece of playback section information defining a playback section of a dependent-view video stream, editing is performable when the extended editability flag is set on partial deletion of the stream file, the partial deletion including:

processing of updating, for each of the base-view video stream and the dependent-view video stream, a start point or an end point of a corresponding piece of playback section information, processing of updating, for each of the base-view video stream and the dependent-view video stream, a start point or an end point of a corresponding arrival time clock (ATC) sequence, and processing of updating, for each of the base-view video stream and the dependent-view video stream, a start point or an end point of a corresponding system time clock (STC) sequence.

7. The recording medium of claim 1, wherein a device recognizes the recording medium as either an editable medium or a non-editable medium, based on the editability flag and the extended editability flag, as soon as the recording medium is inserted into the device and without any user operation being performed, and until the recording medium is ejected from the device.

8. A playback device for reading a stream file from a recording medium and playing back the stream file, the playback device comprising:

a reading unit configured to read an index file and the stream file from the recording medium; and a playback unit configured to play back a video stream contained in the stream file read by the reading unit, the index file including an editability flag, the editability flag indicating, while set on, the recording medium being treated as an editable medium by a legacy device which does not support recording and editing of stereoscopic video, and while set off, the recording medium being treated as a non-editable medium by the legacy device, wherein when the index file further includes an extended editability flag having been set on, the playback unit treats the recording medium as an editable medium and plays back the video stream even when the editability flag is set off, the recording medium includes a media movie database area which comprises a plurality of subdirectories managed under a predetermined directory of a file system, the index file being stored in the predetermined directory, the stream file being stored in a stream subdirectory which is one of the plurality of subdirectories, the index file includes a presence/absence flag indicating whether or not a stereoscopic content is present in the media movie database area, when the presence/absence flag is set on, the editability flag is set off, and when the extended editability flag is set on, the playback unit plays back the recording medium as the editable medium, and when the extended editability flag is set off, the playback unit plays back the recording medium as the non-editable medium.

9. The playback device of claim 8, wherein the stream file is classified into either a first stream file or a second stream file, the first stream file containing a plurality of stereoscopic video streams, the second stream file not containing a stereoscopic video stream, playlist information is recorded in the media movie database area, the playlist information is classified into either stereoscopic playlist information or normal playlist information, the stereoscopic playlist information defining a playback path of the plurality of stereoscopic video streams, the normal playlist information defining a playback path of a video stream, the reading unit reads a video stream specified by the playlist information, and the playback unit includes a video decoder configured to decode a view component included in the video stream read by the reading unit.

10. The playback device of claim 9 further comprising:

a version resister storing a version of the playback device, wherein the playback unit includes a demultiplexing unit that separates, from the stream file, one or more packets that are to be output to the video decoder, the playback device, when the version thereof is not a predetermined version supporting stereoscopic playback of interlaced pictures, acquires a first extended stream selection table from extent data, included in the stereoscopic playlist information, that is associated with an identifier with a first value, the playback device, when the version thereof is the predetermined version, acquires a second extended stream selection table from extent data, included in the stereoscopic playlist information, that is associated with an identifier with a second value, and causes the demultiplexing unit to separate one or more packets that are indicated by one or more packet identifiers included in a stream entry in the acquired extended stream selection table and associated with a stream attribute, and the first value is recognized by a device supporting only stereoscopic playback based on progressive pictures, and the second value is recognized by a device supporting both stereoscopic playback based on progressive pictures and stereoscopic playback based on interlaced pictures.

11. The playback device of claim 9, wherein the playback unit includes a video decoder and a demultiplexing unit that separates, from the stream file, one or more packets that are to be output to the video decoder, the stereoscopic playlist information includes an extended stream selection table that includes a pair of a stream entry and a stream attribute, the stream file is a transport stream file obtained by multiplexing a base-view video stream and a dependent-view video stream, the stream entry indicates, to the demultiplexing unit, a packet constituting the dependent-view video stream that is to be output to the video decoder, and the stream attribute indicates that the dependent-view video stream has a frame format in accordance with an interlaced method and has a frame rate in accordance with a display frequency of the interlaced method.

12. The playback device of claim 11, wherein the stream attribute includes encoding method information indicating that an encoding method applied to the dependent-view video stream is MPEG-4 MVC, and the stream attribute indicates that a horizontal-direction resolution of interlaced pictures is 1080, and the stream attribute indicates that the frame rate is 25 Hz or 29.97 Hz.

13. The playback device of claim 9, wherein the playlist information includes a piece of playback section information defining a playback section of a base-view video stream and a piece of playback section information defining a playback section of a dependent-view video stream, editing is performable when the extended editability flag is set on partial deletion of the stream file, the partial deletion including:

processing of updating, for each of the base-view video stream and the dependent-view video stream, a start point or an end point of a corresponding piece of playback section information, processing of updating, for each of the base-view video stream and the dependent-view video stream, a start point or an end point of a corresponding arrival time clock (ATC) sequence, and processing of updating, for each of the base-view video stream and the dependent-view video stream, a start point or an end point of a corresponding system time clock (STC) sequence.

14. A recording device comprising:

an encoder configured to obtain a video stream by performing an encoding process; and a writing unit configured to write the digital stream and an index file onto a recording medium, wherein the index file includes an editability flag and an extended editability flag, the writing unit sets the editability flag to a value indicating either on or off when the writing unit writes the index file onto the recording medium, the editability flag indicates, while set on, the recording medium being treated as an editable medium by a legacy device which does not support recording and editing of stereoscopic video, and while set off, the recording medium being treated as a non-editable medium by the legacy device, the extended editability flag indicates, while set on, the recording medium being treated as an editable medium by a non-legacy device even when the editability flag is set off, the non-legacy device supporting recording and editing of stereoscopic video, the recording medium includes a media movie database area which comprises a plurality of subdirectories managed under a predetermined directory of a file system, the index file being stored in the predetermined directory, the stream file being stored in a stream subdirectory which is one of the plurality of subdirectories, the writing unit writes the index file into the predetermined directory and writes the stream file into a stream subdirectory which is one of the plurality of subdirectories, and when writing the index file into the media movie database area, the writing unit generates a presence/absence flag in the index file and sets the presence/absence flag to a value indicating whether or not a stereoscopic content is present in the media movie database area.

15. The recording device of claim 14, wherein when writing the index file onto the recording medium, the writing unit sets the extended editability flag to a value indicating either on or off in accordance with a mode setting in the device such that when the extended editability flag is set on, the recording medium is treated as the editable medium by the non-legacy device, and when the extended editability flag is set off, the recording medium is treated as the non-editable medium by the non-legacy device.

16. The recording device of claim 15, wherein the stream file is classified into either a first stream file or a second stream file, the first stream file containing a plurality of stereoscopic video streams, the second stream file not containing a stereoscopic video stream, the writing unit writes playlist information into the media movie database area, the playlist information is classified into either stereoscopic playlist information or normal playlist information, the stereoscopic playlist information defining a playback path of the plurality of stereoscopic video streams, the normal playlist information defining a playback path of a video stream, and when the playlist information to be written into the media movie database area is the stereoscopic playlist information, the presence/absence flag is set on.

17. A non-transitory recording medium including a stream file and an index file, the stream file including a plurality of video streams, the plurality of video streams including: a video stream composed of progressive pictures and having a mandatory frame rate; and a video stream composed of progressive pictures and having an optional frame rate, the index file including an editability flag and an extended editability flag, the editability flag indicating, while set on, the recording medium being treated as an editable medium by a legacy device which does not support recording and editing of progressive pictures at the optional frame rate, and while set off, the recording medium being treated as a non-editable medium by the legacy device, and the extended editability flag indicating, while set on, the recording medium being treated as an editable medium by a non-legacy device even when the editability flag is set off, the non-legacy device supporting recording and editing of the progressive pictures at the optional frame rate.

18. The non-transitory recording medium of claim 17 further including playlist information, wherein the playlist information includes a plurality of pieces of playback section information, each of the plurality of pieces of playback section information including:

information indicating a start point and an end point of a playback section in a time axis; and a stream selection table showing a list of elementary streams that are permitted to be played back in the playback section, and the extended editability flag is generated in the index file on a condition that an entry of the video stream composed of progressive pictures and having the optional frame rate is present in a stream selection table in any one of the plurality of pieces of playback section information in the playlist information.

19. The non-transitory recording medium of claim 18, wherein when the extended editability flag is set on, the recording medium is treated as an editable medium by the non-legacy device, and when the extended editability flag is set off, the recording medium is treated as a non-editable medium by the non-legacy device.

20. The recording medium of claim 18, wherein the optional frame rate equals a display frequency of an interlaced method, the entry of the video stream is associated with a stream attribute in the stream selection table, and indicates, to a demultiplexing unit of a playback device, a packet constituting the video stream that is to be output to a video decoder of the playback device, and the stream attribute indicates that the video stream has a frame format in accordance with a progressive method and has a frame rate equaling the display frequency of the interlaced method.

21. The recording medium of claim 20, wherein the stream attribute includes encoding method information indicating that an encoding method applied to the video stream is MPEG-4 AVC, and the stream attribute indicates that a horizontal-direction resolution of interlaced pictures is 1080, and the stream attribute indicates that the frame rate is 50 Hz or 59.94 Hz.

22. A playback device comprising:

a reading unit configured to read an index file and a stream file from a recording medium; and a playback unit configured to play back a video stream contained in the stream file read by the reading unit, the index file including an editability flag, the editability flag indicating, while set on, the recording medium being treated as an editable medium by a legacy device which does not support recording and editing of progressive pictures at the optional frame rate, and while set off, the recording medium being treated as a non-editable medium by the legacy device, and when the index file further includes an extended editability flag having been set on, the playback unit treats the recording medium as the editable medium and plays back the video stream even when the editability flag is set off.

23. The playback device of claim 22, wherein the recording medium further includes playlist information, the playlist information includes a plurality of pieces of playback section information, each of the plurality of pieces of playback section information includes:

information indicating a start point and an end point of a playback section in a time axis; and a stream selection table showing a list of elementary streams that are permitted to be played back in the playback section, the extended editability flag is generated in the index file on a condition that an entry of the video stream composed of progressive pictures and having the optional frame rate is present in a stream selection table in any one of the plurality of pieces of playback section information in the playlist information, the playback device further comprises:

a stream number register storing a current stream number;

a playback section information number register storing a number assigned to current playback section information which is one of the plurality of pieces of playback section information; and a demultiplexing unit configured to demultiplex one or more of a plurality of elementary streams shown in a stream selection table included in the current playback section information that correspond to the current stream number, to obtain one or more demultiplexed elementary streams, and the playback unit includes a video decoder configured to decode, among the one or more demultiplexed elementary streams obtained by the demultiplexing, a video stream composed of progressive pictures and having an optional frame rate.

24. The playback device of claim 23, wherein the editability flag is set off when an entry of the video stream composed of progressive pictures and having the optional frame rate is present in a stream selection table in any one of the plurality of pieces of playback section information in the playlist information, and when the extended editability flag is set on, the playback unit plays back the recording medium as the editable medium, and when the extended editability flag is set off, the playback unit plays back the recording medium as the non-editable medium.

25. The playback device of claim 23, wherein
the optional frame rate equals a display frequency of an interlaced method,
the entry of the video stream is associated with a stream attribute in the stream selection table, and indicates, to the demultiplexing unit, a packet constituting the video stream that is to be output to the video decoder, and
the stream attribute indicates that the video stream has a frame format in accordance with a progressive method and has a frame rate equaling the display frequency of the interlaced method.

26. The playback device of claim 25, wherein
the stream attribute includes encoding method information indicating that an encoding method applied to the video stream is MPEG-4 AVC, and
the stream attribute indicates that a horizontal-direction resolution of interlaced pictures is 1080, and
the stream attribute indicates that the frame rate is 50 Hz or 59.94 Hz.

27. A recording device comprising:
an encoder configured to obtain a video stream by performing an encoding process; and
a writing unit configured to write the digital stream and an index file onto a recording medium, wherein
the index file includes an editability flag and an extended editability flag,
the writing unit sets the editability flag to a value indicating either on or off when the writing unit writes the index file onto the recording medium,
the editability flag indicating, while set on, the recording medium being treated as an editable medium by a legacy device which does not support recording and editing of progressive pictures at the optional frame rate, and while set off, the recording medium being treated as a non-editable medium by the legacy device, and
the extended editability flag indicating, while set on, the recording medium being treated as an editable medium by a non-legacy device even when the editability flag is set off, the non-legacy device supporting recording and editing of the progressive pictures at the optional frame rate.

28. The recording device of claim 27, wherein
the writing unit writes playlist information onto the recording medium,
the playlist information includes a plurality of pieces of playback section information,
each of the plurality of pieces of playback section information includes:
information indicating a start point and an end point of a playback section in a time axis; and
a stream selection table showing a list of elementary streams that are permitted to be played back in the playback section, and
the extended editability flag is generated in the index file on a condition that an entry of the video stream composed of progressive pictures and having the optional frame rate is present in a stream selection table in any one of the plurality of pieces of playback section information in the playlist information.

29. The recording device of claim 28, wherein
when writing the index file onto the recording medium, the writing unit sets the extended editability flag to a value indicating either on or off in accordance with a mode setting in the device such that when the extended editability flag is set on, the recording medium is treated as the editable medium by the non-legacy device, and when the extended editability flag is set off, the recording medium is treated as a non-editable medium by the non-legacy device.

* * * * *